(12) United States Patent
Shirayanagi

(10) Patent No.: US 6,994,435 B2
(45) Date of Patent: Feb. 7, 2006

(54) ASPHERICAL SPECTACLE LENS

(75) Inventor: Moriyasu Shirayanagi, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 72 days.

(21) Appl. No.: 10/790,541

(22) Filed: Mar. 2, 2004

(65) Prior Publication Data

US 2004/0174494 A1 Sep. 9, 2004

(30) Foreign Application Priority Data

Mar. 3, 2003 (JP) ............................. 2003-055191

(51) Int. Cl.
*G02C 7/02* (2006.01)

(52) U.S. Cl. ...................... 351/159; 351/176
(58) Field of Classification Search ................ 351/159, 351/169, 176
See application file for complete search history.

(56) References Cited

U.S. PATENT DOCUMENTS

| | | | |
|---|---|---|---|
| 5,270,746 A | 12/1993 | Kato et al. ............... | 351/176 |
| 6,056,401 A | 5/2000 | Shirayanagi ............. | 351/159 |
| 6,715,875 B2 | 4/2004 | Obara ....................... | 351/159 |
| 6,789,895 B2 * | 9/2004 | Shirayanagi ............. | 351/159 |
| 2002/0067462 A1 | 6/2002 | Shirayanagi ............. | 351/159 |

FOREIGN PATENT DOCUMENTS

| | | |
|---|---|---|
| JP | 4-45419 | 2/1992 |
| JP | 10-78566 | 3/1998 |

* cited by examiner

*Primary Examiner*—Scott J. Sugarman
(74) *Attorney, Agent, or Firm*—Greenblum & Bernstein, P.L.C.

(57) ABSTRACT

There is provided a spectacle lens having an outer surface and an inner surface, one of the outer and inner surfaces being configured to be a rotationally-asymmetrical aspherical surface. When a curvature at a coordinate $(h,\theta)$ of the outer surface is represented by $C_1(h,\theta)$, a curvature at a coordinate $(h,\theta)$ of the inner surface is represented by $C_2(h,\theta)$, and a difference between curvatures of the outer surface and the inner surface at the coordinate $(h,\theta)$ is represented by $C_{2-1}(h,\theta)=C_2(h,\theta)-C_1(h,\theta)$, if $C_{2-1}(0,\theta)>0$, within the ranges of 10 mm$\leq$h[mm]$\leq$20 mm and 30°$\leq\theta$[°]$\leq$150° the spectacle lens satisfying a condition (1):

$$C_{2-1}(h,\theta+180)-C_{2-1}(h,\theta)>0, \qquad (1)$$

and if $C_{2-1}(0,\theta)<0$, the spectacle lens satisfying a condition (2):

$$C_{2-1}(h,\theta+180)-C_{2-1}(h,\theta)<0. \qquad (2)$$

11 Claims, 111 Drawing Sheets

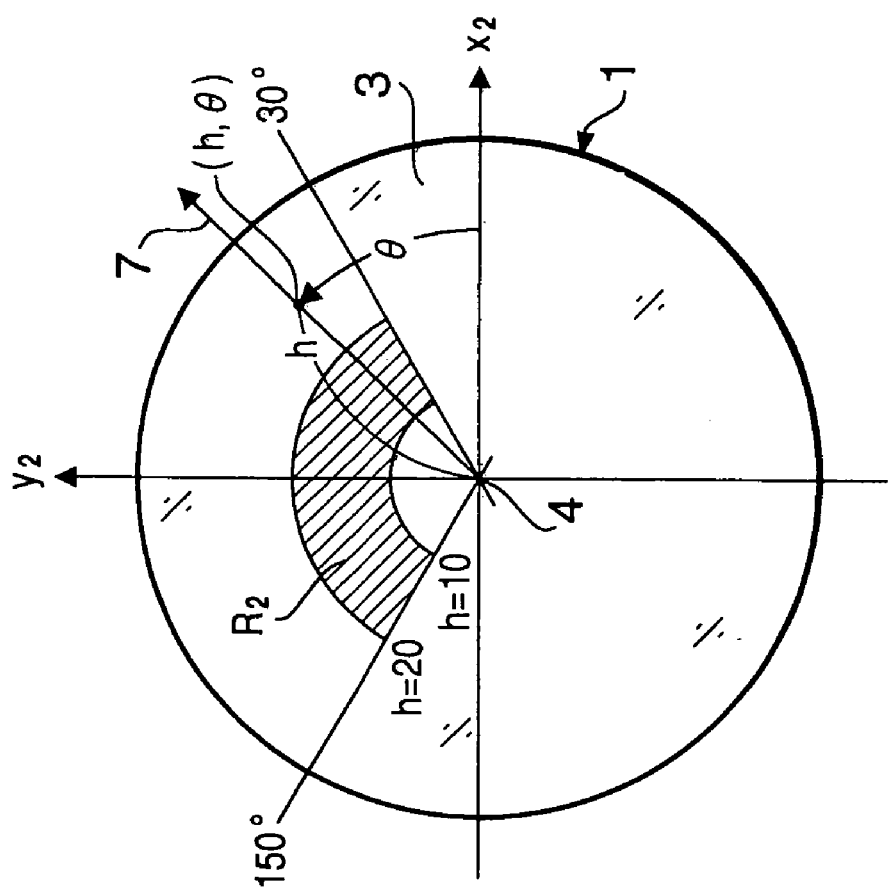
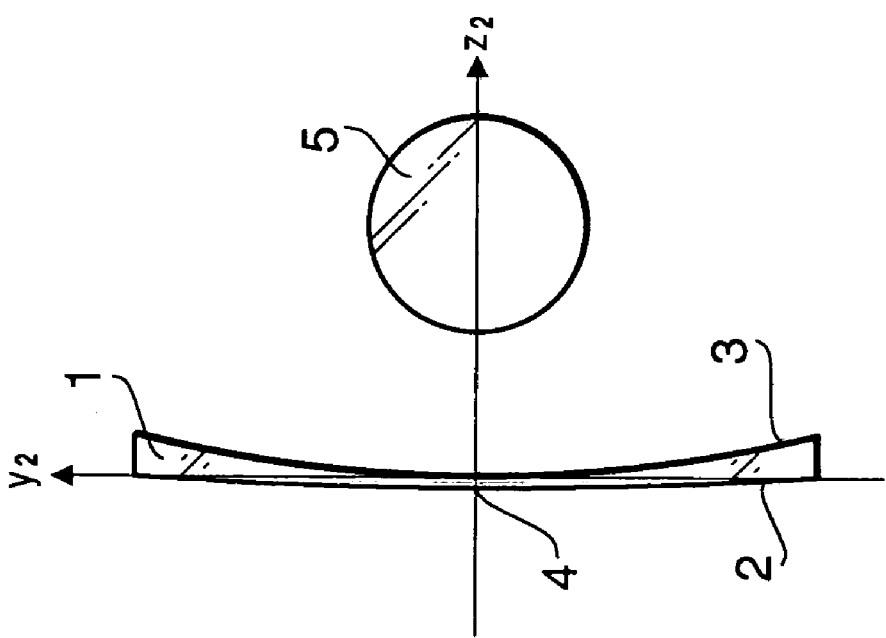
FIG. 1B
FIG. 1A

| | $C_1(h,\theta)$ | | | | | | | |
|---|---|---|---|---|---|---|---|---|
| h\θ | 0 | 45 | 90 | 135 | 180 | 225 | 270 | 315 |
| 0.0 | 1.35 | 1.35 | 1.35 | 1.35 | 1.35 | 1.35 | 1.35 | 1.35 |
| 5.0 | 1.35 | 1.35 | 1.35 | 1.35 | 1.35 | 1.35 | 1.35 | 1.35 |
| 10.0 | 1.35 | 1.35 | 1.35 | 1.35 | 1.35 | 1.35 | 1.35 | 1.35 |
| 15.0 | 1.35 | 1.35 | 1.35 | 1.35 | 1.35 | 1.35 | 1.35 | 1.35 |
| 20.0 | 1.35 | 1.35 | 1.35 | 1.35 | 1.35 | 1.35 | 1.35 | 1.35 |
| 25.0 | 1.35 | 1.35 | 1.35 | 1.35 | 1.35 | 1.35 | 1.35 | 1.35 |

| | $C_2(h,\theta)$ | | | | | | | |
|---|---|---|---|---|---|---|---|---|
| h\θ | 0 | 45 | 90 | 135 | 180 | 225 | 270 | 315 |
| 0.0 | 7.36 | 7.36 | 7.36 | 7.36 | 7.36 | 7.36 | 7.36 | 7.36 |
| 5.0 | 7.22 | 7.19 | 7.18 | 7.19 | 7.22 | 7.25 | 7.26 | 7.25 |
| 10.0 | 6.85 | 6.74 | 6.70 | 6.74 | 6.85 | 6.96 | 7.00 | 6.96 |
| 15.0 | 6.38 | 6.15 | 6.06 | 6.15 | 6.38 | 6.61 | 6.71 | 6.61 |
| 20.0 | 5.94 | 5.57 | 5.43 | 5.57 | 5.94 | 6.32 | 6.49 | 6.32 |
| 25.0 | 5.61 | 5.08 | 4.88 | 5.08 | 5.61 | 6.18 | 6.43 | 6.18 |

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 6.77 | 6.77 | 6.77 | 6.77 | 6.77 | 6.77 | 6.77 | 6.77 |
| 5.0 | 6.79 | 6.81 | 6.82 | 6.81 | 6.79 | 6.77 | 6.77 | 6.77 |
| 10.0 | 6.84 | 6.92 | 6.95 | 6.92 | 6.84 | 6.77 | 6.73 | 6.77 |
| 15.0 | 6.84 | 7.00 | 7.07 | 7.00 | 6.84 | 6.68 | 6.61 | 6.68 |
| 20.0 | 6.72 | 6.98 | 7.08 | 6.98 | 6.72 | 6.46 | 6.34 | 6.46 |
| 25.0 | 6.45 | 6.81 | 6.95 | 6.81 | 6.45 | 6.07 | 5.91 | 6.07 |

FIG.11A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 12.80 | 12.80 | 12.80 | 12.80 | 12.80 | 12.80 | 12.80 | 12.80 |
| 5.0 | 12.80 | 12.80 | 12.80 | 12.80 | 12.80 | 12.80 | 12.80 | 12.80 |
| 10.0 | 12.80 | 12.80 | 12.80 | 12.80 | 12.80 | 12.80 | 12.80 | 12.80 |
| 15.0 | 12.80 | 12.80 | 12.80 | 12.80 | 12.80 | 12.80 | 12.80 | 12.80 |
| 20.0 | 12.80 | 12.80 | 12.80 | 12.80 | 12.80 | 12.80 | 12.80 | 12.80 |
| 25.0 | 12.80 | 12.80 | 12.80 | 12.80 | 12.80 | 12.80 | 12.80 | 12.80 |

FIG.11B

| $C_1(h,\theta)$ | | | | | | | | |
|---|---|---|---|---|---|---|---|---|
| h\θ | 0 | 45 | 90 | 135 | 180 | 225 | 270 | 315 |
| 0.0 | 2.44 | 2.44 | 2.44 | 2.44 | 2.44 | 2.44 | 2.44 | 2.44 |
| 5.0 | 2.54 | 2.54 | 2.54 | 2.54 | 2.54 | 2.54 | 2.54 | 2.54 |
| 10.0 | 2.79 | 2.79 | 2.79 | 2.79 | 2.79 | 2.79 | 2.79 | 2.79 |
| 15.0 | 3.09 | 3.09 | 3.09 | 3.09 | 3.09 | 3.09 | 3.09 | 3.09 |
| 20.0 | 3.34 | 3.34 | 3.34 | 3.34 | 3.34 | 3.34 | 3.34 | 3.34 |
| 25.0 | 3.46 | 3.46 | 3.46 | 3.46 | 3.46 | 3.46 | 3.46 | 3.46 |

FIG.17A

| $C_2(h,\theta)$ | | | | | | | | |
|---|---|---|---|---|---|---|---|---|
| h\θ | 0 | 45 | 90 | 135 | 180 | 225 | 270 | 315 |
| 0.0 | 8.46 | 8.46 | 8.46 | 8.46 | 8.46 | 8.46 | 8.46 | 8.46 |
| 5.0 | 8.46 | 8.46 | 8.46 | 8.46 | 8.46 | 8.46 | 8.46 | 8.46 |
| 10.0 | 8.46 | 8.46 | 8.46 | 8.46 | 8.46 | 8.46 | 8.46 | 8.46 |
| 15.0 | 8.46 | 8.46 | 8.46 | 8.46 | 8.46 | 8.46 | 8.46 | 8.46 |
| 20.0 | 8.46 | 8.46 | 8.46 | 8.46 | 8.46 | 8.46 | 8.46 | 8.46 |
| 25.0 | 8.46 | 8.46 | 8.46 | 8.46 | 8.46 | 8.46 | 8.46 | 8.46 |

FIG.17B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 1.35 | 1.35 | 1.35 | 1.35 | 1.35 | 1.35 | 1.35 | 1.35 |
| 5.0 | 1.35 | 1.35 | 1.35 | 1.35 | 1.35 | 1.35 | 1.35 | 1.35 |
| 10.0 | 1.35 | 1.35 | 1.35 | 1.35 | 1.35 | 1.35 | 1.35 | 1.35 |
| 15.0 | 1.35 | 1.35 | 1.35 | 1.35 | 1.35 | 1.35 | 1.35 | 1.35 |
| 20.0 | 1.35 | 1.35 | 1.35 | 1.35 | 1.35 | 1.35 | 1.35 | 1.35 |
| 25.0 | 1.35 | 1.35 | 1.35 | 1.35 | 1.35 | 1.35 | 1.35 | 1.35 |

FIG.23A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 7.36 | 10.37 | 13.38 | 10.37 | 7.36 | 10.37 | 13.38 | 10.37 |
| 5.0 | 7.22 | 10.17 | 13.16 | 10.17 | 7.22 | 10.25 | 13.31 | 10.25 |
| 10.0 | 6.85 | 9.63 | 12.55 | 9.63 | 6.85 | 9.96 | 13.15 | 9.96 |
| 15.0 | 6.38 | 8.93 | 11.72 | 8.93 | 6.36 | 9.63 | 13.10 | 9.63 |
| 20.0 | 5.94 | 8.22 | 10.91 | 8.22 | 5.94 | 9.45 | 13.40 | 9.45 |
| 25.0 | 5.61 | 7.66 | 10.33 | 7.66 | 5.61 | 9.56 | 14.60 | 9.56 |

FIG.23B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 2.44 | 2.44 | 2.44 | 2.44 | 2.44 | 2.44 | 2.44 | 2.44 |
| 5.0 | 2.55 | 2.59 | 2.60 | 2.59 | 2.55 | 2.52 | 2.47 | 2.52 |
| 10.0 | 2.61 | 2.94 | 2.97 | 2.94 | 2.81 | 2.68 | 2.49 | 2.68 |
| 15.0 | 3.10 | 3.32 | 3.32 | 3.32 | 3.10 | 2.80 | 2.40 | 2.80 |
| 20.0 | 3.29 | 3.55 | 3.49 | 3.55 | 3.29 | 2.76 | 2.11 | 2.76 |
| 25.0 | 3.35 | 3.58 | 3.42 | 3.56 | 3.35 | 2.54 | 1.63 | 2.54 |

FIG.29A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 8.46 | 11.47 | 14.47 | 11.47 | 8.46 | 11.47 | 14.47 | 11.47 |
| 5.0 | 8.46 | 11.47 | 14.47 | 11.47 | 8.46 | 11.47 | 14.47 | 11.47 |
| 10.0 | 8.46 | 11.47 | 14.47 | 11.47 | 8.46 | 11.47 | 14.47 | 11.47 |
| 15.0 | 8.46 | 11.47 | 14.47 | 11.47 | 8.46 | 11.47 | 14.47 | 11.47 |
| 20.0 | 8.46 | 11.47 | 14.47 | 11.47 | 8.46 | 11.47 | 14.47 | 11.47 |
| 25.0 | 8.46 | 11.47 | 14.47 | 11.47 | 8.46 | 11.47 | 14.47 | 11.47 |

FIG.29B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 2.44 | 2.44 | 2.44 | 2.44 | 2.44 | 2.44 | 2.44 | 2.44 |
| 5.0 | 2.54 | 2.54 | 2.54 | 2.54 | 2.54 | 2.54 | 2.54 | 2.54 |
| 10.0 | 2.79 | 2.79 | 2.79 | 2.79 | 2.79 | 2.79 | 2.79 | 2.79 |
| 15.0 | 3.09 | 3.09 | 3.09 | 3.09 | 3.09 | 3.09 | 3.09 | 3.09 |
| 20.0 | 3.34 | 3.34 | 3.34 | 3.34 | 3.34 | 3.34 | 3.34 | 3.34 |
| 25.0 | 3.46 | 3.46 | 3.46 | 3.46 | 3.46 | 3.46 | 3.46 | 3.46 |

FIG.35A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 8.46 | 11.47 | 14.47 | 11.47 | 8.46 | 11.47 | 14.47 | 11.47 |
| 5.0 | 8.46 | 11.46 | 14.47 | 11.46 | 8.46 | 11.46 | 14.47 | 11.46 |
| 10.0 | 8.46 | 11.45 | 14.47 | 11.45 | 8.46 | 11.45 | 14.47 | 11.45 |
| 15.0 | 8.46 | 11.44 | 14.47 | 11.44 | 8.46 | 11.44 | 14.47 | 11.44 |
| 20.0 | 8.46 | 11.42 | 14.47 | 11.42 | 8.46 | 11.42 | 14.47 | 11.42 |
| 25.0 | 8.46 | 11.39 | 14.47 | 11.39 | 8.46 | 11.39 | 14.47 | 11.39 |

FIG.35B

| | \multicolumn{8}{c}{$C_1(h, \theta)$} |
|---|---|---|---|---|---|---|---|---|
| h\θ | 0 | 45 | 90 | 135 | 180 | 225 | 270 | 315 |
| 0.0 | 0.68 | 0.68 | 0.68 | 0.68 | 0.68 | 0.68 | 0.68 | 0.68 |
| 5.0 | 0.68 | 0.68 | 0.68 | 0.68 | 0.68 | 0.68 | 0.68 | 0.68 |
| 10.0 | 0.68 | 0.68 | 0.68 | 0.68 | 0.68 | 0.68 | 0.68 | 0.68 |
| 15.0 | 0.68 | 0.68 | 0.68 | 0.68 | 0.68 | 0.68 | 0.68 | 0.68 |
| 20.0 | 0.68 | 0.68 | 0.68 | 0.68 | 0.68 | 0.68 | 0.68 | 0.68 |
| 25.0 | 0.68 | 0.68 | 0.68 | 0.68 | 0.68 | 0.68 | 0.68 | 0.68 |

FIG.41A

| | $C_2(h, \theta)$ | | | | | | | |
|---|---|---|---|---|---|---|---|---|
| h\θ | 0 | 45 | 90 | 135 | 180 | 225 | 270 | 315 |
| 0.0 | 12.71 | 12.71 | 12.71 | 12.71 | 12.71 | 12.71 | 12.71 | 12.71 |
| 5.0 | 12.55 | 12.50 | 12.47 | 12.50 | 12.55 | 12.61 | 12.53 | 12.61 |
| 10.0 | 12.14 | 11.92 | 11.83 | 11.92 | 12.14 | 12.36 | 12.45 | 12.36 |
| 15.0 | 11.64 | 11.15 | 10.95 | 11.15 | 11.64 | 12.15 | 12.36 | 12.15 |
| 20.0 | 11.25 | 10.37 | 10.02 | 10.37 | 11.25 | 12.18 | 12.58 | 12.18 |
| 25.0 | 11.21 | 9.79 | 9.25 | 9.79 | 11.21 | 12.81 | 13.54 | 12.81 |

FIG.41B

| $C_1(h,\theta)$ | | | | | | | | |
|---|---|---|---|---|---|---|---|---|
| h\\$\theta$ | 0 | 45 | 90 | 135 | 180 | 225 | 270 | 315 |
| 0.0 | 1.73 | 1.73 | 1.73 | 1.73 | 1.73 | 1.73 | 1.73 | 1.73 |
| 5.0 | 1.79 | 1.79 | 1.79 | 1.79 | 1.79 | 1.79 | 1.79 | 1.79 |
| 10.0 | 1.97 | 1.97 | 1.97 | 1.97 | 1.97 | 1.97 | 1.97 | 1.97 |
| 15.0 | 2.27 | 2.27 | 2.27 | 2.27 | 2.27 | 2.27 | 2.27 | 2.27 |
| 20.0 | 2.68 | 2.68 | 2.68 | 2.68 | 2.68 | 2.68 | 2.68 | 2.68 |
| 25.0 | 3.22 | 3.22 | 3.22 | 3.22 | 3.22 | 3.22 | 3.22 | 3.22 |

FIG.47A

| $C_2(h,\theta)$ | | | | | | | | |
|---|---|---|---|---|---|---|---|---|
| h\\$\theta$ | 0 | 45 | 90 | 135 | 180 | 225 | 270 | 315 |
| 0.0 | 13.76 | 13.76 | 13.76 | 13.76 | 13.76 | 13.76 | 13.76 | 13.76 |
| 5.0 | 13.71 | 13.67 | 13.64 | 13.67 | 13.71 | 13.77 | 13.79 | 13.77 |
| 10.0 | 13.66 | 13.45 | 13.37 | 13.45 | 13.66 | 13.87 | 13.96 | 13.87 |
| 15.0 | 13.90 | 13.41 | 13.22 | 13.41 | 13.90 | 14.38 | 14.59 | 14.38 |
| 20.0 | 14.90 | 14.02 | 13.67 | 14.02 | 14.90 | 15.83 | 16.23 | 15.83 |
| 25.0 | 17.91 | 16.24 | 15.61 | 16.24 | 17.91 | 19.77 | 20.62 | 19.77 |

FIG.47B

| $C_1(h,\theta)$ | | | | | | | | |
|---|---|---|---|---|---|---|---|---|
| h\θ | 0 | 45 | 90 | 135 | 180 | 225 | 270 | 315 |
| 0.0 | 1.73 | 1.73 | 1.73 | 1.73 | 1.73 | 1.73 | 1.73 | 1.73 |
| 5.0 | 1.81 | 1.81 | 1.81 | 1.81 | 1.81 | 1.81 | 1.81 | 1.81 |
| 10.0 | 2.04 | 2.04 | 2.04 | 2.04 | 2.04 | 2.04 | 2.04 | 2.04 |
| 15.0 | 2.33 | 2.33 | 2.33 | 2.33 | 2.33 | 2.33 | 2.33 | 2.33 |
| 20.0 | 2.59 | 2.59 | 2.59 | 2.59 | 2.59 | 2.59 | 2.59 | 2.59 |
| 25.0 | 2.77 | 2.77 | 2.77 | 2.77 | 2.77 | 2.77 | 2.77 | 2.77 |

FIG.53A

| $C_2(h,\theta)$ | | | | | | | | |
|---|---|---|---|---|---|---|---|---|
| h\θ | 0 | 45 | 90 | 135 | 180 | 225 | 270 | 315 |
| 0.0 | 13.76 | 13.76 | 13.76 | 13.76 | 13.76 | 13.76 | 13.76 | 13.76 |
| 5.0 | 13.76 | 13.76 | 13.76 | 13.76 | 13.76 | 13.76 | 13.76 | 13.76 |
| 10.0 | 13.76 | 13.76 | 13.76 | 13.76 | 13.76 | 13.76 | 13.76 | 13.76 |
| 15.0 | 13.76 | 13.76 | 13.76 | 13.76 | 13.76 | 13.76 | 13.76 | 13.76 |
| 20.0 | 13.76 | 13.76 | 13.76 | 13.76 | 13.76 | 13.76 | 13.76 | 13.76 |
| 25.0 | 13.76 | 13.76 | 13.76 | 13.76 | 13.76 | 13.76 | 13.76 | 13.76 |

FIG.53B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 0.68 | 0.68 | 0.68 | 0.68 | 0.68 | 0.68 | 0.68 | 0.68 |
| 5.0 | 0.68 | 0.68 | 0.68 | 0.68 | 0.68 | 0.68 | 0.68 | 0.68 |
| 10.0 | 0.68 | 0.68 | 0.68 | 0.68 | 0.68 | 0.68 | 0.68 | 0.68 |
| 15.0 | 0.68 | 0.68 | 0.68 | 0.68 | 0.68 | 0.68 | 0.68 | 0.68 |
| 20.0 | 0.68 | 0.68 | 0.68 | 0.68 | 0.68 | 0.68 | 0.68 | 0.68 |
| 25.0 | 0.68 | 0.68 | 0.68 | 0.68 | 0.68 | 0.68 | 0.68 | 0.68 |

FIG.59A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 18.72 | 15.71 | 12.71 | 15.71 | 18.72 | 15.71 | 12.71 | 15.71 |
| 5.0 | 18.85 | 15.53 | 12.47 | 15.53 | 18.65 | 15.66 | 12.63 | 15.66 |
| 10.0 | 18.48 | 15.01 | 11.83 | 15.01 | 18.48 | 15.55 | 12.45 | 15.55 |
| 15.0 | 18.42 | 14.33 | 10.95 | 14.33 | 18.42 | 15.59 | 12.36 | 15.59 |
| 20.0 | 18.80 | 13.67 | 10.02 | 13.67 | 18.80 | 16.10 | 12.58 | 16.10 |
| 25.0 | 17.82 | 13.43 | 9.25 | 13.43 | 17.82 | 16.77 | 13.54 | 16.77 |

FIG.59B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 1.01 | 1.01 | 1.01 | 1.01 | 1.01 | 1.01 | 1.01 | 1.01 |
| 5.0 | 0.95 | 0.95 | 0.95 | 0.95 | 0.95 | 0.95 | 0.95 | 0.95 |
| 10.0 | 0.77 | 0.77 | 0.77 | 0.77 | 0.77 | 0.77 | 0.77 | 0.77 |
| 15.0 | 0.47 | 0.47 | 0.47 | 0.47 | 0.47 | 0.47 | 0.47 | 0.47 |
| 20.0 | 0.05 | 0.05 | 0.05 | 0.05 | 0.05 | 0.05 | 0.05 | 0.05 |
| 25.0 | −0.49 | −0.49 | −0.49 | −0.49 | −0.49 | −0.49 | −0.49 | −0.49 |

FIG.65A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 19.05 | 16.04 | 13.04 | 16.04 | 19.05 | 16.04 | 13.04 | 16.04 |
| 5.0 | 18.93 | 15.80 | 12.75 | 15.80 | 18.93 | 15.93 | 12.90 | 15.93 |
| 10.0 | 18.57 | 15.10 | 11.92 | 15.10 | 18.57 | 15.64 | 12.54 | 15.64 |
| 15.0 | 17.96 | 13.93 | 10.61 | 13.93 | 17.96 | 15.19 | 12.01 | 15.19 |
| 20.0 | 16.80 | 12.14 | 8.78 | 12.14 | 16.80 | 14.50 | 11.29 | 14.50 |
| 25.0 | 14.71 | 9.28 | 6.11 | 9.28 | 14.71 | 13.04 | 9.92 | 13.04 |

FIG.65B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 1.01 | 1.01 | 1.01 | 1.01 | 1.01 | 1.01 | 1.01 | 1.01 |
| 5.0 | 1.16 | 1.16 | 1.16 | 1.16 | 1.16 | 1.16 | 1.16 | 1.16 |
| 10.0 | 1.54 | 1.54 | 1.54 | 1.54 | 1.54 | 1.54 | 1.54 | 1.54 |
| 15.0 | 1.92 | 1.92 | 1.92 | 1.92 | 1.92 | 1.92 | 1.92 | 1.92 |
| 20.0 | 2.11 | 2.11 | 2.11 | 2.11 | 2.11 | 2.11 | 2.11 | 2.11 |
| 25.0 | 2.06 | 2.06 | 2.06 | 2.06 | 2.06 | 2.06 | 2.06 | 2.06 |

FIG.71A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 19.05 | 16.04 | 13.04 | 16.04 | 19.05 | 16.04 | 13.04 | 16.04 |
| 5.0 | 19.05 | 16.03 | 13.04 | 16.03 | 19.05 | 16.03 | 13.04 | 16.03 |
| 10.0 | 19.05 | 16.01 | 13.04 | 16.01 | 19.05 | 16.01 | 13.04 | 16.01 |
| 15.0 | 19.05 | 15.96 | 13.04 | 15.96 | 19.05 | 15.96 | 13.04 | 15.96 |
| 20.0 | 19.05 | 15.90 | 13.04 | 15.90 | 19.05 | 15.90 | 13.04 | 15.90 |
| 25.0 | 19.05 | 15.80 | 13.04 | 15.80 | 19.05 | 15.80 | 13.04 | 15.80 |

FIG.71B

| $C_1(h,\theta)$ | | | | | | | | |
|---|---|---|---|---|---|---|---|---|
| h\θ | 0 | 45 | 90 | 135 | 180 | 225 | 270 | 315 |
| 0.0 | 6.96 | 6.96 | 6.96 | 6.96 | 6.96 | 6.96 | 6.96 | 6.96 |
| 5.0 | 6.96 | 6.96 | 6.96 | 6.96 | 6.96 | 6.96 | 6.96 | 6.96 |
| 10.0 | 6.96 | 6.96 | 6.96 | 6.96 | 6.96 | 6.96 | 6.96 | 6.96 |
| 15.0 | 6.96 | 6.96 | 6.96 | 6.96 | 6.96 | 6.96 | 6.96 | 6.96 |
| 20.0 | 6.96 | 6.96 | 6.96 | 6.96 | 6.96 | 6.96 | 6.96 | 6.96 |
| 25.0 | 6.96 | 6.96 | 6.96 | 6.96 | 6.96 | 6.96 | 6.96 | 6.96 |

FIG.77A

| $C_2(h,\theta)$ | | | | | | | | |
|---|---|---|---|---|---|---|---|---|
| h\θ | 0 | 45 | 90 | 135 | 180 | 225 | 270 | 315 |
| 0.0 | 1.02 | 1.02 | 1.02 | 1.02 | 1.02 | 1.02 | 1.02 | 1.02 |
| 5.0 | 1.19 | 1.23 | 1.25 | 1.23 | 1.19 | 1.17 | 1.16 | 1.17 |
| 10.0 | 1.63 | 1.76 | 1.81 | 1.76 | 1.63 | 1.53 | 1.50 | 1.53 |
| 15.0 | 2.18 | 2.38 | 2.47 | 2.38 | 2.18 | 1.98 | 1.90 | 1.98 |
| 20.0 | 2.64 | 2.90 | 3.01 | 2.90 | 2.64 | 2.34 | 2.21 | 2.34 |
| 25.0 | 2.92 | 3.26 | 3.40 | 3.26 | 2.92 | 2.54 | 2.37 | 2.54 |

FIG.77B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 7.18 | 7.18 | 7.18 | 7.18 | 7.18 | 7.18 | 7.18 | 7.18 |
| 5.0 | 7.08 | 7.06 | 7.05 | 7.06 | 7.08 | 7.11 | 7.12 | 7.11 |
| 10.0 | 6.84 | 6.75 | 6.71 | 6.75 | 6.84 | 6.93 | 6.97 | 6.93 |
| 15.0 | 6.59 | 6.40 | 6.33 | 6.40 | 6.59 | 6.78 | 6.86 | 6.78 |
| 20.0 | 6.49 | 6.19 | 6.06 | 6.19 | 6.49 | 6.80 | 6.94 | 6.80 |
| 25.0 | 6.66 | 6.24 | 6.07 | 6.24 | 6.66 | 7.11 | 7.30 | 7.11 |

FIG.83A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 1.26 | 1.26 | 1.26 | 1.26 | 1.26 | 1.26 | 1.26 | 1.26 |
| 5.0 | 1.32 | 1.32 | 1.32 | 1.32 | 1.32 | 1.32 | 1.32 | 1.32 |
| 10.0 | 1.50 | 1.50 | 1.50 | 1.50 | 1.50 | 1.50 | 1.50 | 1.50 |
| 15.0 | 1.80 | 1.80 | 1.80 | 1.80 | 1.80 | 1.80 | 1.80 | 1.80 |
| 20.0 | 2.22 | 2.22 | 2.22 | 2.22 | 2.22 | 2.22 | 2.22 | 2.22 |
| 25.0 | 2.75 | 2.75 | 2.75 | 2.75 | 2.75 | 2.75 | 2.75 | 2.75 |

FIG.83B

| $C_1(h,\theta)$ | | | | | | | | |
|---|---|---|---|---|---|---|---|---|
| h\θ | 0 | 45 | 90 | 135 | 180 | 225 | 270 | 315 |
| 0.0 | 7.17 | 7.17 | 7.17 | 7.17 | 7.17 | 7.17 | 7.17 | 7.17 |
| 5.0 | 7.01 | 7.01 | 7.01 | 7.01 | 7.01 | 7.01 | 7.01 | 7.01 |
| 10.0 | 6.56 | 6.56 | 6.56 | 6.56 | 6.56 | 6.56 | 6.56 | 6.56 |
| 15.0 | 5.93 | 5.93 | 5.93 | 5.93 | 5.93 | 5.93 | 5.93 | 5.93 |
| 20.0 | 5.23 | 5.23 | 5.23 | 5.23 | 5.23 | 5.23 | 5.23 | 5.23 |
| 25.0 | 4.58 | 4.58 | 4.58 | 4.58 | 4.58 | 4.58 | 4.58 | 4.58 |

FIG.89A

| $C_2(h,\theta)$ | | | | | | | | |
|---|---|---|---|---|---|---|---|---|
| h\θ | 0 | 45 | 90 | 135 | 180 | 225 | 270 | 315 |
| 0.0 | 1.26 | 1.26 | 1.26 | 1.26 | 1.26 | 1.26 | 1.26 | 1.26 |
| 5.0 | 1.26 | 1.26 | 1.26 | 1.26 | 1.26 | 1.26 | 1.26 | 1.26 |
| 10.0 | 1.26 | 1.26 | 1.26 | 1.26 | 1.26 | 1.26 | 1.26 | 1.26 |
| 15.0 | 1.26 | 1.26 | 1.26 | 1.26 | 1.26 | 1.26 | 1.26 | 1.26 |
| 20.0 | 1.26 | 1.26 | 1.26 | 1.26 | 1.26 | 1.26 | 1.26 | 1.26 |
| 25.0 | 1.26 | 1.26 | 1.26 | 1.26 | 1.26 | 1.26 | 1.26 | 1.26 |

FIG.89B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 6.96 | 6.96 | 6.96 | 6.96 | 6.96 | 6.96 | 6.96 | 6.96 |
| 5.0 | 6.96 | 6.96 | 6.96 | 6.96 | 6.96 | 6.96 | 6.96 | 6.96 |
| 10.0 | 6.96 | 6.96 | 6.96 | 6.96 | 6.96 | 6.96 | 6.96 | 6.96 |
| 15.0 | 6.96 | 6.96 | 6.96 | 6.96 | 6.96 | 6.96 | 6.96 | 6.96 |
| 20.0 | 6.96 | 6.96 | 6.96 | 6.96 | 6.96 | 6.96 | 6.96 | 6.96 |
| 25.0 | 6.96 | 6.96 | 6.96 | 6.96 | 6.96 | 6.96 | 6.96 | 6.96 |

FIG.95A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 4.03 | 1.02 | 4.03 | 7.04 | 4.03 | 1.02 | 4.03 | 7.04 |
| 5.0 | 4.10 | 1.23 | 4.12 | 7.03 | 4.10 | 1.17 | 4.07 | 7.03 |
| 10.0 | 4.26 | 1.76 | 4.34 | 7.02 | 4.26 | 1.53 | 4.18 | 7.00 |
| 15.0 | 4.44 | 2.38 | 4.80 | 7.00 | 4.44 | 1.98 | 4.28 | 6.96 |
| 20.0 | 4.58 | 2.90 | 4.82 | 6.98 | 4.58 | 2.34 | 4.33 | 6.91 |
| 25.0 | 4.66 | 3.26 | 4.97 | 6.95 | 4.66 | 2.54 | 4.32 | 6.86 |

FIG.95B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 5.71 | 7.18 | 5.71 | 4.23 | 5.71 | 7.18 | 5.71 | 4.23 |
| 5.0 | 5.69 | 7.06 | 5.66 | 4.28 | 5.69 | 7.11 | 5.71 | 4.29 |
| 10.0 | 5.57 | 6.75 | 5.60 | 4.43 | 5.67 | 6.93 | 5.74 | 4.44 |
| 15.0 | 5.70 | 6.40 | 5.56 | 4.67 | 5.70 | 6.78 | 5.85 | 4.71 |
| 20.0 | 5.87 | 6.19 | 5.64 | 5.02 | 5.87 | 6.80 | 6.12 | 5.07 |
| 25.0 | 6.24 | 6.24 | 5.92 | 5.46 | 6.24 | 7.11 | 6.59 | 5.54 |

FIG.101A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 2.78 | 1.26 | 2.76 | 4.27 | 2.76 | 1.26 | 2.76 | 4.27 |
| 5.0 | 2.82 | 1.32 | 2.82 | 4.33 | 2.82 | 1.32 | 2.82 | 4.33 |
| 10.0 | 3.00 | 1.50 | 3.00 | 4.50 | 3.00 | 1.50 | 3.00 | 4.50 |
| 15.0 | 3.30 | 1.80 | 3.30 | 4.80 | 3.30 | 1.80 | 3.30 | 4.80 |
| 20.0 | 3.71 | 2.22 | 3.71 | 5.21 | 3.71 | 2.22 | 3.71 | 5.21 |
| 25.0 | 4.24 | 2.75 | 4.24 | 5.72 | 4.24 | 2.75 | 4.24 | 5.72 |

FIG.101B

| $C_1(h, \theta)$ | | | | | | | | |
|---|---|---|---|---|---|---|---|---|
| h\θ | 0 | 45 | 90 | 135 | 180 | 225 | 270 | 315 |
| 0.0 | 7.17 | 7.17 | 7.17 | 7.17 | 7.17 | 7.17 | 7.17 | 7.17 |
| 5.0 | 7.01 | 7.01 | 7.01 | 7.01 | 7.01 | 7.01 | 7.01 | 7.01 |
| 10.0 | 6.56 | 6.56 | 6.56 | 6.56 | 6.56 | 6.56 | 6.56 | 6.56 |
| 15.0 | 5.93 | 5.93 | 5.93 | 5.93 | 5.93 | 5.93 | 5.93 | 5.93 |
| 20.0 | 5.23 | 5.23 | 5.23 | 5.23 | 5.23 | 5.23 | 5.23 | 5.23 |
| 25.0 | 4.58 | 4.58 | 4.58 | 4.58 | 4.58 | 4.58 | 4.58 | 4.58 |

FIG.107A

| $C_2(h, \theta)$ | | | | | | | | |
|---|---|---|---|---|---|---|---|---|
| h\θ | 0 | 45 | 90 | 135 | 180 | 225 | 270 | 315 |
| 0.0 | 4.27 | 1.26 | 4.27 | 7.27 | 4.27 | 1.26 | 4.27 | 7.27 |
| 5.0 | 4.27 | 1.26 | 4.27 | 7.27 | 4.27 | 1.26 | 4.27 | 7.27 |
| 10.0 | 4.27 | 1.26 | 4.27 | 7.27 | 4.27 | 1.26 | 4.27 | 7.27 |
| 15.0 | 4.27 | 1.26 | 4.27 | 7.27 | 4.27 | 1.26 | 4.27 | 7.27 |
| 20.0 | 4.28 | 1.26 | 4.28 | 7.27 | 4.28 | 1.26 | 4.28 | 7.27 |
| 25.0 | 4.29 | 1.26 | 4.29 | 7.27 | 4.29 | 1.26 | 4.29 | 7.27 |

FIG.107B

ASPHERICAL SPECTACLE LENS

BACKGROUND OF THE INVENTION

The present invention relates to a single-vision aspherical lens used for correction of refractive power of human eyes. In particular, the present invention relates to a single-vision spectacle lens which is used when a wearer (a person wearing the spectacle lens) having an amplitude of accommodation views an object located at various distances raging from a short distance to a long distance.

When the wearer uses the spectacle lens, the wearer frequently uses an upper portion of the lens for distance vision and a lower portion of the lens for near vision. For this reason, it is desired that the upper portion of the spectacle lens has suitable performance for distance vision and that the lower portion of the lens has suitable performance for near vision.

Each of Japanese Patent Provisional Publications No. HEI 4-45419 and No. HEI 10-78566 discloses a spectacle lens designed to have suitable performance in the upper portion and the lower portion of the lens.

The spectacle lens disclosed in the publication HEI 4-45419 has one refractive surface configured such that a rate of change of curvature which is measured in an upper portion of the one refractive surface along a line extending on the surface from a center of the upper portion to the periphery of the upper portion is larger than a corresponding rate of change of curvature measured in the lower portion of the surface.

However, in each of four examples of the publication HEI 4-45419, only curvatures on two meridional lines (OA,OB) and a fact that curvatures on the other meridional lines take intermediate values between the curvatures of the lines OA and OB are described. Therefore, it is impossible for a person skilled in the art to practically make a spectacle lens based on the disclosure of the publication HEI 4-45419. That is, it is impossible to practically configure a spectacle lens having the suitable performance with regard to the upper portion and the lower portion thereof based on the disclosure of the publication HEI 4-45419.

Also, from graphs of astigmatism disclosed in each of the examples 2, 3 and 4 of the publication HEI 4-45419, it is understood that a minus lens disclosed in the examples 2, 3 and 4 is corrected for its astigmatism so that the astigmatism for the distance vision is substantially zero. When the astigmatism for the distance vision of the minus lens takes a value of zero, a dioptric power error of the minus lens takes positive values.

Further, in a case where the spectacle lens has a positive dioptric power error, a field of view of the wearer for the distance vision is blurred as if the wearer is in a fog. That is because it is impossible for the wearer to further decrease the refractive power of eyes for the distance vision due to the fact that the refractive power of eyes becomes lowest in the case of the distance vision, even though when the spectacle lens has a positive dioptric power error, an effect of the dioptric power error can be canceled by decreasing refractive power of eyes for the distance vision.

Accordingly, a balance between aberrations of the spectacle lens disclosed in the examples of the publication HEI 4-45419 is improper.

The spectacle lens disclosed in the publication HEI 10-78566 has a rotationally symmetrical asperical surface in which a center of the aspherical surface is shifted from a center of an outline of the lens in order to attain the suitable performance with regard to the upper portion and the lower portion of the spectacle lens.

However, the aspherical surface of the spectacle lens disclosed in each example of the publication HEI 10-78566 is a rotationally symmetrical surface for the purpose of easing the processing of the spectacle lens. Therefore, there is a limit on optical performance that the spectacle lens in the publication HEI 10-78566 can attains.

SUMMARY OF THE INVENTION

The present invention is advantageous in that it provides a spectacle lens configured such that an upper portion of the lens has suitable performance for the distance vision and that a lower portion of the lens has suitable performance for the near vision.

According to an aspect of the invention, there is provided a spectacle lens having an outer surface and an inner surface, one of the outer and inner surfaces being configured to be a rotationally-asymmetrical aspherical surface. When a curvature at a coordinate $(h,\theta)$ of the outer surface is represented by $C_1(h,\theta)$, a curvature at a coordinate $(h,\theta)$ of the inner surface is represented by $C_2(h,\theta)$, and a difference between curvatures of the outer surface and the inner surface at the coordinate $(h,\theta)$ is represented by $C_{2-1}(h,\theta)=C_2(h,\theta)-C_1(h,\theta)$, if $C_{2-1}(0,\theta)>0$, the spectacle lens satisfying a condition (1):

$$C_{2-1}(h,\theta+180)-C_{2-1}(h,\theta)>0 \qquad (1),$$

and if $C_{2-1}(0,\theta)<0$, the spectacle lens satisfying a condition (2):

$$C_{2-1}(h,\theta+180)-C_{2-1}(h,\theta)<0 \qquad (2).$$

The conditions (1) and (2) hold within the ranges of 10 mm$\leq$h$\leq$20 mm and 30°$\leq\theta\leq$150°. Further, given that a normal line which is normal to the outer surface through a centration point is regarded as a $z_1$-axis, a direction which is perpendicular to the $z_1$-axis and which corresponds to an upward direction in the state of wearing of the spectacle lens is regarded as a $y_1$-axis, and a direction which is perpendicular to the $y_1$-axis and the $z_1$-axis in a left hand coordinate system is regarded as an $x_1$-axis, the coordinate $(h,\theta)$ of the outer surface is defined as a point having a height h (unit: mm) from the $z_1$-axis on an intersection line which is formed between the outer surface and a plane including the $z_1$-axis and forming an angle $\theta$ (unit: degree) with respect to the $x_1$-axis.

Further, given that a normal line which is normal to the inner surface through the centration point is regarded as a $z_2$-axis, a direction which is perpendicular to the $z_2$-axis and which corresponds to the upward direction in the state of wearing of the spectacle lens is regarded as a $y_2$-axis, and a direction which is perpendicular to the $y_2$-axis and the $z_2$-axis in the left hand coordinate system is regarded as an $x_2$-axis, the coordinate $(h,\theta)$ of the inner surface is defined as a point having a height h (unit: mm) from the $z_2$-axis on an intersection line which is formed between the inner surface and a plane including the $z_2$-axis and forming an angle $\theta$ (unit: degree) with respect to the $x_2$-axis.

The centration point is defined as a point which coincides with a pupil position of a wearer when the spectacle lens is viewed from a front side in a state of wearing of the spectacle lens.

With the above mentioned configuration, the spectacle lens can attain suitable optical performance in which an upper portion of the lens is adapted to the distance vision and an lower portion of the lens is adapted to the near vision.

Optionally, when the inner surface is configured to be the rotationally-asymmetrical aspherical surface, if $C_{2-1}(0,\theta)>0$, the spectacle lens may satisfy a condition (3):

$$C_2(h,\theta+180)-C_2(h,\theta)>0 \qquad (3),$$

and if $C_{2-1}(0,\theta)<0$, the spectacle lens may satisfy a condition (4):

$$C_2(h,\theta+180)-C_2(h,\theta)<0 \qquad (4).$$

The conditions (3) and (4) hold within the ranges of 10 mm≦h≦20 mm and 30°≦θ≦150°.

Alternatively, when the outer surface is configured to be the rotationally-asymmetrical aspherical surface, if $C_{2-1}(0,\theta)>0$, the spectacle lens may satisfy a condition (5):

$$C_1(h,\theta+180)-C_1(h,\theta)<0 \qquad (5),$$

and if $C_{2-1}(0,\theta)<0$, the spectacle lens may satisfy a condition (6):

$$C_1(h,\theta+180)-C_1(h,\theta)>0 \qquad (6).$$

The conditions (5) and (6) hold within the ranges of 10 mm≦h≦20 mm and 30°≦θ≦150°.

In a particular case, the outer surface may configured to be a spherical surface, and the inner surface may be configured to be the rotationally-asymmetrical aspherical surface.

In a particular case, the outer surface is configured to be the rotationally-asymmetrical aspherical surface, and the inner surface is configured to be a spherical surface.

In a particular case, the outer surface may be configured to be the rotationally-asymmetrical aspherical surface, and the inner surface may be configured to be a toric surface.

In a particular case, both of the outer and inner surfaces may be configured to be aspherical surfaces.

In a particular case, the outer surface may be configured to be a rotationally-symmetrical aspherical surface, and the inner surface may be configured to be the rotationally-asymmetrical aspherical surface.

In a particular case, the outer surface may be configured to be the rotationally-asymmetrical aspherical surface, and the inner surface may be configured to be a rotationally-symmetrical aspherical surface.

In a particular case, both of the outer and inner surfaces may be configured to be the rotationally-asymmetrical aspherical surfaces.

Optionally, one of the outer and inner surfaces may have cylindrical refractive power for correction of an astigmatic vision.

BRIEF DESCRIPTION OF THE ACCOMPANYING DRAWINGS

FIG. 1A is a section view of a spectacle lens according to a first embodiment of the invention viewed from a side surface thereof;

FIG. 1B is a front view of the spectacle lens according to the first embodiment viewed from a front surface side thereof;

FIG. 11A is a list showing a distribution of curvature $C_1(h,\theta)$ of an outer surface of a spectacle lens according to a second example;

FIG. 11B is a list showing a distribution of curvature $C_2(h,\theta)$ of an inner surface of the spectacle lens according to the second example;

FIG. 17A is a list showing a distribution of curvature $C_1(h,\theta)$ of an outer surface of a spectacle lens according to a first comparative example;

FIG. 17B is a list showing a distribution of curvature $C_2(h,\theta)$ of an inner surface of the spectacle lens according to the first comparative example;

FIG. 23A is a list showing a distribution of curvature $C_1(h,\theta)$ of an outer surface of a spectacle lens according to a third example;

FIG. 23B is a list showing a distribution of curvature $C_2(h,\theta)$ of an inner surface of the spectacle lens according to the third example;

FIG. 29A is a list showing a distribution of curvature $C_1(h,\theta)$ of an outer surface of a spectacle lens according to a fourth example;

FIG. 29B is a list showing a distribution of curvature $C_2(h,\theta)$ of an inner surface of the spectacle lens according to the fourth example;

FIG. 35A is a list showing a distribution of curvature $C_1(h,\theta)$ of an outer surface of a spectacle lens according to a second comparative example;

FIG. 35B is a list showing a distribution of curvature $C_2(h,\theta)$ of an inner surface of the spectacle lens according to the second comparative example;

FIG. 41A is a list showing a distribution of curvature $C_1(h,\theta)$ of an outer surface of a spectacle lens according to a fifth example;

FIG. 41B is a list showing a distribution of curvature $C_2(h,\theta)$ of an inner surface of the spectacle lens according to the fifth example;

FIG. 47A is a list showing a distribution of curvature $C_1(h,\theta)$ of an outer surface of a spectacle lens according to a sixth example;

FIG. 47B is a list showing a distribution of curvature $C_2(h,\theta)$ of an inner surface of the spectacle lens according to the sixth example;

FIG. 53A is a list showing a distribution of curvature $C_1(h,\theta)$ of an outer surface of a spectacle lens according to a third comparative example;

FIG. 53B is a list showing a distribution of curvature $C_2(h,\theta)$ of an inner surface of the spectacle lens according to the third comparative example;

FIG. 59A is a list showing a distribution of curvature $C_1(h,\theta)$ of an outer surface of a spectacle lens according to a seventh example;

FIG. 59B is a list showing a distribution of curvature $C_2(h,\theta)$ of an inner surface of the spectacle lens according to the seventh example;

FIG. 65A is a list showing a distribution of curvature $C_1(h,\theta)$ of an outer surface of a spectacle lens according to an eighth example;

FIG. 65B is a list showing a distribution of curvature $C_2(h,\theta)$ of an inner surface of the spectacle lens according to the eighth example;

FIG. 71A is a list showing a distribution of curvature $C_1(h,\theta)$ of an outer surface of a spectacle lens according to a fourth comparative example;

FIG. 71B is a list showing a distribution of curvature $C_2(h,\theta)$ of an inner surface of the spectacle lens according to the fourth comparative example;

FIG. 77A is a list showing a distribution of curvature $C_1(h,\theta)$ of an outer surface of a spectacle lens according to a ninth example;

FIG. 77B is a list showing a distribution of curvature $C_2(h,\theta)$ of an inner surface of the spectacle lens according to the ninth example;

FIG. 83A is a list showing a distribution of curvature $C_1(h,\theta)$ of an outer surface of a spectacle lens according to a tenth example;

FIG. 83B is a list showing a distribution of curvature $C_2(h,\theta)$ of an inner surface of the spectacle lens according to the tenth example;

FIG. 89A is a list showing a distribution of curvature $C_1(h,\theta)$ of an outer surface of a spectacle lens according to a fifth comparative example;

FIG. 89B is a list showing a distribution of curvature $C_2(h,\theta)$ of an inner surface of the spectacle lens according to the fifth comparative example;

FIG. 95A is a list showing a distribution of curvature $C_1(h,\theta)$ of an outer surface of a spectacle lens according to an eleventh example;

FIG. 95B is a list showing a distribution of curvature $C_2(h,\theta)$ of an inner surface of the spectacle lens according to the eleventh example;

FIG. 101A is a list showing a distribution of curvature $C_1(h,\theta)$ of an outer surface of a spectacle lens according to a twelfth example;

FIG. 101B is a list showing a distribution of curvature $C_2(h,\theta)$ of an inner surface of the spectacle lens according to the twelfth example;

FIG. 107A is a list showing a distribution of curvature $C_1(h,\theta)$ of an outer surface of a spectacle lens according to a sixth comparative example;

FIG. 107B is a list showing a distribution of curvature $C_2(h,\theta)$ of an inner surface of the spectacle lens according to the sixth comparative example;

DETAILED DESCRIPTION OF THE EMBODIMENTS

Hereinafter, embodiments according to the invention are described with reference to the accompanying drawings.

FIGS. 1A and 1B show a spectacle lens 1 according to a first embodiment of the invention. FIG. 1A is a section view of the spectacle lens 1 viewed from a side surface of the spectacle lens 1, and FIG. 1B is a front view of the spectacle lens 1 viewed from a front surface side of the lens.

Figure 2B:
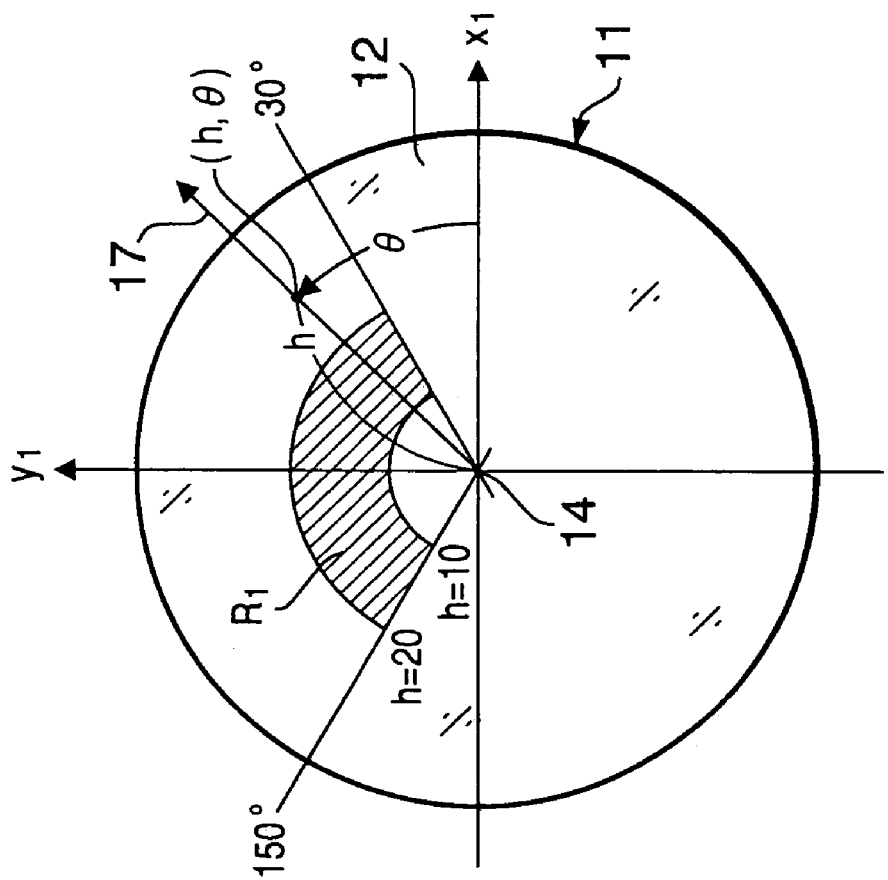
FIG. 2B is a front view of the spectacle lens according to the second embodiment viewed from a front surface side thereof.
Figure 2A:
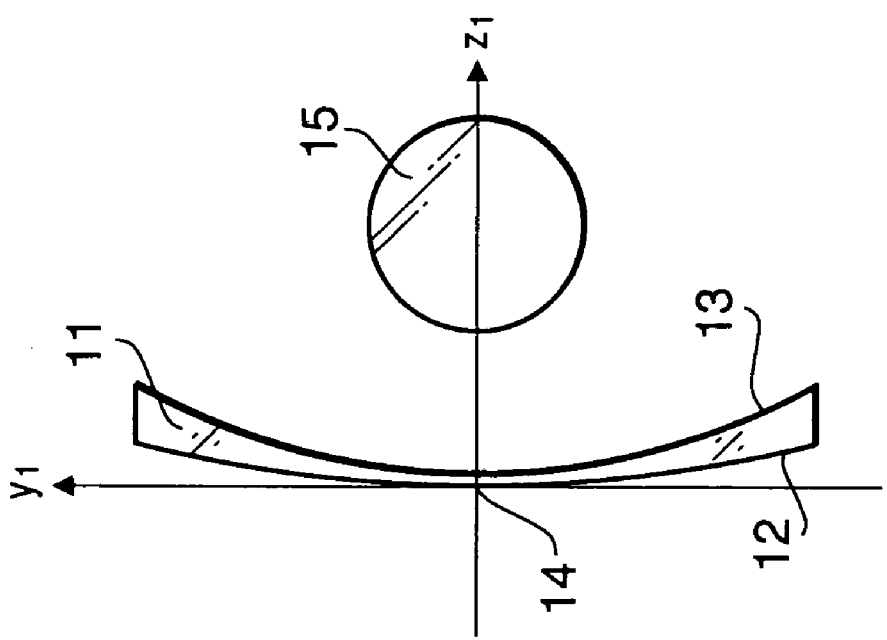
FIG. 2A is a section view of a spectacle lens according to a second embodiment of the invention viewed from a side surface thereof.

FIGS. 2A and 2B show a spectacle lens 11 according to a second embodiment of the invention. FIG. 2A is a section view of the spectacle lens 11 viewed from a side surface of the lens 11, and FIG. 1B is a front view of the spectacle lens 11 viewed from a front surface side of the lens 11.

Hereafter, the spectacle lens 1 according to the first embodiment will be described. As shown in FIG. 1A, the spectacle lens 1 has an outer surface 2 and an inner surface 3 configured to be a surface having a symmetric property (e.g., a spherical surface) and a rotationally-asymmetrical aspherical surface, respectively. A point 4 is a centration point. The centration point is defined as a point which coincides with a pupil position of the wearer when the spectacle lens is viewed from the front side in a state of wearing of the spectacle lens.

In FIG. 1A, a normal line which is normal to the inner surface 3 through the centration point 4 is regarded as a $z_2$-axis. A direction which is perpendicular to the $z_2$-axis and which corresponds to a vertical direction in a state of wearing of the spectacle lens is regarded as a $y_2$-axis. A direction which is perpendicular to the direction of the $y_2$-axis and the direction of the $z_2$-axis in a left hand coordinate system is regarded as an $x_2$-axis.

In order to configure a spectacle lens so that an upper portion of the lens is adapted to the distance vision and that a lower portion of the lens is adapted to the near vision, a design for correction of aberrations has to be made individually with regard to the upper portion and the lower portion of the lens. Therefore, if the spectacle lens is configured using rotationally symmetrical surfaces, such a design for correction of aberrations becomes considerably difficult. For this reason, it is required that at least one of an outer surface and an inner surface of the spectacle lens is configured to be a rotationally-asymmetrical aspherical surface.

As described in detail later, by configuring the inner surface 3 of the spectacle lens 1 of the first embodiment as the rotationally-asymmetrical aspherical surface, the spectacle lens 1 is corrected for the aberrations so that the upper portion of the spectacle lens 1 is adapted to the distance vision and that the lower portion of the spectacle lens 1 is adapted to the near vision.

In FIG. 1B, a point having a height h [mm] from the $z_2$-axis on an intersection line 7, which is formed between the inner surface 3 and a plane including the $z_2$-axis and forming an angle $\theta$ [°] with respect to the $x_2$-axis, is represented by a polar coordinate $(h,\theta)$. Also, $C_2(h, \theta)$ represents a curvature measured along the intersection line 7 at the point $(h,\theta)$. The angle $\theta$ is 0° when the intersection line 7 coincides with the $x_2$-axis, and increases as the intersection line 7 rotates counterclockwise on FIG. 1B.

Plus directions of the $x_2$-axis, $y_2$-axis, $z_2$-axis and polar coordinate $(h,\theta)$ are indicated in FIGS. 1A and 1B by the respective arrows. The centration point 4 corresponds to an origin point of each of the $x_2$-axis, $y_2$-axis, $z_2$-axis and polar coordinate $(h,\theta)$ when the spectacle lens 1 is viewed from the front surface side. A plus direction of the $z_2$-axis corresponds to an eye side of the spectacle lens 1. A plus direction of the $y_2$-axis corresponds to an upper side in the state of the wearing of the spectacle lens 1.

In a case where h and $\theta$ lie in respective ranges of $10 \leq h \leq 20$ and $30 \leq \theta \leq 150$, the spectacle lens 1 satisfies a condition (3) when $C_{2-1}(0,\theta)>0$ holds, and satisfies a condition (4) when $C_{2-1}(0,\theta)<0$ holds. The $C_{2-1}(0,\theta)$ represents a difference between the curvature $C_2(0,\theta)$ of the inner surface 3 at the polar coordinate of $(0,\theta)$ and the curvature $C_1(0,\theta)$ of the outer surface 2 at the polar coordinate of $(0,\theta)$.

$$C_2(h,\theta+180)-C_2(h,\theta)>0 \qquad (3)$$

$$C_2(h,\theta+180)-C_2(h,\theta)<0 \qquad (4)$$

In the conditions (3) and (4), the curvature $C_2(h,\theta)$ is a curvature taken within an area R indicated by a hatch pattern in FIG. 1B. That is, the curvature $C_2(h,\theta)$ is a curvature of the upper portion of the inner surface 3 of the spectacle lens 1. Further, in the conditions (3) and (4), the curvature $C_2(h,\theta+180)$ is a curvature taken within an area located opposite to the area R on the inner surface 3 with respect to the centration point 4. That is, the curvature $C_2(h,\theta+180)$ is a curvature of the lower portion of the inner surface 3 of the spectacle lens 1.

The condition (3) means that the curvature of the upper portion of the inner surface 3 is smaller than that of the lower portion of the inner surface 3 when $C_{2-1}(0,\theta)>0$ holds. The condition (4) means that the curvature of the upper portion of the inner surface 3 is greater than that of the lower portion of the inner surface 3 when $C_{2-1}(0,\theta)<0$ holds.

If a spectacle lens has cylindrical refractive power for the correction of an astigmatic vision, the cylindrical refractive power exerts an effect uniformly on a pair of points which are located on a lens surface of the lens symmetrically with respect to an origin point of the lens surface. Therefore, the conditions (3) and (4) also hold if the spectacle lens 1 has cylindrical refractive power.

By determining the curvature of the upper portion of the inner surface 3 and the curvature of the lower portion of the inner surface 3 so that the curvatures satisfy the conditions (3) and (4), it becomes possible to accomplish a spectacle lens configured such that the upper portion of the lens is adapted to the distance vision and that the lower portion of the lens is adapted to the near vision. Such suitable performance for both of the distance vision and the near vision can be maintained even if the spectacle lens 1 has cylindrical refractive power.

Hereafter, the spectacle lens 11 according to the second embodiment will be described. As shown in FIG. 2A, the spectacle lens 11 has an outer surface 12 and an inner surface 13 configured to be a rotationally-asymmetrical aspherical surface and a surface having a symmetric property (e.g., a spherical surface), respectively. A point 14 is the centration point that coincides with a position of a pupil of an eye 5 when the spectacle lens 11 is fitted to a frame (not shown).

In FIG. 2A, a normal line which is normal to the outer surface 12 through the centration point 14 is regarded as a $z_1$-axis. A direction which is perpendicular to the $z_1$-axis and which corresponds to a vertical direction in a state of wearing of the spectacle lens is regarded as a $y_1$-axis. A direction which is perpendicular to the direction of the $y_1$-axis and the direction of the $z_1$-axis in a left hand coordinate system is regarded as an $x_1$-axis.

As described in detail later, by configuring the outer surface 12 of the spectacle lens 11 of the second embodiment as the rotationally-asymmetrical aspherical surface, the spectacle lens 11 is corrected for aberrations so that the upper portion of the lens 11 is adapted to the distance vision and that the lower portion of the lens 11 is adapted to the near vision.

In FIG. 2B, a point having a height h [mm] from the $z_1$-axis on an intersection line 17, which is formed between the outer surface 12 and a plane including the $z_1$-axis and forming an angle θ [°] with respect to the $x_1$-axis, is represented by a polar coordinate (h,θ). Also, $C_1(h, θ)$ represents a curvature measured along the intersection line 17 at the point (h,θ). The angle θ is 0° when the intersection line 7 coincides with the $x_1$-axis, and increases as the intersection line 17 rotates counterclockwise on FIG. 2B.

Plus directions of the $x_1$-axis, $y_1$-axis, $z_1$-axis and polar coordinate (h,θ) are indicated in FIGS. 2A and 2B by the respective arrows. The centration point 14 corresponds to an origin point of each of the $x_1$-axis, $y_1$-axis, $z_1$-axis and polar coordinate (h,θ). A plus direction of the $z_1$-axis corresponds to an eye side of the spectacle lens 11. A plus direction of the $y_1$-axis corresponds to an upper side in the state of the wearing of the spectacle lens 11.

In a case where h and θ lie in respective ranges of $10 \leq h \leq 20$ and $30 \leq θ \leq 150$, the spectacle lens 11 satisfies condition (5) when $C_{2-1}(0,θ) > 0$ holds, and satisfies a condition (6) when $C_{2-1}(0,θ) < 0$ holds.

$$C_1(h,θ+180) - C_1(h,θ) < 0 \qquad (5)$$

$$C_1(h,θ+180) - C_1(h,θ) > 0 \qquad (6)$$

In the conditions (5) and (6), the curvature $C_1(h,θ)$ is a curvature taken within an area R1 indicated by a hatch pattern in FIG. 2B. That is, the curvature $C_1(h,θ)$ is a curvature of the upper portion of the outer surface 12 of the spectacle lens 11. Further, in the conditions (5) and (6), the curvature $C_1(h,θ+180)$ is a curvature taken within an area located opposite to the area R1 on the outer surface 12 with respect to the centration point 14. That is, the curvature $C_1(h,θ+180)$ is a curvature of the lower portion of the outer surface 12 of the spectacle lens 11.

The condition (5) means that the curvature of the upper portion of the outer surface 12 is larger than that of the lower portion of the outer surface 12 when $C_{2-1}(0,θ) > 0$ holds. The condition (6) means that the curvature of the upper portion of the outer surface 12 is smaller than that of the lower portion of the outer surface 12 when $C_{2-1}(0,θ) < 0$ holds.

By determining the curvature of the upper portion of the outer surface 12 and the curvature of the lower portion of the outer surface 12 so that the curvatures satisfy the conditions (5) and (6), it becomes possible to accomplish a spectacle lens configured such that the upper portion of the lens is adapted to the distance vision and that the lower portion of the lens is adapted to the near vision. Such suitable performance for both of the distance vision and the near vision can be maintained even if the spectacle lens 11 has cylindrical refractive power.

By combining the conditions (3) and (4), which are applied to a situation in which the spectacle lens has the inner surface configured to be the rotationally-asymmetrical aspherical surface, with the conditions (5) and (6), which are applied to a situation in which the spectacle lens has the outer surface configured to be the rotationally-asymmetrical aspherical surface, the following conditions (1) and (2) are derived.

That is, in a case where h and θ lie in respective ranges of $10 \leq h \leq 20$ and $30 \leq θ \leq 150$, the spectacle lens according to the embodiments of the invention satisfies the condition (1) when $C_{2-1}(0,θ) > 0$ holds, and satisfies the condition (2) when $C_{2-1}(0,θ) < 0$ holds ($C_{2-1}(0,θ) = C_2(0,θ) - C_1(0,θ)$).

$$C_{2-1}(h,θ+180) - C_{2-1}(h,θ) > 0 \qquad (1)$$

$$C_{2-1}(h,θ+180) - C_{2-1}(h,θ) < 0 \qquad (2)$$

Hereafter, theoretical grounds concerning the above mentioned conditions (1) through (6) will be explained in detail. Typically, optical performance of a spectacle lens can be represented by an average refractive power error and astigmatism in the periphery of the spectacle lens. When such aberrations are calculated, an optical arrangement shown in FIG. 3 is used.

Figure 3:
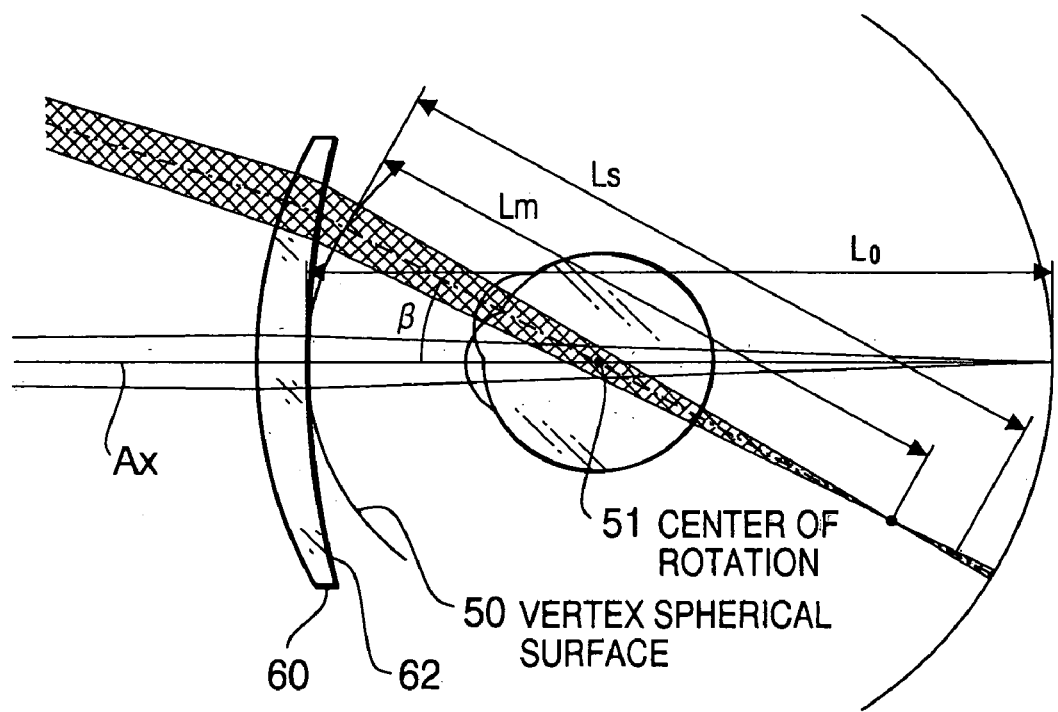
FIG. 3 shows an optical arrangement which is used when aberrations are calculated.

In FIG. 3, a center of rotation of eye 51 is positioned on an optical axis Ax of a spectacle lens 60, and a vertex spherical surface 50 is defined as a spherical surface which is tangential to an inner surface 62 of the spectacle lens 60 at a vertex of the inner surface 62 and which has a center of curvature which coincides with the center of rotation of eye 51. Each aberration is obtained with respect to an angle β [°] of a light beam passing through the center of rotation of eye 51. The angle β is formed between the light beam and the optical axis Ax.

More specifically, the angle β is defined as an angle by which the eye of the wearer is rotated so that a line of sight of the eye coincides with a target light beam with respect to a situation in which a line of sight of the eye coincides with the optical axis Ax. The angle β is called an angle of rotation.

Given that a distance from the vertex of the inner surface 62 to an image location when β is 0° is represented by Lo [m], and a distance, which is measured along the light beam incident on the eye with the angle of rotation β, from the vertex spherical surface 50 to the image location in a meridional cross section is represented by Lm [m]. Further, given that a distance, which is measured along the light beam incident on the eye with the angle of rotation β, from the vertex spherical surface 50 to the image location in a sagittal cross section is represented by Ls [m]. In this case, a meridional refractive power error DM [D] and a sagittal refractive power error DS[D] are determined by the following equations (7) and (8).

$$DM = 1/Lm - 1/Lo \qquad (7)$$

$$DS = 1/Ls - 1/Lo \qquad (8)$$

Since the distance from a point to the image location changes with respect to the degree of convergence and the degree of divergence of the incident light beam (i.e., diopter Do [D]; the inverse of an object distance [m]), DM and DS change as the diopter Do changes even if the angle of rotation β is kept constant.

Since an average refractive power error AP is defined as an average of the DM and DS, and the astigmatism AS is defined as a difference between the DM and DS, the AP and AS are expressed by the following equations (9) and (10).

$$AP=(DM+DS)/2 \quad (9)$$

$$AS=DM-DS \quad (10)$$

In general, when the spectacle lens is designed, the amounts of aberrations DM, DS, AP and AS are calculated while the angle of rotation β and the diopter Do are changed. Then, an aspheric amount of a lens surface of the spectacle lens is determined so that the DM, DS, AP and AS becomes as small as possible.

It is impossible to simultaneously make the DM and DS zero or to simultaneously make the AS and AP zero with regard to all possible values of the angle of rotation β even if the diopter Do is kept constant. Also, it is impossible to make each of the aberrations of DM, DS, AS and AP zero with regard to all possible values of the diopter Do even if the angle of rotation β is kept at a constant value other than zero.

However, the inventor of the invention found out that each aberration (DM,DS,AP,AS) changes linearly with respect to the diopter Do when the angle of rotation β is kept at a constant value, and that the aberrations can be defined by the following approximation expressions (11) through (14).

$$DM \cong A \cdot D_o + B \quad (11)$$

$$DS \cong C \quad (12)$$

$$AP \cong (A/2) \cdot D_o + (B+C)/2 \quad (13)$$

$$AS \cong A \cdot D_o + (B-C) \quad (14)$$

Figures 4, 5A, 5B:
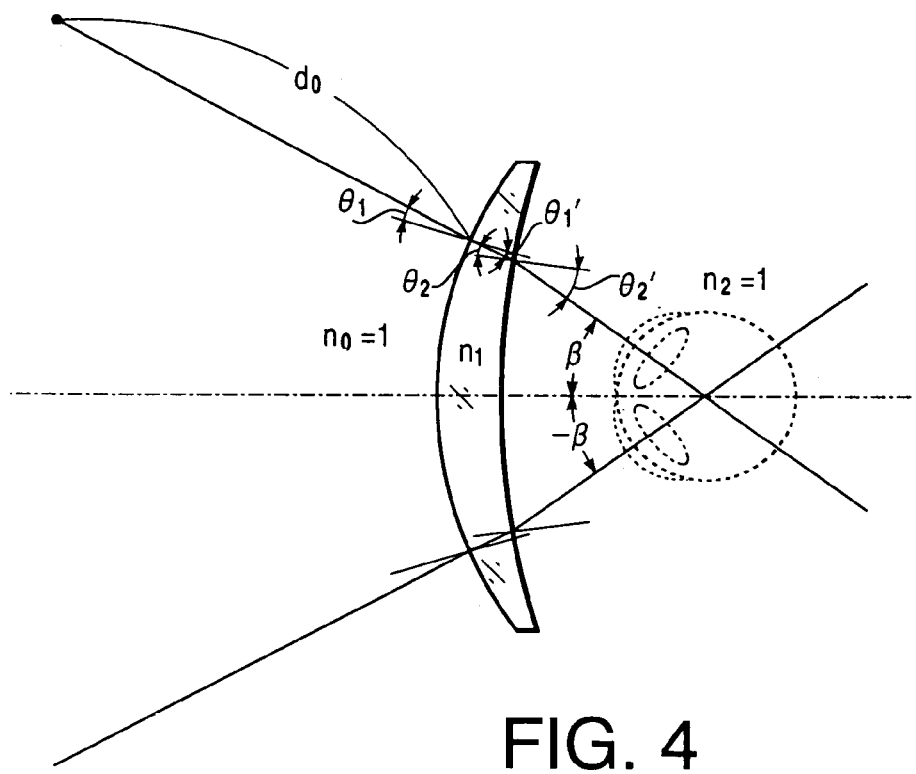
FIG. 4 shows an optical arrangement which is used for calculation of the aberrations and which indicates various parameters related to a ray of light.
FIG. 5A is a list showing a distribution of curvature $C_1(h,\theta)$ of an outer surface of a spectacle lens according to a first example.
FIG. 5B is a list showing a distribution of curvature $C_2(h,\theta)$ of an inner surface of the spectacle lens according to the first example.

In the expressions (11) through (14), A, B and C are coefficients determined with respect to a certain angle of rotation β. As shown in FIG. 4, when refractive indexes of a front and a rear of an i-th refractive surface are represented by $n_{i-1}$ and $n_i$, respectively, cosines of an incident angle θi and an exit angle θi' of a ray of light with respect to the i-th refractive surface are represented by $\xi_i$ and $\xi_i'$, respectively, and curvatures in the meridional cross section and in the sagittal cross section at a point at which the ray of light passes through the i-th refractive surface are represented by $Cm_i$ and $Cs_i$, respectively, the coefficients A, B and C are expressed by the following equations (15) through (17). When the equations (15) through (17) are obtained, the ray of light emitted from an object point having a distance "do" from the outer surface of the lens is traced in accordance with a Coddington's expression, assuming that the lens is sufficiently thin.

$$A \equiv (\xi_1/\xi_1')^2 \cdot (\xi_2/\xi_2') - 1 \quad (15)$$

$$B \equiv (n_1 \xi_1' - \xi_1) \cdot (\xi_2/\xi_2')^2 \cdot \xi_1'^{-2} \cdot Cm_1 - (n_1-1) \cdot C + (\xi_2' - n_1 \xi_2) \cdot \xi_2'^{-2} \cdot Cm_2 - (1-n_1) \cdot C_2 \quad (16)$$

$$C \equiv (n_1 \xi_1' - \xi_1) \cdot Cs_1 - (n_1-1) \cdot C_1 + (\xi_2' - n_1 \xi_2) \cdot Cs_2 - (1-n_1) \cdot C_2 \quad (17)$$

The value of the coefficient A is a rate of change of DM with respect to the diopter Do. The coefficient B is a value of DM itself when the diopter Do=0 (i.e., the object distance is infinite). The coefficient C is a value of DS itself and takes a constant value without depending on the diopter Do.

With regard to the equation (15), the coefficient A only depends on the angle formed between the ray of light and a normal to the lens surface, and does not depend on the curvature of an aspherical surface at a point at which the ray of light passes through the aspherical surface. That is, the coefficient A does not change as the degree of the aspherical surface changes to an extent as long as a base curve does not change.

Except for a particular situation where the base curve of the lens is extremely deep, a relationship $\xi_1 < \xi_2'$ holds and therefore the coefficient A is negative when the refractive power of the lens is negative, and a relationship $\xi_1 > \xi_2'$ holds and therefore the coefficient A is positive when the refractive power of the lens is positive.

With regard to the equation (16), since the equation (16) includes the curvature of the meridional cross section of the aspherical surface at the point at which the ray of light passes through the asherical surface, the coefficient B changes as the curvature of the aspherical surface changes. Therefore, a linear line representing the DM moves parallel to itself as the degree of the aspherical surface changes.

The equation (17) includes the curvature of the sagittal cross section of the aspherical surface. In general, a curvature of a sagittal cross section of a rotationally-symmetrical aspherical surface Cs(h) is determined by the following equation:

$$Cs = Z'(h)/h \cdot \overline{\sqrt{1+Z'(h)^2}} \quad (18)$$

where Z(h) represents a shape of the meridional cross section. That is, the cuvature of the sagittal cross section depends on the gradient of the meridional cross section, and does not change as the degree of the aspherical surface changes to a certain degree.

Therefore, after a refractive index of material of the spectacle lens and a base curve are determined, an effective way, that a designer who wants to suitably correct the aberrations of the spectacle lens can adopt, is nothing but determining the coefficient B so that a balance between the aberrations becomes suitable by changing the curvature of the meridional cross section for each point on the aspherical surface. That is, it is impossible to accomplish a spectacle lens that has suitable performance for each of the distance vision and the near vision by only using a rotationally-symmetrical surface, because only the coefficient B can be controlled and therefore there is a limit on the optical design of the spectacle lens for attaining a suitable balance between the aberrations.

For the above mentioned reason, the spectacle lens according to the embodiments of the invention uses a rotationally-asymmetrical aspherical surface in which the upper portion and the lower portion of the surface have different shapes that are respectively suitable for the distance vision and the near vision.

To calculate the aberrations of points which are symmetrical with respect to an optical center on the lens surface, a light beam being incident on the lens surface with forming the angle +β (i.e., being incident from the upper side) and a light beam being incident on the lens with forming the angle −β (i.e., being incident on the lens from the lower side) will be considered.

Hereafter, each symbol (a coefficient, a variable, and etc.) that represents an amount concerning the upper portion of the lens is assigned a subscript (+), and each symbol that represents an amount concerning the lower portion of the lens is assigned a subscript (−). The upper portion and the lower portion of the lens have different aspheric amounts to differentiate the characteristic of aberrations in the upper portion from the characteristic of the aberrations in the lower portion of the lens. Further, the upper portion and the lower portion of the lens have substantially the same shape.

Therefore, even though the shapes of the upper portion and the lower portion of the lens are different from each other, the coefficient A (and C) is common to both of the upper portion and the lower portion of the lens. Accordingly, it is required that the coefficient B is determined individually with regard to the upper portion and the lower portion of the lens.

With regard to the upper portion and the lower portion of the lens, the equation (16) is expressed by the following equations (16a) and (16b).

$$B_{(+)} = (n_1 \xi_1'_{(+)} - \xi_{1(+)}) \cdot (\xi_{2(+)} / \xi_2'_{(+)})^2 \cdot \xi_1'_{(+)}{}^{-2} \cdot Cm_{1(+)} - (n_1 - 1) \cdot C_1 + (\xi_2'_{(+)} - n_1 \xi_{2(+)}) \cdot \xi_2'_{(+)}{}^{-2} \cdot Cm_{2(+)} - (1 - n_1) \cdot C_2 \quad (16a)$$

$$B_{(-)} = (n_1 \xi_1'_{(-)} - \xi_{1(-)}) \cdot (\xi_{2(-)} / \xi_2'_{(-)})^2 \cdot \xi_1'_{(-)}{}^{-2} \cdot Cm_{1(-)} - (n_1 - 1) \cdot C_1 + (\xi_2'_{(-)} - n_1 \xi_{2(-)}) \cdot \xi_2'_{(-)}{}^{-2} \cdot Cm_{2(-)} - (1 - n_1) \cdot C_2 \quad (16b)$$

Since an angle that a ray of light forms with respect to the refractive surface within the upper portion of the lens and an angle that a ray of light forms with respect to the refractive surface within the lower portion of the lens are substantially the same, the following relationships of $\xi_{1(+)} = \xi_{1(-)}$, $\xi_1'_{(+)} = \xi_1'_{(-)}$, $\xi_{2(+)} = \xi_{2(-)}$, and $\xi_2'_{(+)} = \xi_2'_{(-)}$ hold. Therefore, when these angles are represented by $\xi_1$, $\xi_1'$, $\xi_2$, and $\xi_2'$, respectively, and the equation (16b) is subtracted from the equation (16a), the following equation (19) is obtained.

$$B_{(+)} - B_{(-)} = (n_1 \xi_1' - \xi_1) \cdot (\xi_2 / \xi_2')^2 \cdot \xi_1'{}^{-2} \cdot (Cm_{1(+)} - Cm_{1(-)}) + (\xi_2' - n_1 \xi_2) \cdot \xi_2'{}^{-2} \cdot (Cm_{2(+)} - Cm_{2(-)}) \quad (19)$$

In the equation (19), $(n_1 \xi_1' - \xi_1)(\xi_2 / \xi_2')^2 \xi_1'{}^{-2}$ and $(\xi_2' - n_1 \xi_2) \xi_2'{}^{-2}$ are regarded as contributions of the curvature of the lens surface to the aberrations, and become $(n_1 - 1)$ and $(1 - n_1)$, respectively, when the ray of light is incident on the lens surface perpendicularly.

When the inner surface of the lens is a rotationally-asymmetrical aspherical surface and the outer surface of the lens is a surface having a symmetric property (e.g., a spherical surface, a toric surface, a rotationally-symmetrical surface and the like), $Cm_{1(+)} - Cm_{1(-)} = 0$ holds and therefore the equation (19) can be changed to the following equation (20).

$$B_{(+)} - B_{(-)} = (\xi_2' - n_1 \xi_2) \cdot \xi_2'{}^{-2} \cdot (Cm_{2(+)} - Cm_{2(-)}) \quad (20)$$

In the case of a minus lens, $C_2 - C_1 > 0$ holds. Further, each of the DM, AP and AS increases as the diopter Do decreases (i.e., as the object distance decreases) because the coefficient A is negative. Therefore, to suppress an increase of each aberration for the near vision, $B_{(-)}$ is required to be lower than $B_{(+)}$ (i.e., $B_{(+)} > B_{(-)}$). By further considering that $(\xi_2' - n_1 \xi_2) \xi_2'{}^{-2} < 0$ holds, the following relationship can be derived from the equation (20).

$$Cm_{2(-)} - Cm_{2(+)} > 0$$

The above inequality ($Cm_{2(-)} - Cm_{2(+)} > 0$) means that the curvature of the inner surface in the upper portion thereof is smaller than the curvature of the inner surface in the lower portion thereof. Thus, the grounds of the condition (3) have been shown.

In the case of a plus lens, $C_2 - C_1 < 0$ holds. Further, each of the DM, AP and AS decreases as the diopter Do decreases because the coefficient A is positive. Therefore, in contrast to the case of the minus lens, to suppress an increase of each aberration for the near vision, $B_{(-)}$ is required to be larger than $B_{(+)}$ (i.e., $B_{(+)} < B_{(-)}$). By further considering that $(\xi_2' - n_1 \xi_2) \xi_2'{}^{-2} < 0$ holds, the following relationship can be derived from the equation (20).

$$Cm_{2(-)} - Cm_{2(+)} < 0$$

The above inequality ($Cm_{2(-)} - Cm_{2(+)} < 0$) means that the curvature of the inner surface in the upper portion thereof is larger than the curvature of the inner surface in the lower portion thereof. Thus, the grounds of the condition (4) have been shown.

When the outer surface of the lens is a rotationally-asymmetrical aspherical surface and the inner surface of the lens is a surface having a symmetric property (e.g., a spherical surface, a toric surface, a rotationally-symmetrical surface and the like), $Cm_{2(+)} - Cm_{2(-)} = 0$ holds and therefore the equation (19) can be changed to the following equation (21).

$$B_{(+)} - B_{(-)} = (n_1 \xi_1' - \xi_1) \cdot (\xi_2 / \xi_2')^2 \cdot \xi_1'{}^{-2} \cdot (Cm_{1(+)} - Cm_{1(-)}) \quad (21)$$

In the case of a minus lens, $C_2 - C_1 > 0$ holds. Further, it is required that $B_{(+)} > B_{(-)}$ holds. By further considering that $(n_1 \xi_1' - \xi_1)(\xi_2 / \xi_2')^2 \xi_1'{}^{-2} > 0$ holds, the following relationship can be derived from the equation (21).

$$Cm_{1(-)} - Cm_{1(+)} < 0$$

The above inequality ($Cm_{1(-)} - Cm_{1(+)} < 0$) means that the curvature of the outer surface in the upper portion thereof is larger than the curvature of the outer surface in the lower portion thereof. Thus, the grounds of the condition (5) have been shown.

In the case of the plus lens, $C_2 - C_1 < 0$ holds. Further, it is required that $B_{(+)} < B_{(-)}$ holds. By further considering that $(n_1 \xi_1' - \xi_1)(\xi_2 / \xi_2')^2 \xi_1'{}^{-2} > 0$ holds, the following relationship can be derived from the equation (21).

$$Cm_{1(-)} - Cm_{1(+)} > 0$$

The above inequality ($Cm_{1(-)} - Cm_{1(+)} > 0$) means that the curvature of the outer surface in the upper portion thereof is smaller than the curvature of the outer surface in the lower portion thereof. Thus, the grounds of the condition (6) have been shown.

In a case where both of the outer and inner surfaces of the lens are rotationally-asymmetrical aspherical surfaces, it is required to use the equation (19) as it is. However, $\xi$ and $\xi'$ should be removed from conditions to be satisfied by the spectacle lens because the $\xi$ and $\xi'$ are cosines of the angles formed by the ray of light and the refractive surface. Thus, by the neglect of the ray of light that is incident on the lens surface obliquely (i.e., by respectively replacing $(n_1 \xi_1' - \xi_1)(\xi_2 / \xi_2')^2 \xi_1'{}^{-2}$ and $(\xi_2' - n_1 \xi_2) \xi_2'{}^{-2}$ with $(n_1 - 1)$ and $(1 - n_1)$ that holds for the ray of light incident on the lens surface perpendicularly), the equation (19) can be changed to an equation (22) as indicated below.

$$\begin{aligned} B_{(+)} - B_{(-)} &= (n_1 - 1)[Cm_{1(+)} - Cm_{1(-)}] + (1 - n_1)[Cm_{2(+)} - Cm_{2(-)}] \\ &= (n_1 - 1)[[Cm_{2(-)} - Cm_{1(-)}] - [Cm_{2(+)} - Cm_{1(+)}]] \end{aligned} \quad (22)$$

In the case of the minus lens, $C_2 - C_1 > 0$ holds. Further, it is required that $B_{(+)} > B_{(-)}$ holds. By further considering that $(n_1 - 1) > 0$ holds, the following relationship can be derived from the equation (22).

$$[Cm_{2(-)} - Cm_{1(-)}] - [Cm_{2(+)} - Cm_{1(+)}] > 0$$

This inequality means that a difference between the curvature of the upper portion of the inner surface and the curvature of the upper portion of the outer surface is smaller than a difference between the curvature of the lower portion of the inner surface and the curvature of the lower portion of the outer surface. Thus, the grounds of the condition (1) have been shown.

In the case of the plus lens, $C_2-C_1<0$ holds. Further, it is required that $B_{(+)}<B_{(-)}$ holds. By further considering that $(n_1-1)<0$ holds, the following relationship can be derived from the equation (22).

$$[Cm_{2(-)}-Cm_{1(-)}]-[Cm_{2(+)}-Cm_{1(+)}]<0$$

This inequality means that the difference between the curvature of the upper portion of the inner surface and the curvature of the upper portion of the outer surface is larger than the difference between the curvature of the lower portion of the inner surface and the curvature of the lower portion of the outer surface. Thus, the grounds of the condition (2) have been shown.

Hereafter, twelve concrete examples according to the embodiments of the invention and six comparative examples are described. In the following, two examples and one comparative example are shown for each of six types of dioptric power. All of spectacle lenses shown in the following examples and comparative examples have the same refractive index of 1.67.

FIRST EXAMPLE

A spectacle lens according to a first example will be described below using numerical references shown in FIG. 1. The spectacle lens according to the first example is a minus lens that is not prescribed cylindrical refractive power (cylindrical power). Specifications of the spectacle lens of the first example are indicated in Table 1. As shown in Table 1, the outer surface 2 is a spherical surface having a curvature shown in Table 1, the inner surface 3 is a rotationally-asymmetrical aspherical surface.

TABLE 1

| | |
|---|---|
| SPHERICAL POWER SPH | −4.00[D] |
| CURVATURE OF OUTER SURFACE C1 (SPHERICAL SURFACE) | 1.35[D] |
| CURVATURE OF INNER SURFACE C2 (ROTATIONALLY-ASYMMETRICAL ASPHERICAL SURFACE) | 7.36[D] |
| CENTRAL THICKNESS | 1.10[mm] |

FIG. 5A is a list showing a distribution of the curvature $C_1(h,\theta)$ which is obtained on the outer surface 2 at each point having the polar coordinate $(h,\theta)$ represented by the height h from the centration point 4 and the angle $\theta$ of the intersection line 7 with respect to the x-axis. Since the outer surface 2 is spherical, the curvatures $C_1(h,\theta)$ at all of the points on the outer surface 2 are the same. FIG. 5B is a list showing a distribution of the curvature $C_2(h,\theta)$ which is obtained on the inner surface 3 at each point having the polar coordinate $(h,\theta)$.

Figure 6A:
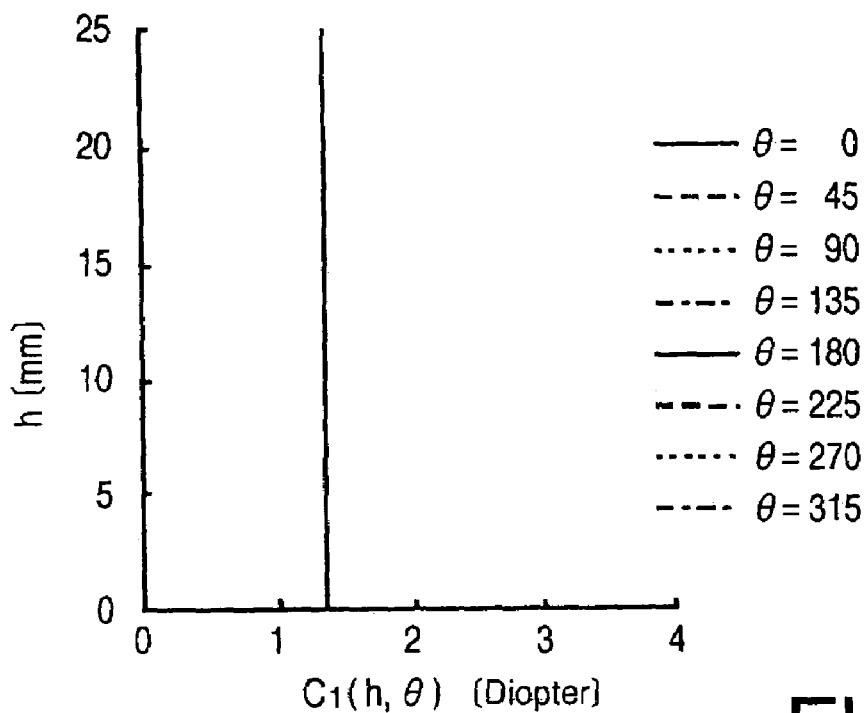
FIG. 6A is a graph illustrating change of the curvature $C_1(h,\theta)$ of the first example for each of angles θ with respect to change of a height h.

FIG. 6A is a graph illustrating the change of the curvature $C_1(h,\theta)$ for each of the angle $\theta$ of 0°, 45°, 90°, 135°, 180°, 225°, 270° and 315° with respect to the change of the height h. In FIG. 6A (and in the following similar graphs), a horizontal axis represents the curvature, and a vertical axis represents the height h. Since the outer surface 2 is spherical, the change of the curvature $C_1(h,\theta)$ is represented by a linear line on which all of the changes of the curvature $C_1(h,\theta)$ at different angles $\theta$ are overlapping one another.

Figure 6B:
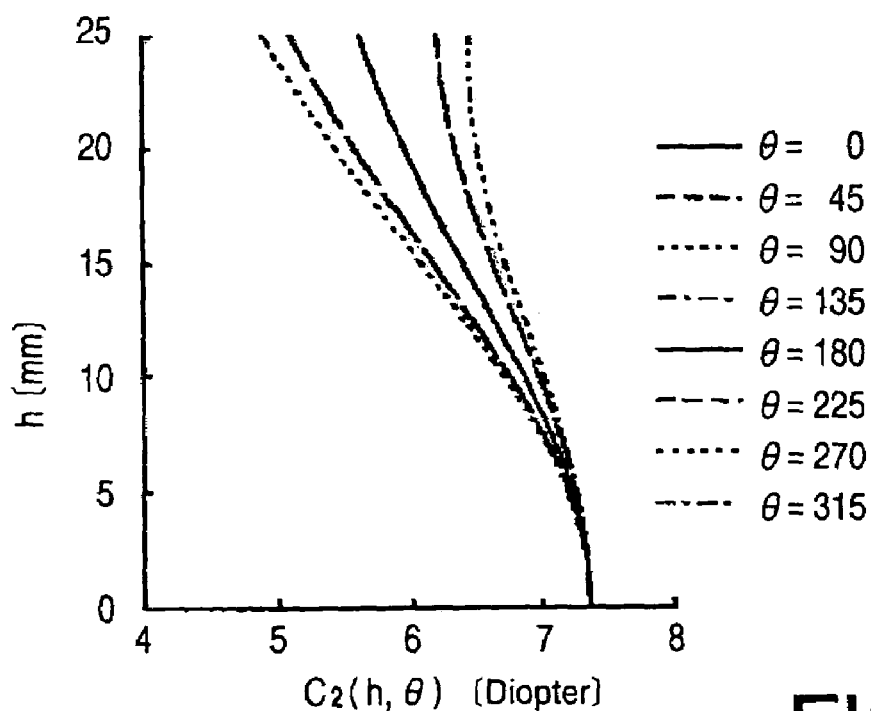
FIG. 6B is a graph illustrating change of the curvature $C_2(h,\theta)$ of the first example for each of angles θ with respect to change of a height h.

FIG. 6B is a graph illustrating the change of the curvature $C_2(h,\theta)$ for each of the angle $\theta$ of 0°, 45°, 90°, 135°, 180°, 225°, 270° and 315° with respect to the change of the height h. In FIG. 6B, curves of the angles $\theta$ of 0° and 180° are overlapping one another. On the left side of the curve of the angle $\theta$ of 0° (180°) on FIG. 6B, a curve on which the changes of the curvatures of the angles $\theta$ of 45° and 135° are overlapping and a curve of the angles $\theta$ of 90° are indicated in order of the decreasing amount of the curvature. On the right side of the curve of the angle $\theta$ of 0° (180°) on FIG. 6B, a curve on which the changes of the curvatures of the angles $\theta$ of 225° and 315° are overlapping and a curve of the angles $\theta$ of 270° are indicated in order of the increasing amount of the curvature.

Figure 7A:
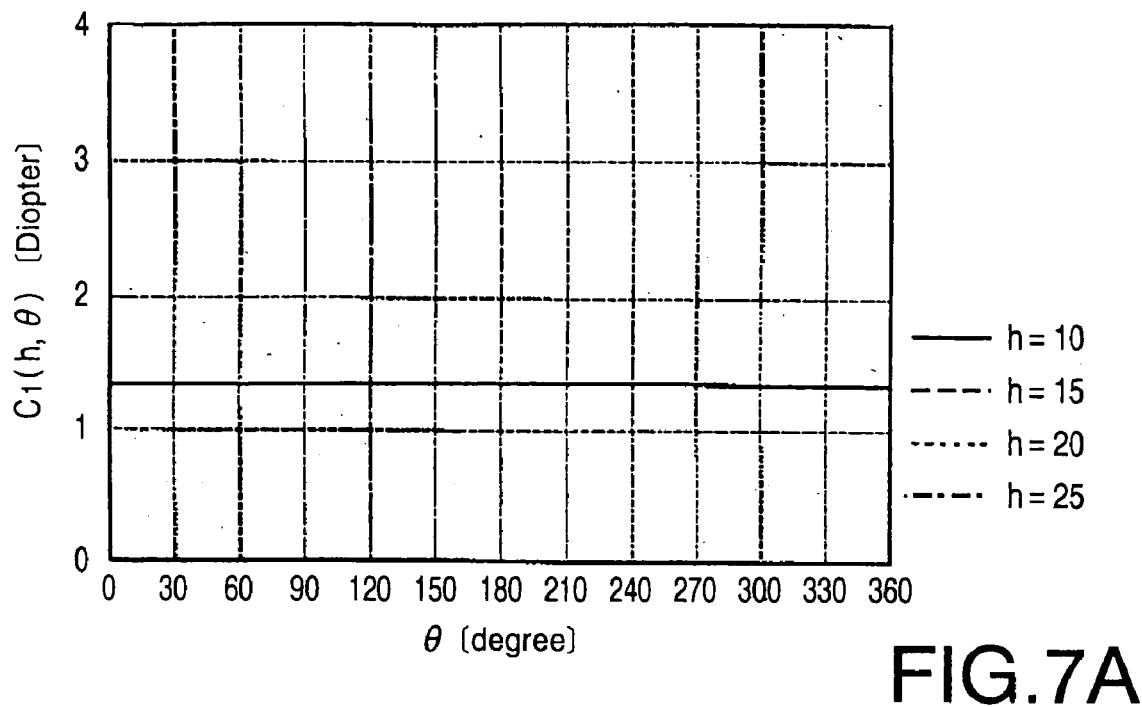
FIG. 7A is a graph illustrating change of the curvature $C_1(h,\theta)$ of the first example for each of the heights h with respect to change of the angle θ.

FIG. 7A is a graph illustrating the change of the curvature $C_1(h,\theta)$ for each of the heights h of 10 mm, 15 mm, 20 mm and 25 mm with respect to the change of the angle $\theta$. In FIG. 7A (and in the following similar graphs), a horizontal axis represents the angle $\theta$, and a vertical axis represents the curvature. Since the outer surface 2 is spherical, the change of the curvature $C_1(h,\theta)$ is represented by a linear line on which all of the changes of the curvature $C_1(h,\theta)$ at different heights h are overlapping one another.

Figure 7B:
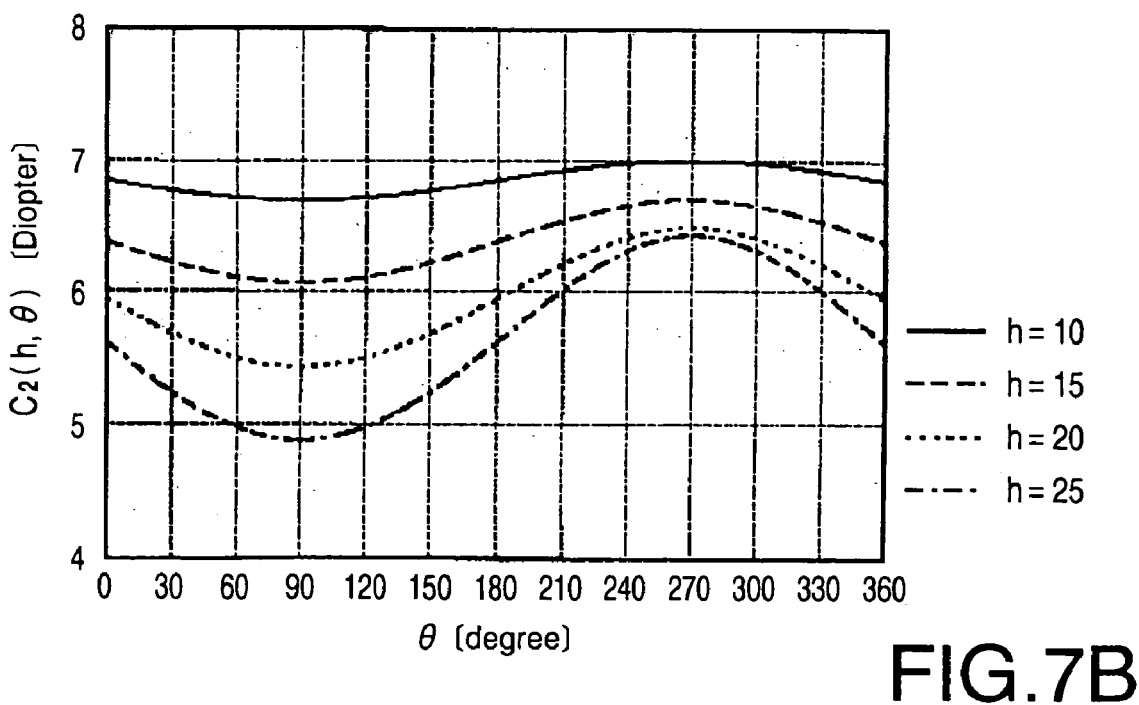
FIG. 7B is a graph illustrating change of the curvature $C_2(h,\theta)$ of the first example for each of the heights h with respect to change of the angle θ.

FIG. 7B is a graph illustrating the change of the curvature $C_2(h,\theta)$ for each of the heights h of 10 mm, 15 mm, 20 mm and 25 mm with respect to the change of the angle $\theta$. As shown in FIG. 7B, for all of the curves of the heights of 10 mm, 15 mm, 20 mm and 25 mm, the curvature $C_2(h,\theta)$ takes the minimum value at the angle $\theta$ of 90° (i.e., in the upper portion) and takes the maximum value at the angle $\theta$ of 270° (i.e., in the lower portion).

Figure 8A:
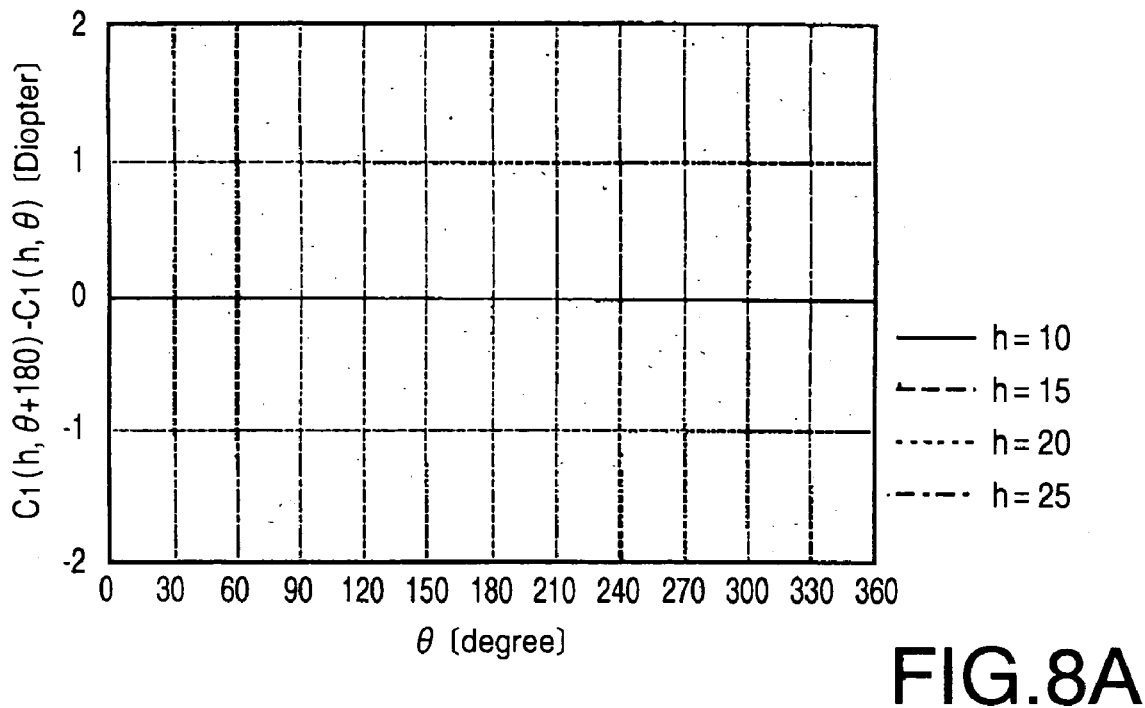
FIG. 8A is a graph illustrating change of a value of $C_1(h,\theta+180)-C_1(h,\theta)$ of the first example for each of the heights h with respect to the change of the angle θ.

FIG. 8A is a graph illustrating the change of the value of $C_1(h,\theta+180)-C_1(h,\theta)$ of the condition (3) for each of the heights h of 10 mm, 15 mm, 20 mm and 25 mm with respect to the change of the angle $\theta$. In FIG. 8A (and in the following similar graphs), a horizontal axis represents the angle $\theta$, and a vertical axis represents $C_1(h,\theta+180)-C_1(h,\theta)$. Since the outer surface 2 is spherical, the change of $C_1(h,\theta+180)-C_1(h,\theta)$ is represented by a linear line on which all of the changes of $C_1(h,\theta+180)-C_1(h,\theta)$ at different heights h are overlapping one another.

Figure 8B:
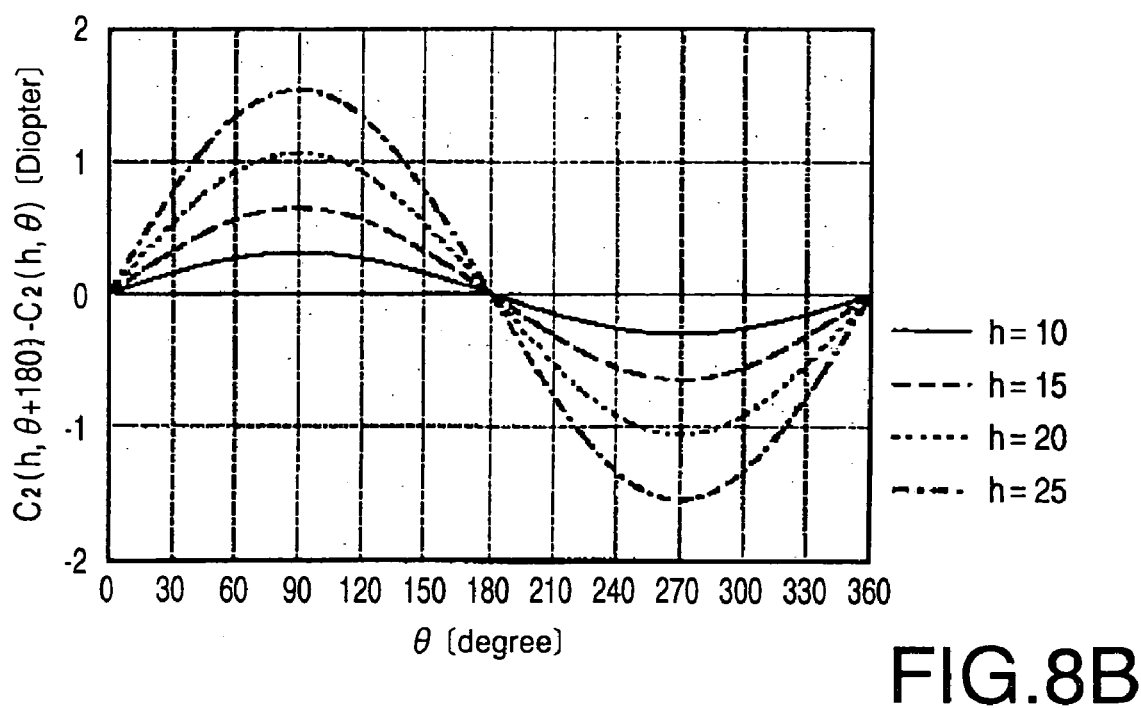
FIG. 8B is a graph illustrating change of a value of $C_2(h,\theta+180)-C_2(h,\theta)$ of the first example for each of the heights h with respect to the change of the angle θ.

FIG. 8B is a graph illustrating the change of the value of $C_2(h,\theta+180)-C_2(h,\theta)$ of the condition (3) for each of the heights h of 10 mm, 15 mm, 20 mm and 25 mm with respect to the change of the angle $\theta$. As shown in FIG. 8B, for all of the curves of the heights h of 10 mm, 15 mm, 20 mm and 25 mm, the value of $C_2(h,\theta+180)-C_2(h,\theta)$ takes the maximum value at the angle $\theta$ of 90° (i.e., in the upper portion) and takes the minimum value at the angle $\theta$ of 270° (i.e., in the lower portion).

Further, as shown in FIG. 8B, the amplitude of the change of $C_2(h,\theta+180)-C_2(h,\theta)$ becomes greater as the height h increases. In FIG. 8B, a point on the curve of the height h=10 at the angle $\theta$=90° takes the value of $C_2(10,270)-C_2(10,90)$. As can be seen from FIG. 5B, $C_2(10,270)$ and $C_2(10,90)$ are 7.00 and 6.70, respectively. Therefore, the value of the curve the height h=10 at the angle $\theta$=90° is 0.30. It is obvious from FIG. 8B that $C_2(h,\theta+180)-C_2(h,\theta)$ is positive for each of the heights h of 10 mm, 15 mm, 20 mm and 25 mm within the range of $30 \leq \theta \leq 150$. Accordingly, the spectacle lens according to the first example satisfies the condition (3).

Figure 9:
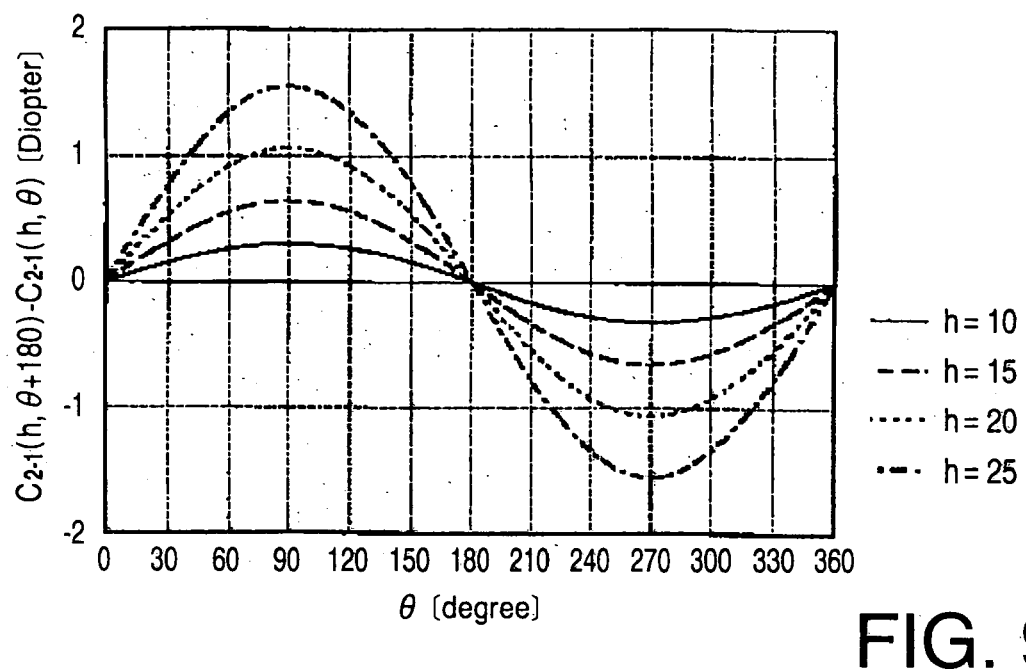
FIG. 9 is a graph illustrating change of a value of $C_{2-1}(h,\theta+180)-C_{2-1}(h,\theta)$ of the first example for each of the heights h with respect to the change of the angle θ.

FIG. 9 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle $\theta$. As shown in FIG. 9, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion).

It is obvious from FIG. 9 that $C_{2-1}(h,\theta+180)-C_{2-1}(h,\theta)$ is positive for each of the heights h of 10 mm, 15 mm, 20 mm and 25 mm within the range of 30≦θ≦150. Accordingly, the spectacle lens according to the first example satisfies the condition (1).

Figure 10A:
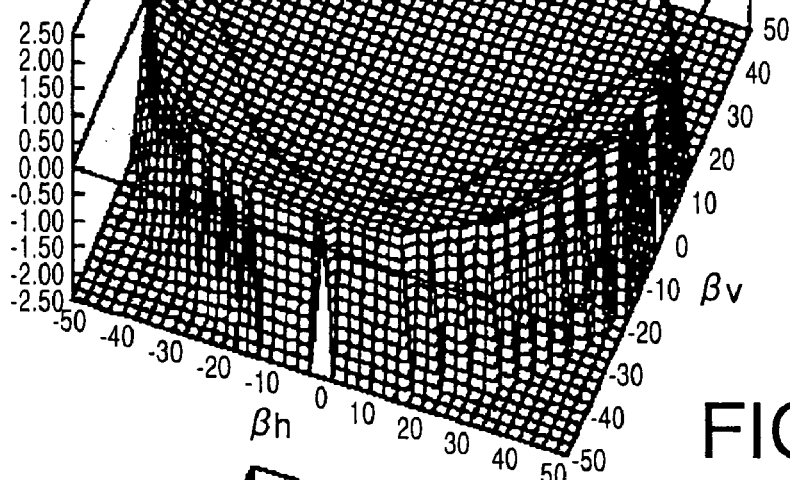
FIG. 10A is a three dimensional graph illustrating an average refractive power error of the spectacle lens of the first example.
Figure 10B:
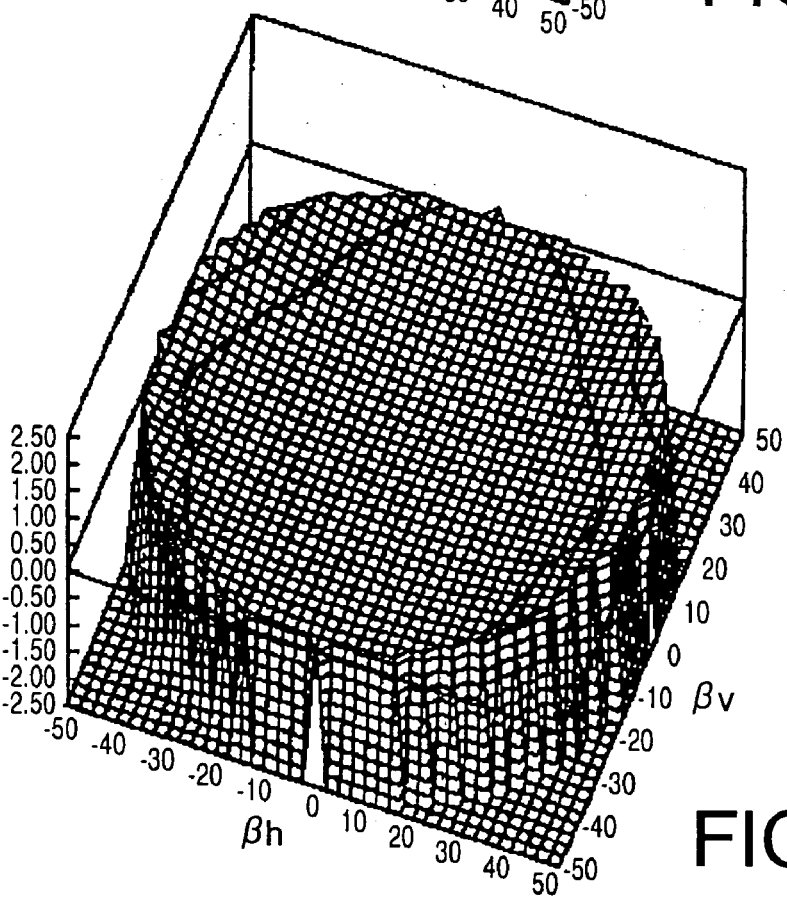
FIG. 10B is a three dimensional graph illustrating astigmatism of the spectacle lens of the first example.

FIGS. 10A and 10B represent optical performance of the spectacle lens of the first example. FIGS. 10A and 10B are three dimensional graphs of the average refractive power error and the astigmatism, respectively. In each of FIGS. 10A and 10B (and the following similar graphs), a plane graph has an axis of the angle of rotation βv in the vertical direction and has an axis of the angle of rotation βh in the horizontal direction. Further, a vertical axis in FIG. 10A represents the amount of the aberration AP [D] (the average refractive power error). Further, a vertical axis in FIG. 10B represents the amount of the aberration AS[d] (the astigmatism).

In each of graphs of FIGS. 10A and 10B, the aberration is indicated by continuously assigning the object distance raging from infinity (Do=0) to 250 mm (Do=−4) to the range of 50° though 50° of the angle of rotation βv in the vertical axis. That is, the aberration is evaluated for each object distance that is assigned to the corresponding angle of rotation βv.

More specifically, a longer object distance is used to evaluate the aberration in the upper portion of the lens because optical performance for the distance vision is important in the upper portion of the lens. On the other hand, a shorter object distance is used to evaluate the aberration in the lower portion of the lens because optical performance for the near vision is important in the lower portion of the lens. The above mentioned properties of the three dimensional graphs of the aberrations also apply to the similar graphs shown in the following examples and comparative examples.

SECOND EXAMPLE

A spectacle lens according to a second example will be described below using numerical references shown in FIG. 2. The spectacle lens according to the second example is a minus lens that is not prescribed cylindrical power. Specifications of the spectacle lens of the second example are indicated in Table 2. As shown in Table 2, the inner surface 13 is a spherical surface having a curvature shown in Table 2, and the outer surface 12 is a rotationally-asymmetrical aspherical surface.

TABLE 2

| | |
|---|---|
| SPHERICAL POWER SPH | −4.00[D] |
| CURVATURE OF OUTER SURFACE C1 (ROTATIONALLY-ASYMMETRICAL ASPHERICAL SURFACE) | 6.77[D] |
| CURVATURE OF INNER SURFACE C2 (SPHERICAL SURFACE) | 12.80[D] |
| CENTRAL THICKNESS | 1.10[mm] |

FIG. 11A is a list showing a distribution of the curvature $C_1(h,\theta)$ which is obtained on the outer surface 12 at each point having the polar coordinate (h,θ). FIG. 11B is a list showing a distribution of the curvature $C_2(h,\theta)$ which is obtained on the inner surface 13 at each point having the polar coordinate (h,θ). Since the inner surface 13 is spherical, the curvatures $C_2(h,\theta)$ at all of the points on the inner surface 13 are the same.

Figure 12A:
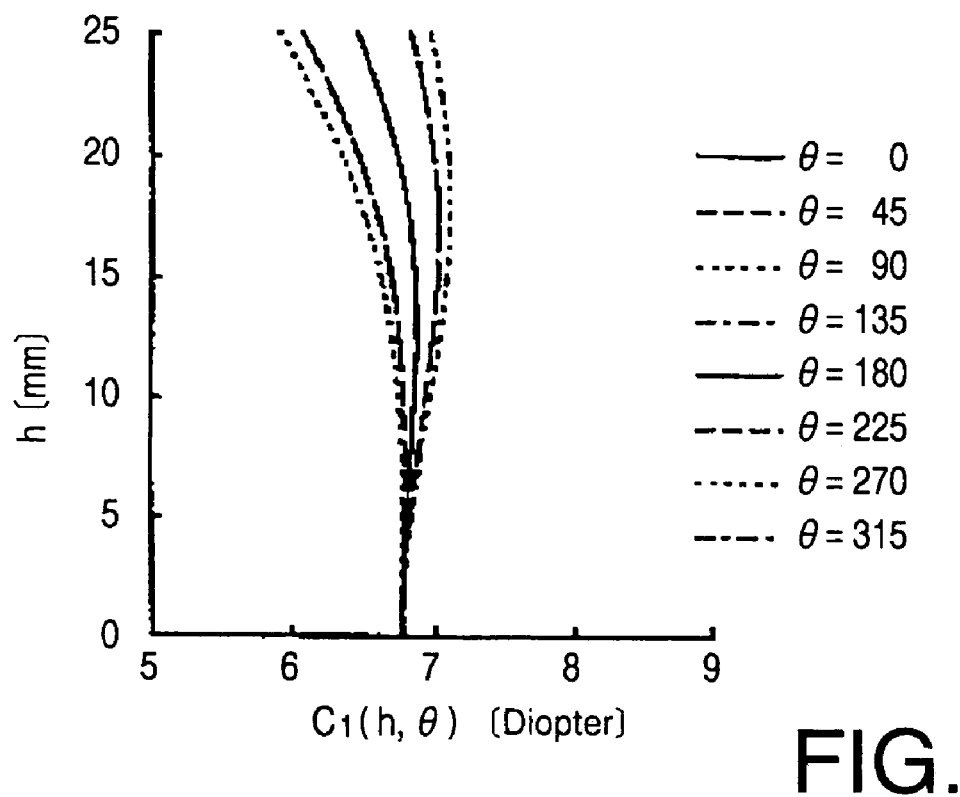
FIG. 12A is a graph illustrating change of the curvature $C_1(h,\theta)$ of the second example for each of angles θ with respect to change of a height h.
Figure 12B:
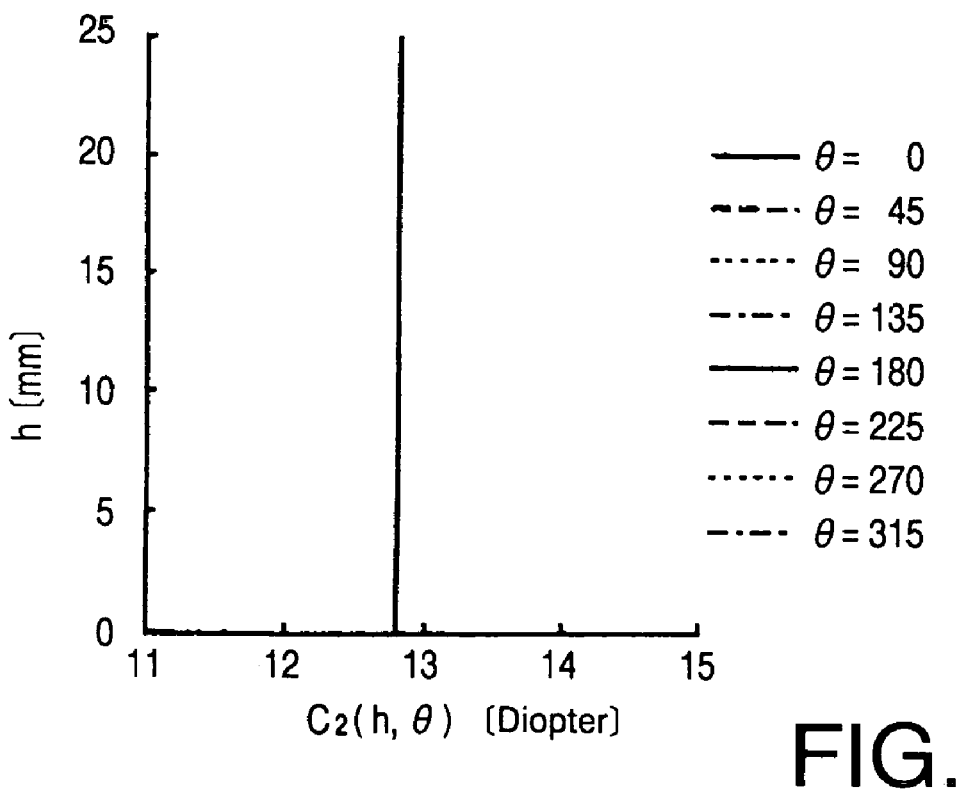
FIG. 12B is a graph illustrating change of the curvature $C_2(h,\theta)$ of the second example for each of angles θ with respect to change of a height h.

FIGS. 12A and 12B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

In FIG. 12A, curves of the angles θ of 0° and 180° are overlapping one another. On the left side of the curve of the angle θ of 0° (180°) on FIG. 12A, a curve on which the changes of the curvatures of the angles θ of 225° and 315° are overlapping and a curve of the angles θ of 270° are indicated in order of the decreasing amount of the curvature. On the right side of the curve of the angle θ of 0° (180°) on FIG. 12A, a curve on which the changes of the curvatures of the angles θ of 45° and 135° are overlapping and a curve of the angles θ of 90° are indicated in order of the increasing amount of the curvature.

Since the inner surface 13 is spherical, the change of the curvature $C_2(h,\theta)$ is represented by a linear line on which all of the changes of the curvature $C_2(h,\theta)$ at different angles θ are overlapping one another on FIG. 12B.

Figure 13A:
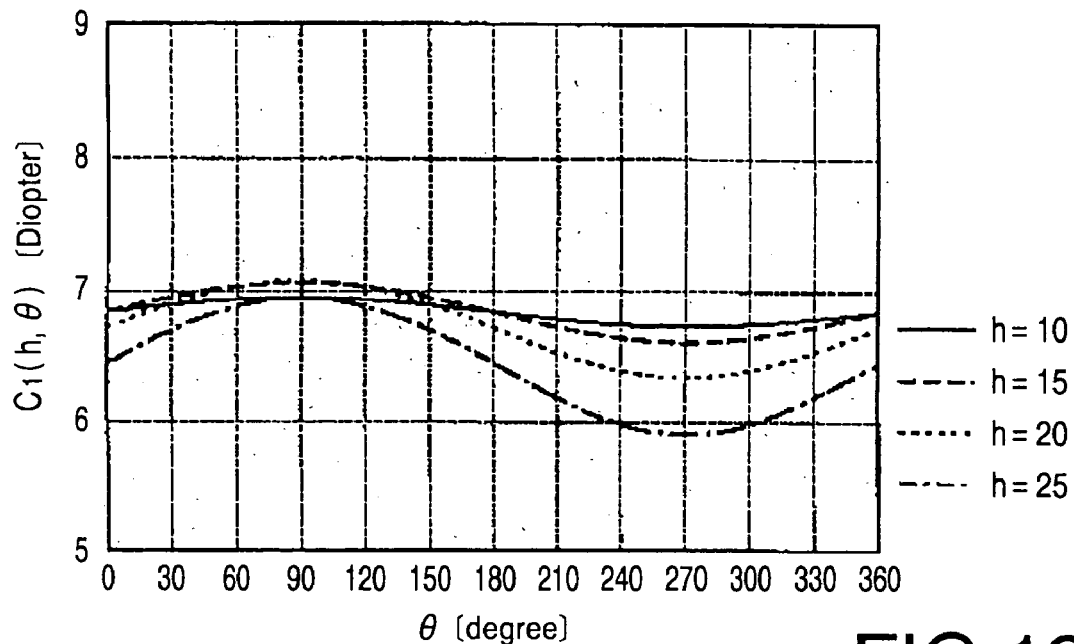
FIG. 13A is a graph illustrating change of the curvature $C_1(h,\theta)$ of the second example for each of the heights h with respect to change of the angle θ.
Figure 13B:
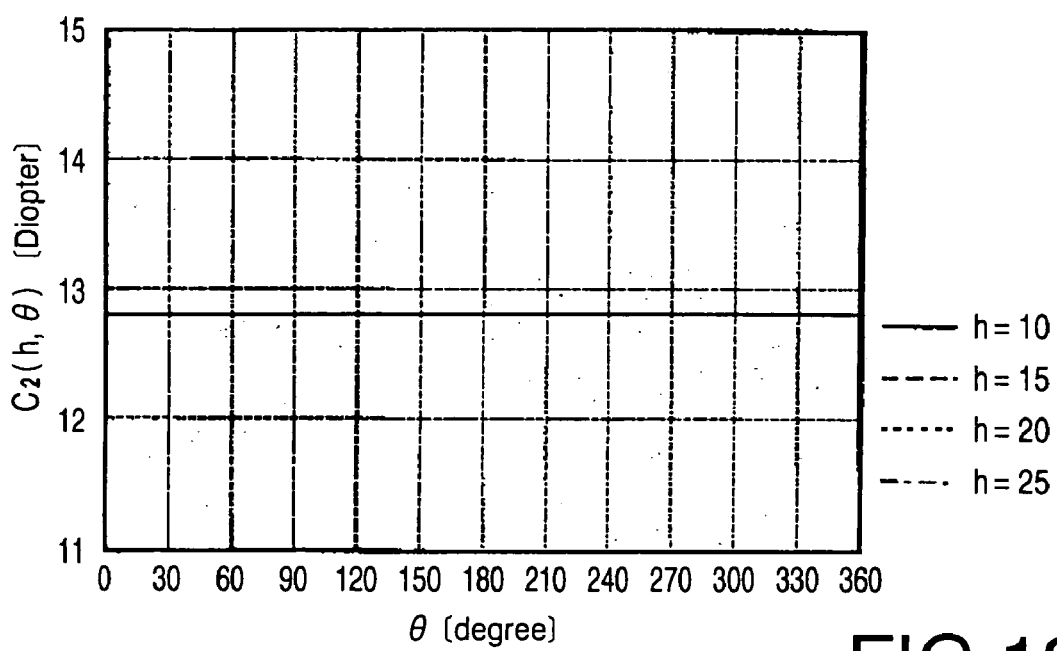
FIG. 13B is a graph illustrating change of the curvature $C_2(h,\theta)$ of the second example for each of the heights h with respect to change of the angle θ.

FIGS. 13A and 13B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

As shown in FIG. 13A, for all of curves of the heights of 10 mm, 15 mm, 20 mm and 25 mm, the curvature $C_1(h,\theta)$ takes the maximum value at the angle θ of 90° (i.e., in the upper portion) and takes the minimum value at the angle θ of 270° (i.e., in the lower portion). Since the inner surface 13 is spherical, the change of the curvature $C_2(h,\theta)$ is represented by a linear line on which all of the changes of the curvature $C_2(h,\theta)$ at different heights h are overlapping one another.

Figure 14A:
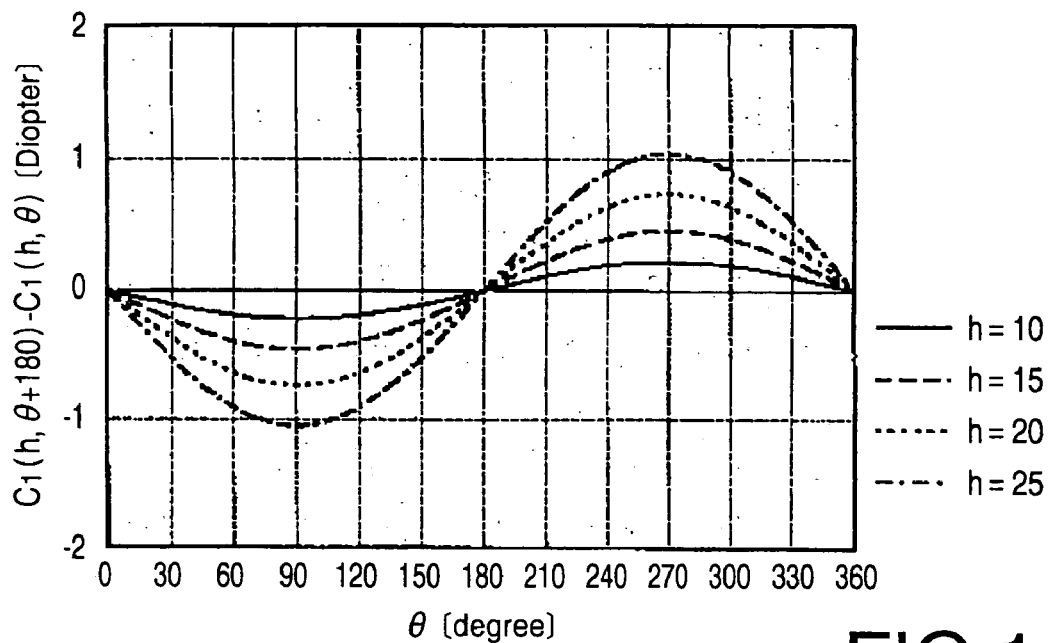
FIG. 14A is a graph illustrating change of a value of $C_1(h,\theta+180)-C_1(h,\theta)$ of the second example for each of the heights h with respect to the change of the angle θ.
Figure 14B:
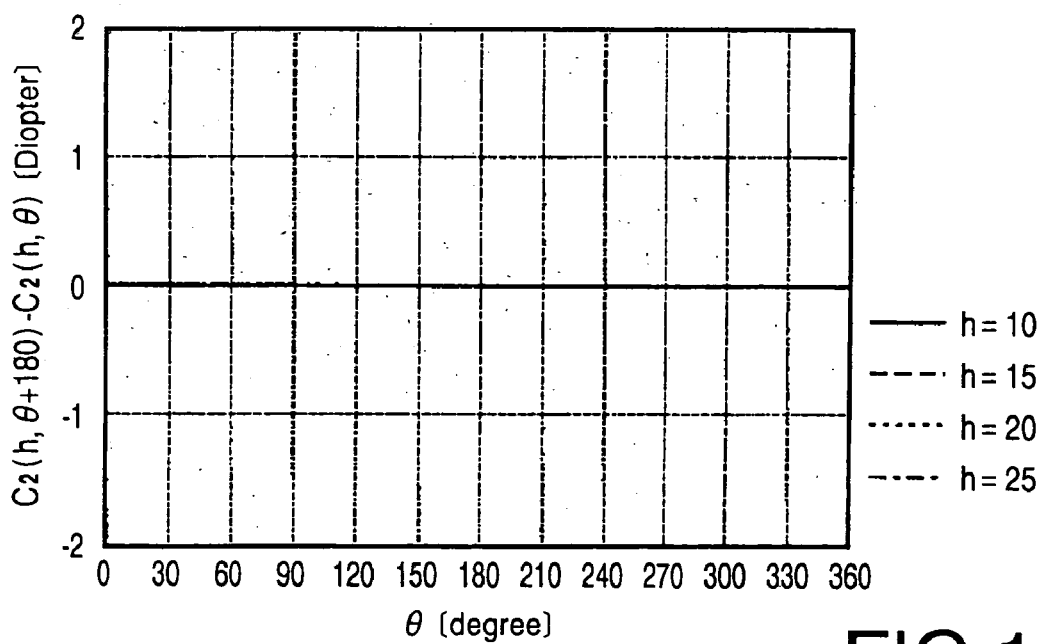
FIG. 14B is a graph illustrating change of a value of $C_2(h,\theta+180)-C_2(h,\theta)$ of the second example for each of the heights h with respect to the change of the angle θ.

FIGS. 14A and 14B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

As shown in FIG. 14A, for all of curves of the heights h of 10 mm, 15 mm, 20 mm and 25 mm, the value of $C_1(h,\theta+180)-C_1(h,\theta)$ takes the minimum value at the angle θ of 90° (i.e., in the upper portion) and takes the maximum value at the angle θ of 270° (i.e., in the lower portion).

Further, as shown in FIG. 14A, the amplitude of the curve of $C_1(h,\theta+180)-C_1(h,\theta)$ becomes greater as the height h increases. It is obvious from FIG. 14A that $C_1(h,\theta+180)-C_1(h,\theta)$ is negative for each of the heights h of 10 mm, 15 mm, 20 mm and 25 mm within the range of 30≦θ≦150. Accordingly, the spectacle lens according to the second example satisfies the condition (5). Since the inner surface 13 is spherical, the change of $C_2(h,\theta+180)-C_2(h,\theta)$ is represented by a linear line on which all of the changes of $C_2(h,\theta+180)-C_2(h,\theta)$ at different heights h are overlapping one another.

Figure 15:
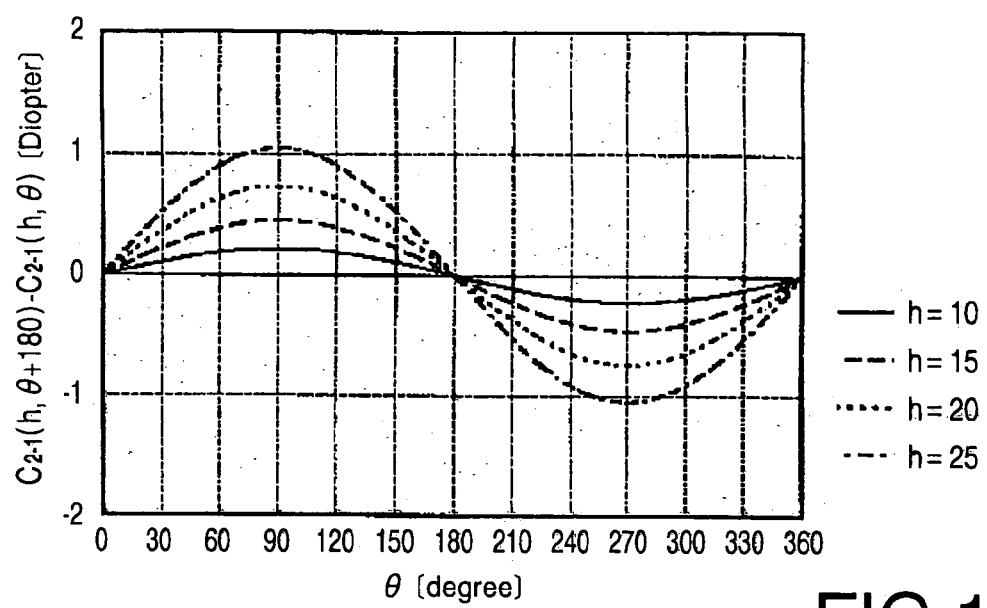
FIG. 15 is a graph illustrating change of a value of $C_{2-1}(h,\theta+180)-C_{2-1}(h,\theta)$ of the second example for each of the heights h with respect to the change of the angle θ.

FIG. 15 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 15, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion).

It is obvious from FIG. 15 that $C_{2-1}(h,\theta+180)-C_{2-1}(h,\theta)$ is positive for each of the heights h of 10 mm, 15 mm, 20 mm and 25 mm within the range of 30≦θ≦150. Accordingly, the spectacle lens according to the second example satisfies the condition (1).

Figure 16A:
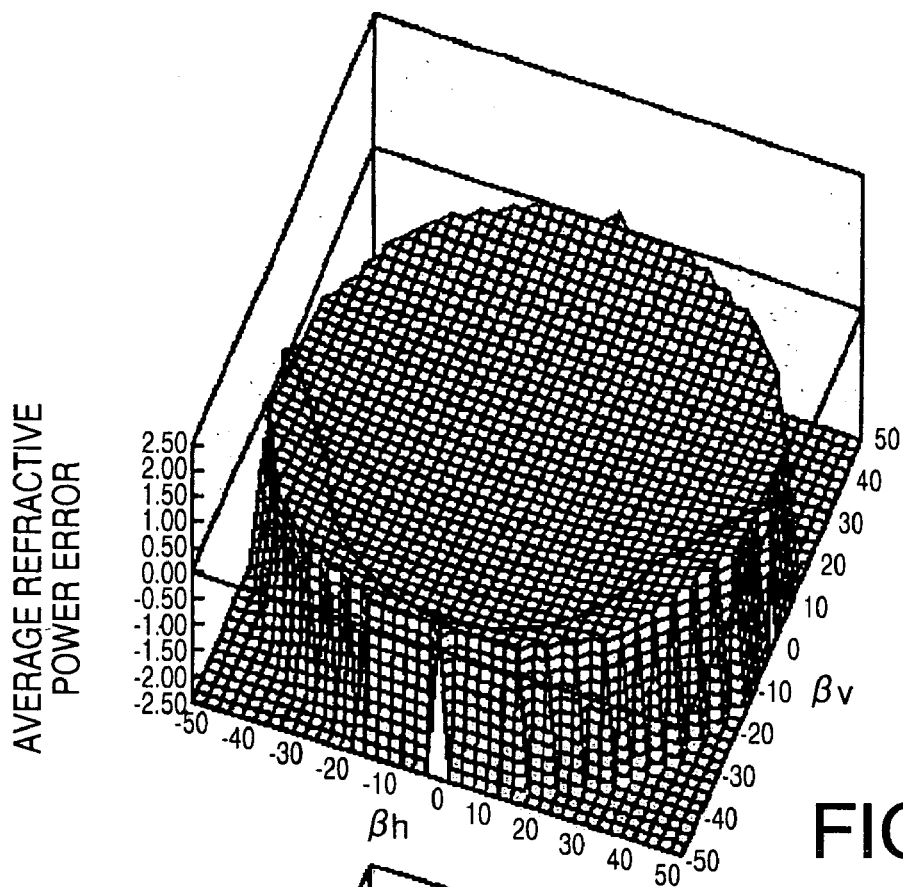
FIG. 16A is a three dimensional graph illustrating an average refractive power error of the spectacle lens of the second example.
Figure 16B:
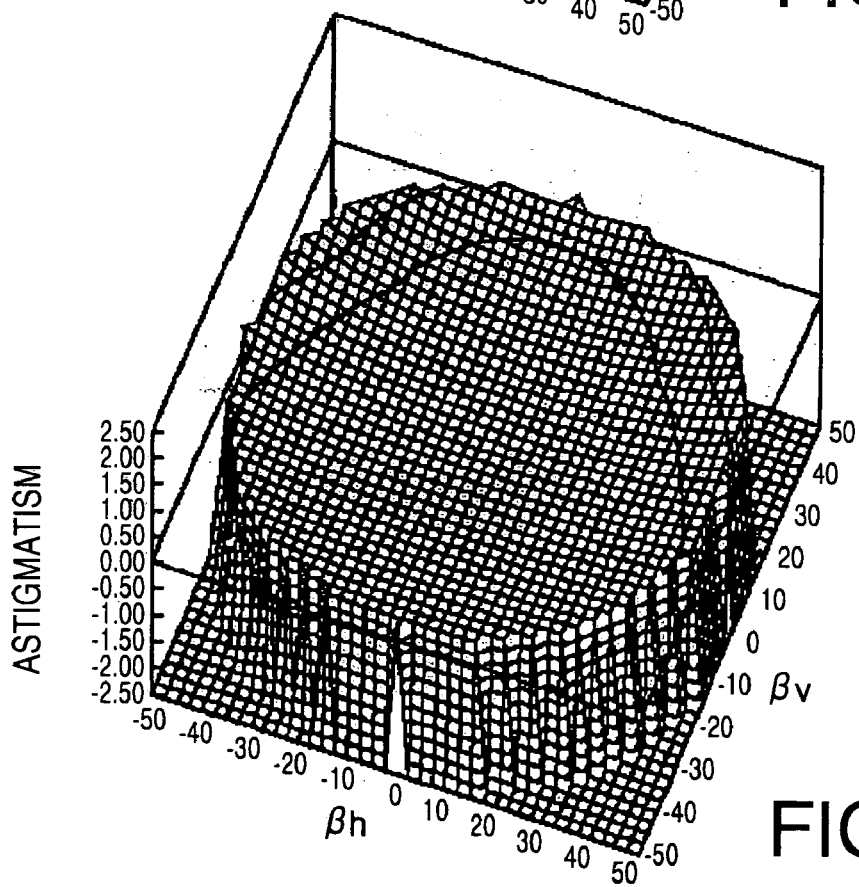
FIG. 16B is a three dimensional graph illustrating astigmatism of the spectacle lens of the second example.

FIGS. 16A and 16B represent optical performance of the spectacle lens of the second example. FIGS. 16A and 16B are three dimensional graphs of the average refractive power error and the astigmatism, respectively.

FIRST COMPARATIVE EXAMPLE

A spectacle lens according to a first comparative example will be described below using numerical references shown in FIG. 2. The spectacle lens of the first comparative example has the same spherical refractive power (spherical power) and the center thickness as those of the first and second examples. Specifications of the spectacle lens of the first comparative example are indicated in Table 3. As shown in Table 3, the inner surface 13 is a spherical surface having a curvature shown in Table 3, and the outer surface 12 is a rotationally-symmetrical aspherical surface.

TABLE 3

| | |
|---|---|
| SPHERICAL POWER SPH | −4.00[D] |
| CURVATURE OF OUTER SURFACE C1 (RATATIONALL-SYMMETRICAL ASPHERICAL SURFACE) | 2.44[D] |
| CURVATURE OF INNER SURFACE C2 (SPHERICAL SURFACE) | 8.46[D] |
| CENTRAL THICKNESS | 1.10[mm] |

FIG. 17A is a list showing a distribution of the curvature $C_1(h,\theta)$ which is obtained on the outer surface 12 at each point having the polar coordinate $(h,\theta)$. FIG. 17B is a list showing a distribution of the curvature $C_2(h,\theta)$ which is obtained on the inner surface 13 at each point having the polar coordinate $(h,\theta)$. Since the inner surface 13 is spherical, the curvatures $C_2(h,\theta)$ at all of the points on the inner surface 13 are the same.

Figure 18A:
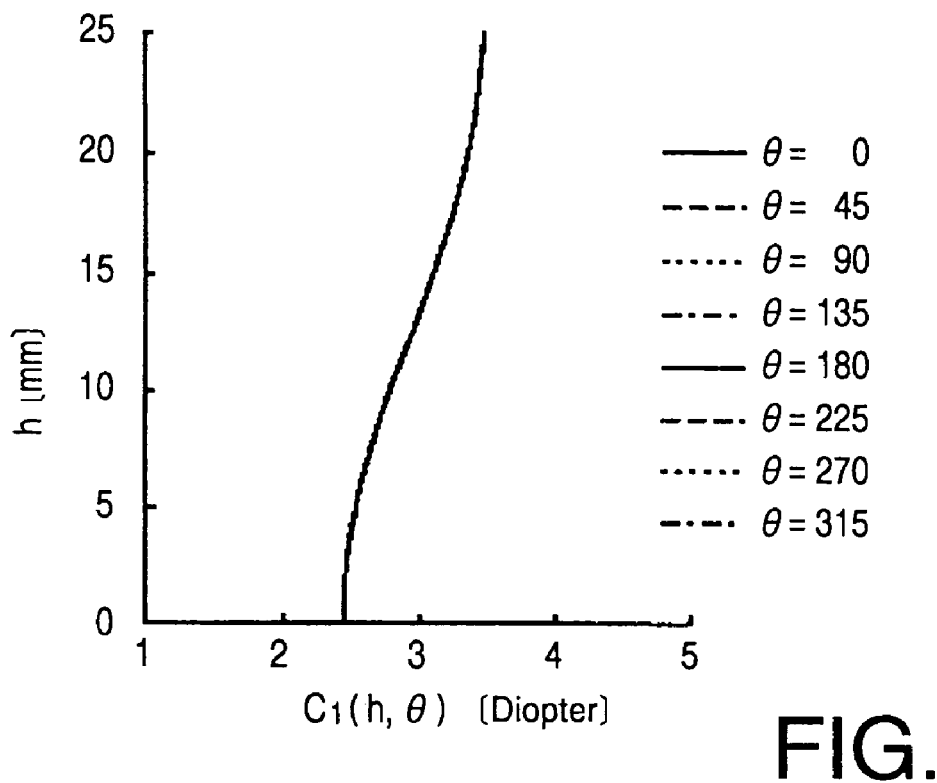
FIG. 18A is a graph illustrating change of the curvature $C_1(h,\theta)$ of the first comparative example for each of angles $\theta$ with respect to change of a height h.
Figure 18B:
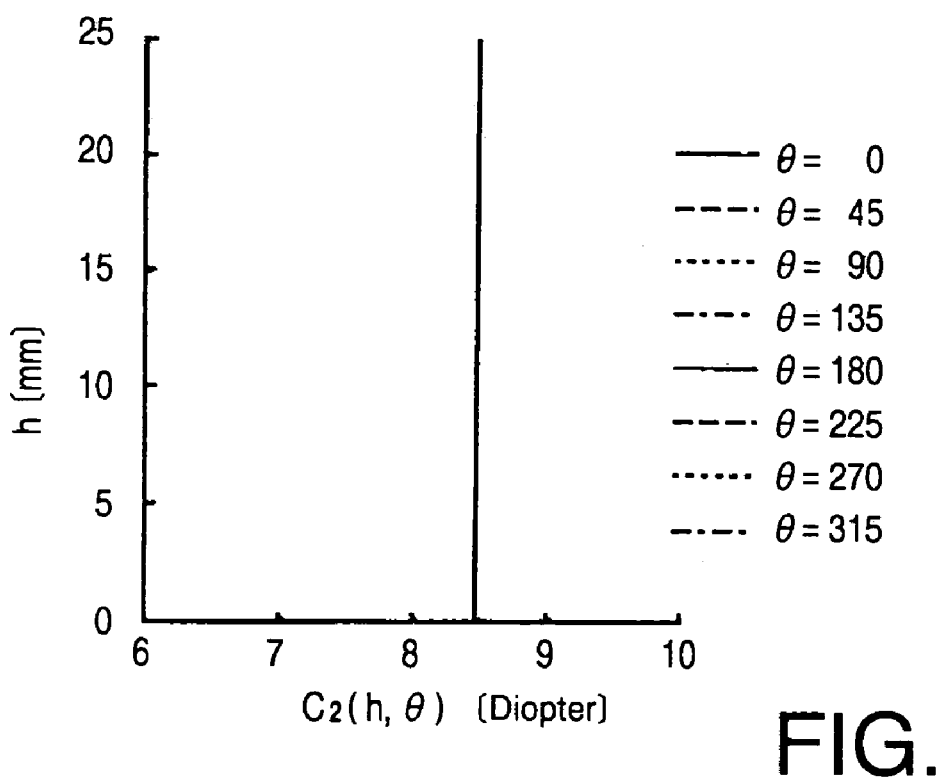
FIG. 18B is a graph illustrating change of the curvature $C_2(h,\theta)$ of the first comparative example for each of angles $\theta$ with respect to change of a height h.

FIGS. 18A and 18B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles θ are overlapping one another on the curve shown in FIG. 18A. Since the inner surface 13 is spherical, the change of the curvature $C_2(h,\theta)$ is represented by a linear line on which all of the changes of the curvature $C_2(h,\theta)$ at different angles θ are overlapping one another.

Figure 19A:
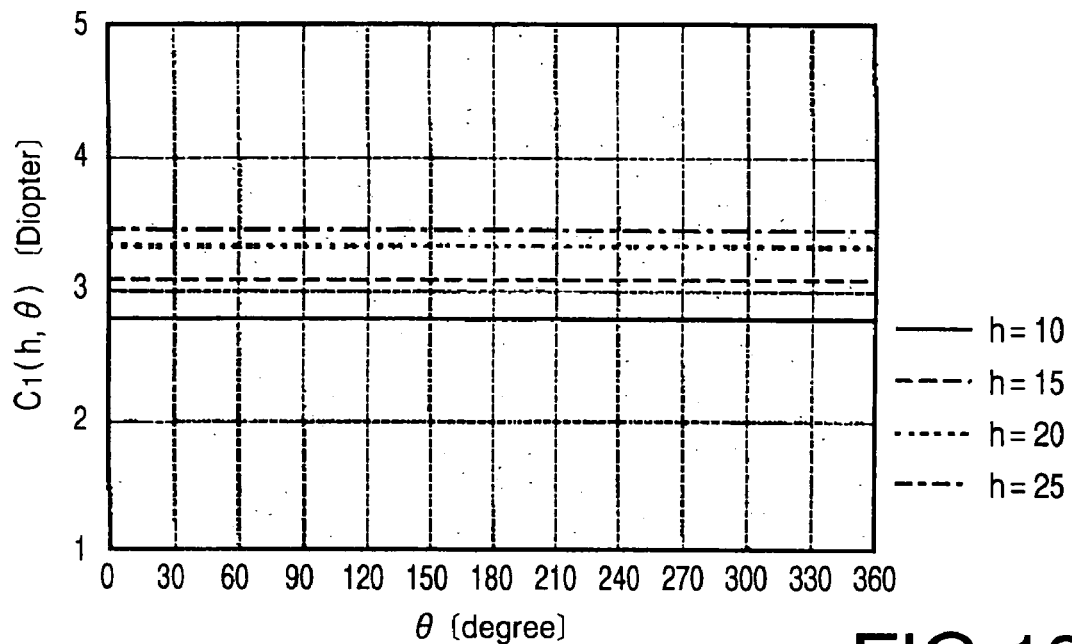
FIG. 19A is a graph illustrating change of the curvature $C_1(h,\theta)$ of the first comparative example for each of the heights h with respect to change of the angle $\theta$.
Figure 19B:
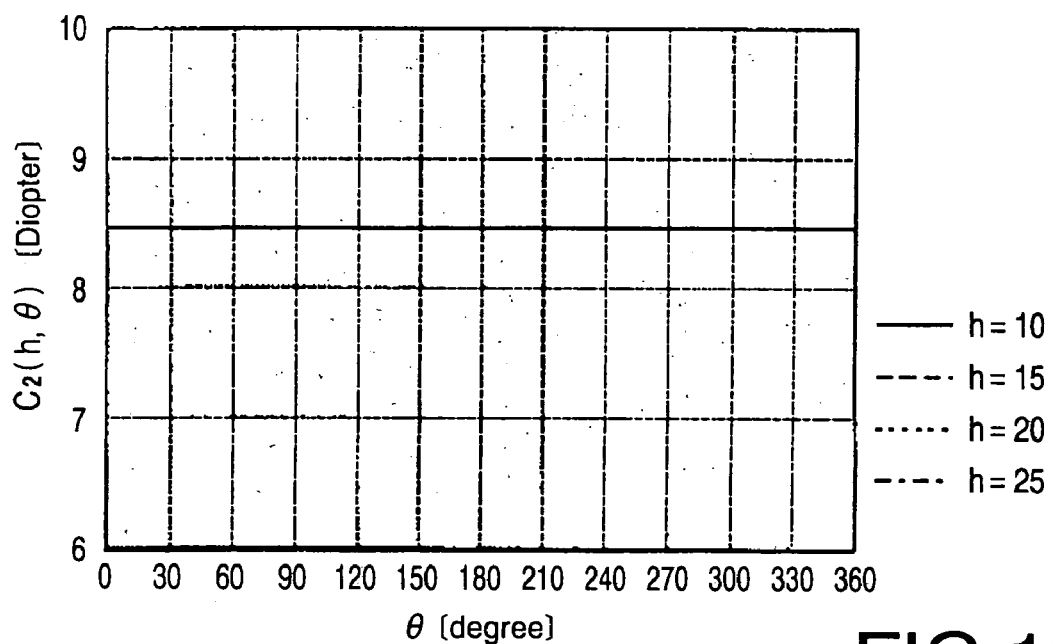
FIG. 19B is a graph illustrating change of the curvature $C_2(h,\theta)$ of the first comparative example for each of the heights h with respect to change of the angle $\theta$.

FIGS. 19A and 19B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the curvature $C_1(h,\theta)$ does not change with respect to the change of the angle θ, the curvature $C_1(h,\theta)$ is represented by a linear line for each of the heights of 10 mm, 15 mm, 20 mm and 25 mm in FIG. 19A. Since the inner surface 13 is spherical, the change of the curvature $C_2(h,\theta)$ is represented by a linear line on which all of the changes of the curvature $C_2(h,\theta)$ at different heights h are overlapping one another in FIG. 19B.

Figure 20A:
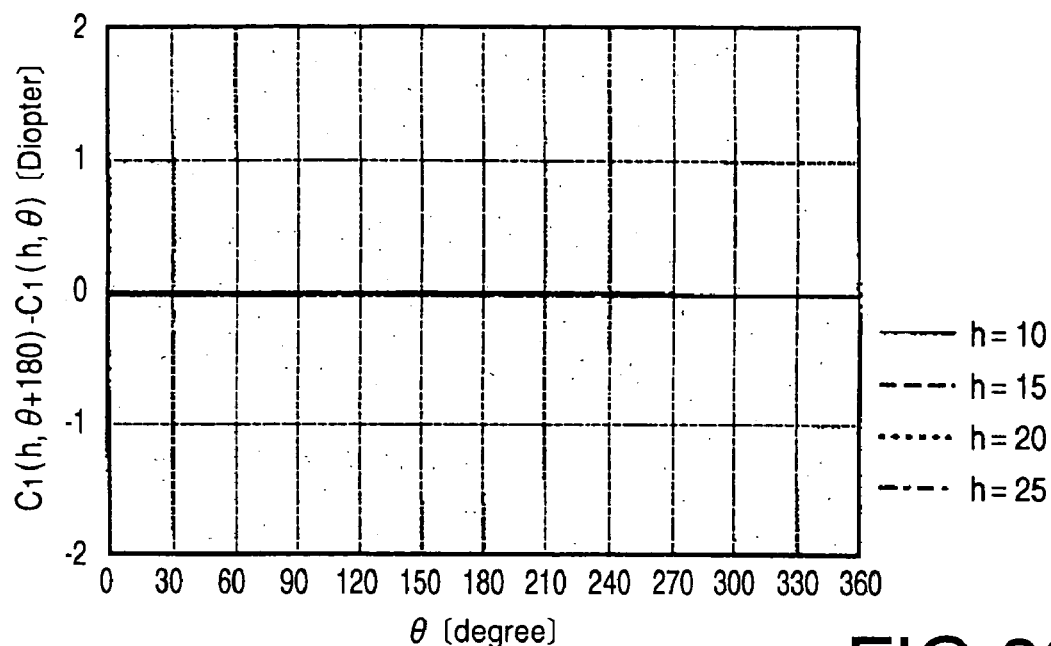
FIG. 20A is a graph illustrating change of a value of $C_1(h,\theta+180)-C_1(h,\theta)$ of the first comparative example for each of the heights h with respect to the change of the angle $\theta$.
Figure 20B:
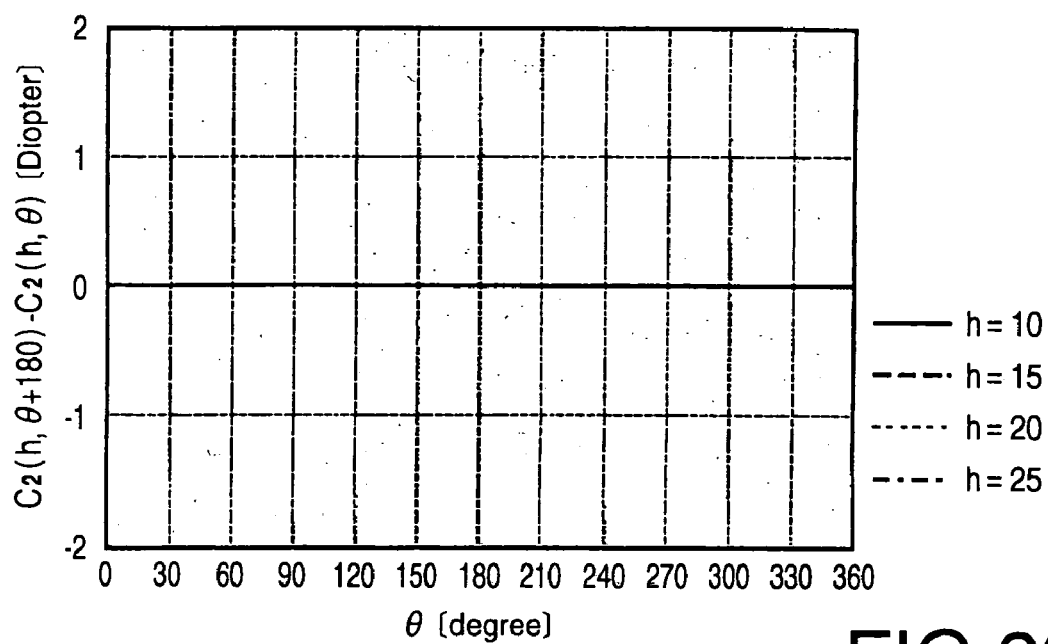
FIG. 20B is a graph illustrating change of a value of $C_2(h,\theta+180)-C_2(h,\theta)$ of the first comparative example for each of the heights h with respect to the change of the angle $\theta$.
Figure 21:
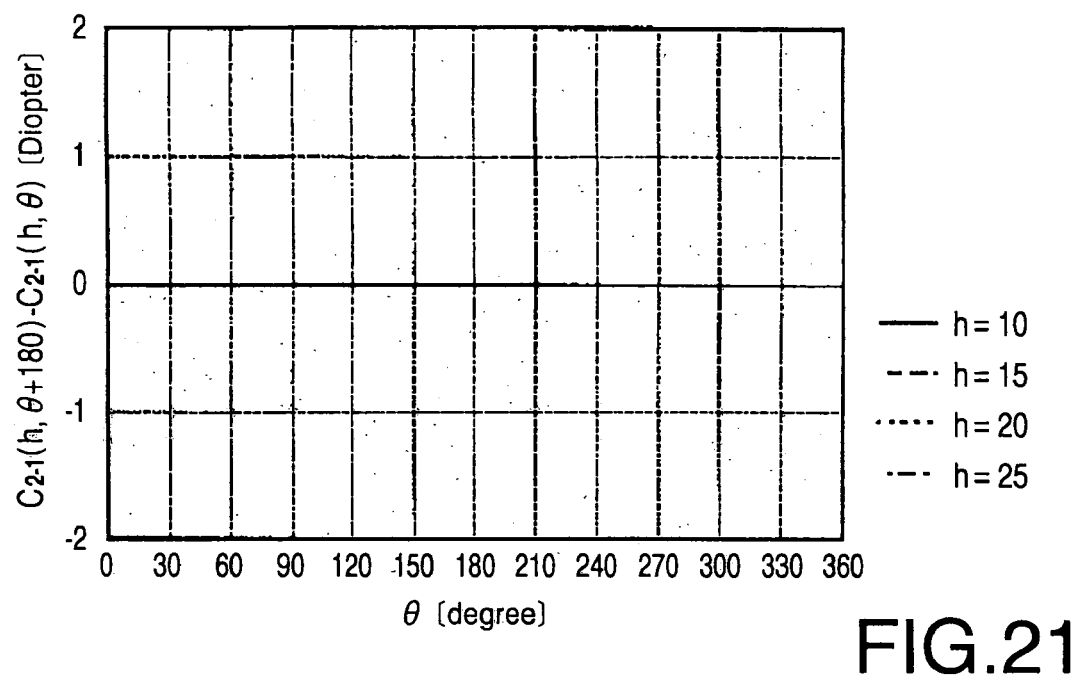
FIG. 21 is a graph illustrating change of a value of $C_{2-1}(h,\theta+180)-C_{2-1}(h,\theta)$ of the first comparative example for each of the heights h with respect to the change of the angle $\theta$.

FIGS. 20A and 20B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ. FIG. 21 is a graph illustrating the change of the value of $C_{2\text{-}1}(h,\theta+180)-C_{2\text{-}1}(h,\theta)$ of the condition (1) for each of the heights h of 10 mm, 15 mm, 20 mm and 25 mm with respect to the change of the angle θ.

Since both of the outer and inner surfaces are rotationally-symmetrical, the value of $C_1(h,\theta+180)-C_1(h,\theta)$ of the condition (5), the value of $C_2(h,\theta+180)-C_2(h,\theta)$ the condition (3) and the value of $C_{2\text{-}1}(h,\theta+180)-C_{2\text{-}1}(h,\theta)$ of the condition (1) take a constant value of zero. Accordingly, the first comparative example does not satisfy the conditions (1), (3) and (5).

Figure 22A:
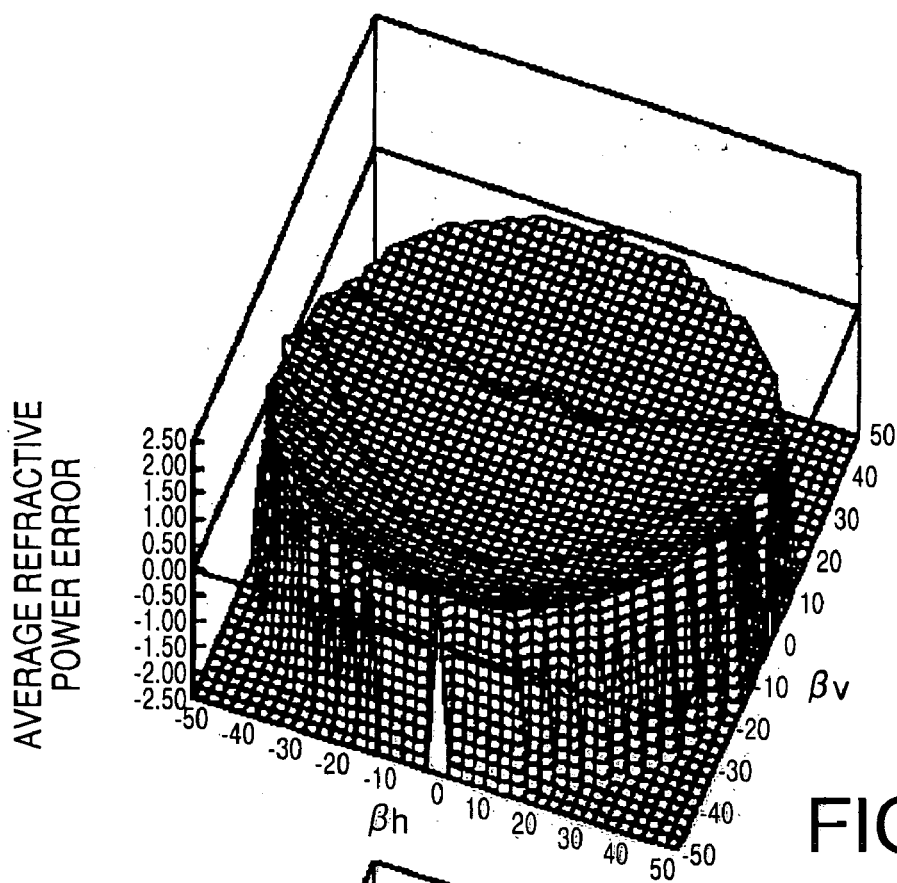
FIG. 22A is a three dimensional graph illustrating an average refractive power error of the spectacle lens of the first comparative example.
Figure 22B:
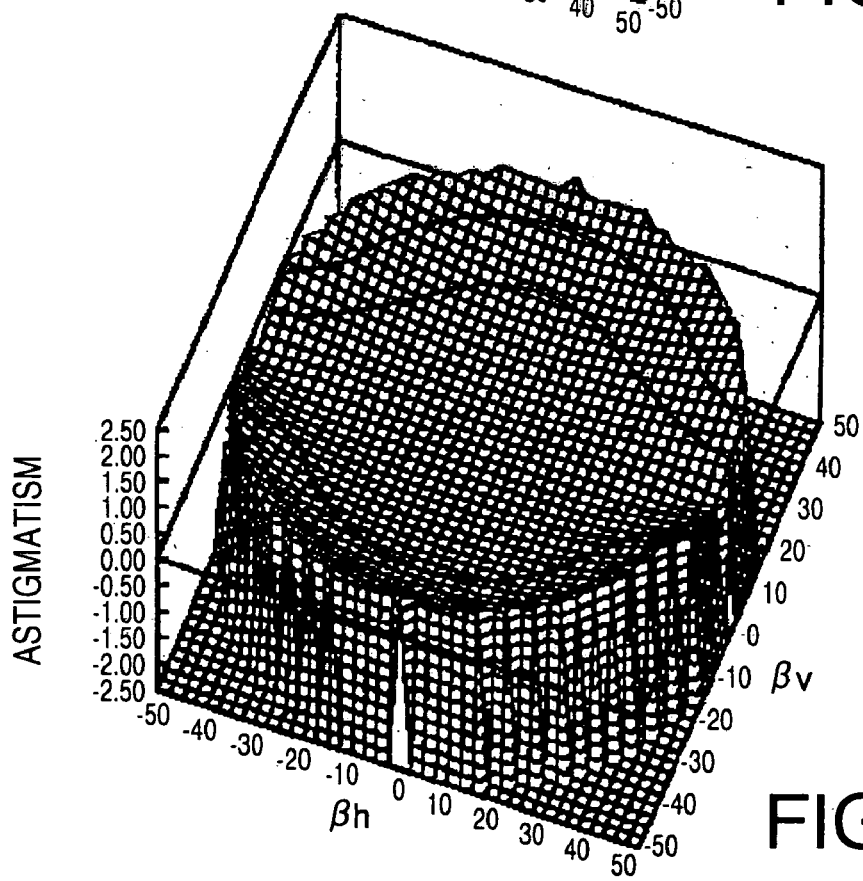
FIG. 22B is a three dimensional graph illustrating astigmatism of the spectacle lens of the first comparative example.

FIGS. 22A and 22B represent optical performance of the spectacle lens of the first comparative example. FIGS. 22A and 22B are three dimensional graphs of the average refractive power error and the astigmatism, respectively. By comparing FIG. 22A with FIGS. 10A and 16A and comparing FIG. 22B with FIGS. 12B and 16B, it is understood that the aberrations are sufficiently corrected in each of the first and the second examples.

THIRD EXAMPLE

A spectacle lens according to a third example will be described below using numerical references shown in FIG. 1. The spectacle lens according to the third example is a minus lens that is prescribed cylindrical power. Specifications of the spectacle lens of the third example are indicated in Table 4. As shown in Table 4, the outer surface 2 is a spherical surface having a curvature shown in Table 4, and the inner surface 3 is a rotationally-asymmetrical aspherical surface.

TABLE 4

| | |
|---|---|
| SPHERICAL POWER SPH | −4.00[D] |
| CYLINDRICAL POWER CYL | −4.00[D] |
| ASTIGMATIC AXIS AX | 0[°] |
| CURVATURE OF OUTER SURFACE C1 (SPHERICAL SURFACE) | 1.35[D] |
| CURVATURE OF INNER SURFACE C2 (ROTATIONALLY-ASYMMETRICAL ASPHERICAL SURFACE) | 7.36~13.38[D] |
| CENTRAL THICKNESS | 1.10[mm] |

FIG. 23A is a list showing a distribution of the curvature $C_1(h,\theta)$ which is obtained on the outer surface 2 at each point having the polar coordinate $(h,\theta)$. FIG. 23B is a list showing a distribution of the curvature $C_2(h,\theta)$ which is obtained on the inner surface 3 at each point having the polar coordinate $(h,\theta)$. Since the outer surface 2 is spherical, the curvatures $C_1(h,\theta)$ at all of the points on the outer surface 2 are the same.

Figure 24A:
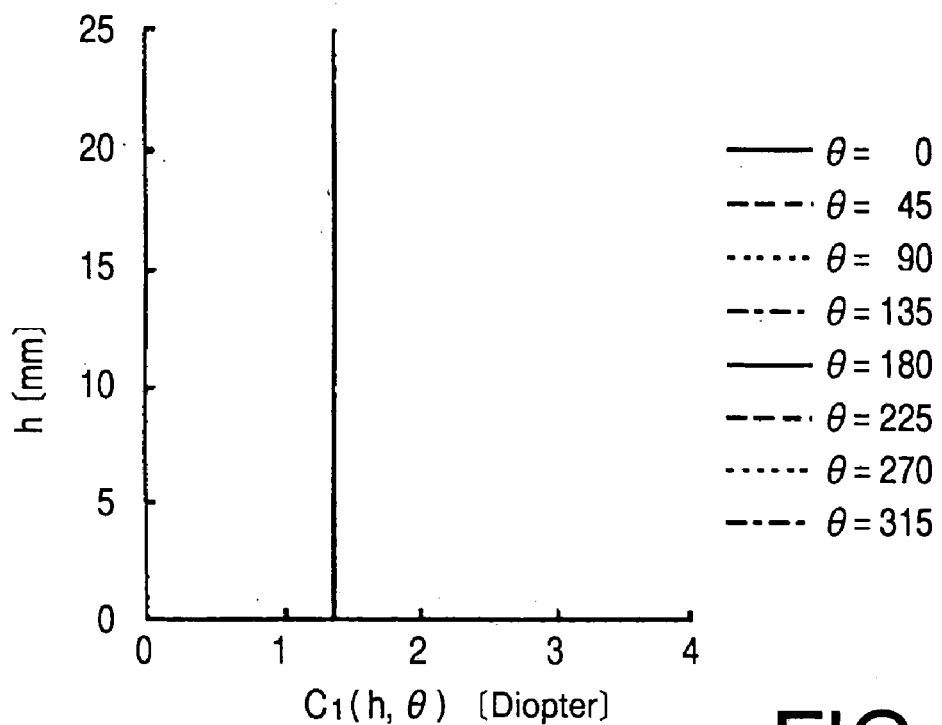
FIG. 24A is a graph illustrating change of the curvature $C_1(h,\theta)$ of the third example for each of angles $\theta$ with respect to change of a height h.
Figure 24B:
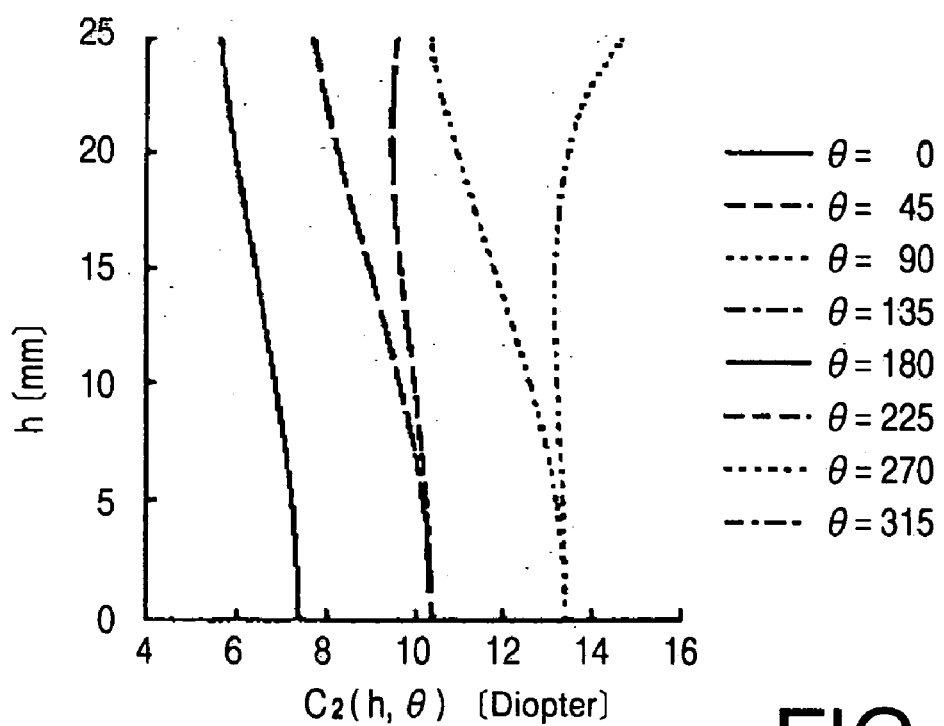
FIG. 24B is a graph illustrating change of the curvature $C_2(h,\theta)$ of the third example for each of angles $\theta$ with respect to change of a height h.

FIGS. 24A and 24B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

Since the outer surface 2 is spherical, the change of the curvature $C_1(h,\theta)$ is represented by a linear line on which all of the changes of the curvature $C_1(h,\theta)$ at different angles θ are overlapping one another in FIG. 24A.

In FIG. 24B, curves of the angles θ of 0° and 180° are overlapping one another and take the minimum value of the curvature $C_2(h,\theta)$ of all curves having different angles θ. On the right side of the curve of the angle θ of 0° (180°) on FIG. 24B, a curve on which the changes of the curvatures of the angles θ of 45° and 135° are overlapping, a curve on which the changes of the curvatures of the angles θ of 225° and 315° are overlapping, a curve of the angles θ of 90° and a curve of the angles θ of 270° are indicated in order of the increasing amount of the curvature. Since the inner surface 3 has the cylindrical power, the curves of the curvatures for different angles θ take different values at the height h=0.

Figure 25A:
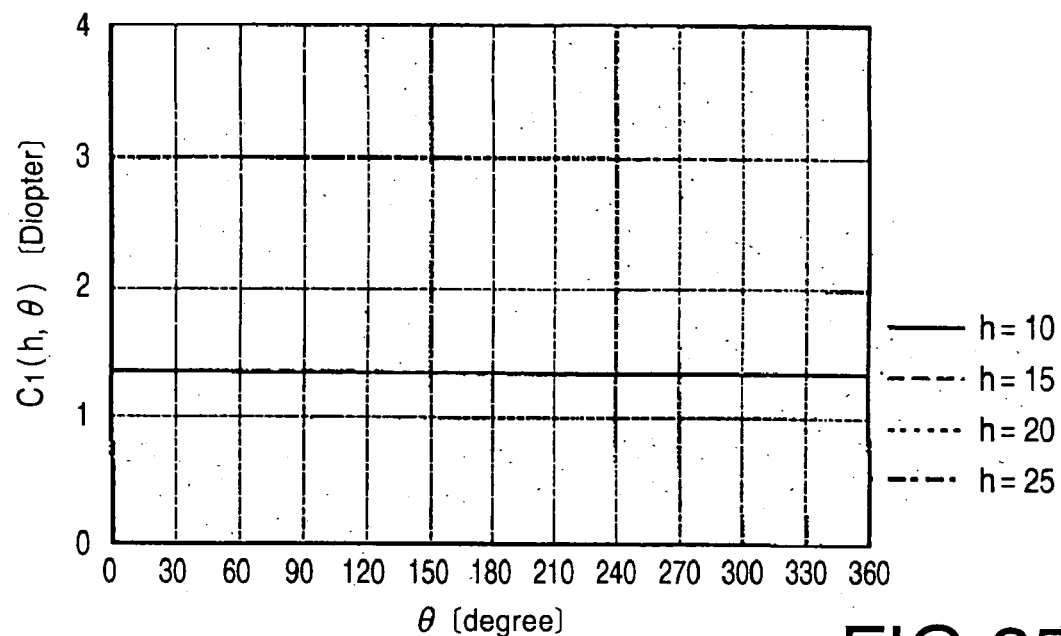
FIG. 25A is a graph illustrating change of the curvature $C_1(h,\theta)$ of the third example for each of the heights h with respect to change of the angle $\theta$.
Figure 25B:
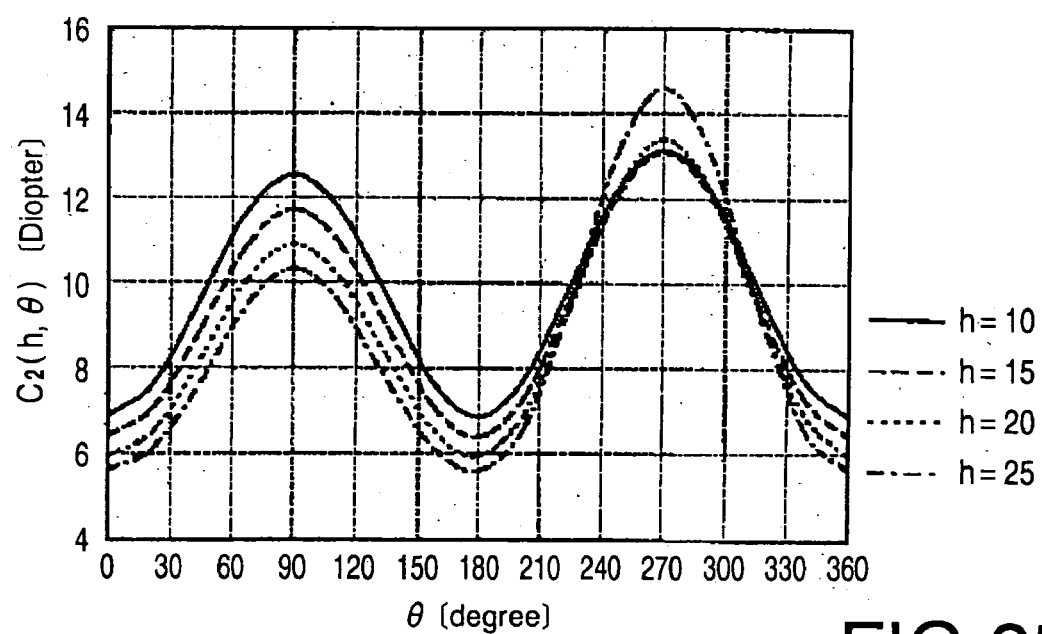
FIG. 25B is a graph illustrating change of the curvature $C_2(h,\theta)$ of the third example for each of the heights h with respect to change of the angle $\theta$.

FIGS. 25A and 25B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the outer surface 2 is spherical, the change of the curvature $C_1(h,\theta)$ is represented by a linear line on which all of the changes of the curvature $C_1(h,\theta)$ at different heights h are overlapping one another on FIG. 25A. As shown in FIG. 25B, for all of curves of the heights of 10 mm, 15 mm, 20 mm and 25 mm, the curvature $C_2(h,\theta)$ changes like a sine wave with respect to the change of the angle θ, and takes a peak value at the angle θ of 90° (i.e., in the upper portion) and a peak value at the angle θ of 270° (i.e., in the lower portion). The peak value at the angle θ of 90° is smaller than the peak value at the angle θ of 270°.

Figure 26A:
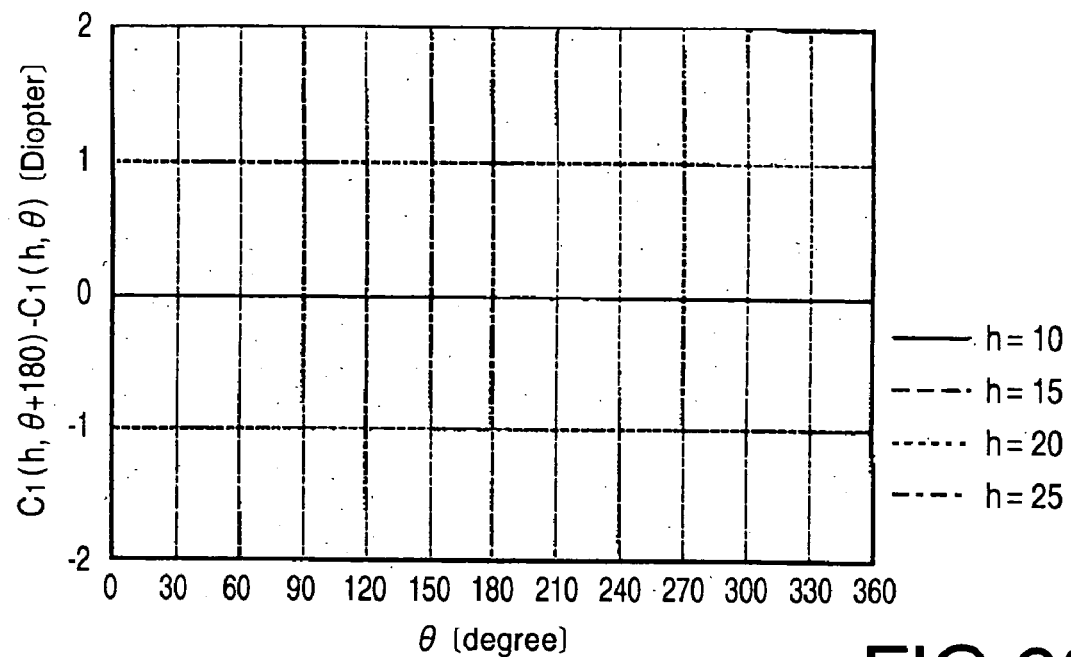
FIG. 26A is a graph illustrating change of a value of $C_1(h,\theta+180)-C_1(h,\theta)$ of the third example for each of the heights h with respect to the change of the angle $\theta$.
Figure 26B:
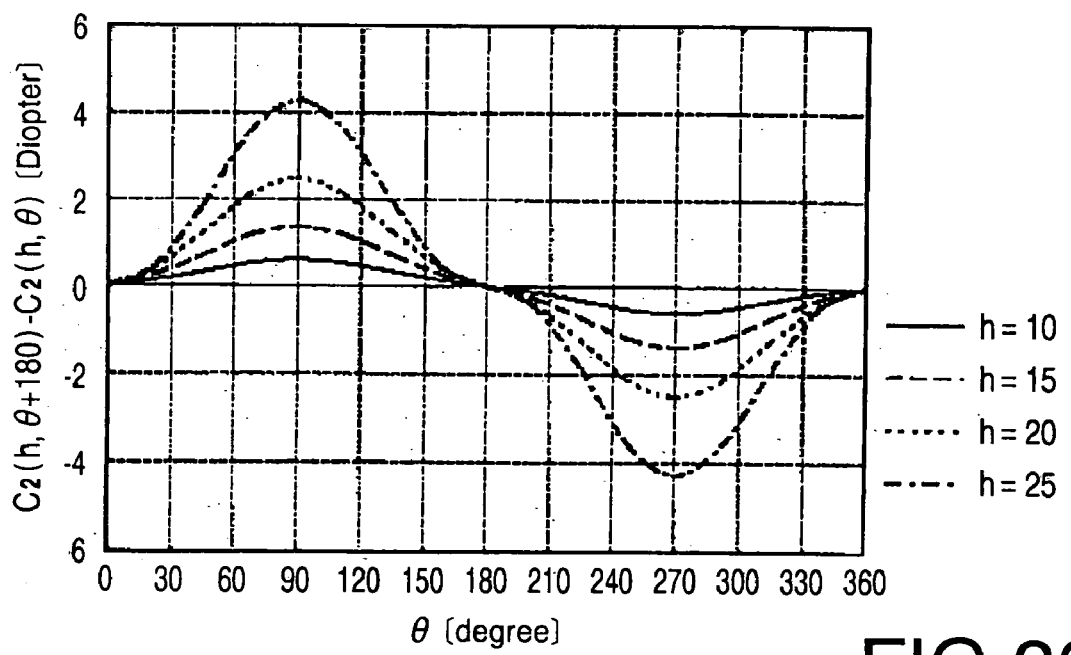
FIG. 26B is a graph illustrating change of a value of $C_2(h,\theta+180)-C_2(h,\theta)$ of the third example for each of the heights h with respect to the change of the angle $\theta$.

FIGS. 26A and 26B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

Since the outer surface 2 is spherical, the change of the value of $C_1(h,\theta+180)-C_1(h,\theta)$ is represented by a linear line on which all of the changes of $C_1(h,\theta+180)-C_1(h,\theta)$ at different heights h are overlapping one another on FIG. 26A.

As shown in FIG. 26B, for all of curves of the heights h of 10 mm, 15 mm, 20 mm and 25 mm, the value of $C_2(h,\theta+180)-C_2(h,\theta)$ takes the maximum value at the angle θ of 90° (i.e., in the upper portion) and takes the minimum value at the angle θ of 270° (i.e., in the lower portion). Further, as shown in FIG. 26B, the amplitude of the curve of $C_2(h,\theta+180)-C_2(h,\theta)$ becomes greater as the height h increases. It is obvious from FIG. 26B that $C_2(h,\theta+180)-C_2(h,\theta)$ is positive for each of the heights h of 10 mm, 15 mm, 20 mm and 25 mm within the range of $30 \leq \theta \leq 150$. Accordingly, the spectacle lens according to the third example satisfies the condition (3).

Figure 27:
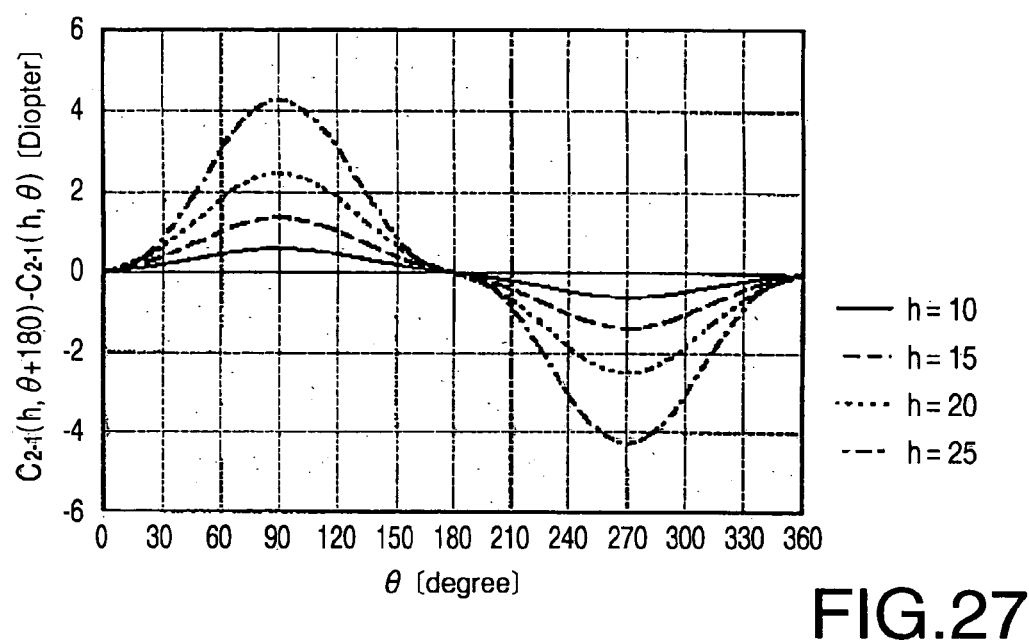
FIG. 27 is a graph illustrating change of a value of $C_{2-1}(h,\theta+180)-C_{2-1}(h,\theta)$ of the third example for each of the heights h with respect to the change of the angle $\theta$.

FIG. 27 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 27, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion).

It is obvious from FIG. 27 that $C_{2-1}(h,\theta+180)-C_{2-1}(h,\theta)$ is positive for each of the heights h of 10 mm, 15 mm, 20 mm and 25 mm within the range of $30 \leq \theta \leq 150$. Accordingly, the spectacle lens according to the third example satisfies the condition (1).

Figure 28A:
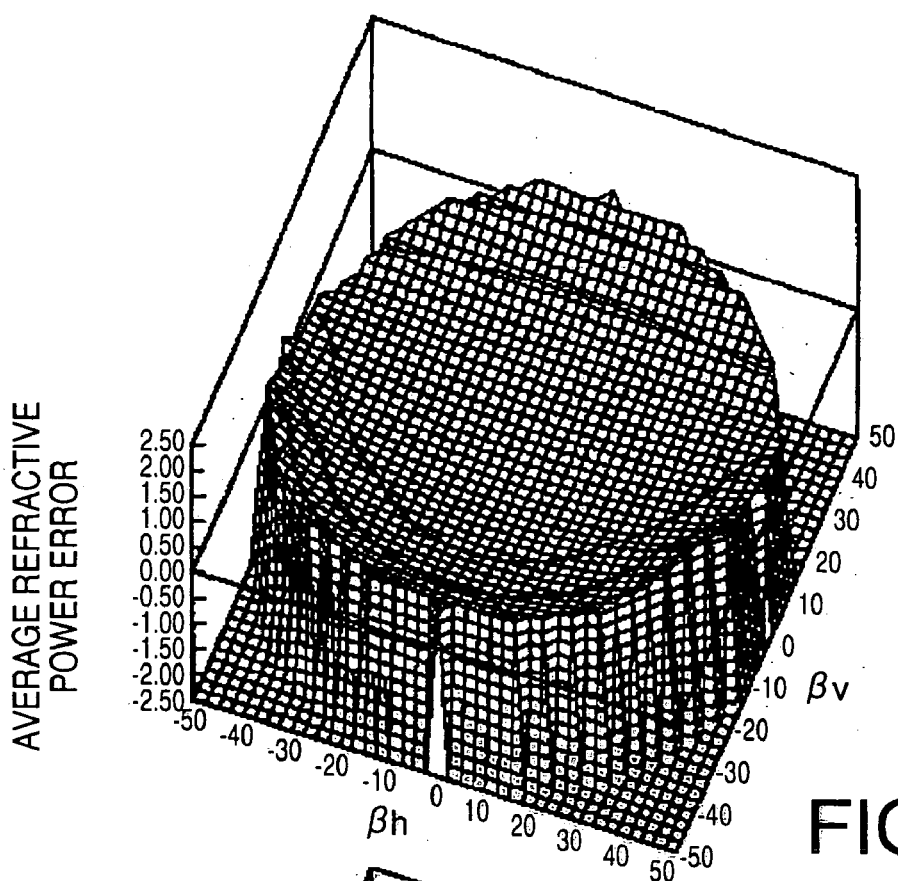
FIG. 28A is a three dimensional graph illustrating an average refractive power error of the spectacle lens of the third example.
Figure 28B:
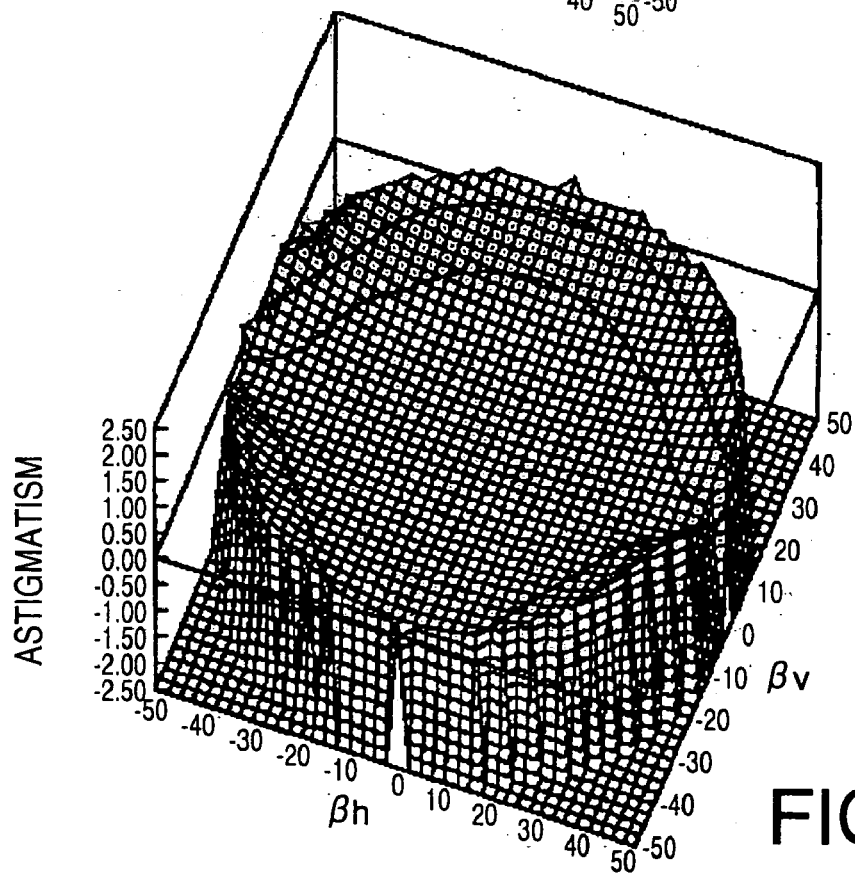
FIG. 28B is a three dimensional graph illustrating astigmatism of the spectacle lens of the third example.

FIGS. 28A and 28B represent optical performance of the spectacle lens of the third example. FIGS. 28A and 28B are three dimensional graphs of the average refractive power error and the astigmatism, respectively.

FOURTH EXAMPLE

A spectacle lens according to a fourth example will be described below using numerical references shown in FIG. 2. The spectacle lens according to the fourth example is a minus lens and has cylindrical power. Specifications of the spectacle lens of the fourth example are indicated in Table 5. As shown in Table 5, the inner surface 13 is a toric surface having a curvature shown in Table 5, the outer surface 12 is a rotationally-asymmetrical aspherical surface.

TABLE 5

| | |
|---|---|
| SPHERICAL POWER SPH | −4.00[D] |
| CYLINDRICAL POWER CYL | −4.00[D] |
| ASTIGMATIC AXIS AX | 0[°] |
| CURVATURE OF OUTER SURFACE C1 (ROTATIONALLY-ASYMMETRICAL ASPHERICAL SURFACE) | 2.44[D] |
| CURVATURE OF INNER SURFACE C2 (TORIC SURFACE) | 8.46~14.47[D] |
| CENTRAL THICKNESS | 1.10[mm] |

FIG. 29A is a list showing a distribution of the curvature $C_1(h,\theta)$ which is obtained on the outer surface 12 at each point having the polar coordinate (h,θ). FIG. 29B is a list showing a distribution of the curvature $C_2(h,\theta)$ which is obtained on the inner surface 13 at each point having the polar coordinate (h,θ).

Figure 30A:
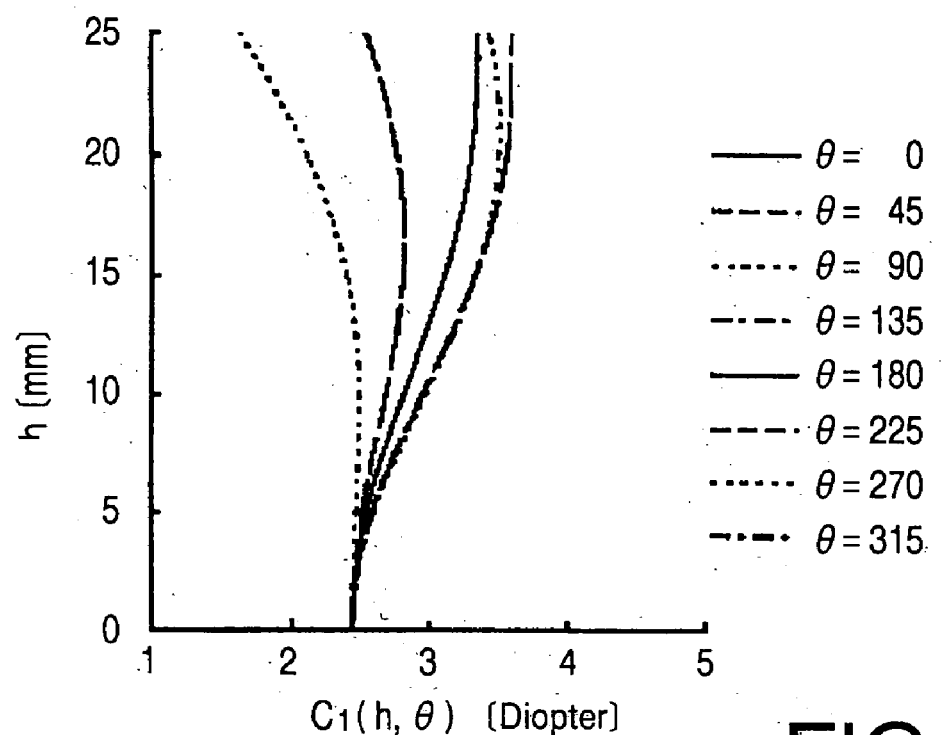
FIG. 30A is a graph illustrating change of the curvature $C_1(h,\theta)$ of the fourth example for each of angles $\theta$ with respect to change of a height h.
Figure 30B:
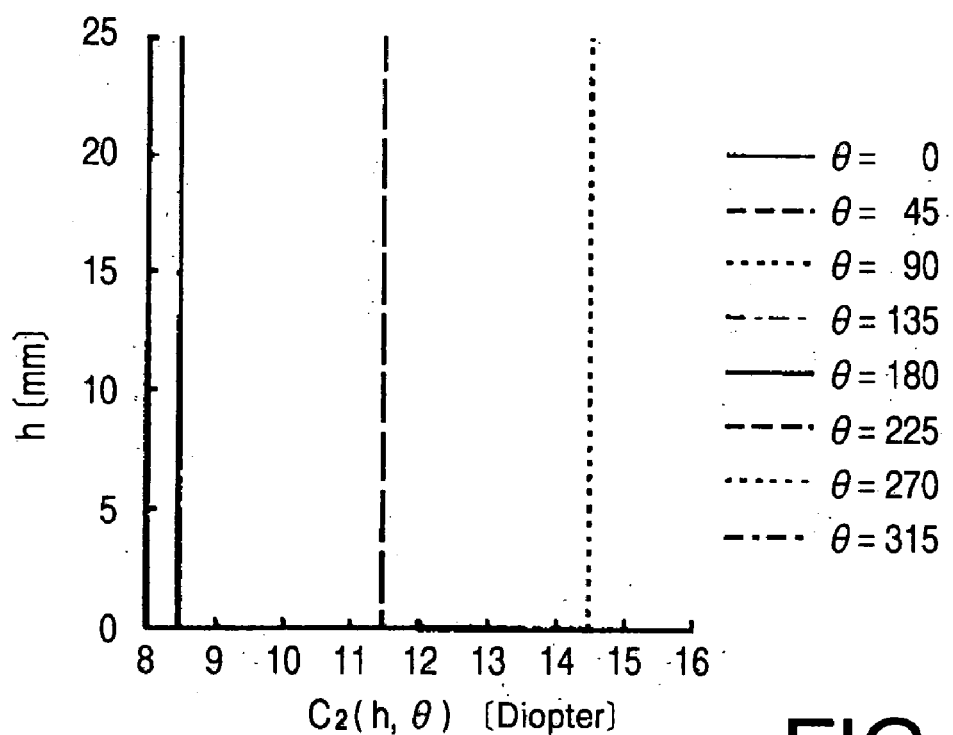
FIG. 30B is a graph illustrating change of the curvature $C_2(h,\theta)$ of the fourth example for each of angles $\theta$ with respect to change of a height h.

FIGS. 30A and 30B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

In FIG. 30A, curves of the angles θ of 0° and 180° indicated by solid lines are overlapping one another. On the left side of the curve of the angle θ of 0° (180°) on FIG. 30A, a curve on which the changes of the curvatures of the angles θ of 225° and 315° are overlapping and a curve of the angles θ of 270° are indicated in order of the decreasing amount of the curvature. On the right side of the curve of the angle θ of 0° (180°) on FIG. 30A, a curve of the angle θ of 90° and a curve on which the changes of the curvatures of the angles θ of 45° and 135° are overlapping are indicated in order of the increasing amount of the curvature.

Since the inner surface 13 is the toric surface, a linear line (a solid line) on which the changes of the curvatures $C_2(h,\theta)$ of the angles θ of 0° and 180° are overlapping, a linear line on which the changes of the curvatures $C_2(h,\theta)$ of the angles θ of 45°, 135°, 225° and 315° are overlapping, and a linear line on which the changes of the curvatures $C_1(h,\theta)$ of the angles θ of 90° and 270° are overlapping are indicated in order of the increasing amount of the curvature.

Figure 31A:
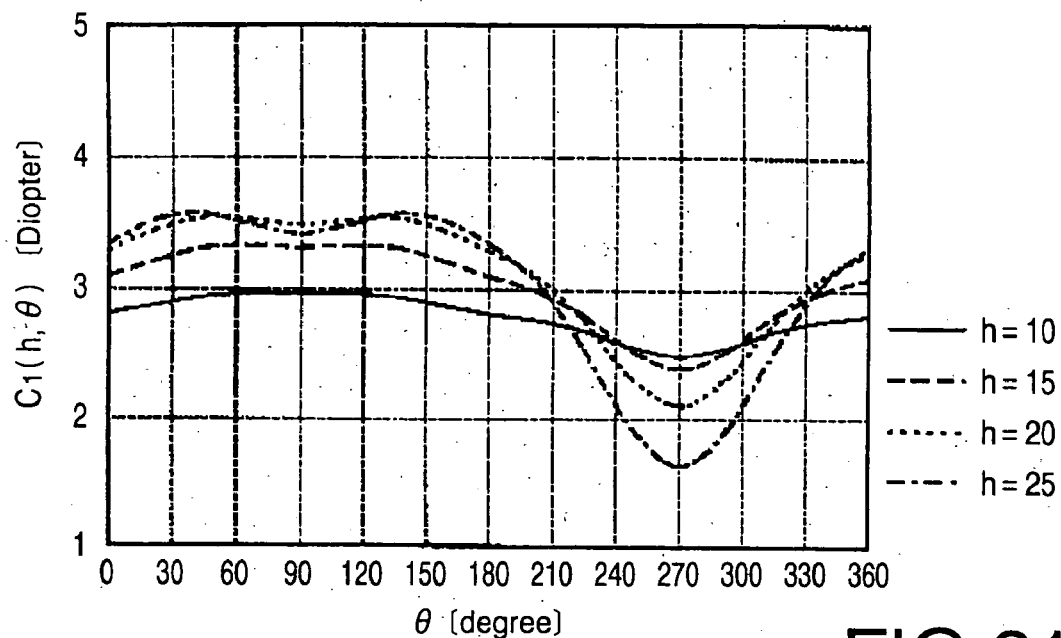
FIG. 31A is a graph illustrating change of the curvature $C_1(h,\theta)$ of the fourth example for each of the heights h with respect to change of the angle $\theta$.
Figure 31B:
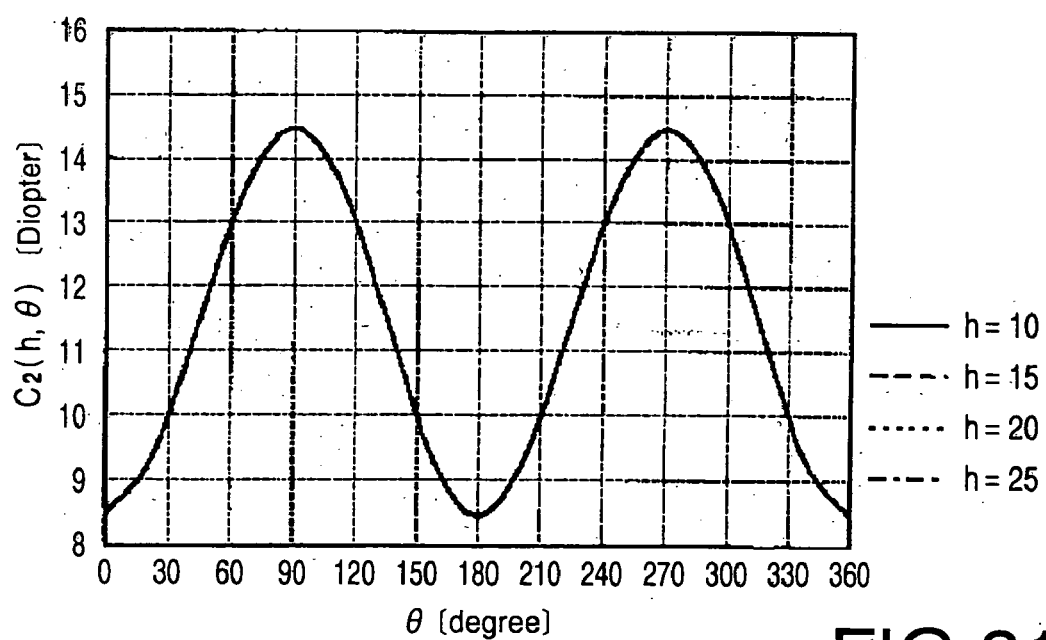
FIG. 31B is a graph illustrating change of the curvature $C_2(h,\theta)$ of the fourth example for each of the heights h with respect to change of the angle $\theta$.

FIGS. 31A and 31B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

As shown in FIG. 31A, for all of curves of the heights of 10 mm, 15 mm, 20 mm and 25 mm, the curvature $C_1(h,\theta)$ takes the maximum value within the range of the angle θ=45°~135° (i.e., in the upper portion), and takes the minimum value at the angle θ of 270° (i.e., in the lower portion). Further, as shown in FIG. 31A, within a considerable range of the angle θ, the curvature $C_1(h,\theta)$ increases as the height h increases for each of the curves, an the difference between the curvature at the upper portion and the curvature of the lower portion becomes greater for each of the curves as the height h increases.

As shown in FIG. 31B, since the inner surface 13 is the toric surface, the change of the curvature $C_2(h,\theta)$ is represented by a curve like a sine wave on which all of the changes of the curvature $C_2(h,\theta)$ at different heights h are overlapping one another.

Figure 32A:
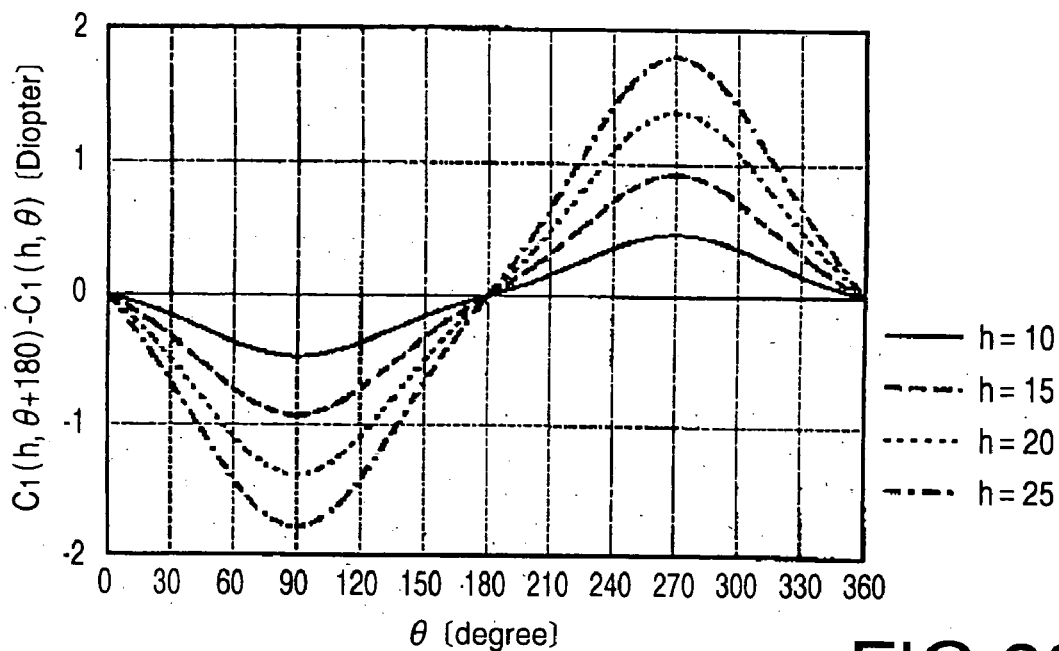
FIG. 32A is a graph illustrating change of a value of $C_1(h,\theta+180)-C_1(h,\theta)$ of the fourth example for each of the heights h with respect to the change of the angle $\theta$.
Figure 32B:
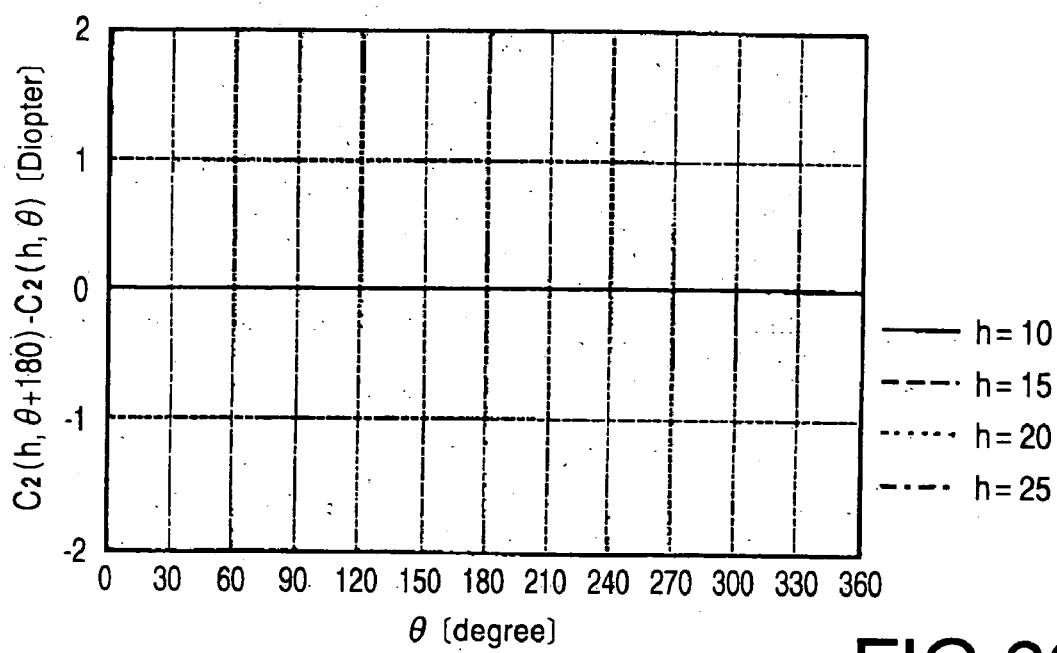
FIG. 32B is a graph illustrating change of a value of $C_2(h,\theta+180)-C_2(h,\theta)$ of the fourth example for each of the heights h with respect to the change of the angle $\theta$.

FIGS. 32A and 32B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

As shown in FIG. 32A, for all of curves of the heights h of 10 mm, 15 mm, 20 mm and 25 mm, the value of $C_1(h,\theta+180)-C_1(h,\theta)$ takes the minimum value at the angle θ of 90° (i.e., in the upper portion) and takes the maximum value at the angle θ of 270° (i.e., in the lower portion). Further, as shown in FIG. 32A, the amplitude of the curve of $C_1(h,\theta+180)-C_1(h,\theta)$ becomes greater as the height h increases. It is obvious from FIG. 32A that $C_1(h,\theta+180)-C_1(h,\theta)$ is negative for each of the heights h of 10 mm, 15 mm, 20 mm and 25 mm within the range of $30 \leq \theta \leq 150$. Accordingly, the spectacle lens according to the fourth example satisfies the condition (5).

Since the inner surface 13 is the toric surface, curvatures on symmetrical points on the surface are the same, and therefore the change of $C_2(h,\theta+180)-C_2(h,\theta)$ is represented by a linear line on which all of the changes of the value of $C_2(h,\theta+180)-C_2(h,\theta)$ at different heights h are overlapping one another in FIG. 32A.

Figure 33:
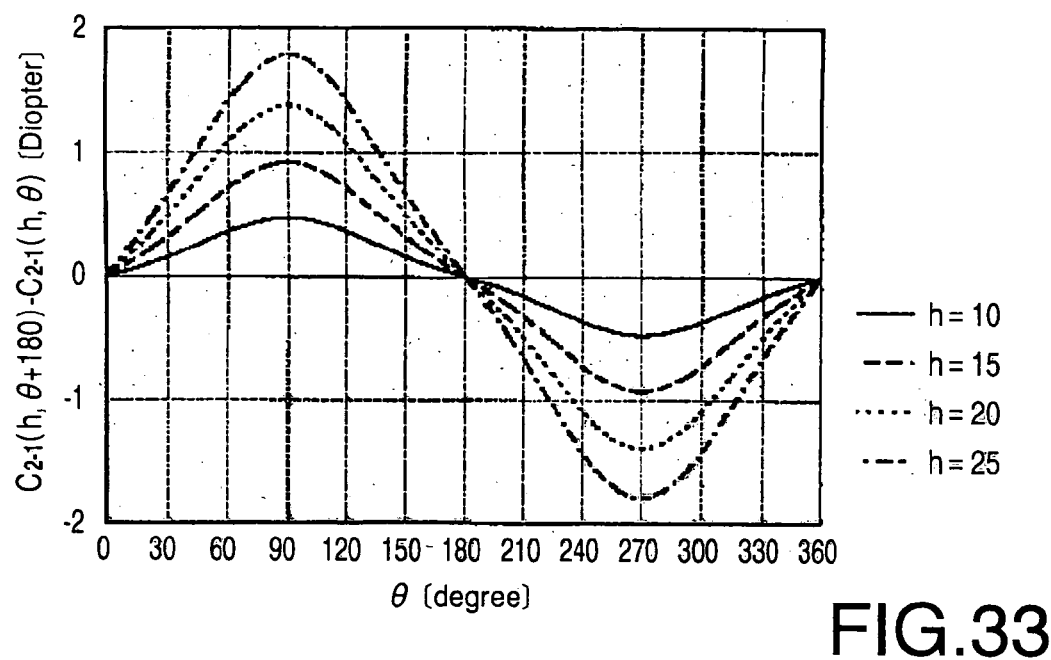
FIG. 33 is a graph illustrating change of a value of $C_{2-1}(h,\theta+180)-C_{2-1}(h,\theta)$ of the fourth example for each of the heights h with respect to the change of the angle $\theta$.

FIG. 33 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 33, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion).

It is obvious from FIG. 33 that $C_{2-1}(h,\theta+180)-C_{2-1}(h,\theta)$ is positive for each of the heights h of 10 mm, 15 mm, 20 mm and 25 mm within the range of $30 \leq \theta \leq 150$. Accordingly, the spectacle lens according to the fourth example satisfies the condition (1).

Figure 34A:
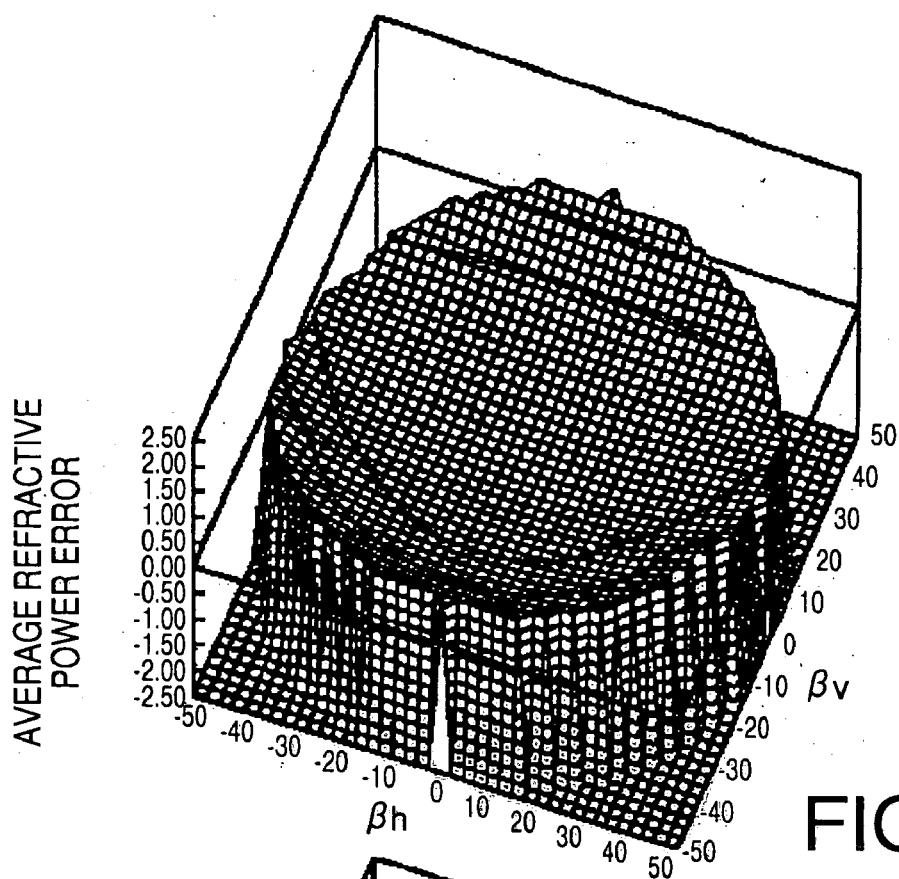
FIG. 34A is a three dimensional graph illustrating an average refractive power error of the spectacle lens of the fourth example.
Figure 34B:
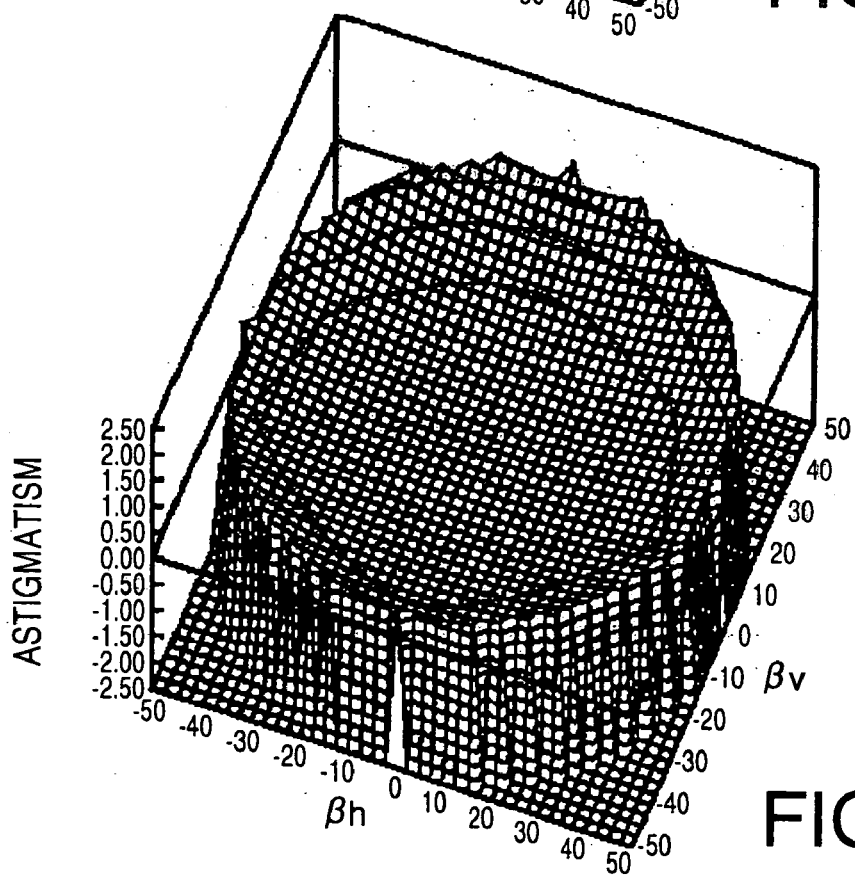
FIG. 34B is a three dimensional graph illustrating astigmatism of the spectacle lens of the fourth example.

FIGS. 34A and 34B represent optical performance of the spectacle lens of the third example. FIGS. 34A and 34B are three dimensional graphs of the average refractive power error and the astigmatism, respectively.

SECOND COMPARATIVE EXAMPLE

A spectacle lens according to a second comparative example will be described below using numerical references shown in FIG. 2. The spectacle lens of the second comparative example has the same spherical power, cylindrical power and the center thickness as those of the third and the fourth examples. Specifications of the spectacle lens of the second comparative example are indicated in Table 6. As shown in Table 6, the inner surface 13 is a toric surface having a curvature shown in Table 6, and the outer surface 12 is a rotationally-symmetrical aspherical surface.

TABLE 6

| | |
|---|---|
| SPHERICAL POWER SPH | −4.00[D] |
| CYLINDRICAL POWER CYL | −4.00[D] |
| ASTIGMATIC AXIS AX | 0[°] |
| CURVATURE OF OUTER SURFACE C1 (ROTATIONALLY-SYMMETRICAL ASPHERICAL SURFACE) | 2.44[D] |
| CURVATURE OF INNER SURFACE C2 (TORIC SURFACE) | 8.46~14.47[D] |
| CENTRAL THICKNESS | 1.10[mm] |

FIG. 35A is a list showing a distribution of the curvature $C_1(h,\theta)$ which is obtained on the outer surface 12 at each point having the polar coordinate (h,θ). FIG. 35B is a list showing a distribution of the curvature $C_2(h,\theta)$ which is obtained on the inner surface 13 at each point having the polar coordinate (h,θ).

Figure 36A:
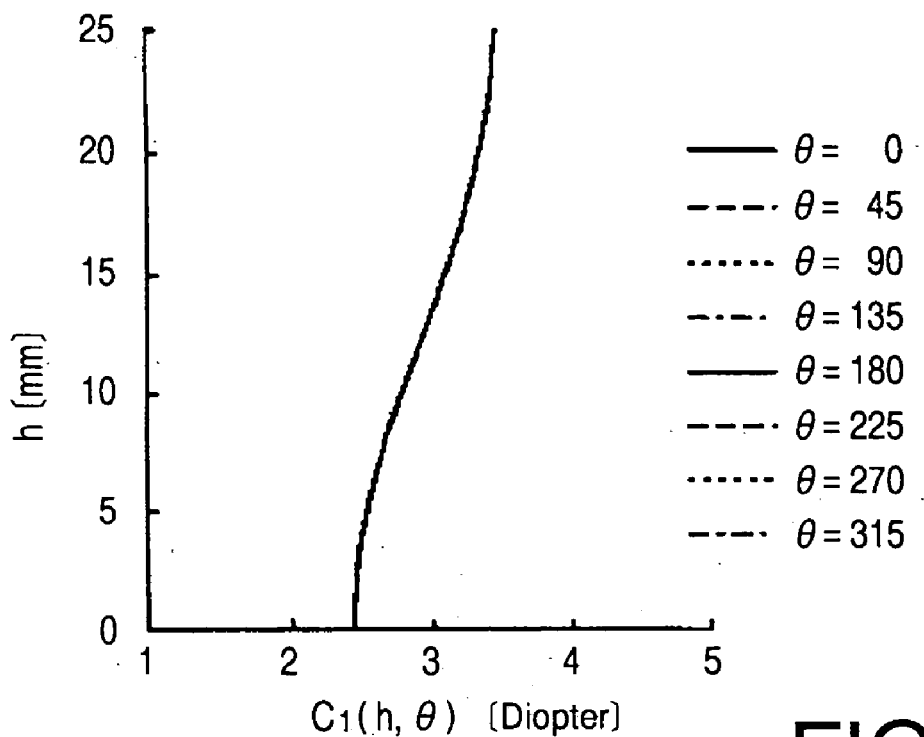
FIG. 36A is a graph illustrating change of the curvature $C_1(h,\theta)$ of the second comparative example for each of angles $\theta$ with respect to change of a height h.
Figure 36B:
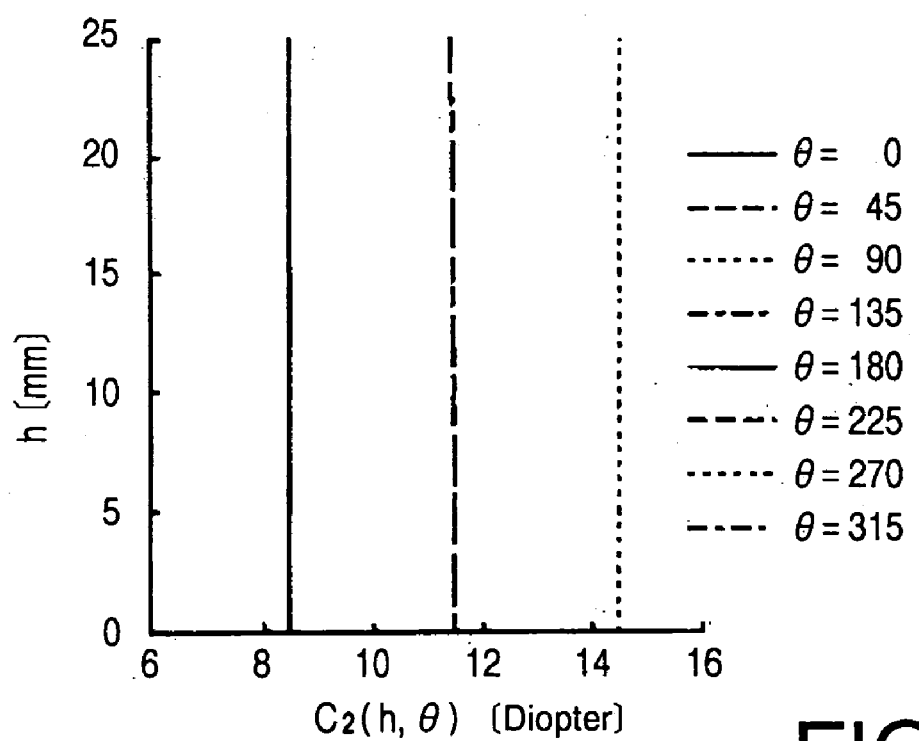
FIG. 36B is a graph illustrating change of the curvature $C_2(h,\theta)$ of the second comparative example for each of angles $\theta$ with respect to change of a height h.

FIGS. 36A and 36B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles θ are overlapping one another on the curve shown in FIG. 36A. Since the inner surface 13 of the second comparative example is the toric surface whose configuration is the same as the inner surface of the fourth example, the graph of FIG. 36B is equal to the graph of FIG. 30B.

Figure 37A:
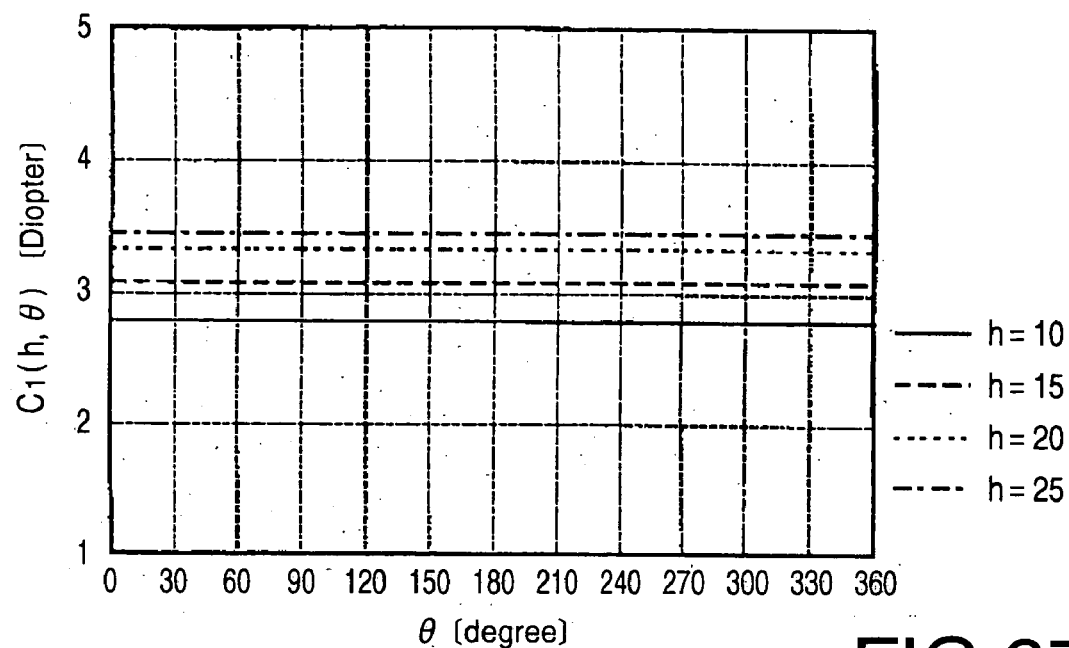
FIG. 37A is a graph illustrating change of the curvature $C_1(h,\theta)$ of the second comparative example for each of the heights h with respect to change of the angle $\theta$.
Figure 37B:
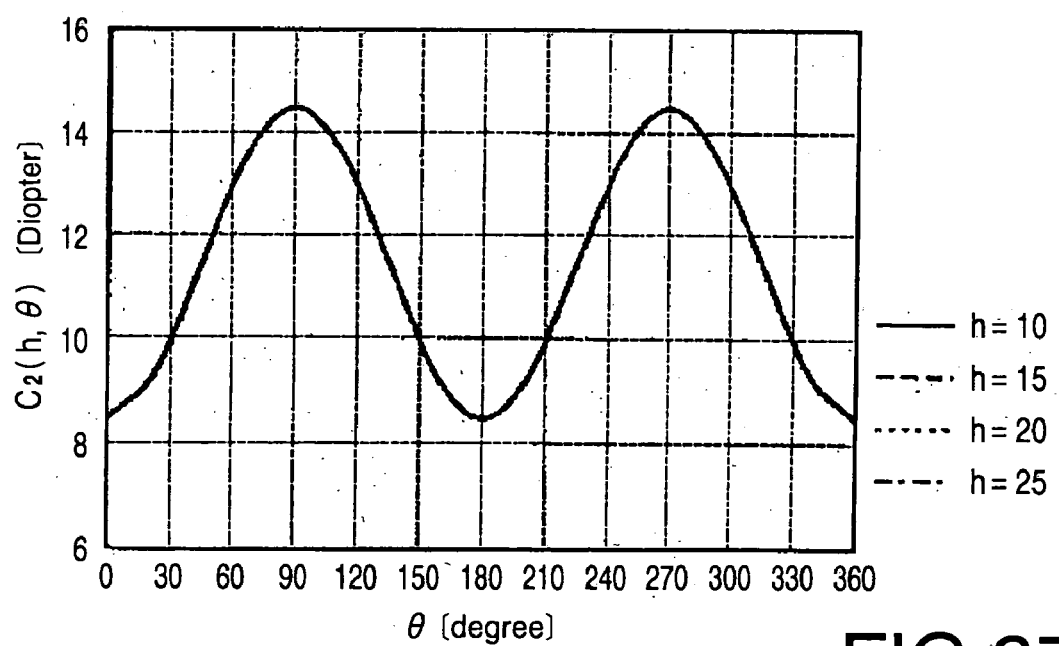
FIG. 37B is a graph illustrating change of the curvature $C_2(h,\theta)$ of the second comparative example for each of the heights h with respect to change of the angle $\theta$.

FIGS. 37A and 37B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the curvature $C_1(h,\theta)$ does not change with respect to the change of the angle θ, the curvature $C_1(h,\theta)$ is represented by a linear line for each of the heights of 10 mm, 15 mm, 20 mm and 25 mm in FIG. 37A. Also, the curvature $C_1(h,\theta)$ becomes greater as the height h increases. As shown in FIG. 37B, since the inner surface 13 is the toric surface, the change of the curvature $C_2(h,\theta)$ is represented by a curve like a sine wave on which all of the changes of the curvature $C_2(h,\theta)$ at different heights h are overlapping one another.

Figure 38A:
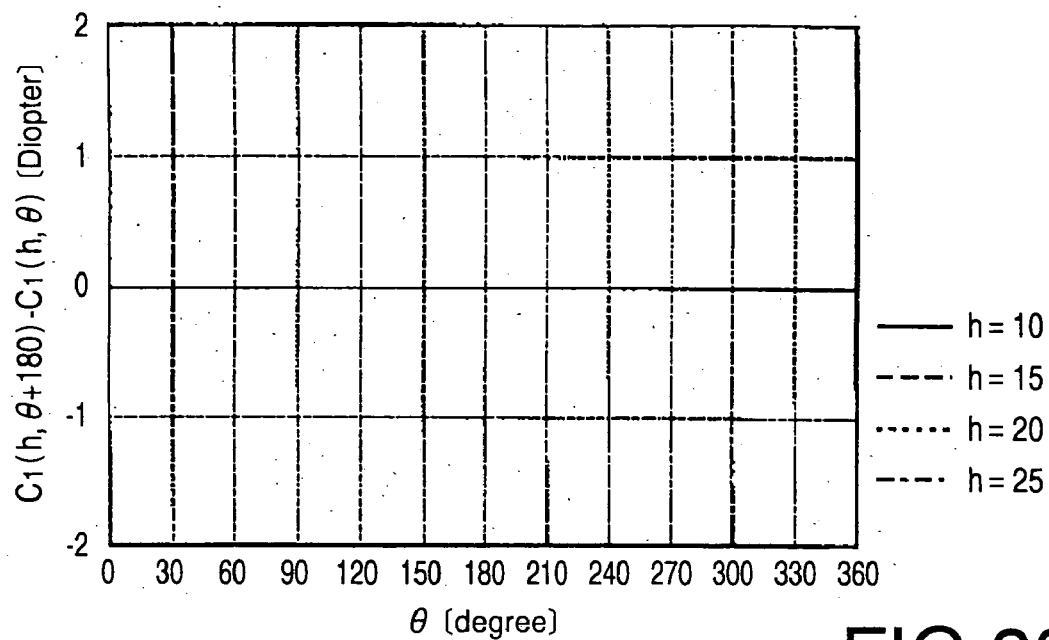
FIG. 38A is a graph illustrating change of a value of $C_1(h,\theta+180)-C_1(h,\theta)$ of the second comparative example for each of the heights h with respect to the change of the angle $\theta$.
Figure 38B:
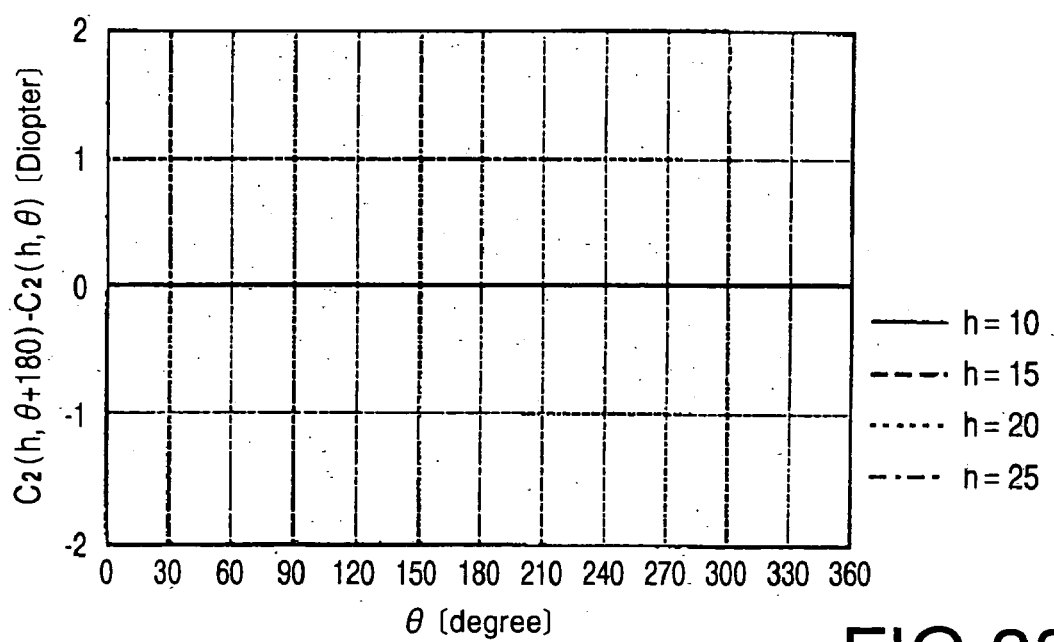
FIG. 38B is a graph illustrating change of a value of $C_2(h,\theta+180)-C_2(h,\theta)$ of the second comparative example for each of the heights h with respect to the change of the angle $\theta$.
Figure 39:
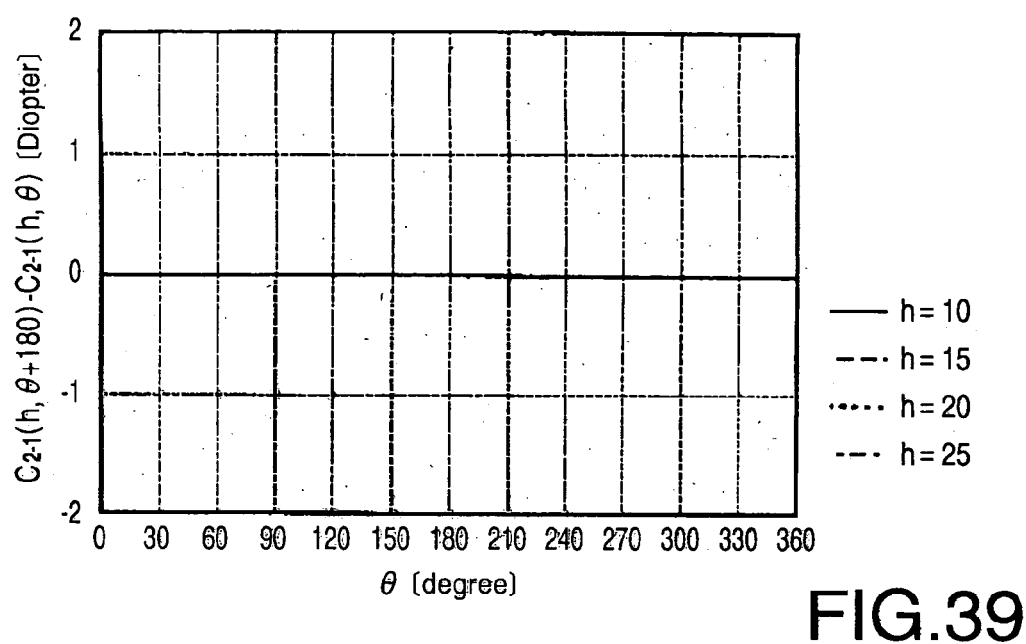
FIG. 39 is a graph illustrating change of a value of $C_{2\text{-}1}(h,\theta+180)-C_{2\text{-}1}(h,\theta)$ of the second comparative example for each of the heights h with respect to the change of the angle $\theta$.

FIGS. 38A and 38B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ. FIG. 39 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ.

Since the outer surface is rotationally symmetrical and the inner surface is the toric surface which is symmetrical with respect to the optical axis thereof, the value of $C_1(h,\theta+180)-C_1(h,\theta)$ of the condition (5), the value of $C_2(h,\theta+180)-C_2(h,\theta)$ the condition (3) and the value of $C_{2-1}(h,\theta+180)-C_{2-1}(h,\theta)$ of the condition (1) take a constant value of zero regardless of the height h and the angle θ. Accordingly, the second comparative example does not satisfy the conditions (1), (3) and (5).

Figure 40A:
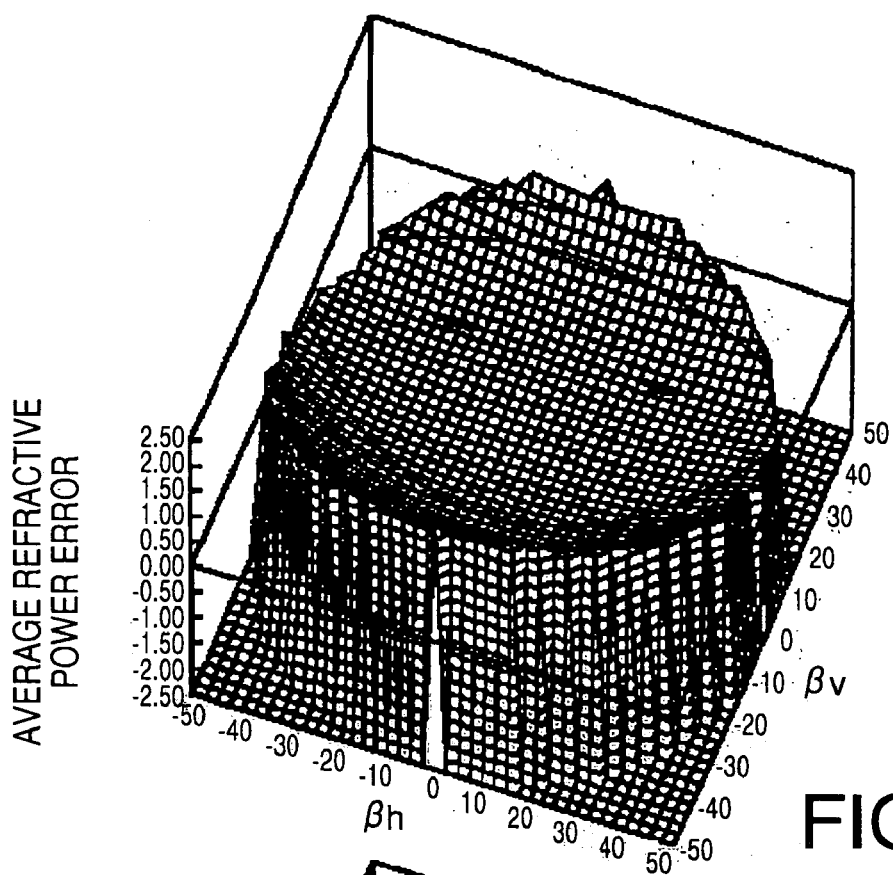
FIG. 40A is a three dimensional graph illustrating an average refractive power error of the spectacle lens of the second comparative example.
Figure 40B:
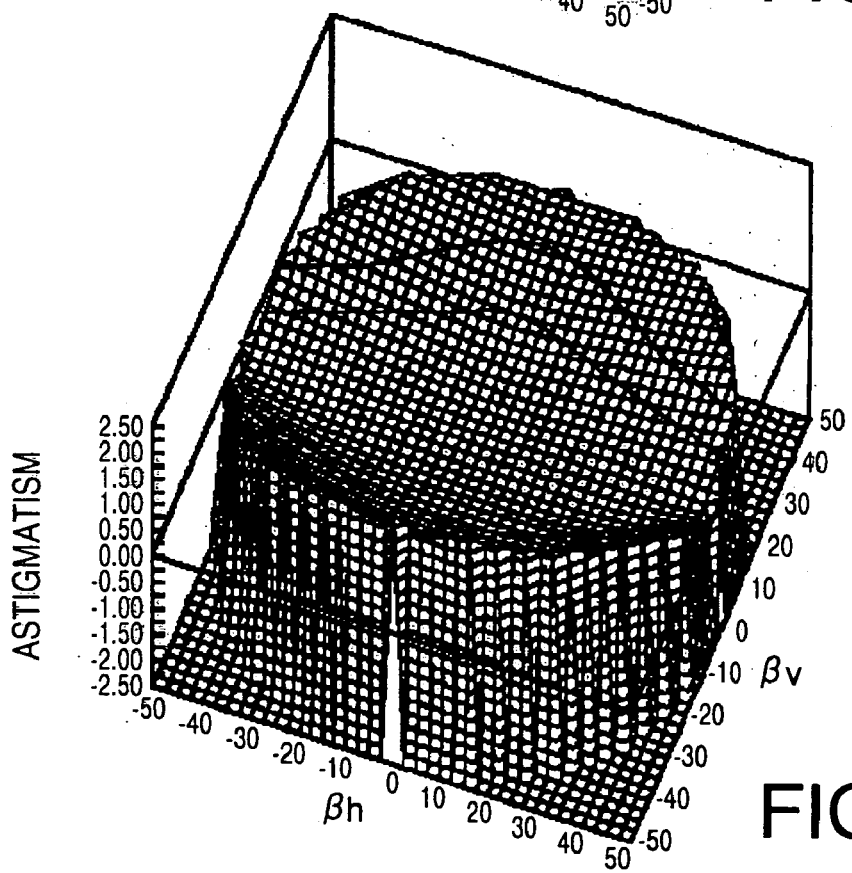
FIG. 40B is a three dimensional graph illustrating astigmatism of the spectacle lens of the second comparative example.

FIGS. 40A and 40B represent optical performance of the spectacle lens of the second comparative example. FIGS. 40A and 40B are three dimensional graphs of the average refractive power error and the astigmatism, respectively. By comparing FIG. 40A with FIGS. 28A and 34A and comparing FIG. 40B with FIGS. 28B and 34B, it is understood that the aberrations are sufficiently corrected in each of the third and the fourth examples.

FIFTH EXAMPLE

A spectacle lens according to a fifth example will be described below using numerical references shown in FIG. 1. The spectacle lens according to the fifth example is a minus lens that is not prescribed cylindrical power. Specifications of the spectacle lens of the fifth example are indicated in Table 7. As shown in Table 7, the outer surface 2 is a spherical surface having a curvature shown in Table 7, the inner surface 3 is a rotationally-asymmetrical aspherical surface.

TABLE 7

| | |
|---|---|
| SPHERICAL POWER SPH | −8.00[D] |
| CURVATURE OF OUTER SURFACE C1 (SPHERICAL SURFACE) | 0.68[D] |
| CURVATURE OF INNER SURFACE C2 (ROTATIONALLY-ASYMMETRICAL ASPHERICAL SURFACE) | 12.71[D] |
| CENTRAL THICKNESS | 1.10[mm] |

FIG. 41A is a list showing a distribution of the curvature $C_1(h,\theta)$ which is obtained on the outer surface 2 at each point having the polar coordinate $(h,\theta)$. Since the outer surface 2 is spherical, the curvatures $C_1(h,\theta)$ at all of the points on the outer surface 2 are the same. FIG. 41B is a list showing a distribution of the curvature $C_2(h,\theta)$ which is obtained on the inner surface 3 at each point having the polar coordinate $(h,\theta)$.

Figure 42A:
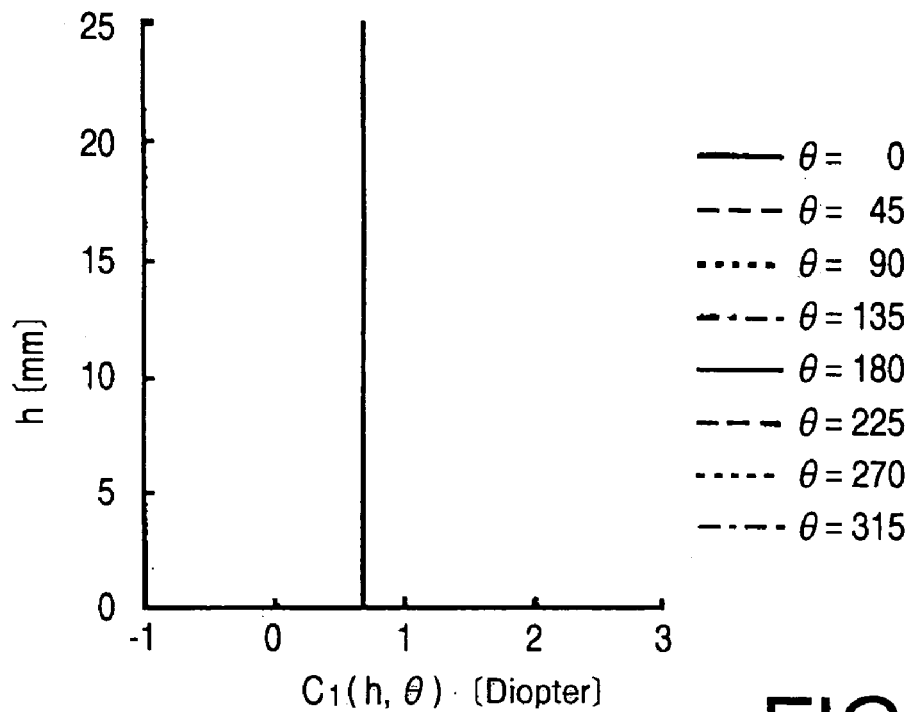
FIG. 42A is a graph illustrating change of the curvature $C_1(h,\theta)$ of the fifth example for each of angles $\theta$ with respect to change of a height h.
Figure 42B:
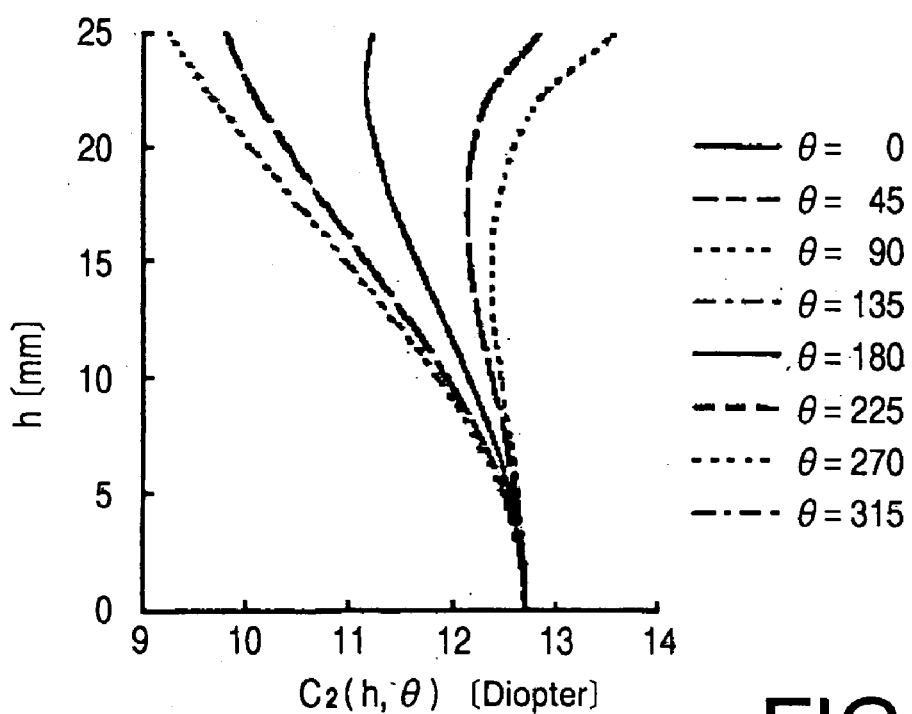
FIG. 42B is a graph illustrating change of the curvature $C_2(h,\theta)$ of the fifth example for each of angles $\theta$ with respect to change of a height h.

FIGS. 42A and 42B are graphs respectively illustrating the changes of the curvatures $C_1(h,\theta)$ and $C_2(h,\theta)$ for each of the angle $\theta$ of 0°, 45°, 90°, 135°, 180°, 225°, 270° and 315° with respect to the change of the height h. Since the outer surface 2 is spherical, the change of the curvature $C_1(h,\theta)$ is represented by a linear line on which all of the changes of the curvature $C_1(h,\theta)$ at different angles θ are overlapping one another in FIG. 42A.

In FIG. 42B, curves of the angles θ of 0° and 180° are overlapping one another. On the left side of the curve of the angle θ of 0° (180°) in FIG. 42B, a curve on which the changes of the curvatures of the angles θ of 45° and 135° are overlapping and a curve of the angles θ of 90° are indicated in order of the decreasing amount of the curvature. On the right side of the curve of the angle θ of 0° (180°) on FIG. 42B, a curve on which the changes of the curvatures of the angles θ of 225° and 315° are overlapping and a curve of the angle θ of 270° are indicated in order of the increasing amount of the curvature.

Figure 43A:
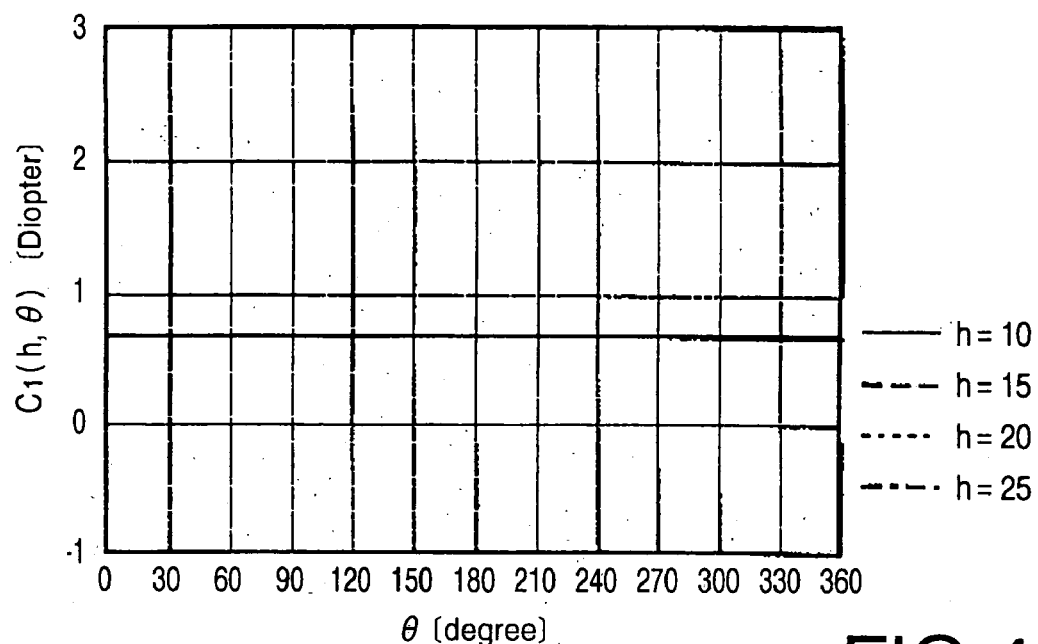
FIG. 43A is a graph illustrating change of the curvature $C_1(h,\theta)$ of the fifth example for each of the heights h with respect to change of the angle $\theta$.
Figure 43B:
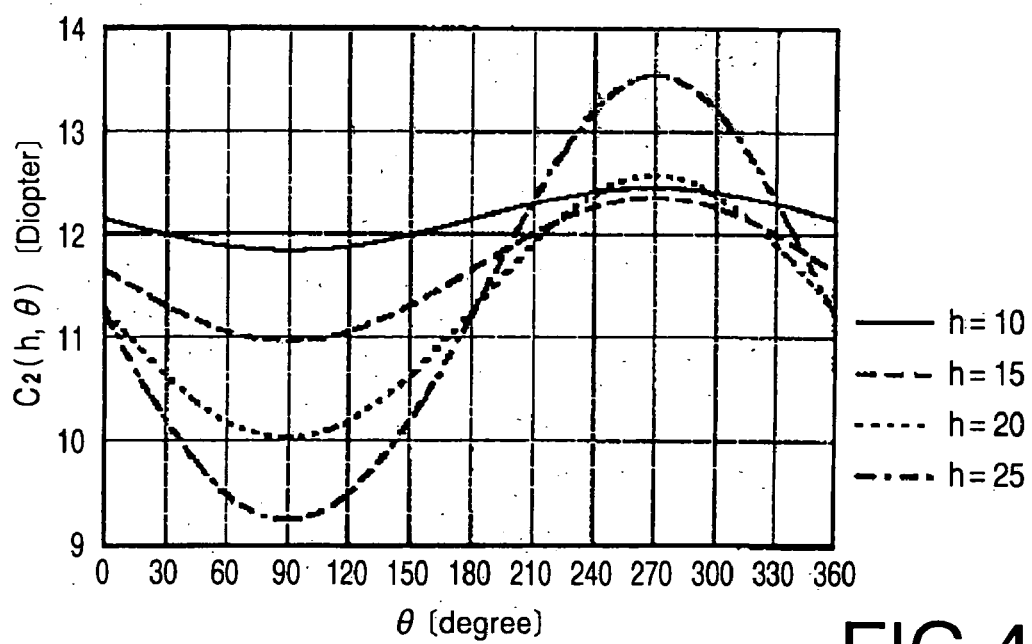
FIG. 43B is a graph illustrating change of the curvature $C_2(h,\theta)$ of the fifth example for each of the heights h with respect to change of the angle $\theta$.

FIGS. 43A and 43B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ. Since the outer surface 2 is spherical, the change of the curvature $C_1(h,\theta)$ is represented by a linear line on which all of the changes of the curvature $C_1(h,\theta)$ at different heights h are overlapping one another.

As shown in FIG. 43B, for all of the curves of the heights of 10 mm, 15 mm, 20 mm and 25 mm, the curvature $C_2(h,\theta)$ takes the minimum value at the angle θ of 90° (i.e., in the upper portion) and takes the maximum value at the angle θ of 270° (i.e., in the lower portion).

Figure 44A:
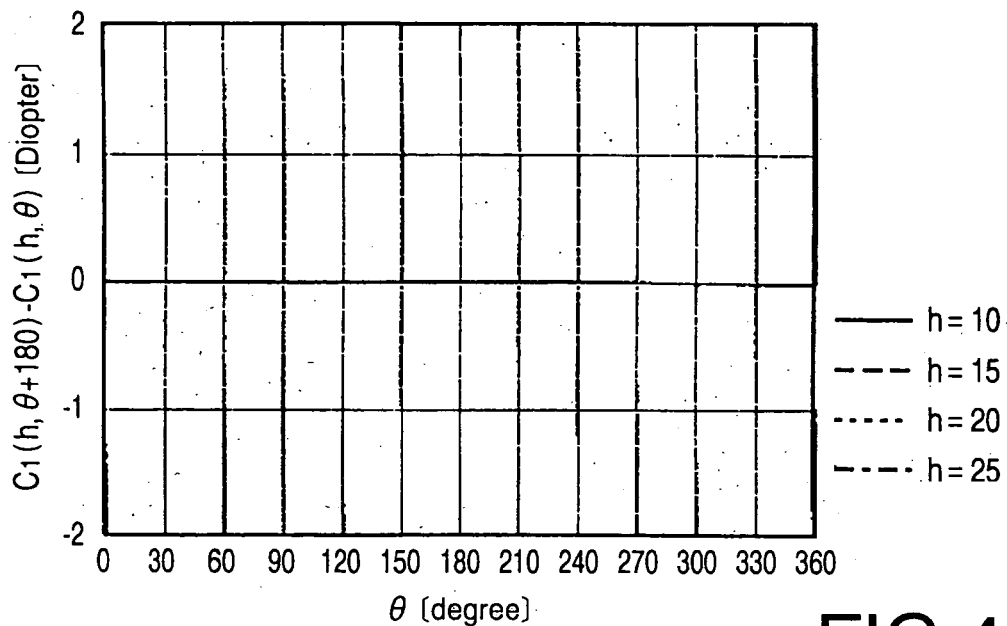
FIG. 44A is a graph illustrating change of a value of $C_1(h,\theta+180)-C_1(h,\theta)$ of the fifth example for each of the heights h with respect to the change of the angle $\theta$.
Figure 44B:
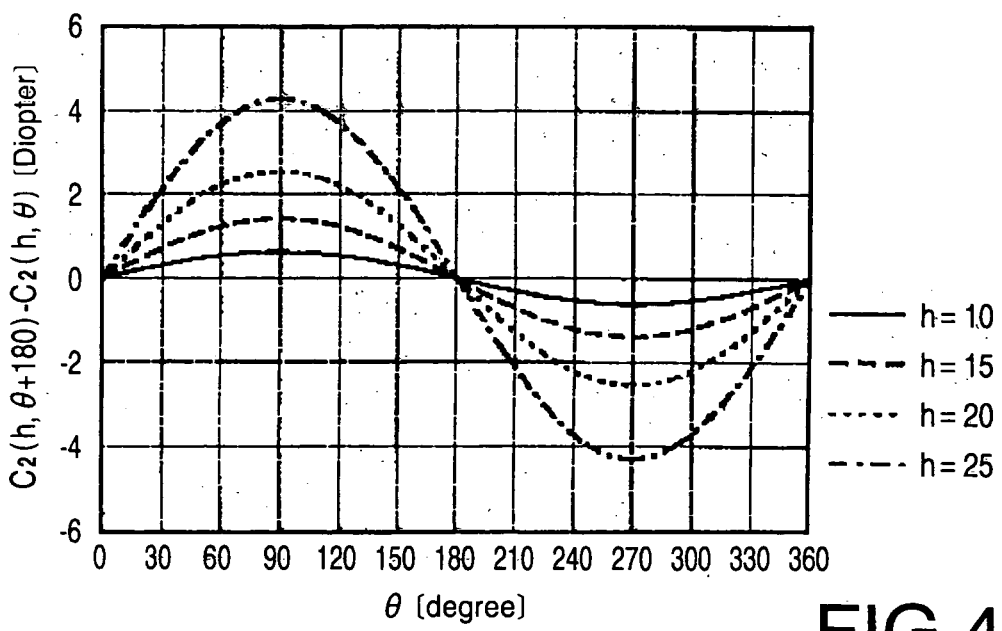
FIG. 44B is a graph illustrating change of a value of $C_2(h,\theta+180)-C_2(h,\theta)$ of the fifth example for each of the heights h with respect to the change of the angle $\theta$.

FIGS. 44A and 44B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

Since the outer surface 2 is spherical, the change of the value of $C_1(h,\theta+180)-C_1(h,\theta)$ is represented by a linear line on which all of the changes of the values $C_1(h,\theta+180)-C_1(h,\theta)$ at different heights h are overlapping one another on FIG. 44A.

As shown in FIG. 44B, for all of the curves of the heights h of 10 mm, 15 mm, 20 mm and 25 mm, the value of $C_2(h,\theta+180)-C_2(h,\theta)$ takes the maximum value at the angle θ of 90° (i.e., in the upper portion) and takes the minimum value at the angle θ of 270° (i.e., in the lower portion).

Further, as shown in FIG. 44B, the amplitude of the change of the value of $C_2(h,\theta+180)-C_2(h,\theta)$ becomes greater as the height h increases. It is obvious from FIG. 44B that $C_2(h,\theta+180)-C_2(h,\theta)$ is positive for each of the heights h of 10 mm, 15 mm, 20 mm and 25 mm within the range of $30 \leq \theta \leq 150$. Accordingly, the spectacle lens according to the fifth example satisfies the condition (3).

Figure 45:
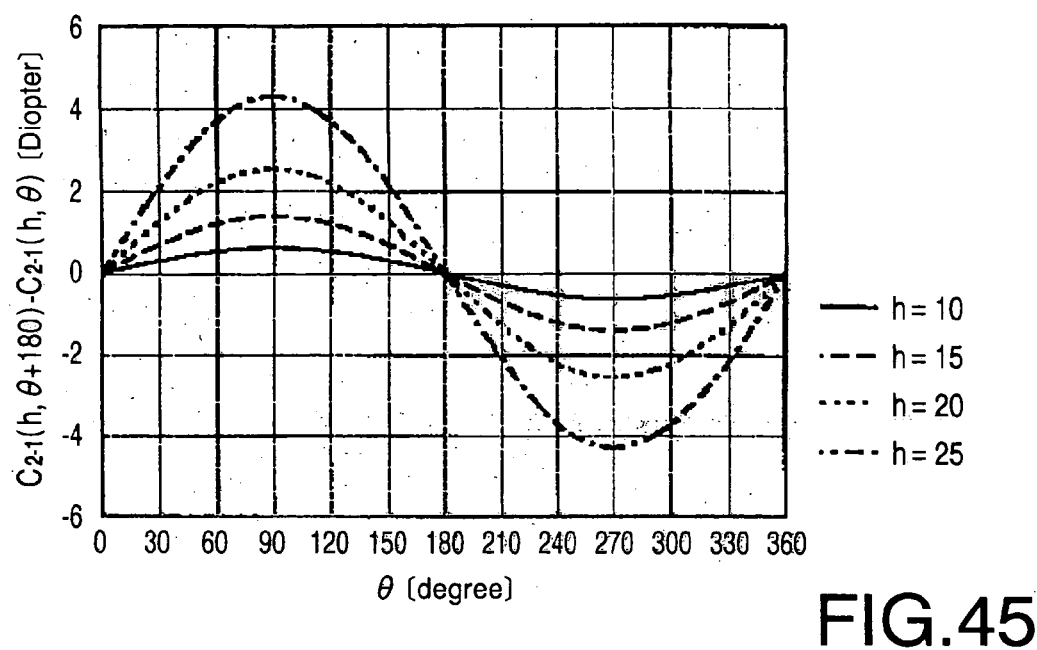
FIG. 45 is a graph illustrating change of a value of $C_{2\text{-}1}(h,\theta+180)-C_{2\text{-}1}(h,\theta)$ of the fifth example for each of the heights h with respect to the change of the angle $\theta$.

FIG. 45 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 45, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion).

It is obvious from FIG. 45 that $C_{2-1}(h,\theta+180)-C_{2-1}(h,\theta)$ is positive for each of the heights h of 10 mm, 15 mm, 20 mm and 25 mm within the range of $30 \leq \theta \leq 150$. Accordingly, the spectacle lens according to the fifth example satisfies the condition (1).

FIGS. 28A and 28B represent optical performance of the spectacle lens of the fifth example. FIGS. 28A and 28B are three dimensional graphs of the average refractive power error and the astigmatism, respectively.

SIXTH EXAMPLE

A spectacle lens according to a sixth example will be described below using numerical references shown in FIG. 1. The spectacle lens according to the sixth example is a minus lens that is not prescribed cylindrical power. Specifications of the spectacle lens of the sixth example are indicated in Table 8. As shown in Table 8, the outer surface 2 is a rotationally-symmetrical aspherical surface, and the inner surface 3 is a rotationally-asymmetrical aspherical surface.

TABLE 8

| | |
|---|---|
| SPHERICAL POWER SPH | −8.00[D] |
| CURVATURE OF OUTER SURFACE C1 (RATATIONALLY-SYMMETRICAL ASPHERICAL SURFACE) | 1.73[D] |
| CURVATURE OF INNER SURFACE C2 (ROTATIONALLY-ASYMMETRICAL ASPHERICAL SURFACE) | 13.76[D] |
| CENTRAL THICKNESS | 1.10[mm] |

FIG. 47A is a list showing a distribution of the curvature $C_1(h,\theta)$ which is obtained on the outer surface 2 at each point having the polar coordinate $(h,\theta)$. FIG. 41B is a list showing a distribution of the curvature $C_2(h,\theta)$ which is obtained on the inner surface 3 at each point having the polar coordinate $(h,\theta)$.

Figure 48A:
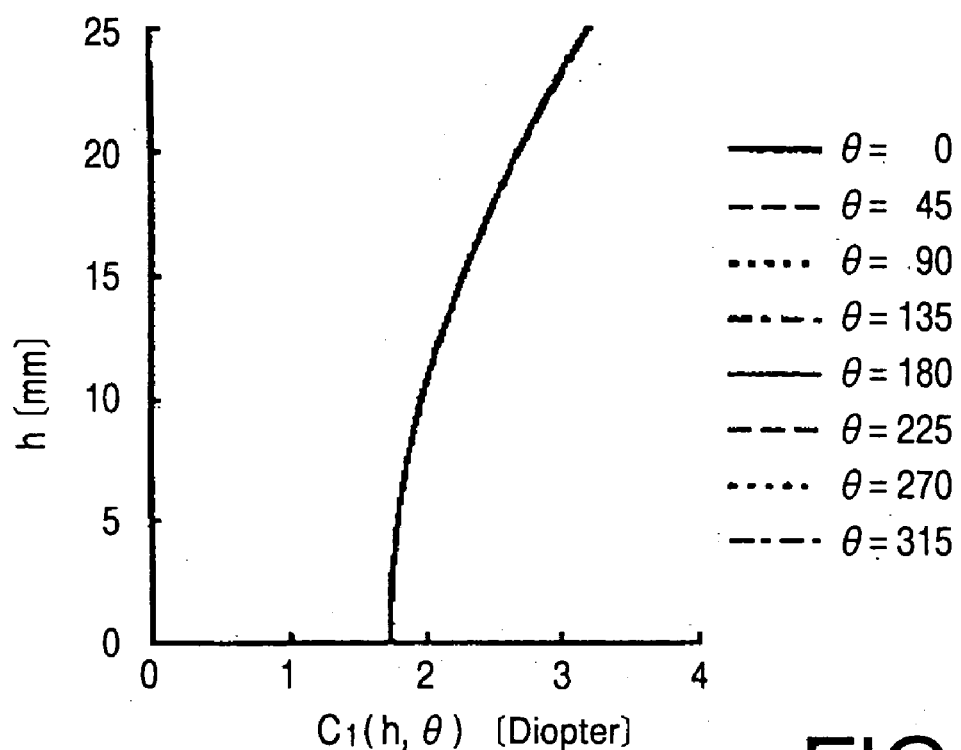
FIG. 48A is a graph illustrating change of the curvature $C_1(h,\theta)$ of the sixth example for each of angles $\theta$ with respect to change of a height h.
Figure 48B:
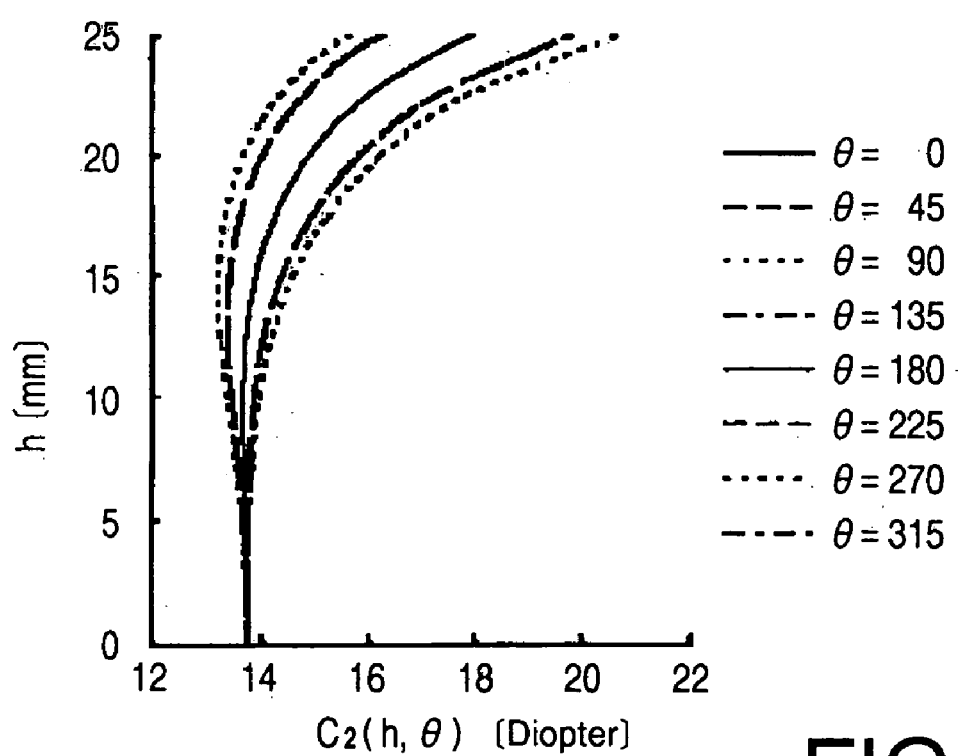
FIG. 48B is a graph illustrating change of the curvature $C_2(h,\theta)$ of the sixth example for each of angles $\theta$ with respect to change of a height h.

FIGS. 48A and 48B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h. Since the outer surface 2 is rotationally symmetrical, the change of the curvature $C_1(h,\theta)$ is represented by a curve on which all of the changes of the curvature $C_1(h,\theta)$ at different angles θ are overlapping one another in FIG. 48A.

In FIG. 48B, curves of the angles θ of 0° and 180° indicated by solid lines are overlapping one another. On the left side of the curve of the angle θ of 0° (180°) in FIG. 48B, a curve on which the changes of the curvatures of the angles θ of 45° and 135° are overlapping and a curve of the angles θ of 90° are indicated in order of the decreasing amount of the curvature. On the right side of the curve of the angle θ of 0° (180°) in FIG. 48B, a curve on which the changes of the curvatures of the angles θ of 225° and 315° are overlapping and a curve of the angle θ of 270° are indicated in order of the increasing amount of the curvature.

Figure 49A:
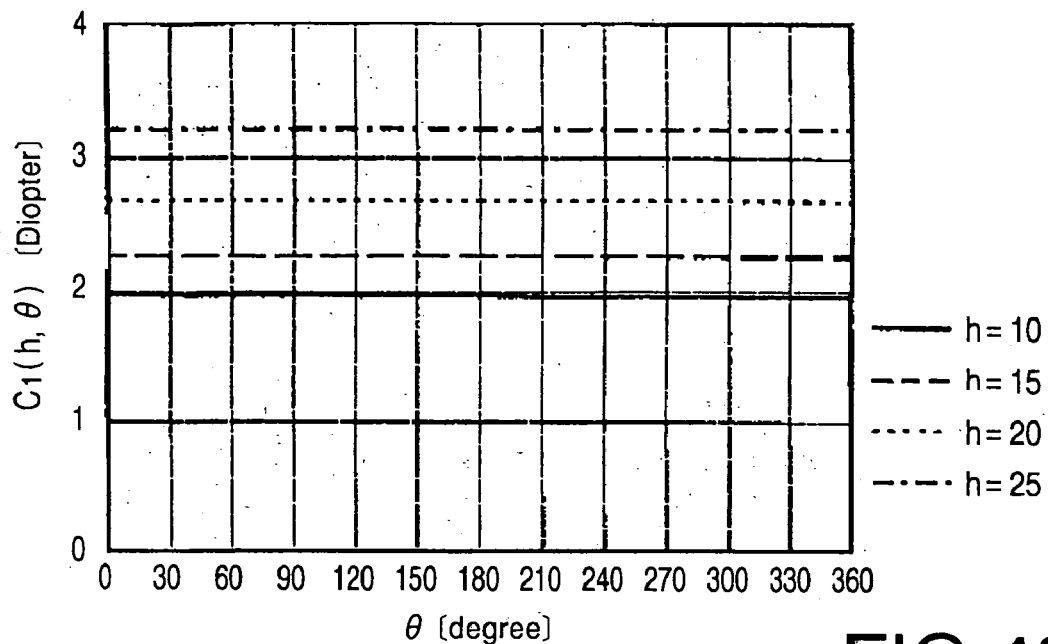
FIG. 49A is a graph illustrating change of the curvature $C_1(h,\theta)$ of the sixth example for each of the heights h with respect to change of the angle $\theta$.
Figure 49B:
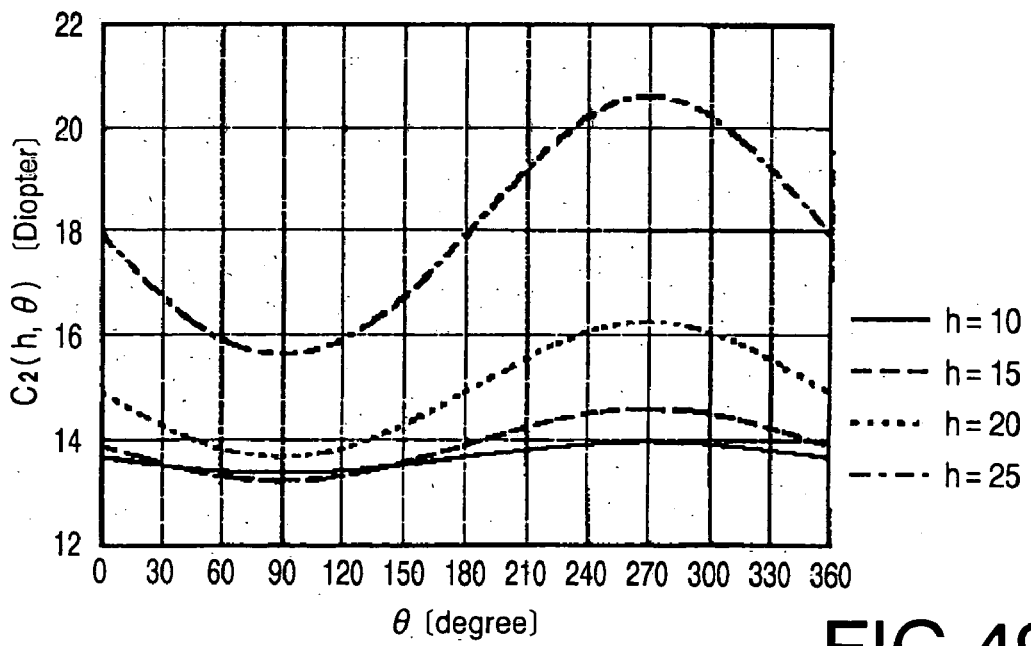
FIG. 49B is a graph illustrating change of the curvature $C_2(h,\theta)$ of the sixth example for each of the heights h with respect to change of the angle $\theta$.

FIGS. 49A and 49B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ. Since the outer surface 2 is rotationally symmetrical, the change of the curvature $C_1(h,\theta)$ for all of the heights h of 10 mm, 15 mm, 20 mm and 25 mm is represented by a linear line. That is, the curvature $C_1(h,\theta)$ does not change with respect to the change of the angle θ. Also, the curvature $C_1(h,\theta)$ becomes greater as the height h increases.

As shown in FIG. 49B, for all of the curves of the heights of 10 mm, 15 mm, 20 mm and 25 mm, the curvature $C_2(h,\theta)$ takes the minimum value at the angle θ of 90° (i.e., in the upper portion) and takes the maximum value at the angle θ of 270° (i.e., in the lower portion).

Figure 50A:
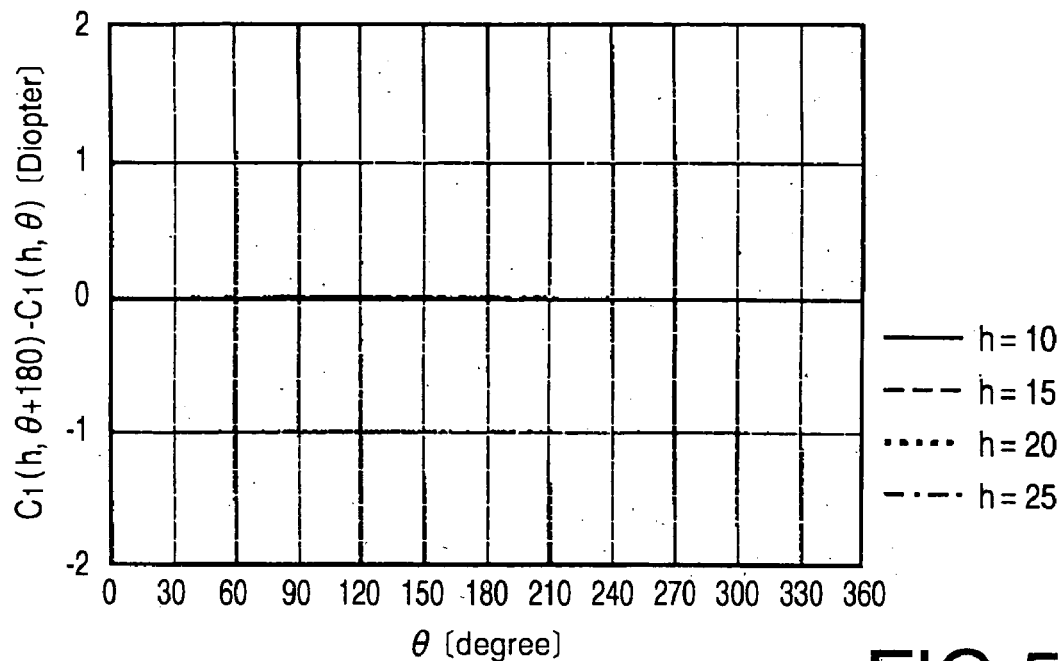
FIG. 50A is a graph illustrating change of a value of $C_1(h,\theta+180)-C_1(h,\theta)$ of the sixth example for each of the heights h with respect to the change of the angle $\theta$.
Figure 50B:
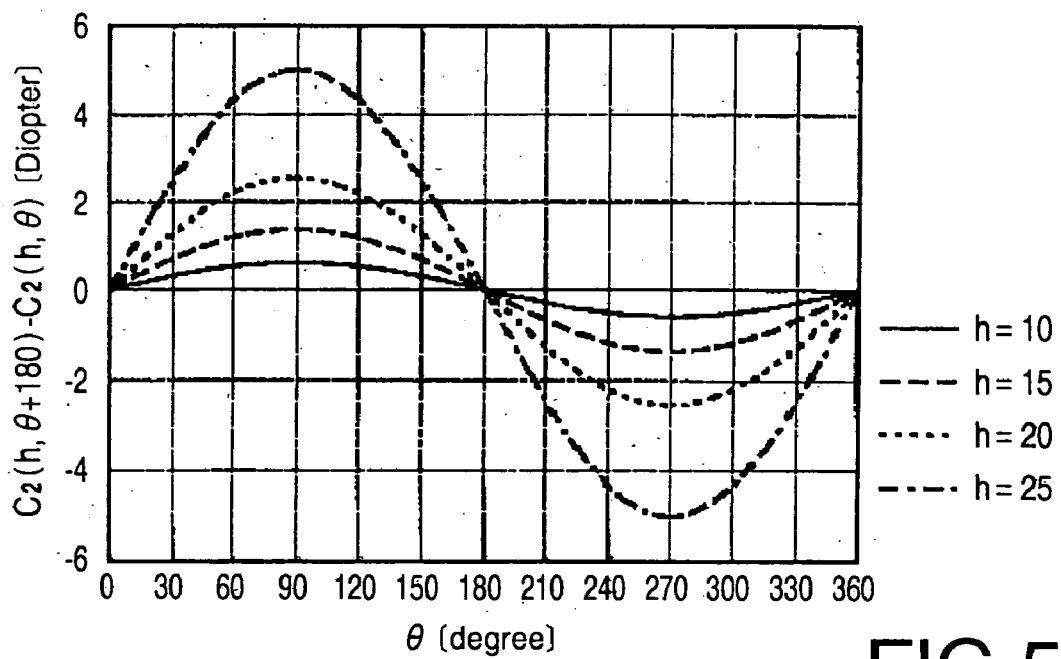
FIG. 50B is a graph illustrating change of a value of $C_2(h,\theta+180)-C_2(h,\theta)$ of the sixth example for each of the heights h with respect to the change of the angle $\theta$.

FIGS. 50A and 50B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

As shown in FIG. 50A, the change of the value of $C_1(h,\theta+180)-C_1(h,\theta)$ is represented by a linear line on which all of the changes of the values $C_1(h,\theta+180)-C_1(h,\theta)$ at different heights h are overlapping one another. As shown in FIG. 50B, for all of the curves of the heights h of 10 mm, 15 mm, 20 mm and 25 mm, the value of $C_2(h,\theta+180)-C_2(h,\theta)$ takes the maximum value at the angle θ of 90° (i.e., in the upper portion) and takes the minimum value at the angle θ of 270° (i.e., in the lower portion).

Further, as shown in FIG. 50B, the amplitude of the change of the value of $C_2(h,\theta+180)-C_2(h,\theta)$ becomes greater as the height h increases. It is obvious from FIG. 50B that $C_2(h,\theta+180)-C_2(h,\theta)$ is positive for each of the heights h of 10 mm, 15 mm, 20 mm and 25 mm within the range of $30 \leq \theta \leq 150$. Accordingly, the spectacle lens according to the sixth example satisfies the condition (3).

Figure 51:
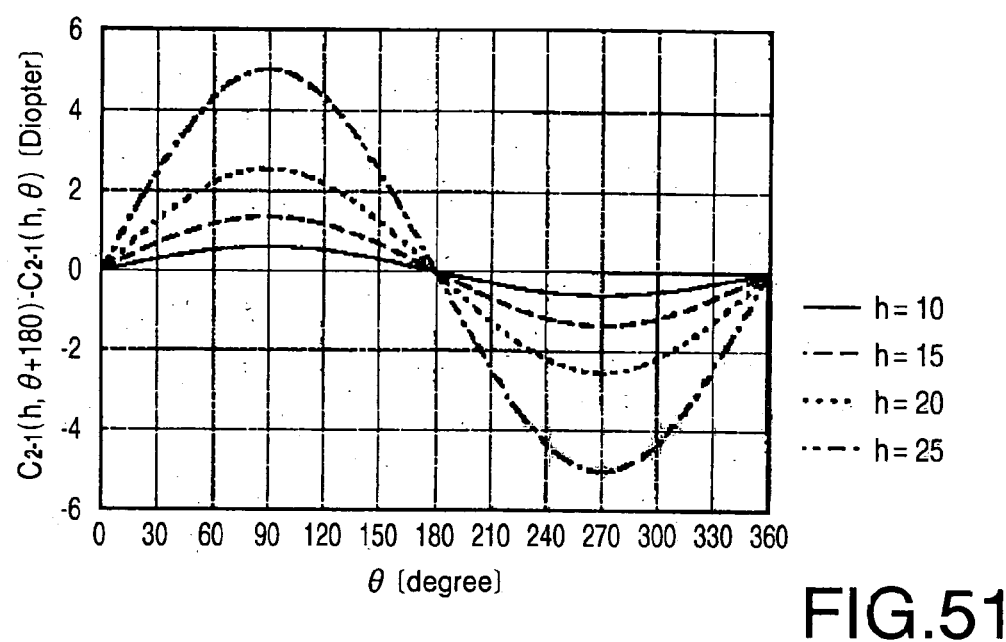
FIG. 51 is a graph illustrating change of a value of $C_{2\text{-}1}(h,\theta+180)-C_{2\text{-}1}(h,\theta)$ of the sixth example for each of the heights h with respect to the change of the angle $\theta$.

FIG. 51 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 51, for all of the curves of the heights h of 10 mm, 15 mm, 20 mm and 25 mm, the value of $C_{2-1}(h,\theta+180)-C_{2-1}(h,\theta)$ takes the maximum value at the angle θ of 90° (i.e., in the upper portion) and takes the minimum value at the angle θ of 270° (i.e., in the lower portion). Also, the amplitude of each curve becomes greater as the height h increases.

It is obvious from FIG. 51 that $C_{2-1}(h,\theta+180)-C_{2-1}(h,\theta)$ is positive for each of the heights h of 10 mm, 15 mm, 20 mm and 25 mm within the range of $30 \leq \theta \leq 150$. Accordingly, the spectacle lens according to the sixth example satisfies the condition (1).

Figure 52A:
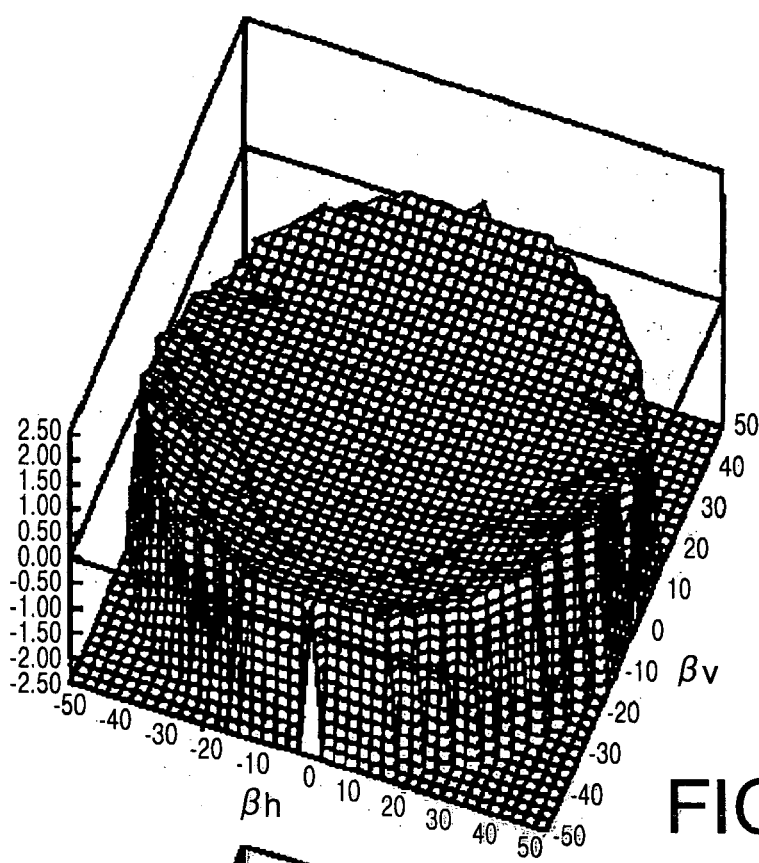
FIG. 52A is a three dimensional graph illustrating an average refractive power error of the spectacle lens of the sixth example.
Figure 52B:
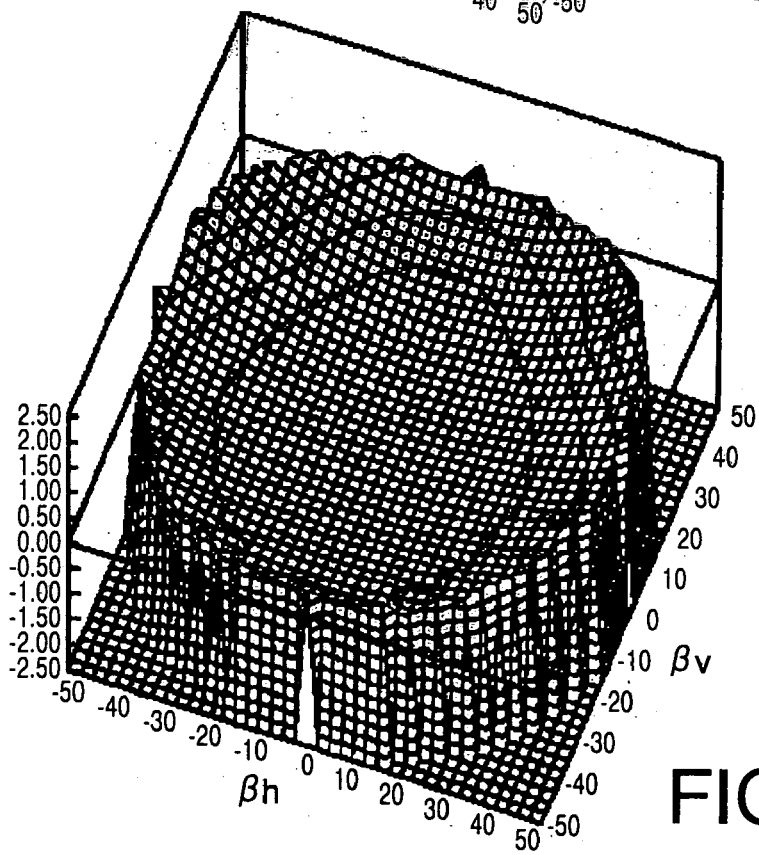
FIG. 52B is a three dimensional graph illustrating astigmatism of the spectacle lens of the sixth example.

FIGS. 52A and 52B represent optical performance of the spectacle lens of the sixth example. FIGS. 52A and 52B are three dimensional graphs of the average refractive power error and the astigmatism, respectively.

THIRD COMPARATIVE EXAMPLE

A spectacle lens according to a third comparative example will be described below using numerical references shown in FIG. 2. The spectacle lens of the third comparative example has the same spherical power and the center thickness as those of the fifth and sixth examples. Specifications of the spectacle lens of the third comparative example are indicated in Table 9. As shown in Table 9, the inner surface 13 is a spherical surface, and the outer surface 12 is a rotationally-symmetrical aspherical surface.

TABLE 9

| SPHERICAL POWER SPH | −8.00[D] |
|---|---|
| CURVATURE OF OUTER SURFACE C1 (ROTATIONALLY-SYMMETRICAL ASPHERICAL SURFACE) | 1.73[D] |
| CURVATURE OF INNER SURFACE C2 (SPHERICAL SURFACE) | 13.76[D] |
| CENTRAL THICKNESS | 1.10[mm] |

FIG. 53A is a list showing a distribution of the curvature $C_1(h,\theta)$ which is obtained on the outer surface 12 at each point having the polar coordinate (h,θ). FIG. 53B is a list showing a distribution of the curvature $C_2(h,\theta)$ which is obtained on the inner surface 13 at each point having the polar coordinate (h,θ). Since the inner surface 13 is spherical, the curvatures $C_2(h,\theta)$ at all of the points on the inner surface 13 are the same.

Figure 54A:
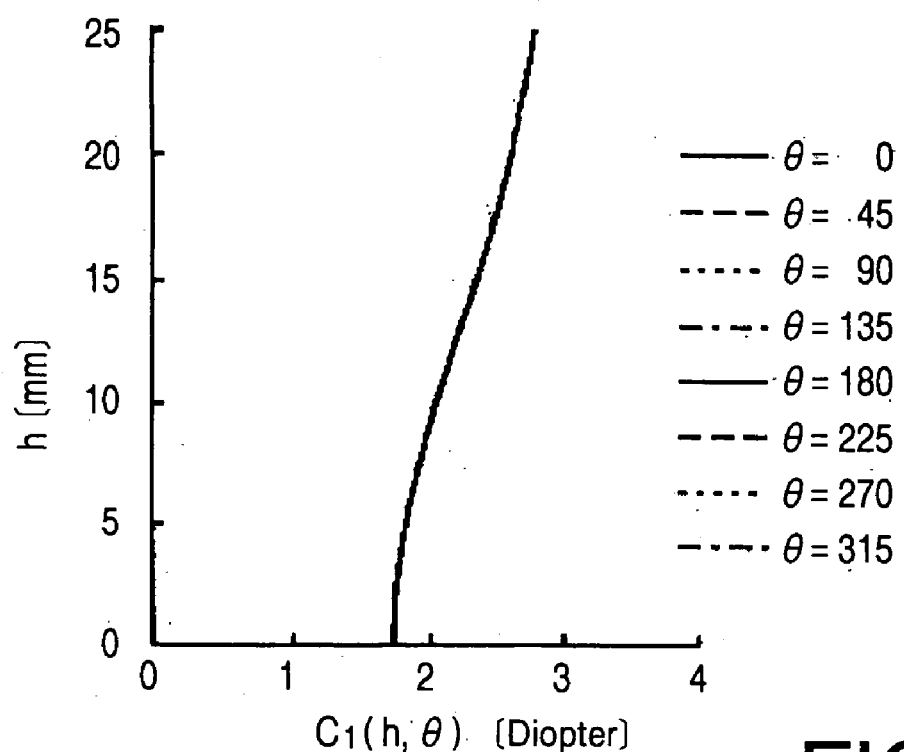
FIG. 54A is a graph illustrating change of the curvature $C_1(h,\theta)$ of the third comparative example for each of angles $\theta$ with respect to change of a height h.
Figure 54B:
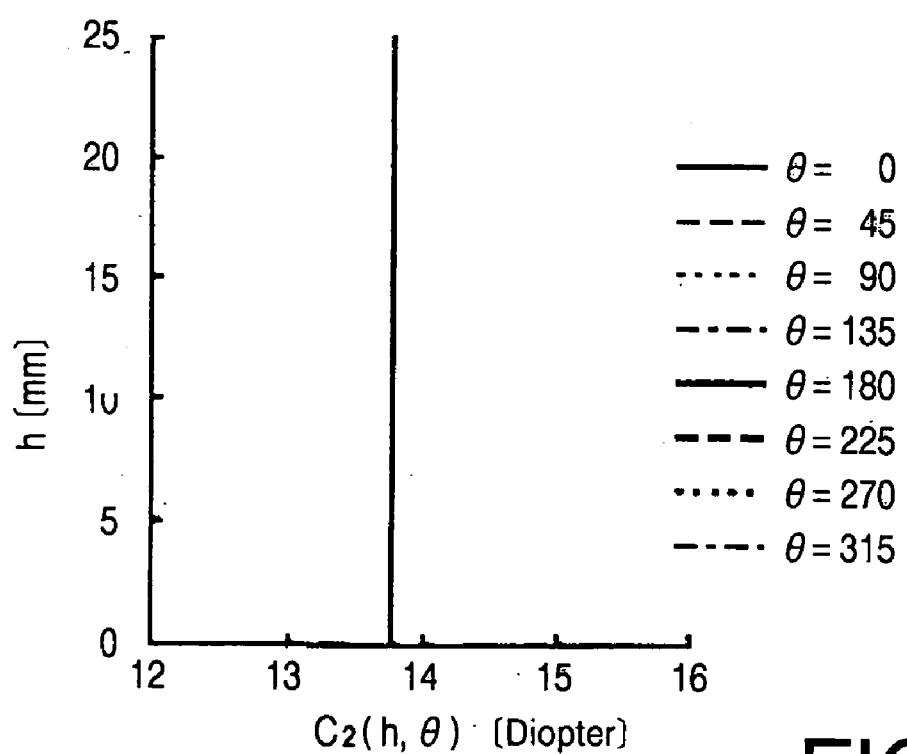
FIG. 54B is a graph illustrating change of the curvature $C_2(h,\theta)$ of the third comparative example for each of angles $\theta$ with respect to change of a height h.

FIGS. 54A and 54B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles θ are overlapping one another on the curve shown in FIG. 54A. Since the inner surface 13 is spherical, the change of the curvature $C_2(h,\theta)$ is represented by a linear line on which all of the changes of the curvature $C_2(h,\theta)$ at different angles θ are overlapping one another.

Figure 55A:
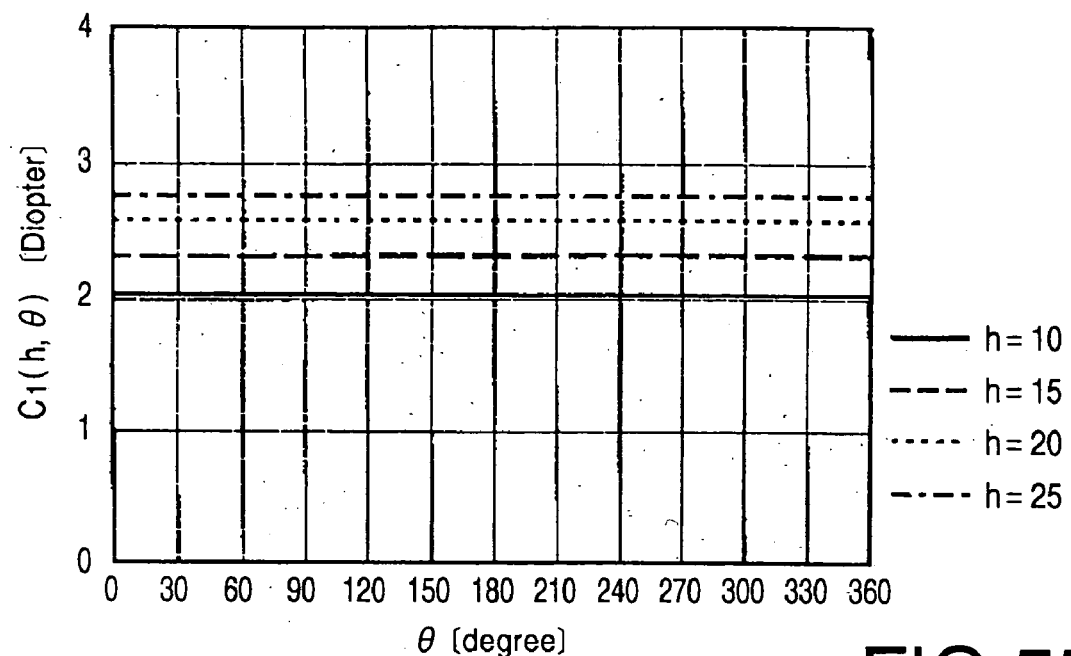
FIG. 55A is a graph illustrating change of the curvature $C_1(h,\theta)$ of the third comparative example for each of the heights h with respect to change of the angle $\theta$.
Figure 55B:
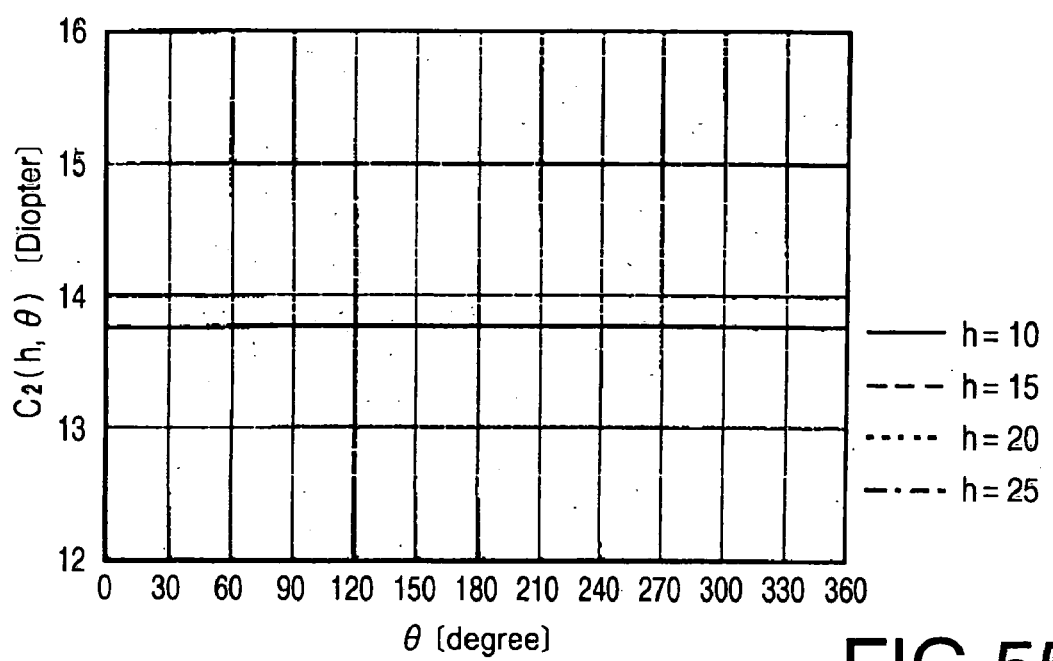
FIG. 55B is a graph illustrating change of the curvature $C_2(h,\theta)$ of the third comparative example for each of the heights h with respect to change of the angle $\theta$.

FIGS. 55A and 55B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the curvature $C_1(h,\theta)$ does not change with respect to the change of the angle θ, the curvature $C_1(h,\theta)$ is represented by a linear line for each of the heights of 10 mm, 15 mm, 20 mm and 25 mm in FIG. 55A. Also, the curvature $C_1(h,\theta)$ becomes greater as the height h increases. Since the inner surface 13 is spherical, the change of the curvature $C_2(h,\theta)$ is represented by a linear line on which all of the changes of the curvature $C_2(h,\theta)$ at different heights h are overlapping one another in FIG. 55B.

Figure 56A:
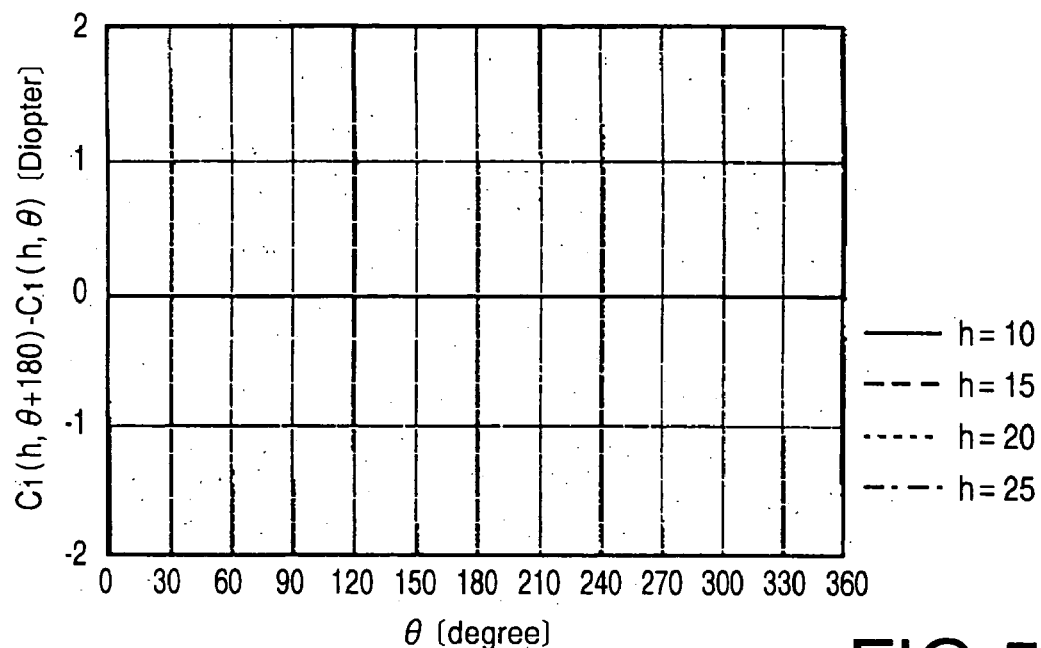
FIG. 56A is a graph illustrating change of a value of $C_1(h,\theta+180)-C_1(h,\theta)$ of the third comparative example for each of the heights h with respect to the change of the angle $\theta$.
Figure 56B:
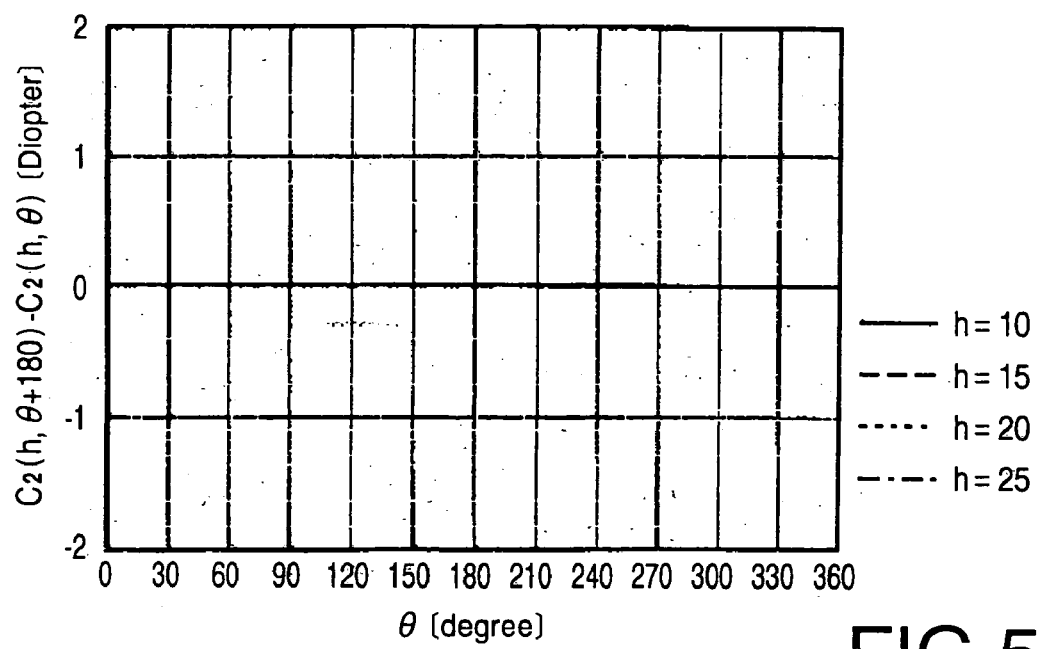
FIG. 56B is a graph illustrating change of a value of $C_2(h,\theta+180)-C_2(h,\theta)$ of the third comparative example for each of the heights h with respect to the change of the angle $\theta$.
Figure 57:
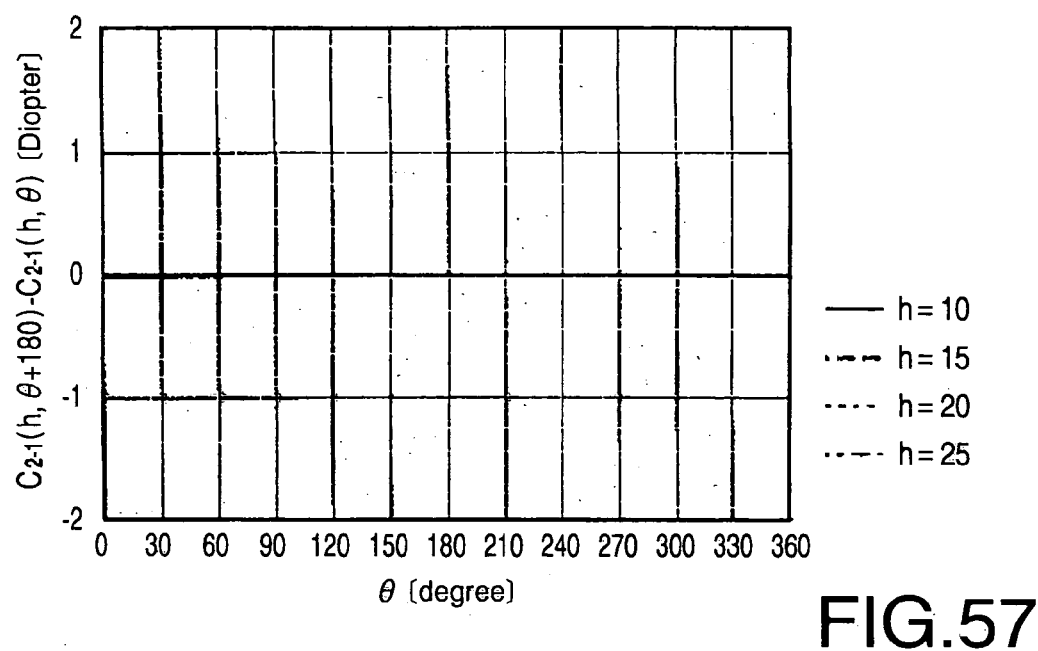
FIG. 57 is a graph illustrating change of a value of $C_{2\text{-}1}(h,\theta+180)-C_{2\text{-}1}(h,\theta)$ of the third comparative example for each of the heights h with respect to the change of the angle $\theta$.

FIGS. 56A and 56B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ. FIG. 57 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ.

Since both of the outer and inner surfaces are rotationally-symmetrical, the value of $C_1(h,\theta+180)-C_1(h,\theta)$ of the condition (5), the value of $C_2(h,\theta+180)-C_2(h,\theta)$ the condition (3) and the value of $C_{2-1}(h,\theta+180)-C_{2-1}(h,\theta)$ of the condition (1) take a constant value of zero regardless of the angle θ. Accordingly, the third comparative example does not satisfy the conditions (1), (3) and (5).

Figure 46A:
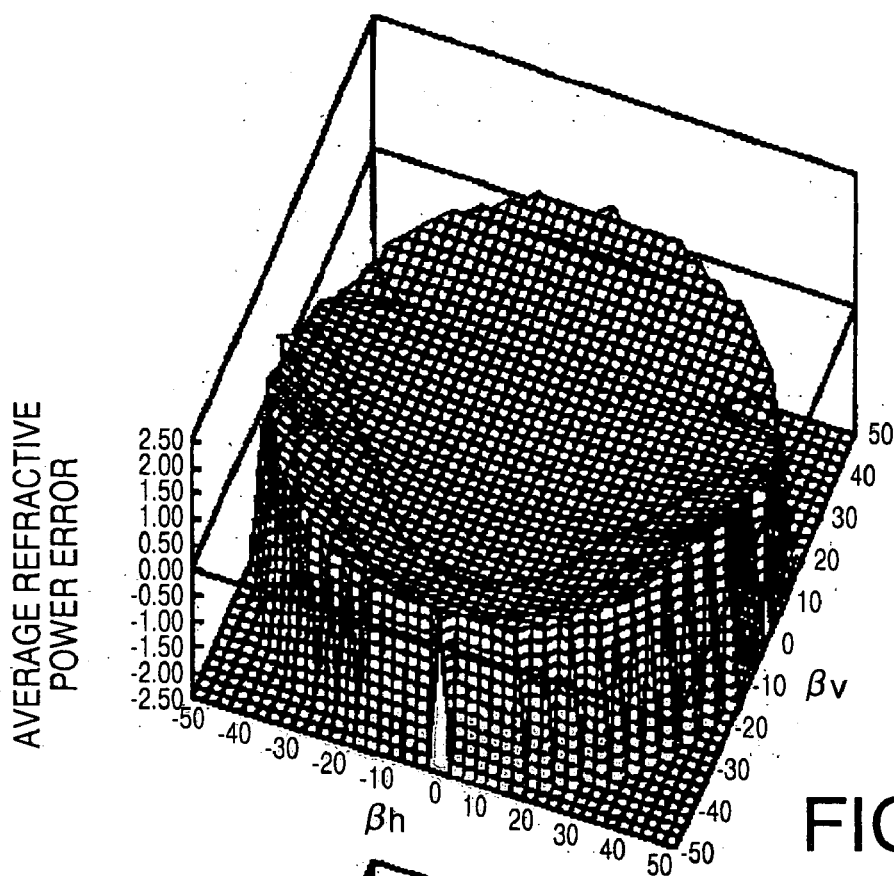
FIG. 46A is a three dimensional graph illustrating an average refractive power error of the spectacle lens of the fifth example.
Figure 46B:
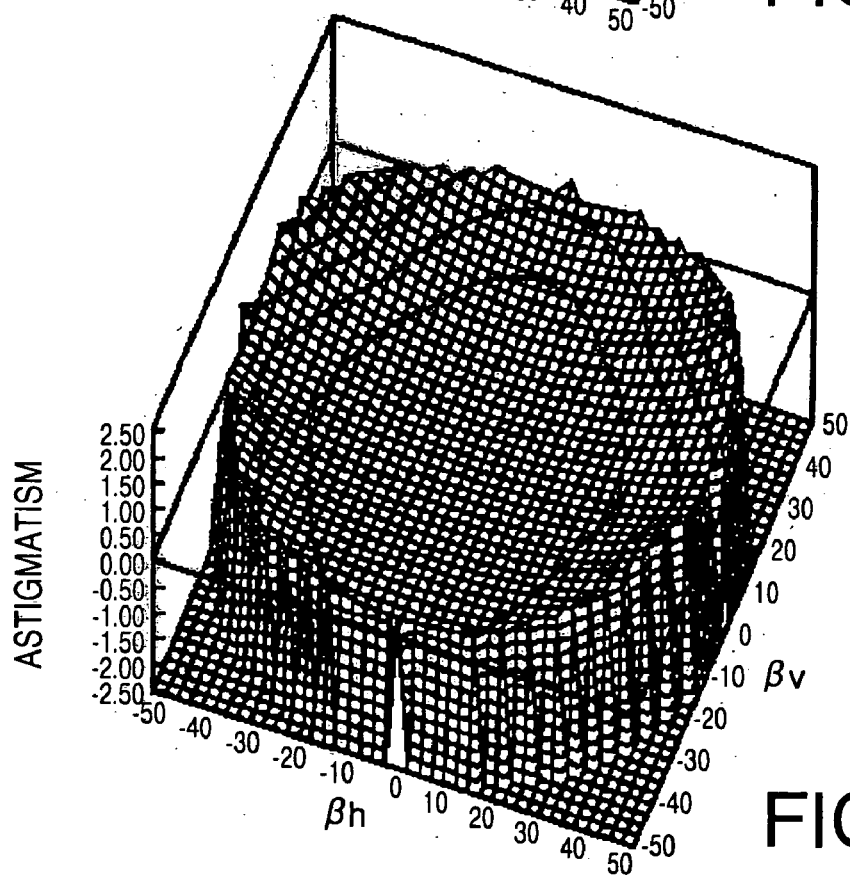
FIG. 46B is a three dimensional graph illustrating astigmatism of the spectacle lens of the fifth example.
Figure 58A:
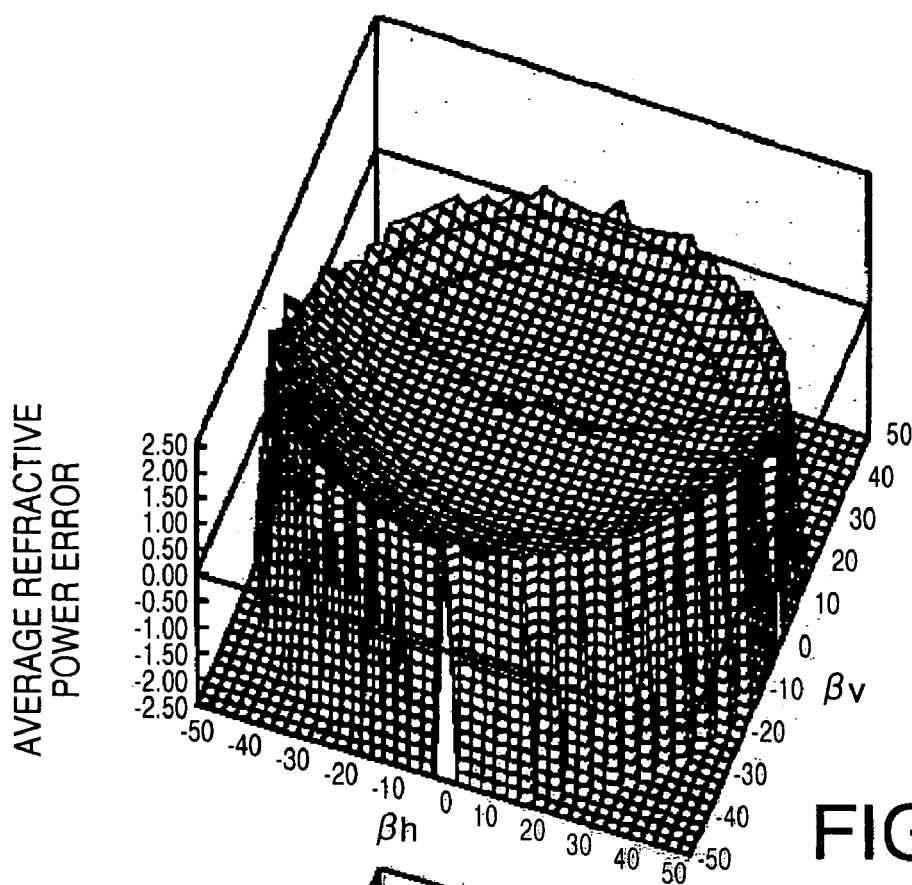
FIG. 58A is a three dimensional graph illustrating an average refractive power error of the spectacle lens of the third comparative example.
Figure 58B:
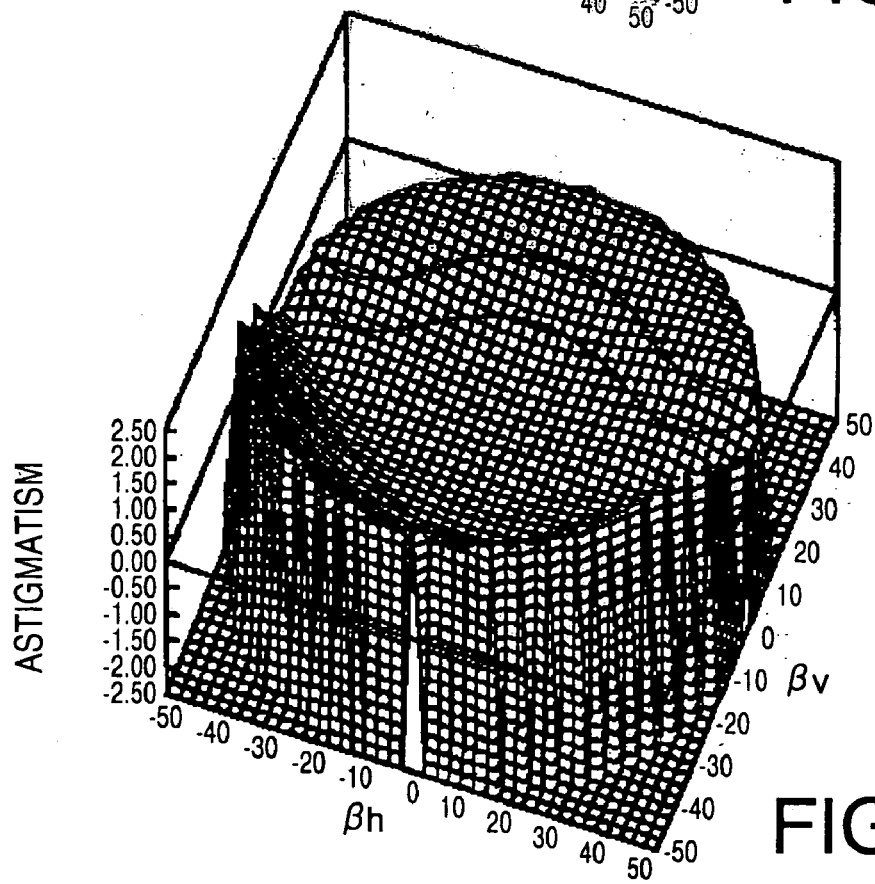
FIG. 58B is a three dimensional graph illustrating astigmatism of the spectacle lens of the third comparative example.

FIGS. 58A and 58B represent optical performance of the spectacle lens of the third comparative example. FIGS. 58A and 58B are three dimensional graphs of the average refractive power error and the astigmatism, respectively. By comparing FIG. 58A with FIGS. 46A and 52A and comparing FIG. 58B with FIGS. 46B and 52B, it is understood that the aberrations are sufficiently corrected in each of the fifth and the sixth examples.

SEVENTH EXAMPLE

A spectacle lens according to a seventh example will be described below using numerical references shown in FIG. 1. The spectacle lens according to the seventh example is a minus lens that is prescribed cylindrical power. Specifications of the spectacle lens of the seventh example are indicated in Table 10. As shown in Table 10, the outer surface 2 is a spherical surface having a curvature shown in Table 10, and the inner surface 3 is a rotationally-asymmetrical aspherical surface.

TABLE 10

| | |
|---|---|
| SPHERICAL POWER SPH | −8.00[D] |
| CYLINDRICAL POWER CYL | −4.00[D] |
| ASTIGMATIC AXIS AX | 90[°] |
| CURVATURE OF OUTER SURFACE C1 (SPHERICAL SURFACE) | 0.68[D] |
| CURVATURE OF INNER SURFACE C2 (ROTATIONALLY-ASYMMETRICAL ASPHERICAL SURFACE) | 12.71~18.72[D] |
| CENTRAL THICKNESS | 1.10[mm] |

FIG. 59A is a list showing a distribution of the curvature $C_1(h,\theta)$ which is obtained on the outer surface 2 at each point having the polar coordinate $(h,\theta)$. FIG. 59B is a list showing a distribution of the curvature $C_2(h,\theta)$ which is obtained on the inner surface 3 at each point having the polar coordinate $(h,\theta)$. Since the outer surface 2 is spherical, the curvatures $C_1(h,\theta)$ at all of the points on the outer surface 2 are the same.

Figure 60A:
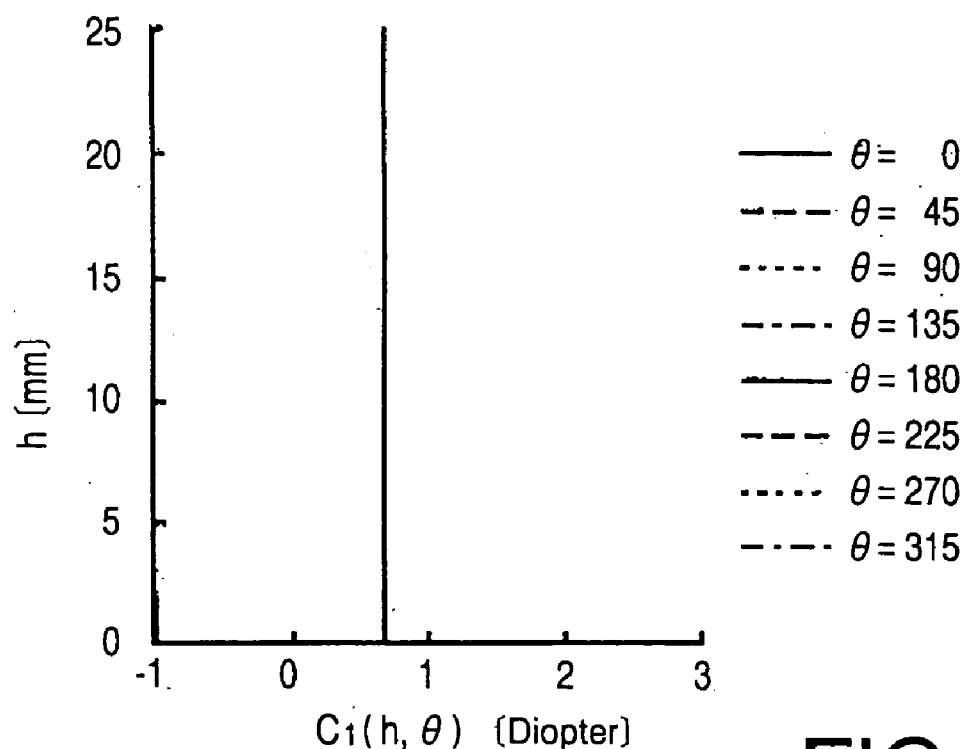
FIG. 60A is a graph illustrating change of the curvature $C_1(h,\theta)$ of the seventh example for each of angles $\theta$ with respect to change of a height h.
Figure 60B:
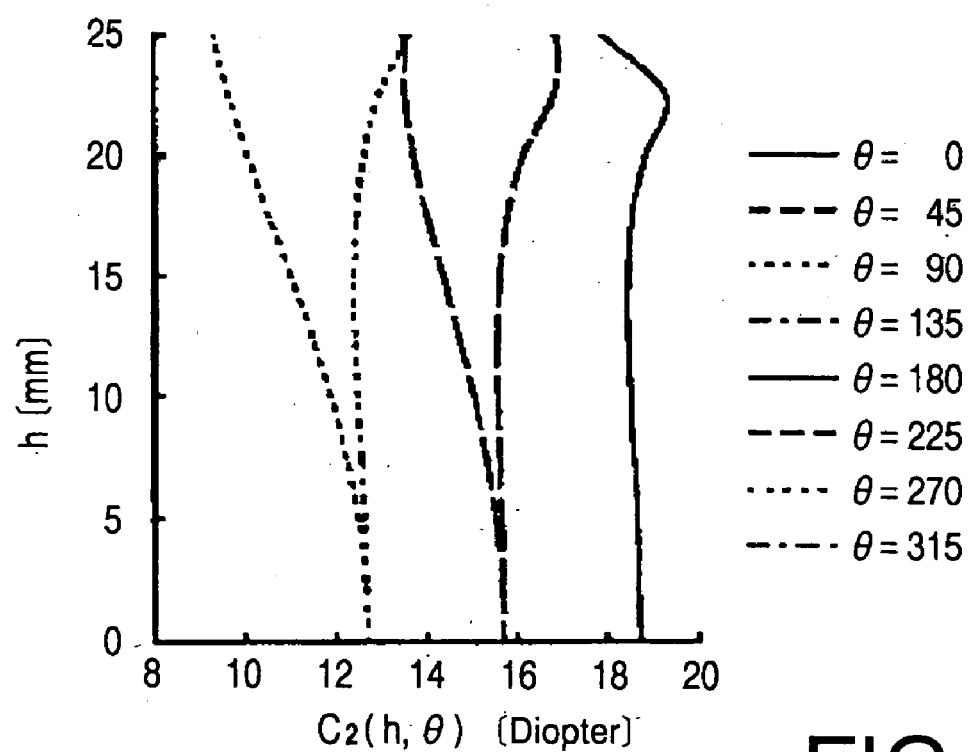
FIG. 60B is a graph illustrating change of the curvature $C_2(h,\theta)$ of the seventh example for each of angles $\theta$ with respect to change of a height h.

FIGS. 60A and 60B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

Since the outer surface 2 is spherical, the change of the curvature $C_1(h,\theta)$ is represented by a linear line on which all of the changes of the curvature $C_1(h,\theta)$ at different angles θ are overlapping one another in FIG. 60A.

In FIG. 60B, curves of the angles θ of 0° and 180° are overlapping one another and take the maximum value of the curvature $C_2(h,\theta)$ of all curves having different angles θ. On the left side of the curve of the angle θ of 0° (180°) on FIG. 60B, a curve on which the changes of the curvatures of the angles θ of 225° and 315° are overlapping, a curve on which the changes of the curvatures of the angles θ of 45° and 135° are overlapping, a curve of the angles θ of 270° and a curve of the angles θ of 90° are indicated in order of the decreasing amount of the curvature. Since the inner surface 3 has the cylindrical power, the curves of the curvatures for different angles θ take different values at the height h=0.

Figure 61A:
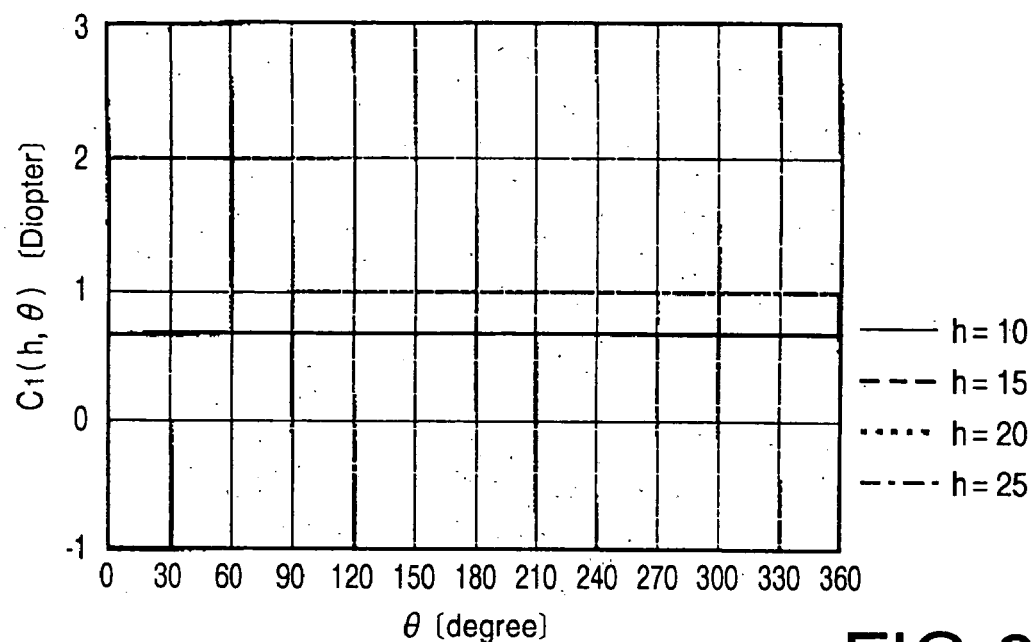
FIG. 61A is a graph illustrating change of the curvature $C_1(h,\theta)$ of the seventh example for each of the heights h with respect to change of the angle $\theta$.
Figure 61B:
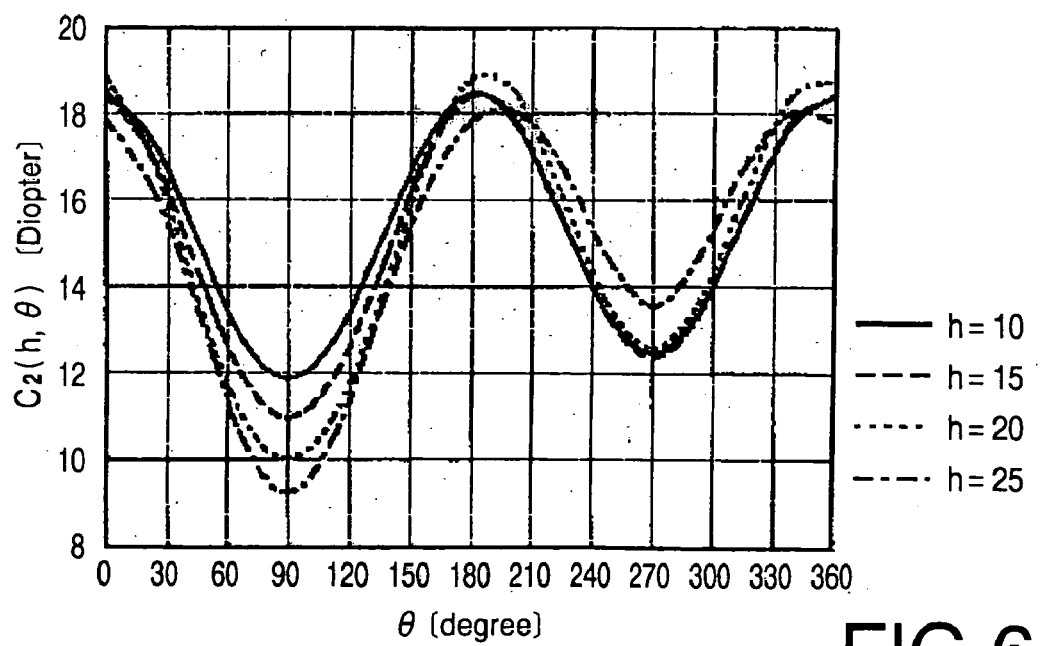
FIG. 61B is a graph illustrating change of the curvature $C_2(h,\theta)$ of the seventh example for each of the heights h with respect to change of the angle $\theta$.

FIGS. 61A and 61B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the outer surface 2 is spherical, the change of the curvature $C_1(h,\theta)$ is represented by a linear line on which all of the changes of the curvature $C_1(h,\theta)$ at different heights h are overlapping one another on FIG. 61A. As shown in FIG. 61B, for all of curves of the heights of 10 mm, 15 mm, 20 mm and 25 mm, the curvature $C_2(h,\theta)$ takes a local minimal value at the angle θ of 90° (i.e., in the upper portion) and takes a local minimal value at the angle θ of 270° (i.e., in the lower portion). The local minimal value at the angle θ of 90° is smaller than the local minimal value at the angle θ of 270°.

Figure 62A:
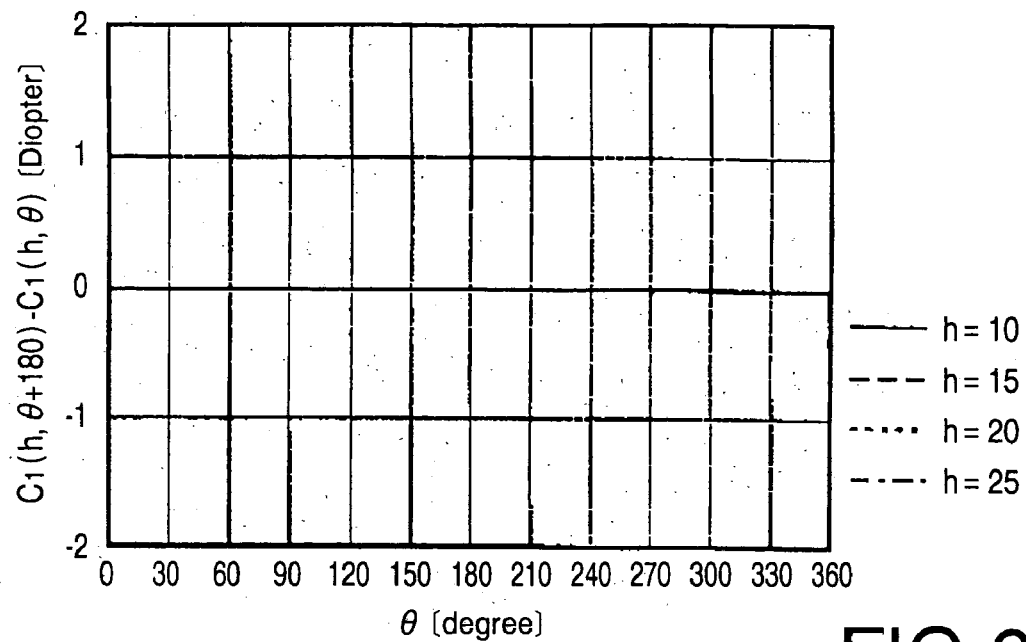
FIG. 62A is a graph illustrating change of a value of $C_1(h,\theta+180)-C_1(h,\theta)$ of the seventh example for each of the heights h with respect to the change of the angle $\theta$.
Figure 62B:
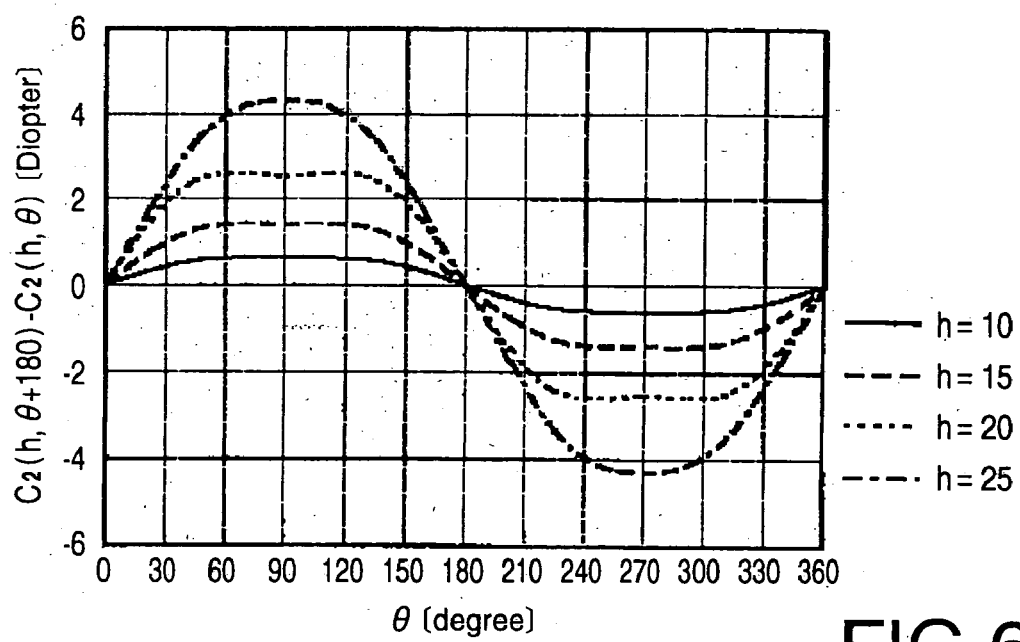
FIG. 62B is a graph illustrating change of a value of $C_2(h,\theta+180)-C_2(h,\theta)$ of the seventh example for each of the heights h with respect to the change of the angle $\theta$.

FIGS. 62A and 62B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

Since the outer surface 2 is spherical, the change of the value of $C_1(h,\theta+180)-C_1(h,\theta)$ is represented by a linear line on which all of the changes of the value of $C_1(h,\theta+180)-C_1(h,\theta)$ at different heights h are overlapping one another on FIG. 62A.

As shown in FIG. 62B, for all of curves of the heights h of 10 mm, 15 mm, 20 mm and 25 mm, the value of $C_2(h,\theta+180)-C_2(h,\theta)$ takes the maximum value within the range of θ=45°~135° (i.e., in the upper portion) and takes the minimum value within the range of θ=225°~315° (i.e., in the lower portion). Further, as shown in FIG. 62B, the amplitude of the curve of $C_2(h,\theta+180)-C_2(h,\theta)$ becomes greater as the height h increases. It is obvious from FIG. 62B that $C_2(h,\theta+180)-C_2(h,\theta)$ is positive for each of the heights h of 10 mm, 15 mm, 20 mm and 25 mm within the range of 30≦θ≦150. Accordingly, the spectacle lens according to the seventh example satisfies the condition (3).

Figure 63:
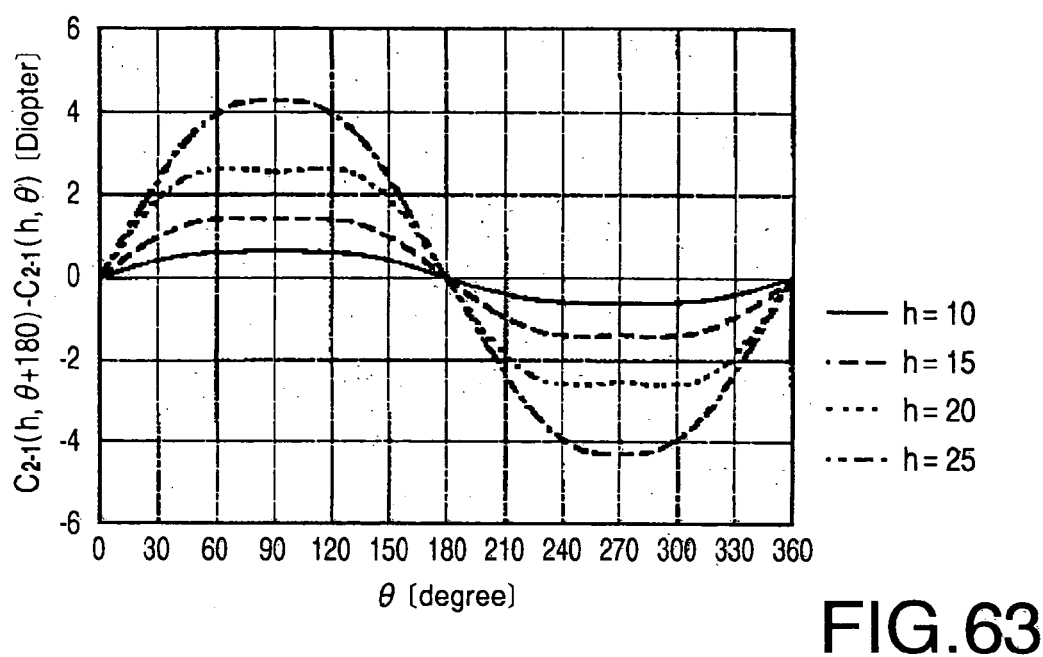
FIG. 63 is a graph illustrating change of a value of $C_{2\text{-}1}(h,\theta+180)-C_{2\text{-}1}(h,\theta)$ of the seventh example for each of the heights h with respect to the change of the angle $\theta$.

FIG. 63 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 63, for all of the curves of the heights h of 10 mm, 15 mm, 20 mm and 25 mm, the value of $C_{2-1}(h,\theta+180)-C_{2-1}(h,\theta)$ takes the maximum value within the range of θ=45°~135° (i.e., in the upper portion) and takes the minimum value within the range of θ=225°~315° (i.e., in the lower portion). Further, as shown in FIG. 63, the amplitude of the curve of the value of $C_{2-1}(h,\theta+180)-C_{2-1}(h,\theta)$ becomes greater as the height h increases.

It is obvious from FIG. 63 that $C_{2-1}(h,\theta+180)-C_{2-1}(h,\theta)$ is positive for each of the heights h of 10 mm, 15 mm, 20 mm and 25 mm within the range of 30≦θ≦150. Accordingly, the spectacle lens according to the seventh example satisfies the condition (1).

Figure 64A:
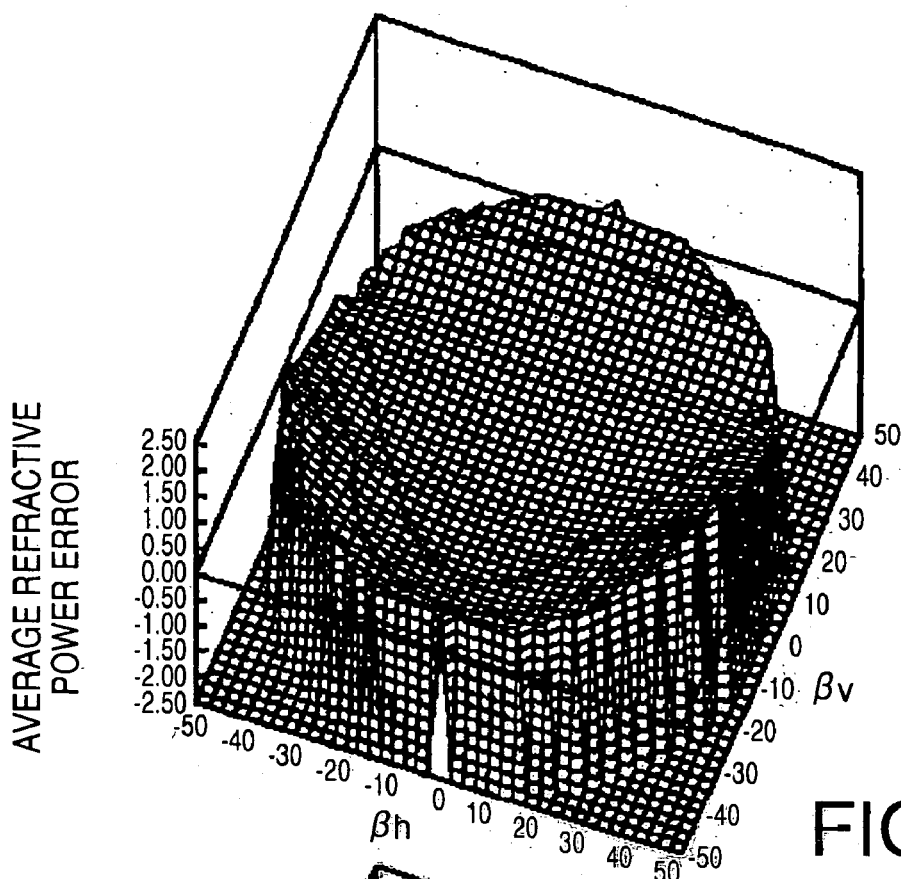
FIG. 64A is a three dimensional graph illustrating an average refractive power error of the spectacle lens of the seventh example.
Figure 64B:
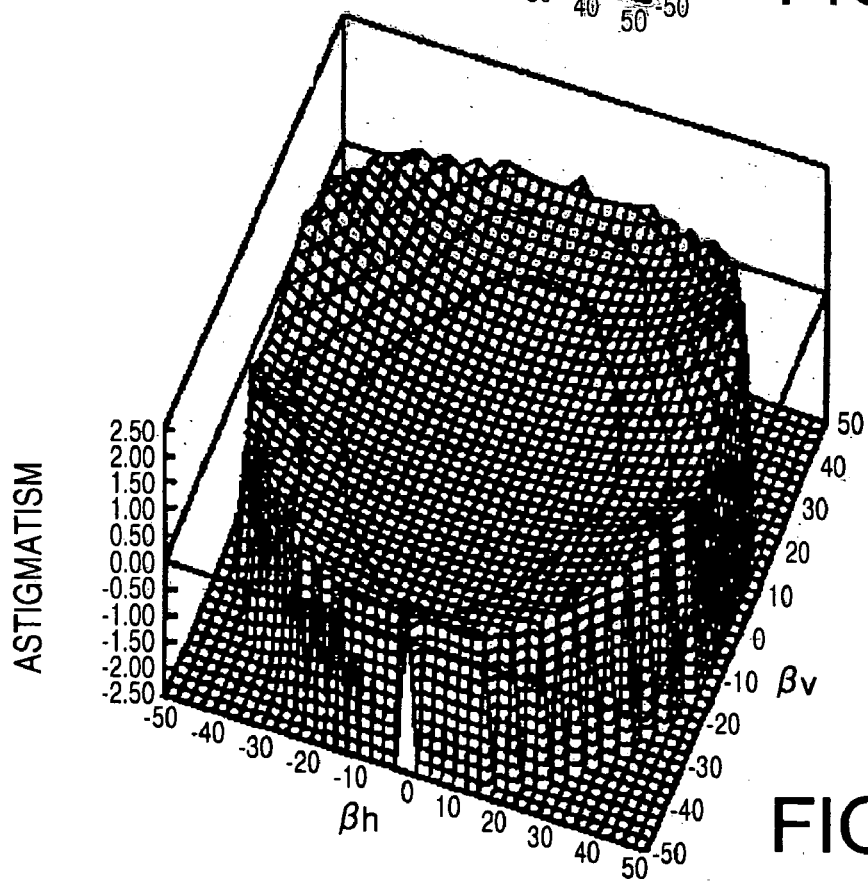
FIG. 64B is a three dimensional graph illustrating astigmatism of the spectacle lens of the seventh example.

FIGS. 64A and 64B represent optical performance of the spectacle lens of the seventh example. FIGS. 64A and 64B are three dimensional graphs of the average refractive power error and the astigmatism, respectively.

EIGHTH EXAMPLE

A spectacle lens according to an eighth example will be described below using numerical references shown in FIG. 1. The spectacle lens according to the eighth example is a minus lens that is prescribed cylindrical power. Specifications of the spectacle lens of the eighth example are indicated in Table 11. The outer surface 2 is a rotationally-symmetrical aspherical surface, and the inner surface 3 is a rotationally-asymmetrical aspherical surface.

TABLE 11

| | |
|---|---|
| SPHERICAL POWER SPH | −8.00[D] |
| CYLINDRICAL POWER CYL | −4.00[D] |
| ASTIGMATIC AXIS AX | 90[°] |
| CURVATURE OF OUTER SURFACE C1 (ROTATIONALLY-SYMMETRICAL | 1.01[D] |

TABLE 11-continued

| | |
|---|---|
| ASPHERICAL SURFACE) CURVATURE OF INNER SURFACE C2 (ROTATIONALLY-ASYMMETRICAL ASPHERICAL SURFACE) | 13.04~19.05[D] |
| CENTRAL THICKNESS | 1.10[mm] |

FIG. 65A is a list showing a distribution of the curvature $C_1(h,\theta)$ which is obtained on the outer surface 2 at each point having the polar coordinate $(h,\theta)$. FIG. 65B is a list showing a distribution of the curvature $C_2(h,\theta)$ which is obtained on the inner surface 3 at each point having the polar coordinate $(h,\theta)$.

Figure 66A:
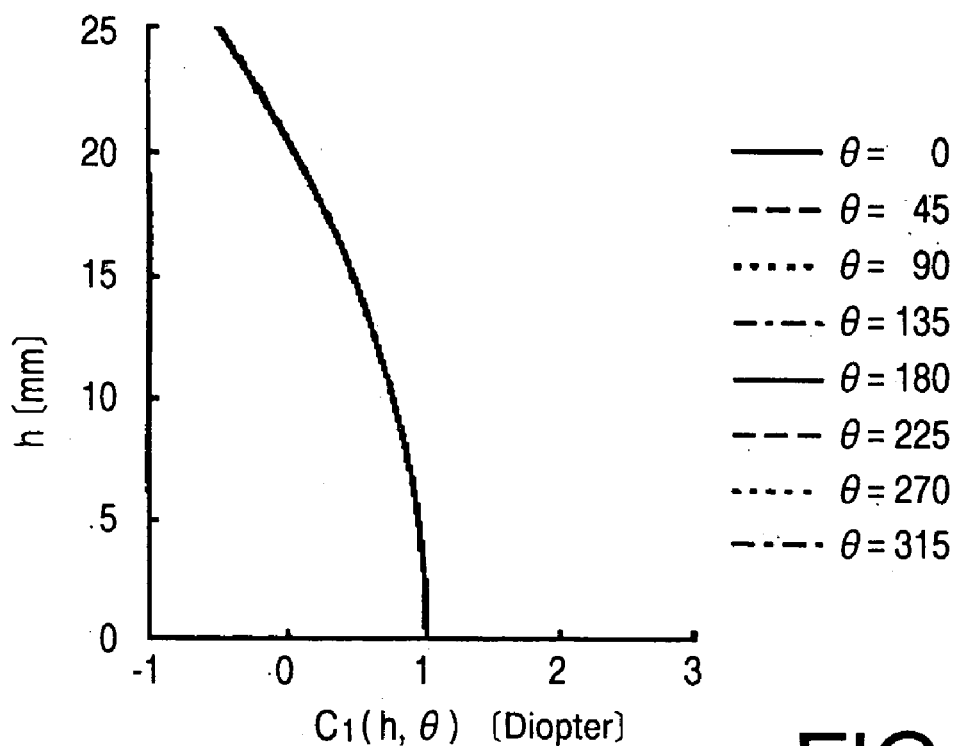
FIG. 66A is a graph illustrating change of the curvature $C_1(h,\theta)$ of the eighth example for each of angles $\theta$ with respect to change of a height h.
Figure 66B:
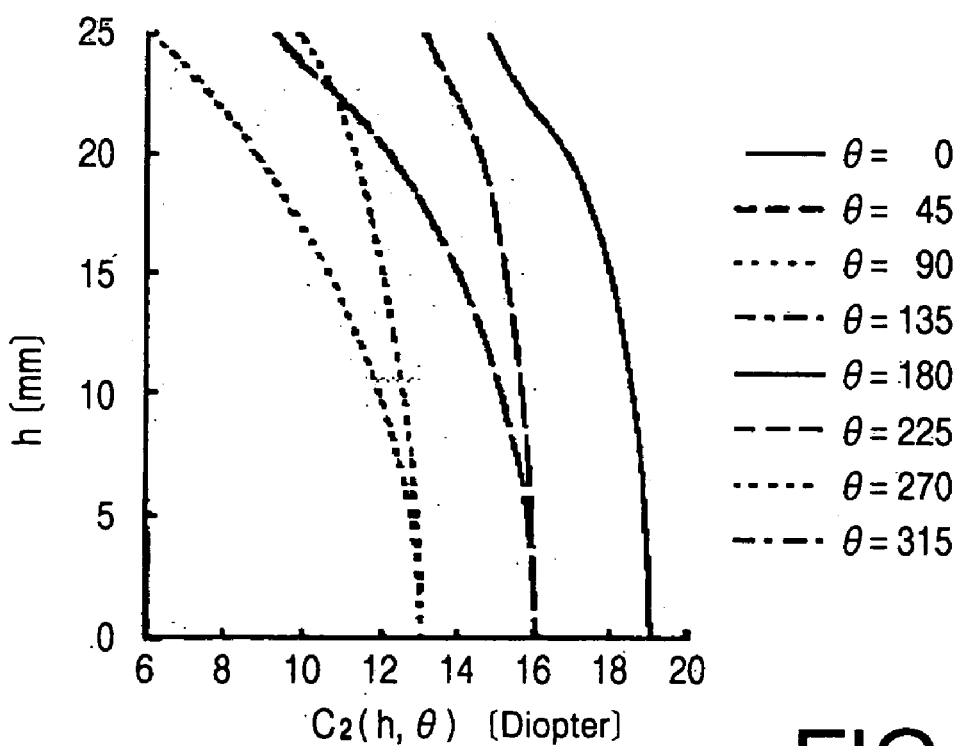
FIG. 66B is a graph illustrating change of the curvature $C_2(h,\theta)$ of the eighth example for each of angles $\theta$ with respect to change of a height h.

FIGS. 66A and 66B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h. Since the outer surface 2 is rotationally symmetrical, the change of the curvature $C_1(h,\theta)$ is represented by a curve on which all of the changes of the curvature $C_1(h,\theta)$ at different angles θ are overlapping one another in FIG. 66A.

In FIG. 66B, curves of the angles θ of 0° and 180° indicated by solid lines are overlapping one another at high values of the curvature. On the left side of the curve of the angle θ of 0° (180°) on FIG. 66B, a curve on which the changes of the curvatures of the angles θ of 225° and 315° are overlapping, a curve on which the changes of the curvatures of the angles θ of 45° and 135° are overlapping, a curve of the angles θ of 270° and a curve of the angles θ of 90° are indicated in order of the decreasing amount of the curvature.

Figure 67A:
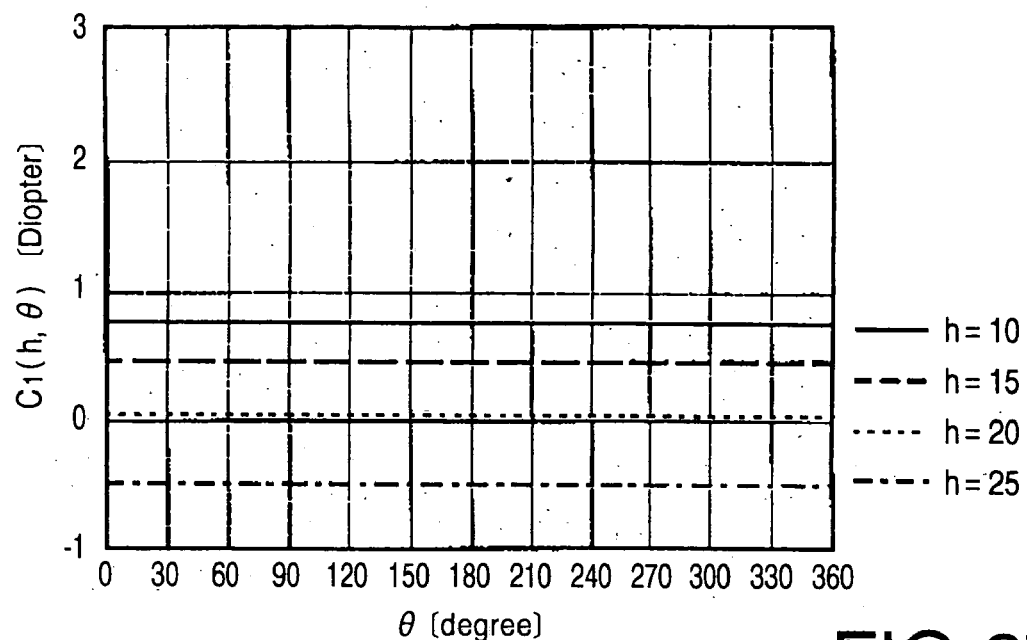
FIG. 67A is a graph illustrating change of the curvature $C_1(h,\theta)$ of the eighth example for each of the heights h with respect to change of the angle $\theta$.
Figure 67B:
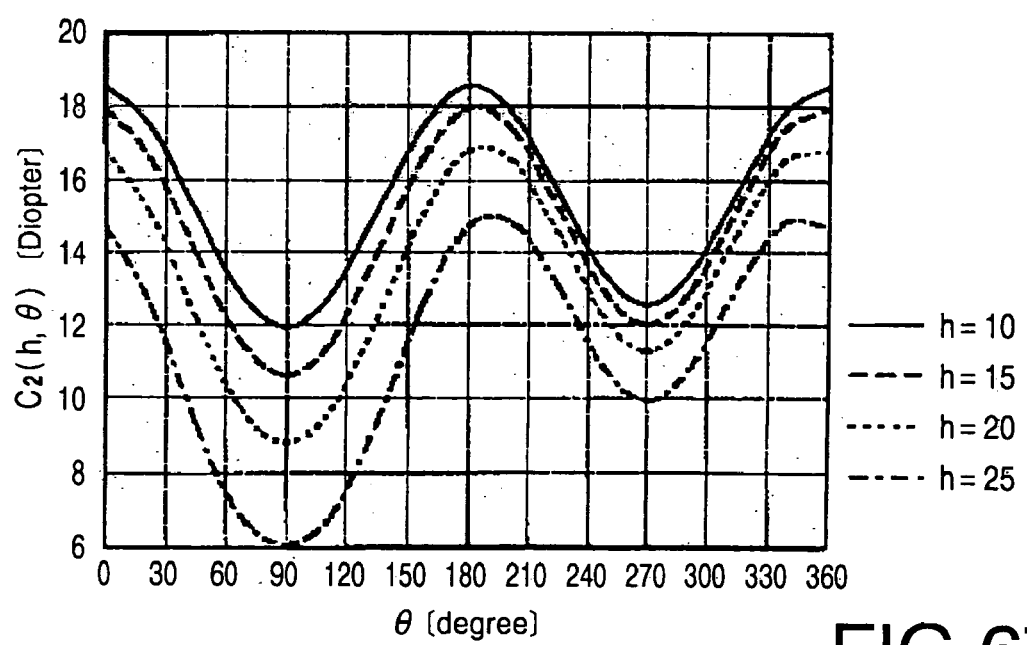
FIG. 67B is a graph illustrating change of the curvature $C_2(h,\theta)$ of the eighth example for each of the heights h with respect to change of the angle $\theta$.

FIGS. 67A and 67B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ. Since the outer surface 2 is rotationally symmetrical, the change of the curvature $C_1(h,\theta)$ for all of the heights h of 10 mm, 15 mm, 20 mm and 25 mm is represented by a linear line. That is, the curvature $C_1(h,\theta)$ does not change with respect to the change of the angle θ. Also, the curvature $C_1(h,\theta)$ becomes greater as the height h increases.

As shown in FIG. 67B, for all of the curves of the heights of 10 mm, 15 mm, 20 mm and 25 mm, the curvature $C_2(h,\theta)$ takes a local minimal value at the angle θ of 90° (i.e., in the upper portion) and takes a local minimal value at the angle θ of 270° (i.e., in the lower portion). The local minimal value at the angle θ of 90° is smaller than the local minimal value at the angle θ of 270°.

Figure 68A:
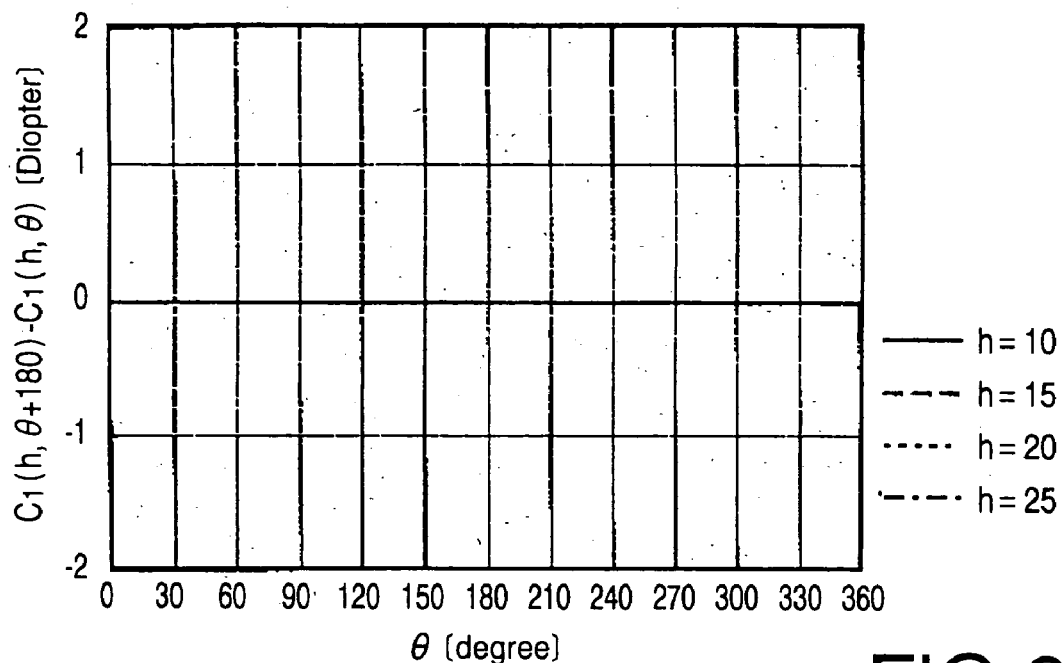
FIG. 68A is a graph illustrating change of a value of $C_1(h,\theta+180)-C_1(h,\theta)$ of the eighth example for each of the heights h with respect to the change of the angle $\theta$.
Figure 68B:
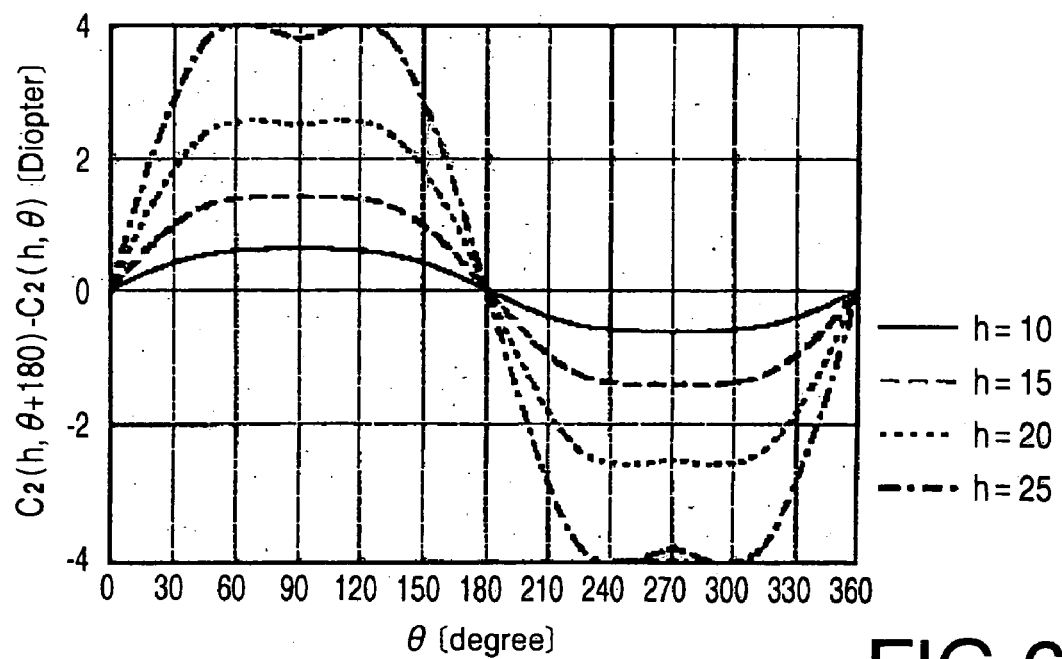
FIG. 68B is a graph illustrating change of a value of $C_2(h,\theta+180)-C_2(h,\theta)$ of the eighth example for each of the heights h with respect to the change of the angle $\theta$.

FIGS. 68A and 68B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle θ.

The outer surface 2 is rotationally symmetrical. Therefore, a difference of curvature at symmetrical points on the surface is zero, and therefore the change of the value of $C_1(h,\theta+180)-C_1(h,\theta)$ is represented by a linear line on which all of the changes of the values $C_1(h,\theta+180)-C_1(h,\theta)$ at different heights h are overlapping one another in FIG. 68A.

As shown in FIG. 68B, for all of curves of the heights h of 10 mm, 15 mm, 20 mm and 25 mm, the value of $C_2(h,\theta+180)-C_2(h,\theta)$ takes the maximum value within the range of θ=45°~135° (i.e., in the upper portion) and takes the minimum value within the range of θ=225°~315° (i.e., in the lower portion). Further, as shown in FIG. 62B, the amplitude of the curve of $C_2(h,\theta+180)-C_2(h,\theta)$ becomes greater as the height h increases. It is obvious from FIG. 68B that $C_2(h,\theta+180)-C_2(h,\theta)$ is positive for each of the heights h of 10 mm, 15 mm, 20 mm and 25 mm within the range of 30≦θ≦150. Accordingly, the spectacle lens according to the eighth example satisfies the condition (3).

Figure 69:
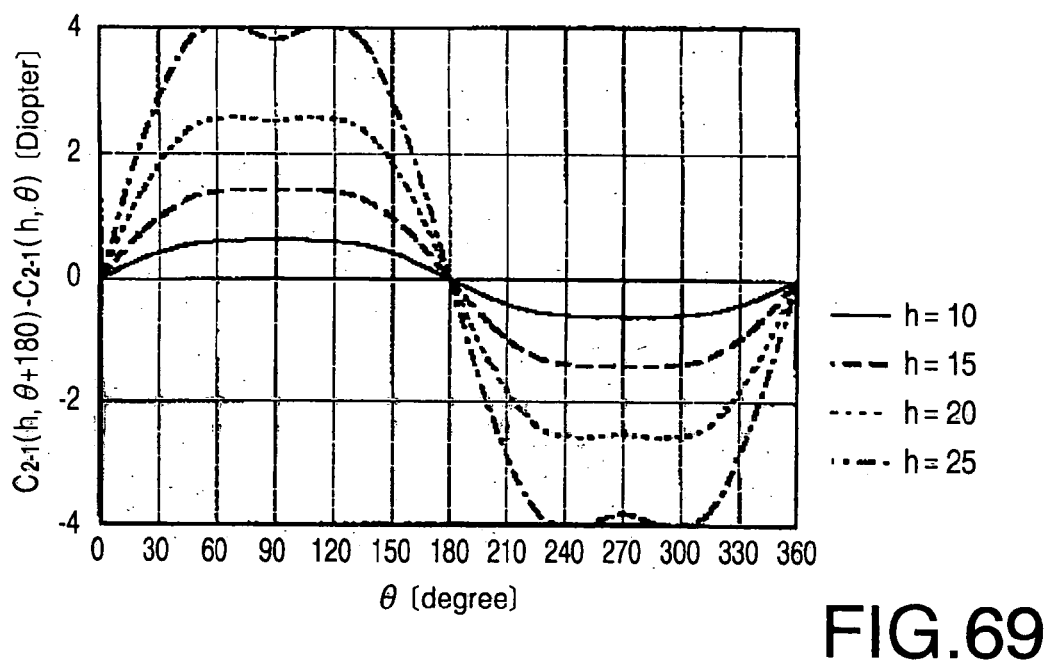
FIG. 69 is a graph illustrating change of a value of $C_{2\text{-}1}(h,\theta+180)-C_{2\text{-}1}(h,\theta)$ of the eighth example for each of the heights h with respect to the change of the angle $\theta$.

FIG. 69 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle θ. As shown in FIG. 69, for all of the curves of the heights h of 10 mm, 15 mm, 20 mm and 25 mm, the value of $C_{2-1}(h,\theta+180)-C_{2-1}(h,\theta)$ takes the maximum value within the range of θ=45°~135° (i.e., in the upper portion) and takes the minimum value within the range of θ=225°~315° (i.e., in the lower portion). Further, as shown in FIG. 69, the amplitude of the curve of the value of $C_{2-1}(h,\theta+180)-C_{2-1}(h,\theta)$ becomes greater as the height h increases.

It is obvious from FIG. 69 that $C_{2-1}(h,\theta+180)-C_{2-1}(h,\theta)$ is positive for each of the heights h of 10 mm, 15 mm, 20 mm and 25 mm within the range of 30≦θ≦150. Accordingly, the spectacle lens according to the eighth example satisfies the condition (1).

Figure 70A:
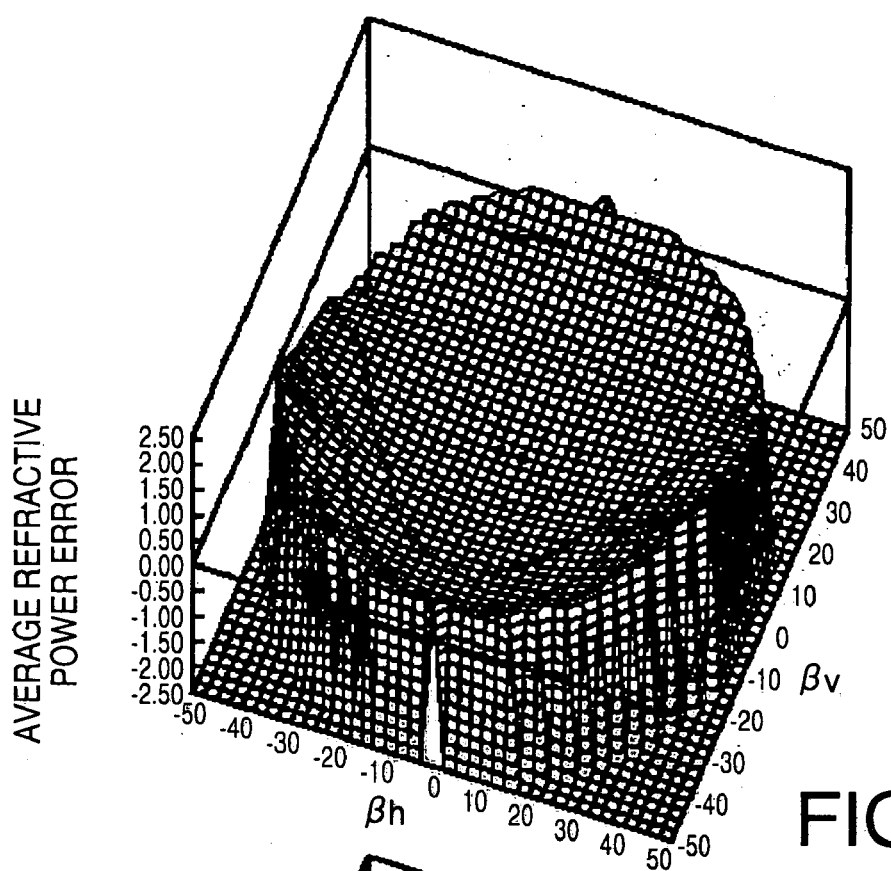
FIG. 70A is a three dimensional graph illustrating an average refractive power error of the spectacle lens of the eighth example.
Figure 70B:
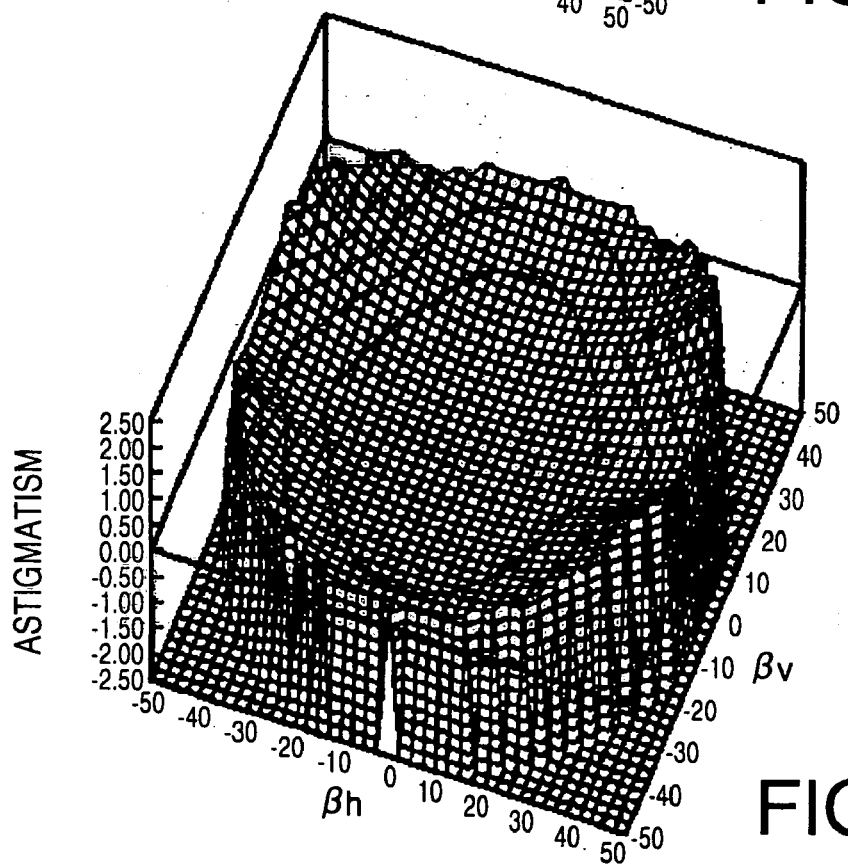
FIG. 70B is a three dimensional graph illustrating astigmatism of the spectacle lens of the eighth example.

FIGS. 70A and 70B represent optical performance of the spectacle lens of the eighth example. FIGS. 70A and 70B are three dimensional graphs of the average refractive power error and the astigmatism, respectively.

FOURTH COMPARATIVE EXAMPLE

A spectacle lens according to a fourth comparative example will be described below using numerical references shown in FIG. 2. The spectacle lens of the fourth comparative example has the same spherical power, cylindrical power and the center thickness as those of the seventh and the eighth examples. Specifications of the spectacle lens of the fourth comparative example are indicated in Table 12. As shown in Table 12, the inner surface 13 is a toric surface having a curvature shown in Table 12, and the outer surface 12 is a rotationally-symmetrical aspherical surface.

TABLE 12

| | |
|---|---|
| SPHERICAL POWER SPH | −8.00[D] |
| CYLINDRICAL POWER CYL | −4.00[D] |
| ASTIGMATIC AXIS AX | 90[°] |
| CURVATURE OF OUTER SURFACE C1 (ROTATIONALLY-SYMMETRICAL ASPHERICAL SURFACE) | 1.01[D] |
| CURVATURE OF INNER SURFACE C2 (TORIC SURFACE) | 13.04~19.05[D] |
| CENTRAL THICKNESS | 1.10[mm] |

FIG. 71A is a list showing a distribution of the curvature $C_1(h,\theta)$ which is obtained on the outer surface 12 at each point having the polar coordinate $(h,\theta)$. FIG. 71B is a list showing a distribution of the curvature $C_2(h,\theta)$ which is obtained on the inner surface 13 at each point having the polar coordinate $(h,\theta)$.

Figure 72A:
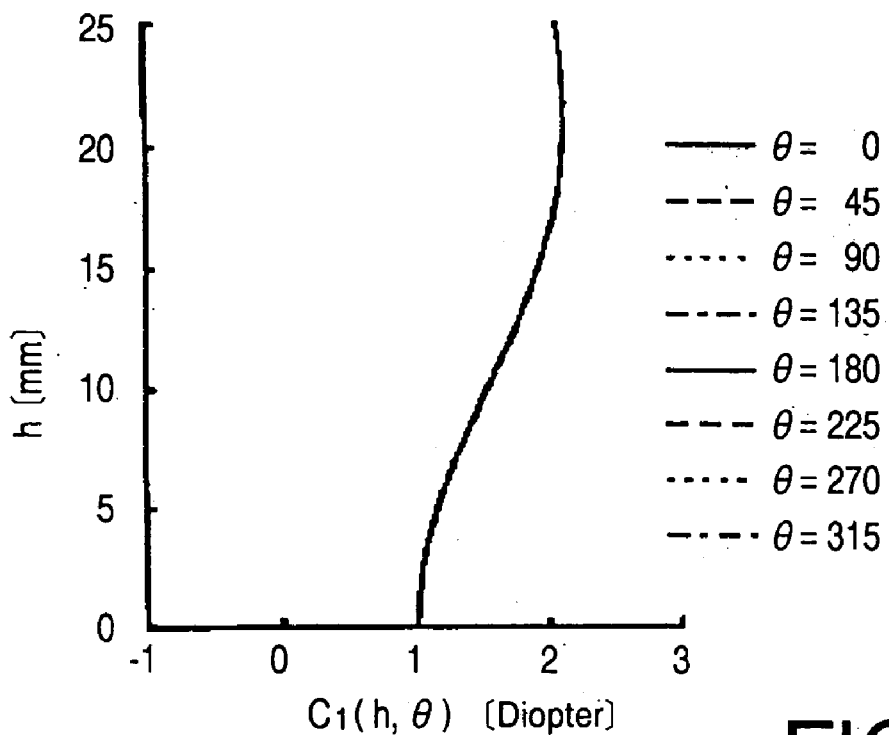
FIG. 72A is a graph illustrating change of the curvature $C_1(h,\theta)$ of the fourth comparative example for each of angles $\theta$ with respect to change of a height h.
Figure 72B:
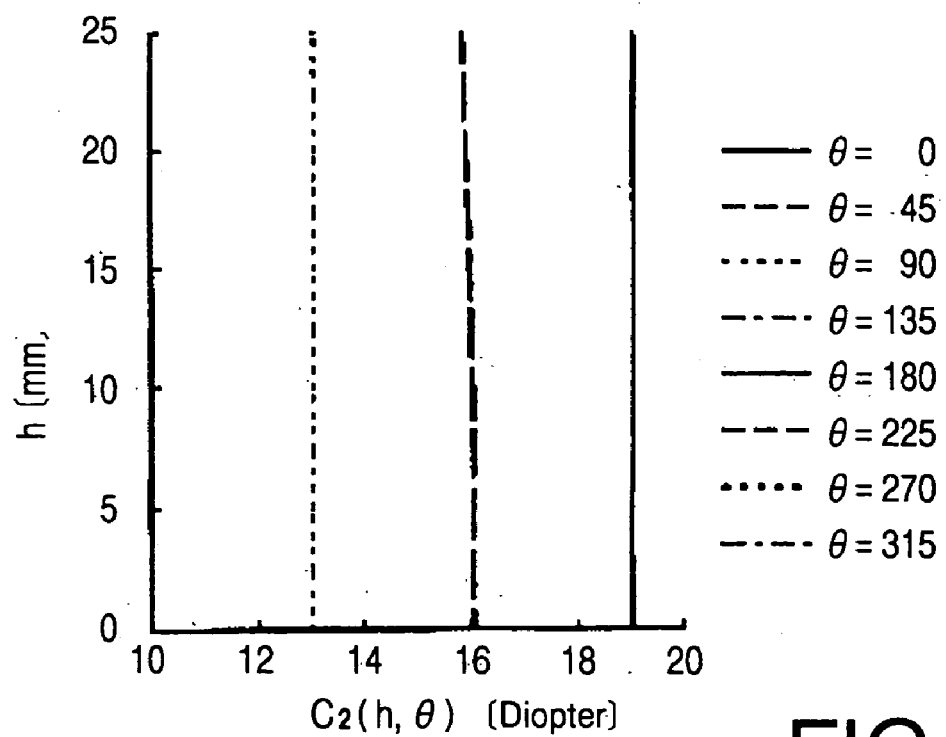
FIG. 72B is a graph illustrating change of the curvature $C_2(h,\theta)$ of the fourth comparative example for each of angles $\theta$ with respect to change of a height h.

FIGS. 72A and 72B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles θ are overlapping one another on the curve shown in FIG. 72A.

Since the inner surface 13 is the toric surface, a linear line (a solid line) on which the changes of the curvatures $C_2(h,\theta)$ of the angles $\theta$ of 0° and 180° are overlapping, a linear line on which the changes of the curvatures $C_2(h,\theta)$ of the angles $\theta$ of 45°, 135°, 225° and 315° are overlapping, and a linear line on which the changes of the curvatures $C_2(h,\theta)$ of the angles $\theta$ of 90° and 270° are overlapping are indicated in order of the decreasing amount of the curvature.

Figure 73A:
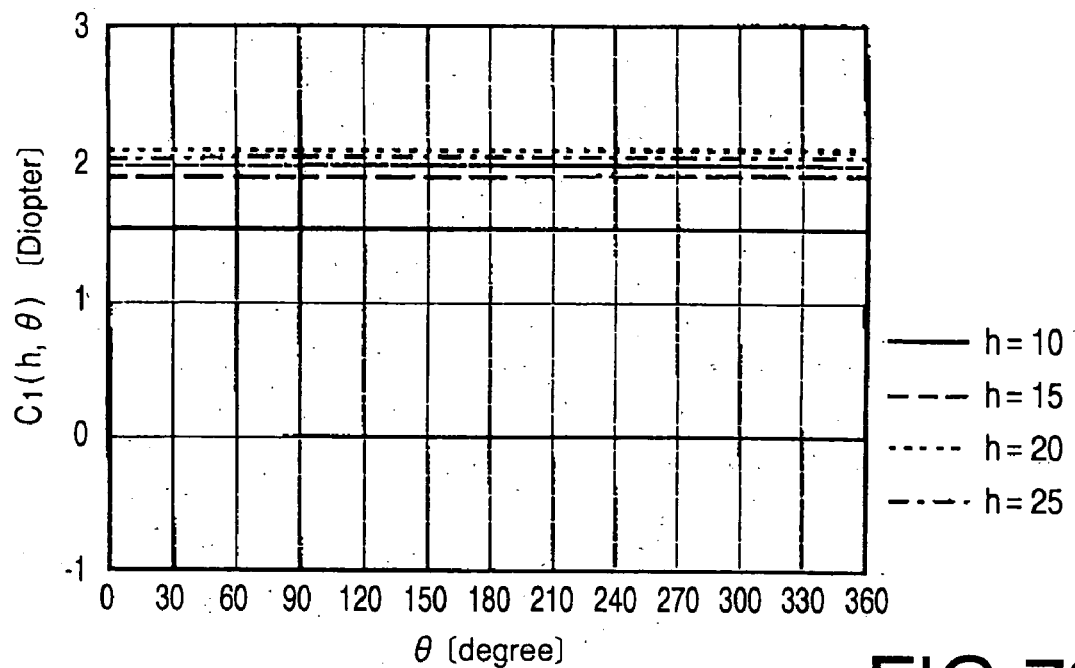
FIG. 73A is a graph illustrating change of the curvature $C_1(h,\theta)$ of the fourth comparative example for each of the heights h with respect to change of the angle $\theta$.
Figure 73B:
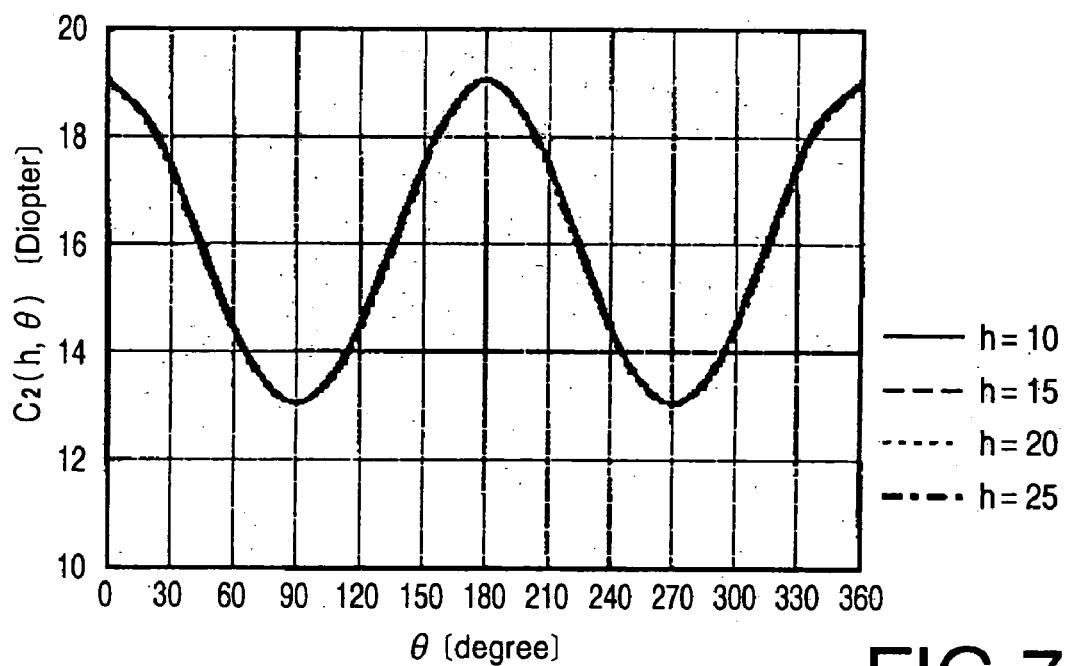
FIG. 73B is a graph illustrating change of the curvature $C_2(h,\theta)$ of the fourth comparative example for each of the heights h with respect to change of the angle $\theta$.

FIGS. 73A and 73B are graphs respectively illustrating the changes of the curvatures $C_1(h,\theta)$ and $C_2(h,\theta)$ for each of the heights h of 10 mm, 15 mm, 20 mm and 25 mm with respect to the change of the angle $\theta$.

Since the curvature $C_1(h,\theta)$ does not change with respect to the change of the angle $\theta$, the curvature $C_1(h,\theta)$ is represented by a linear line for each of the heights of 10 mm, 15 mm, 20 mm and 25 mm in FIG. 73A. Also, the curvature $C_1(h,\theta)$ becomes greater as the height h increases. As shown in FIG. 73B, since the inner surface 13 is the toric surface, the change of the curvature $C_2(h,\theta)$ is represented by a curve like a sine wave on which all of the changes of the curvature $C_2(h,\theta)$ at different heights h are overlapping one another.

Figure 74A:
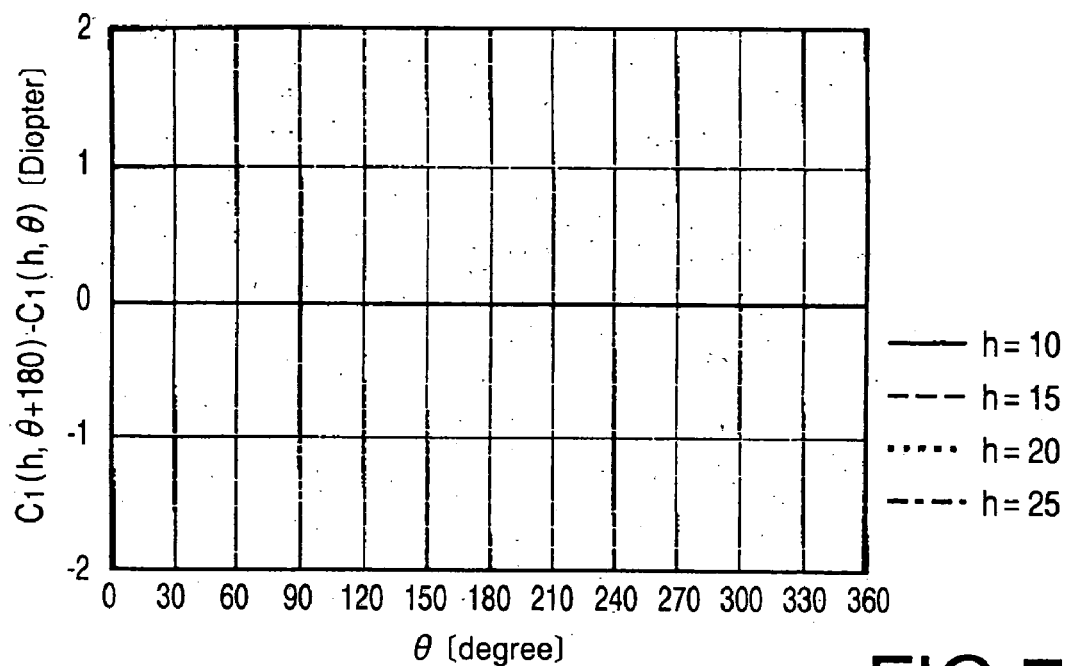
FIG. 74A is a graph illustrating change of a value of $C_1(h,\theta+180)-C_1(h,\theta)$ of the fourth comparative example for each of the heights h with respect to the change of the angle $\theta$.
Figure 74B:
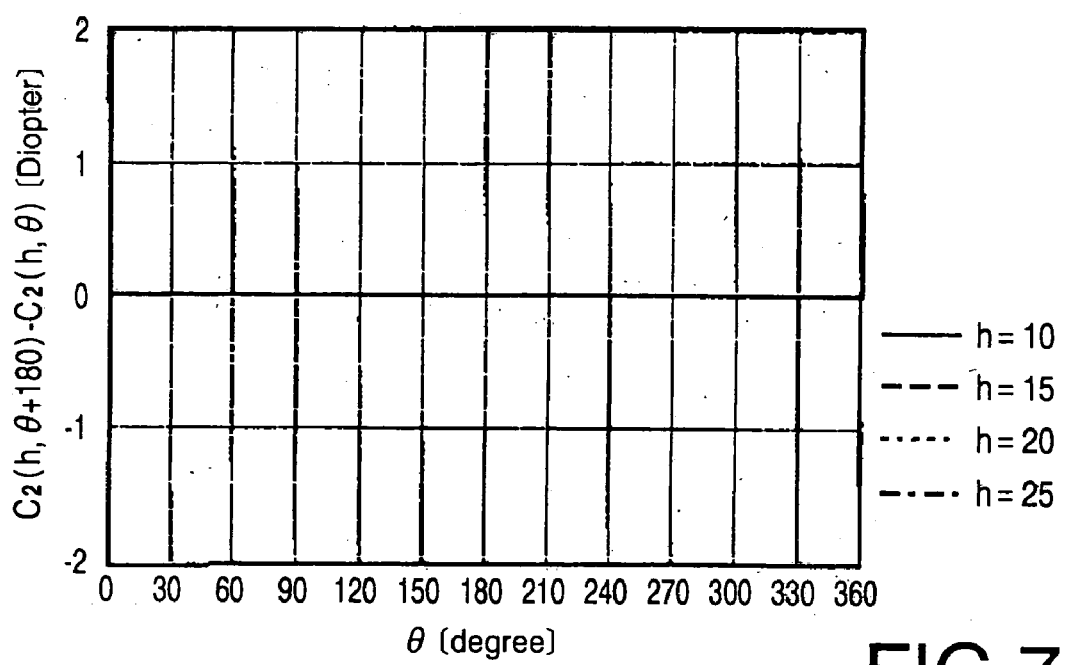
FIG. 74B is a graph illustrating change of a value of $C_2(h,\theta+180)-C_2(h,\theta)$ of the fourth comparative example for each of the heights h with respect to the change of the angle $\theta$.
Figure 75:
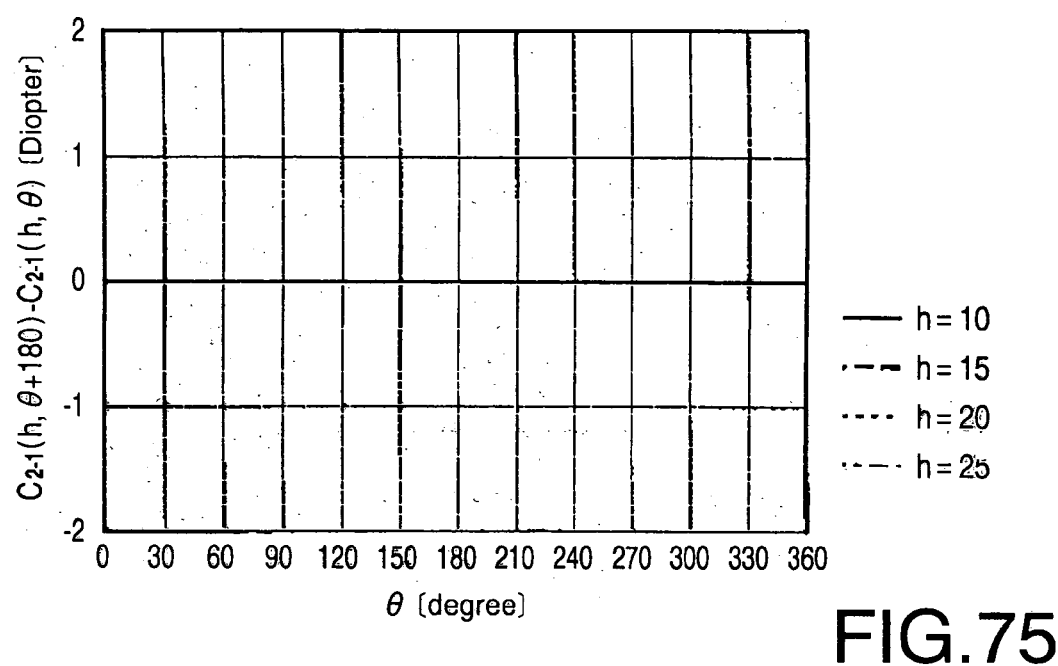
FIG. 75 is a graph illustrating change of a value Of $C_{2\text{-}1}(h,\theta+180)-C_{2\text{-}1}(h,\theta)$ of the fourth comparative example for each of the heights h with respect to the change of the angle $\theta$.

FIGS. 74A and 74B are graphs respectively illustrating the changes of the value of $C_1(h,\theta+180)-C_1(h,\theta)$ of the condition (5) and the value of $C_2(h,\theta+180)-C_2(h,\theta)$ of the condition (3) for each of the heights h of 10 mm, 15 mm, 20 mm and 25 mm with respect to the change of the angle $\theta$. FIG. 75 is a graph illustrating the change of the value of $C_{2-1}(h,\theta+180)-C_{2-1}(h,\theta)$ of the condition (1) for each of the heights h of 10 mm, 15 mm, 20 mm and 25 mm with respect to the change of the angle $\theta$.

Since the outer surface is rotationally symmetrical and the inner surface is the toric surface which is symmetrical with respect to the optical axis thereof, the value of $C_1(h,\theta+180)-C_1(h,\theta)$ of the condition (5), the value of $C_2(h,\theta+180)-C_2(h,\theta)$ the condition (3) and the value of $C_{2-1}(h,\theta+180)-C_{2-1}(h,\theta)$ of the condition (1) take a constant value of zero regardless of the height h and the angle $\theta$. Accordingly, the fourth comparative example does not satisfy the conditions (1), (3) and (5).

Figure 76A:
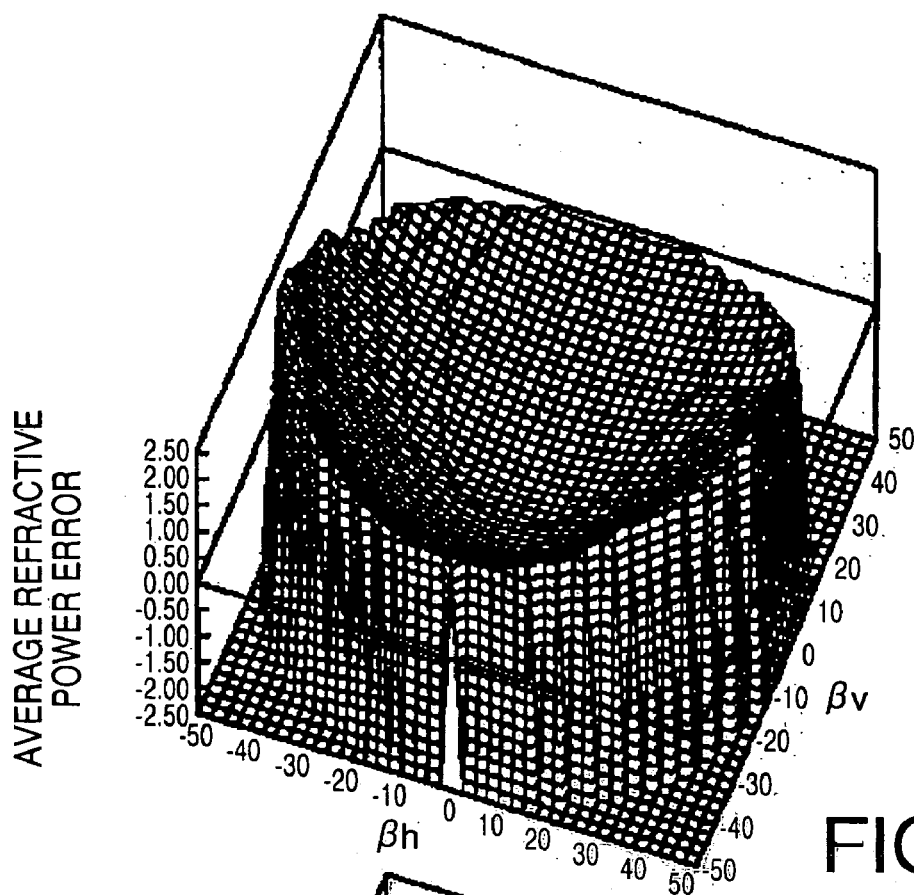
FIG. 76A is a three dimensional graph illustrating an average refractive power error of the spectacle lens of the fourth comparative example.
Figure 76B:
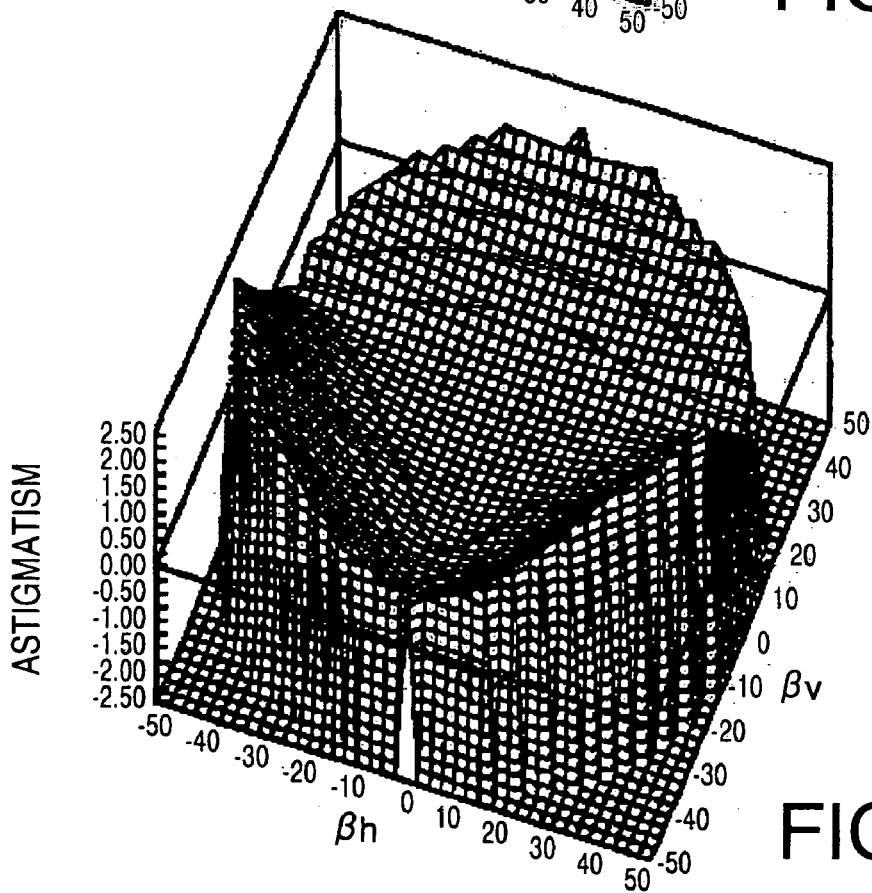
FIG. 76B is a three dimensional graph illustrating astigmatism of the spectacle lens of the fourth comparative example.

FIGS. 76A and 76B represent optical performance of the spectacle lens of the fourth comparative example. FIGS. 76A and 76B are three dimensional graphs of the average refractive power error and the astigmatism, respectively. By comparing FIG. 76A with FIGS. 64A and 70A and comparing FIG. 76B with FIGS. 64B and 70B, it is understood that the aberrations are sufficiently corrected in each of the seventh and the eighth examples.

NINTH EXAMPLE

A spectacle lens according to a ninth example will be described below using numerical references shown in FIG. 1. The spectacle lens according to the ninth example is a plus lens that is not prescribed cylindrical power. Specifications of the spectacle lens of the ninth example are indicated in Table 13. As shown in Table 13, the outer surface 2 is a spherical surface having a curvature shown in Table 13, the inner surface 3 is a rotationally-asymmetrical aspherical surface.

TABLE 13

| | |
|---|---|
| SPHERICAL POWER SPH | 4.00[D] |
| CURVATURE OF OUTER SURFACE C1 (SPHERICAL SURFACE) | 6.96[D] |
| CURVATURE OF INNER SURFACE C2 (ROTATIONALLY-ASYMMETRICAL ASPHERICAL SURFACE) | 1.02[D] |
| CENTRAL THICKNESS | 3.80[mm] |

TABLE 13-continued

FIG. 77A is a list showing a distribution of the curvature $C_1(h,\theta)$ which is obtained on the outer surface 2 at each point having the polar coordinate (h,$\theta$). Since the outer surface 2 is spherical, the curvatures $C_1(h,\theta)$ at all of the points on the outer surface 2 are the same. FIG. 77B is a list showing a distribution of the curvature $C_2(h,\theta)$ which is obtained on the inner surface 3 at each point having the polar coordinate (h,$\theta$).

Figure 78A:
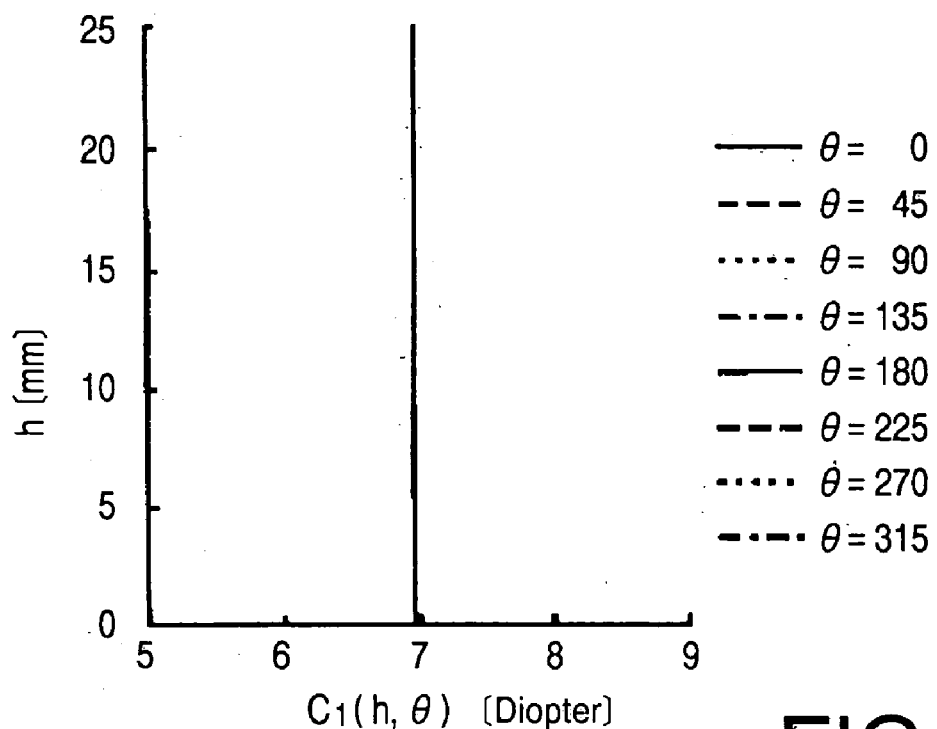
FIG. 78A is a graph illustrating change of the curvature $C_1(h,\theta)$ of the ninth example for each of angles $\theta$ with respect to change of a height h.
Figure 78B:
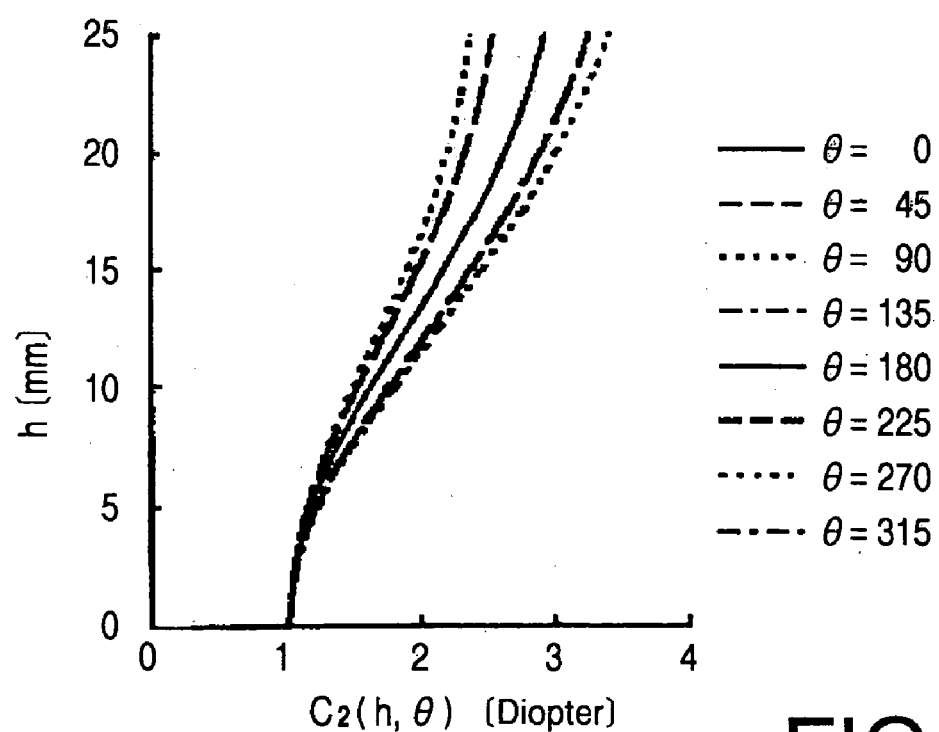
FIG. 78B is a graph illustrating change of the curvature $C_2(h,\theta)$ of the ninth example for each of angles $\theta$ with respect to change of a height h.

FIGS. 78A and 78B are graphs respectively illustrating the changes of the curvatures $C_1(h,\theta)$ and $C_2(h,\theta)$ for each of the angle $\theta$ of 0°, 45°, 90°, 135°, 180°, 225°, 270° and 315° with respect to the change of the height h. Since the outer surface 2 is spherical, the change of the curvature $C_1(h,\theta)$ is represented by a linear line on which all of the changes of the curvature $C_1(h,\theta)$ at different angles $\theta$ are overlapping one another in FIG. 78A.

In FIG. 78B, curves of the angles $\theta$ of 0° and 180° indicated by solid lines are overlapping one another. On the right side of the curve of the angle $\theta$ of 0° (180°) in FIG. 78B, a curve on which the changes of the curvatures of the angles $\theta$ of 45° and 135° are overlapping and a curve of the angles $\theta$ of 90° are indicated in order of the increasing amount of the curvature. On the left side of the curve of the angle $\theta$ of 0° (180°) on FIG. 78B, a curve on which the changes of the curvatures of the angles $\theta$ of 225° and 315° are overlapping and a curve of the angle $\theta$ of 270° are indicated in order of the decreasing amount of the curvature.

Figure 79A:
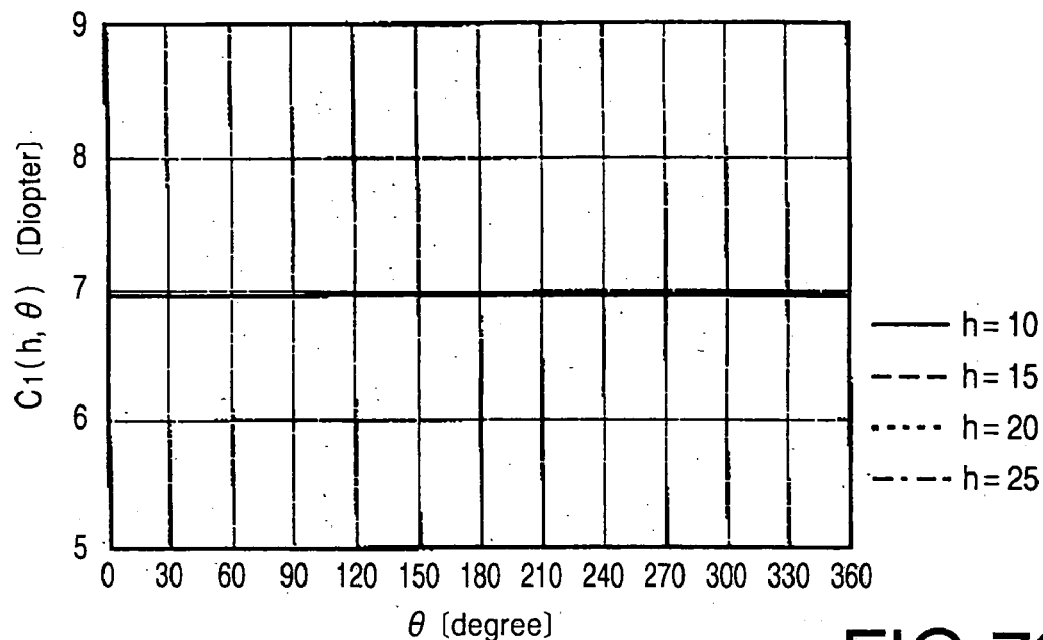
FIG. 79A is a graph illustrating change of the curvature $C_1(h,\theta)$ of the ninth example for each of the heights h with respect to change of the angle $\theta$.
Figure 79B:
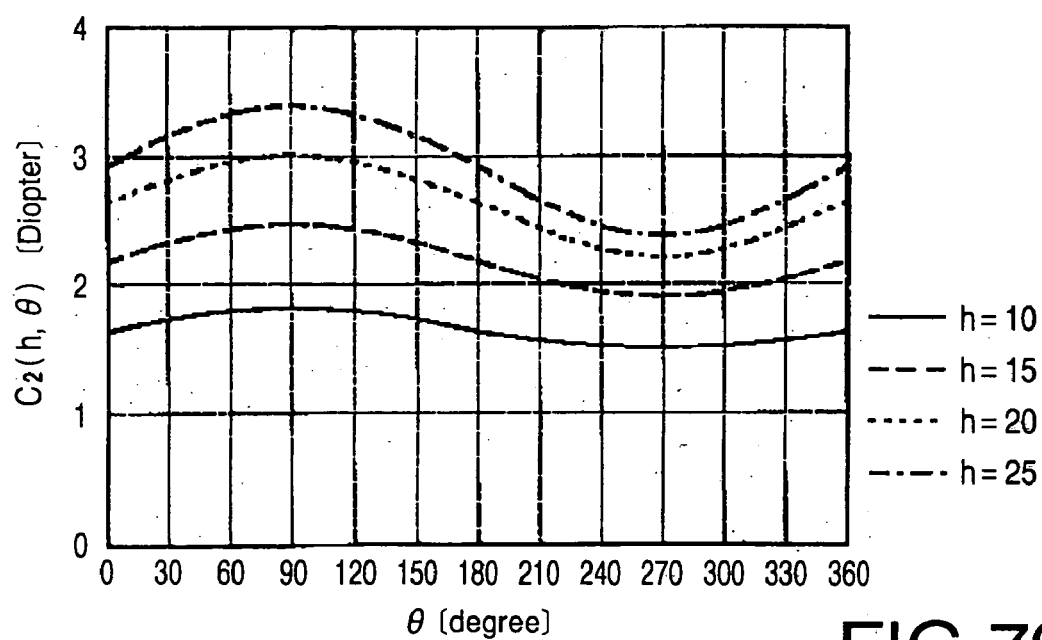
FIG. 79B is a graph illustrating change of the curvature $C_2(h,\theta)$ of the ninth example for each of the heights h with respect to change of the angle $\theta$.

FIGS. 79A and 79B are graphs respectively illustrating the changes of the curvatures $C_1(h,\theta)$ and $C_2(h,\theta)$ for each of the heights h of 10 mm, 15 mm, 20 mm and 25 mm with respect to the change of the angle $\theta$. Since the outer surface 2 is spherical, the change of the curvature $C_1(h,\theta)$ is represented by a linear line on which all of the changes of the curvature $C_1(h,\theta)$ at different heights h are overlapping one another.

As shown in FIG. 79B, for all of the curves of the heights of 10 mm, 15 mm, 20 mm and 25 mm, the curvature $C_2(h,\theta)$ takes the maximum value at the angle $\theta$ of 90° (i.e., in the upper portion) and takes the minimum value at the angle $\theta$ of 270° (i.e., in the lower portion).

Figure 80A:
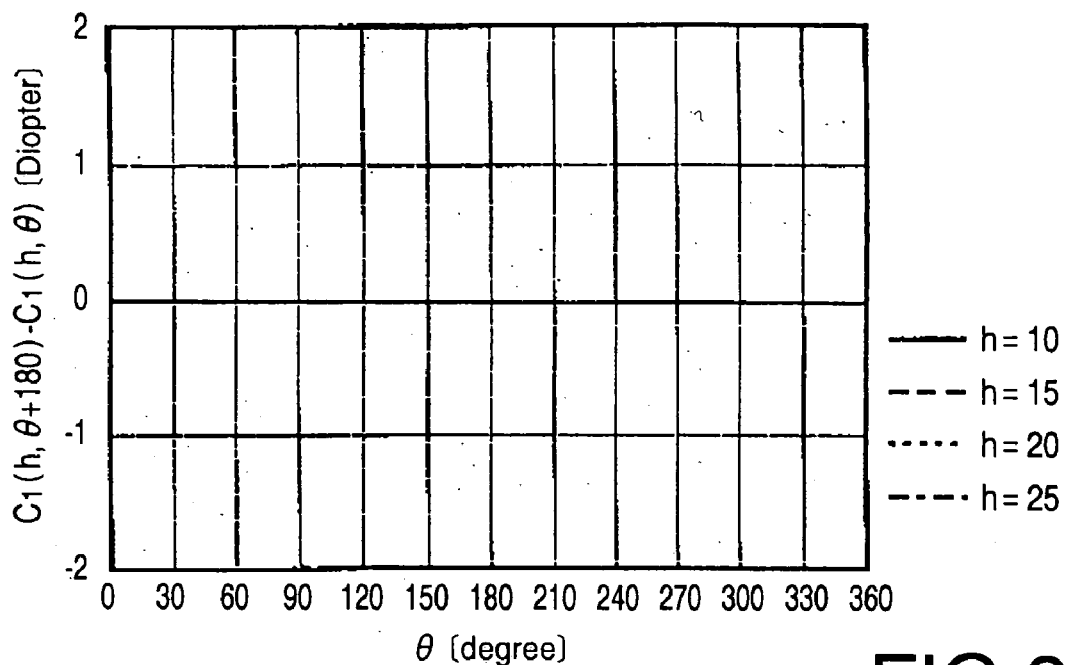
FIG. 80A is a graph illustrating change of a value of $C_1(h,\theta+180)-C_1(h,\theta)$ of the ninth example for each of the heights h with respect to the change of the angle $\theta$.
Figure 80B:
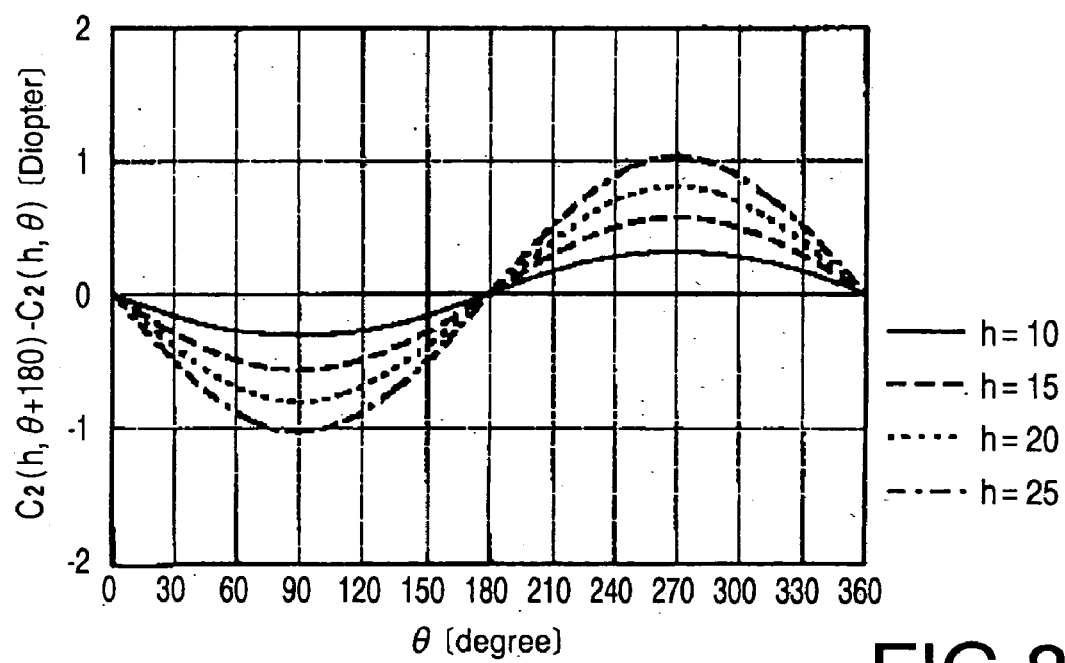
FIG. 80B is a graph illustrating change of a value of $C_2(h,\theta+180)-C_2(h,\theta)$ of the ninth example for each of the heights h with respect to the change of the angle $\theta$.

FIGS. 80A and 80B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle $\theta$.

Since the outer surface 2 is spherical, the change of the value of $C_1(h,\theta+180)-C_1(h,\theta)$ is represented by a linear line on which all of the changes of the values $C_1(h,\theta+180)-C_1(h,\theta)$ at different heights h are overlapping one another on FIG. 80A.

As shown in FIG. 80B, for all of the curves of the heights h of 10 mm, 15 mm, 20 mm and 25 mm, the value of $C_2(h,\theta+180)-C_2(h,\theta)$ takes the minimum value at the angle $\theta$ of 90° (i.e., in the upper portion) and takes the maximum value at the angle $\theta$ of 270° (i.e., in the lower portion).

Further, as shown in FIG. 80B, the amplitude of the change of the value of $C_2(h,\theta+180)-C_2(h,\theta)$ becomes greater as the height h increases. It is obvious from FIG. 80B that $C_2(h,\theta+180)-C_2(h,\theta)$ is negative for each of the heights h of 10 mm, 15 mm, 20 mm and 25 mm within the range of $30 \leq \theta \leq 150$. Accordingly, the spectacle lens according to the ninth example satisfies the condition (4).

Figure 81:
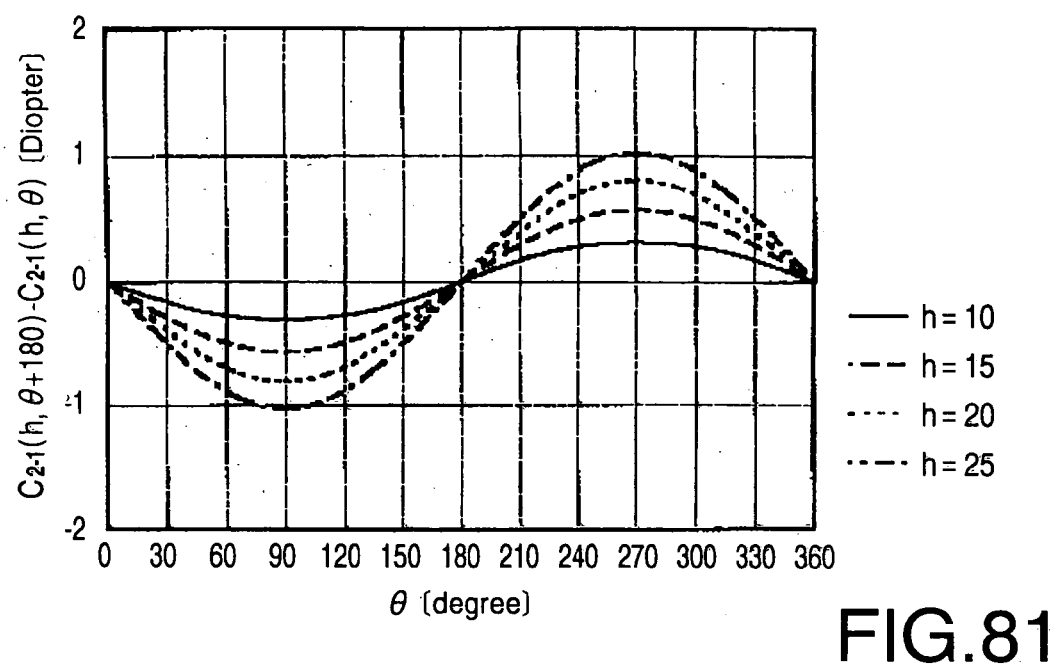
FIG. 81 is a graph illustrating change of a value of $C_{2\text{-}1}(h,\theta+180)-C_{2\text{-}1}(h,\theta)$ of the ninth example for each of the heights h with respect to the change of the angle $\theta$.

FIG. 81 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle $\theta$. As shown in FIG. 81, for all of the curves of the heights h of 10 mm, 15 mm, 20 mm and 25 mm, the value of $C_{2-1}(h,\theta+180)-C_{2-1}(h,\theta)$ takes the minimum value at the angle $\theta$ of 90° (i.e., in the upper portion) and takes the maximum value at the angle $\theta$ of 270° (i.e., in the lower portion).

It is obvious from FIG. 81 that $C_{2-1}(h,\theta+180)-C_{2-1}(h,\theta)$ is negative for each of the heights h of 10 mm, 15 mm, 20 mm and 25 mm within the range of $30 \leq \theta \leq 150$. Accordingly, the spectacle lens according to the ninth example satisfies the condition (2).

Figure 82A:
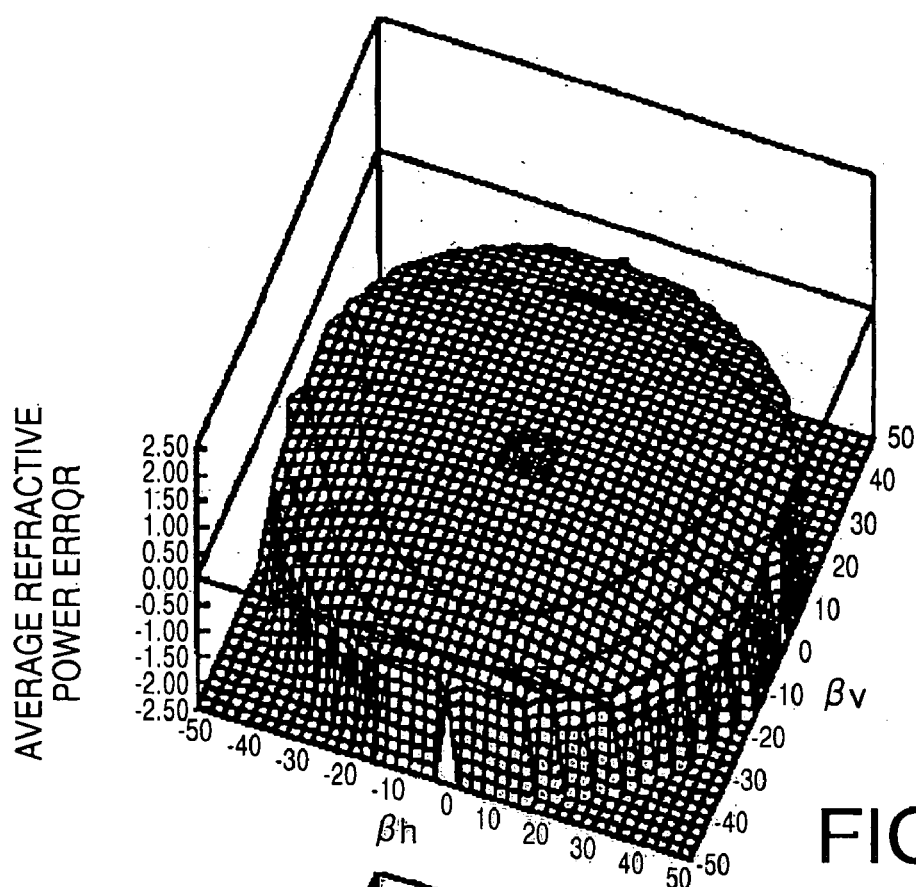
FIG. 82A is a three dimensional graph illustrating an average refractive power error of the spectacle lens of the ninth example.
Figure 82B:
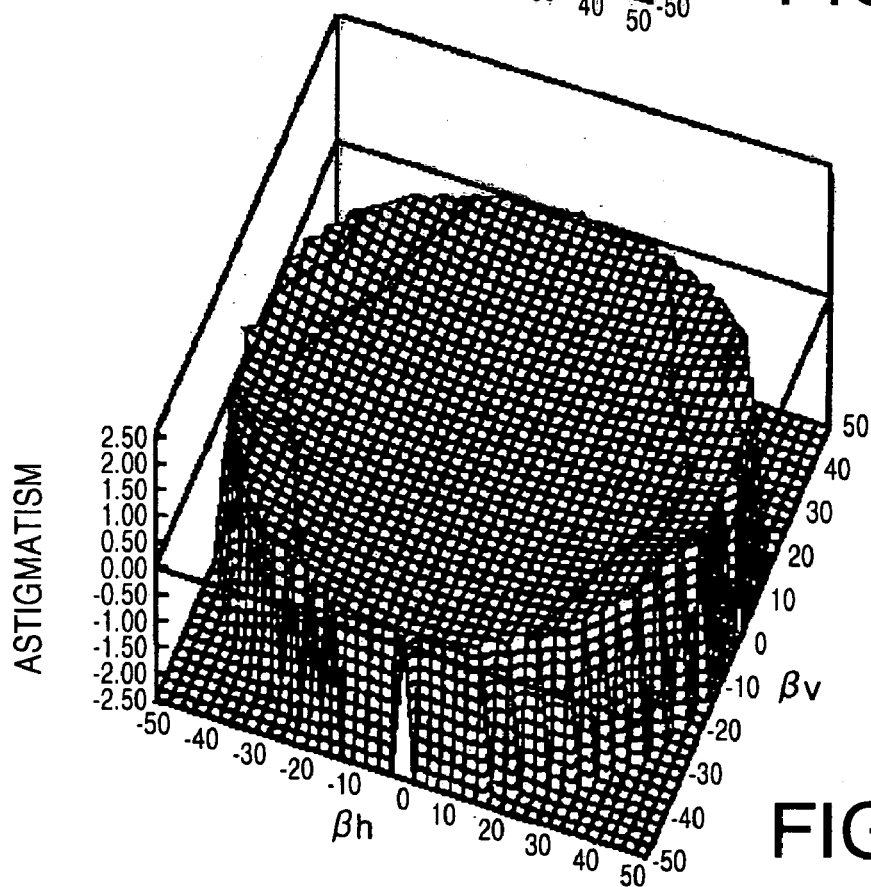
FIG. 82B is a three dimensional graph illustrating astigmatism of the spectacle lens of the ninth example.

FIGS. 82A and 82B represent optical performance of the spectacle lens of the ninth example. FIGS. 82A and 82B are three dimensional graphs of the average refractive power error and the astigmatism, respectively.

TENTH EXAMPLE

A spectacle lens according to a tenth example will be described below using numerical references shown in FIG. 2. The spectacle lens according to the tenth example is a plus lens having the same spherical power as that of the ninth example, and is not prescribed cylindrical power. Specifications of the spectacle lens of the tenth example are indicated in Table 14. The inner surface 13 is a rotationally symmetrical aspherical surface, and the outer surface 12 is a rotationally-asymmetrical aspherical surface.

TABLE 14

| | |
|---|---|
| SPHERICAL POWER SPH | 4.00[D] |
| CURVATURE OF OUTER SURFACE C1 (ROTATIONALLY-ASYMMETRICAL ASPHERICAL SURFACE) | 7.18[D] |
| CURVATURE OF INNER SURFACE C2 (ROTATIONALLY-SYMMETRICAL ASPHERICAL SURFACE) | 1.26[D] |
| CENTRAL THICKNESS | 4.30[mm] |

FIG. 83A is a list showing a distribution of the curvature $C_1(h,\theta)$ which is obtained on the outer surface 12 at each point having the polar coordinate $(h,\theta)$. FIG. 83B is a list showing a distribution of the curvature $C_2(h,\theta)$ which is obtained on the inner surface 13 at each point having the polar coordinate $(h,\theta)$.

Figure 84A:
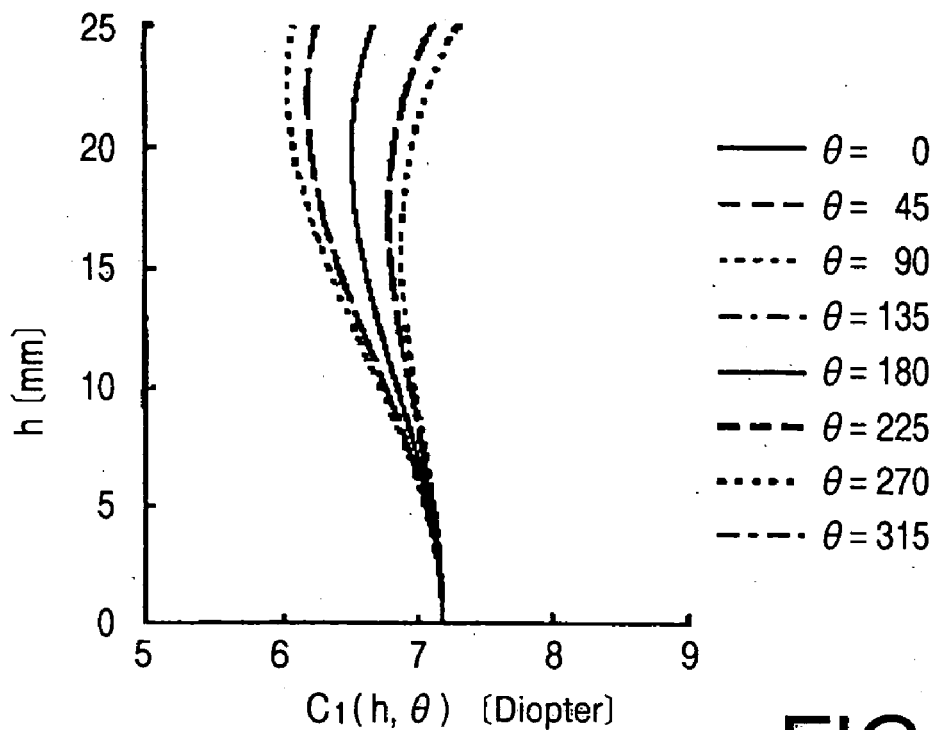
FIG. 84A is a graph illustrating change of the curvature $C_1(h,\theta)$ of the tenth example for each of angles $\theta$ with respect to change of a height h.
Figure 84B:
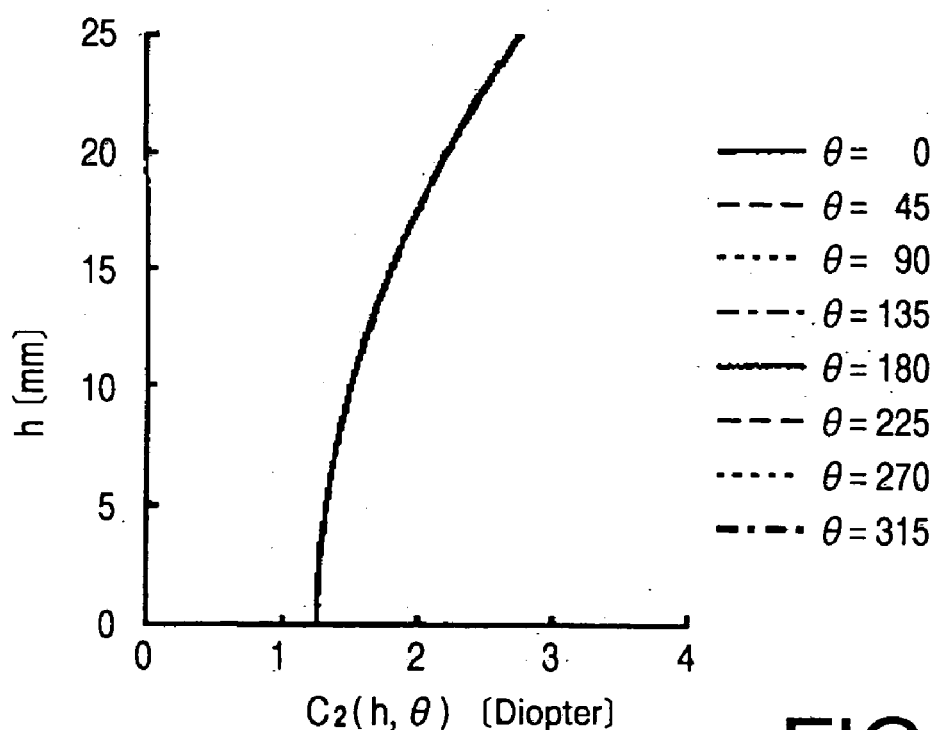
FIG. 84B is a graph illustrating change of the curvature $C_2(h,\theta)$ of the tenth example for each of angles $\theta$ with respect to change of a height h.

FIGS. 84A and 84B are graphs respectively illustrating the changes of the curvatures $C_1(h,\theta)$ and $C_2(h,\theta)$ for each of the angle $\theta$ of 0°, 45°, 90°, 135°, 180°, 225°, 270° and 315° with respect to the change of the height h.

In FIG. 84A, curves of the angles $\theta$ of 0° and 180° indicated by solid lines are overlapping one another. On the left side of the curve of the angle $\theta$ of 0° (180°) on FIG. 84A, a curve on which the changes of the curvatures of the angles $\theta$ of 45° and 135° are overlapping and a curve of the angles $\theta$ of 90° are indicated in order of the decreasing amount of the curvature. On the right side of the curve of the angle $\theta$ of 0° (180°) on FIG. 84A, a curve on which the changes of the curvatures of the angles $\theta$ of 225° and 315° are overlapping and a curve of the angles $\theta$ of 270° are indicated in order of the increasing amount of the curvature.

Since the inner surface 13 is rotationally symmetrical, all of the changes of the curvature $C_2(h,\theta)$ at different angles $\theta$ are overlapping one another on a curve shown in FIG. 84B.

Figure 85A:
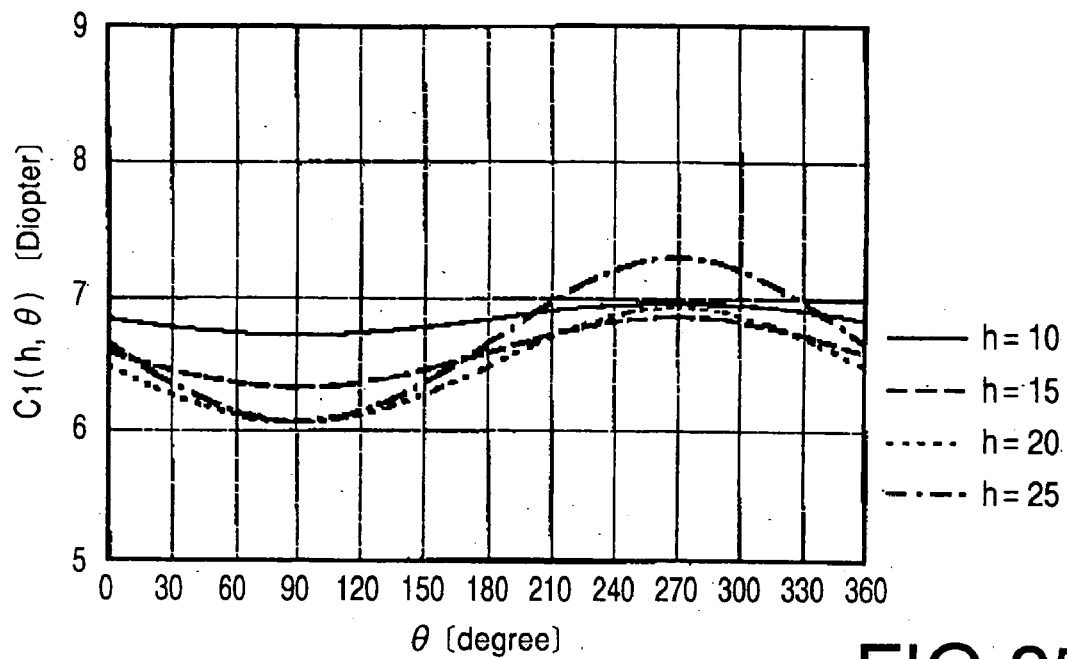
FIG. 85A is a graph illustrating change of the curvature $C_1(h,\theta)$ of the tenth example for each of the heights h with respect to change of the angle $\theta$.
Figure 85B:
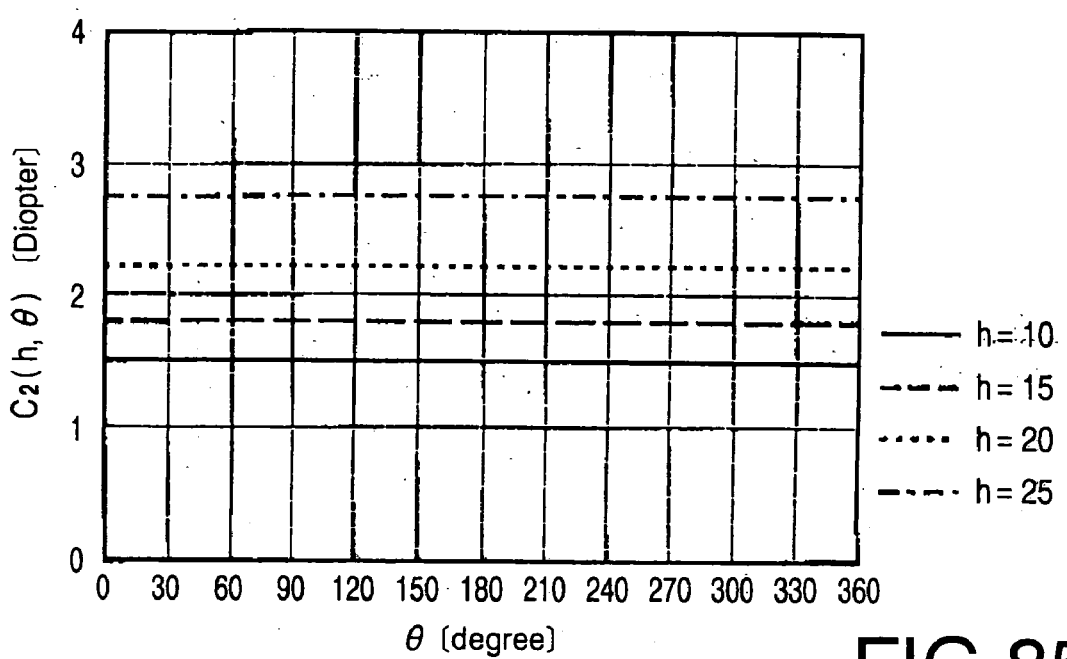
FIG. 85B is a graph illustrating change of the curvature $C_2(h,\theta)$ of the tenth example for each of the heights h with respect to change of the angle $\theta$.

FIGS. 85A and 85B are graphs respectively illustrating the changes of the curvatures $C_1(h,\theta)$ and $C_2(h,\theta)$ for each of the heights h of 1 mm, 15 mm, 20 mm and 25 mm with respect to the change of the angle $\theta$.

As shown in FIG. 85A, for all of curves of the heights of 10 mm, 15 mm, 20 mm and 25 mm, the curvature $C_1(h,\theta)$ takes the minimum value at the angle $\theta$ of 90° (i.e., in the upper portion) and takes the maximum value at the angle $\theta$ of 270° (i.e., in the lower portion).

Since the curvature $C_2(h,\theta)$ does not change with respect to the change of the angle $\theta$, the curvature $C_2(h,\theta)$ is represented by a linear line for each of the heights of 10 mm, 15 mm, 20 mm and 25 mm in FIG. 85B. Further, the curvature $C_2(h,\theta)$ becomes greater as the height h increases.

Figure 86A:
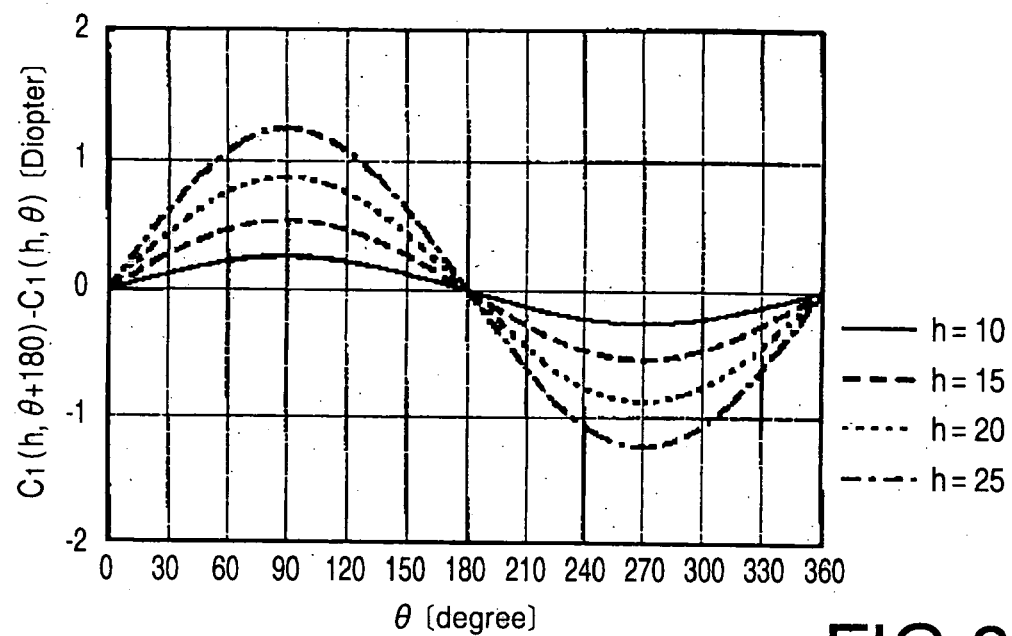
FIG. 86A is a graph illustrating change of a value of $C_1(h,\theta+180)-C_1(h,\theta)$ of the tenth example for each of the heights h with respect to the change of the angle $\theta$.
Figure 86B:
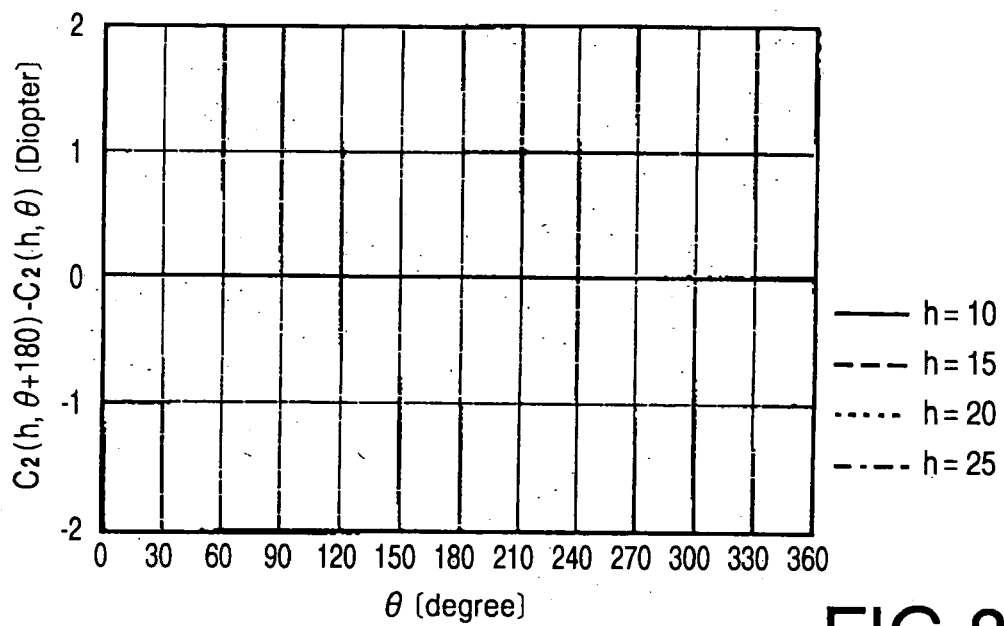
FIG. 86B is a graph illustrating change of a value of $C_2(h,\theta+180)-C_2(h,\theta)$ of the tenth example for each of the heights h with respect to the change of the angle $\theta$.

FIGS. 86A and 86B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle $\theta$.

As shown in FIG. 86A, for all of curves of the heights h of 10 mm, 15 mm, 20 mm and 25 mm, the value of $C_1(h,\theta+180)-C_1(h,\theta)$ takes the maximum value at the angle $\theta$ of 90° (i.e., in the upper portion) and takes the minimum value at the angle $\theta$ of 270° (i.e., in the lower portion).

Further, as shown in FIG. 86A, the amplitude of the curve of $C_1(h,\theta+180)-C_1(h,\theta)$ becomes greater as the height h increases. It is obvious from FIG. 86A that $C_1(h,\theta+180)-C_1(h,\theta)$ is positive for each of the heights h of 10 mm, 15 mm, 20 mm and 25 mm within the range of $30 \leq \theta \leq 150$. Accordingly, the spectacle lens according to the tenth example satisfies the condition (6). Since the inner surface 13 is rotationally symmetrical, the change of $C_2(h,\theta+180)-C_2(h,\theta)$ is zero regardless of the height h and the angle $\theta$.

Figure 87:
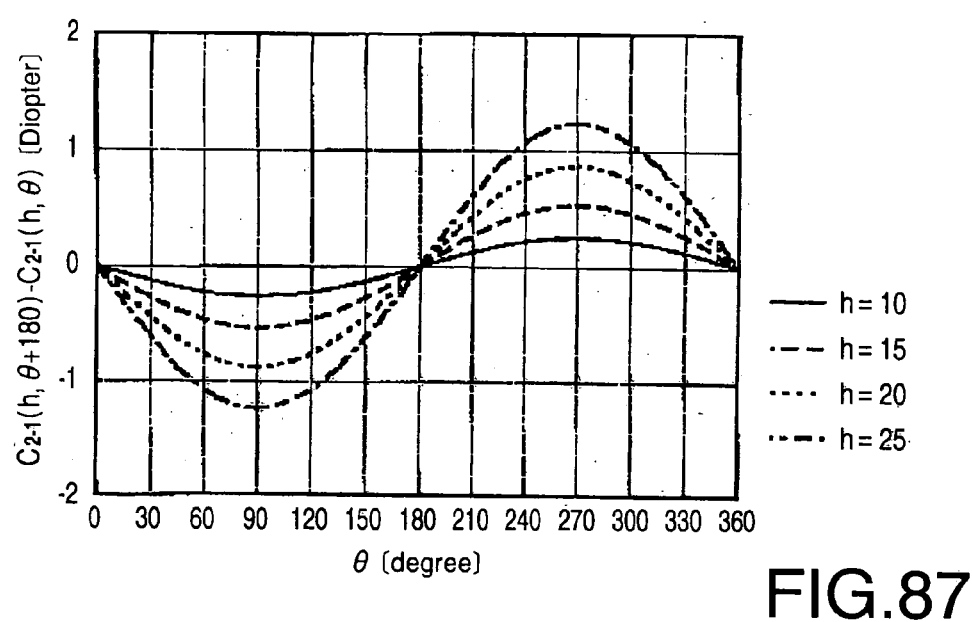
FIG. 87 is a graph illustrating change of a value of $C_{2-1}(h,\theta+180)-C_{2-1}(h,\theta)$ of the tenth example for each of the heights h with respect to the change of the angle $\theta$.

FIG. 87 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle $\theta$. As shown in FIG. 87, for all of the curves of the heights h of 10 mm, 15 mm, 20 mm and 25 mm, the value of $C_{2-1}(h,\theta+180)-C_{2-1}(h,\theta)$ takes the minimum value at the angle $\theta$ of 90° (i.e., in the upper portion) and takes the maximum value at the angle $\theta$ of 270° (i.e., in the lower portion). Further, the value of $C_{2-1}(h,\theta+180)-C_{2-1}(h,\theta)$ becomes greater as the height h increases.

It is obvious from FIG. 87 that $C_{2-1}(h,\theta+180)-C_{2-1}(h,\theta)$ is negative for each of the heights h of 10 mm, 15 mm, 20 mm and 25 mm within the range of $30 \leq \theta \leq 150$. Accordingly, the spectacle lens according to the tenth example satisfies the condition (2).

Figure 88A:
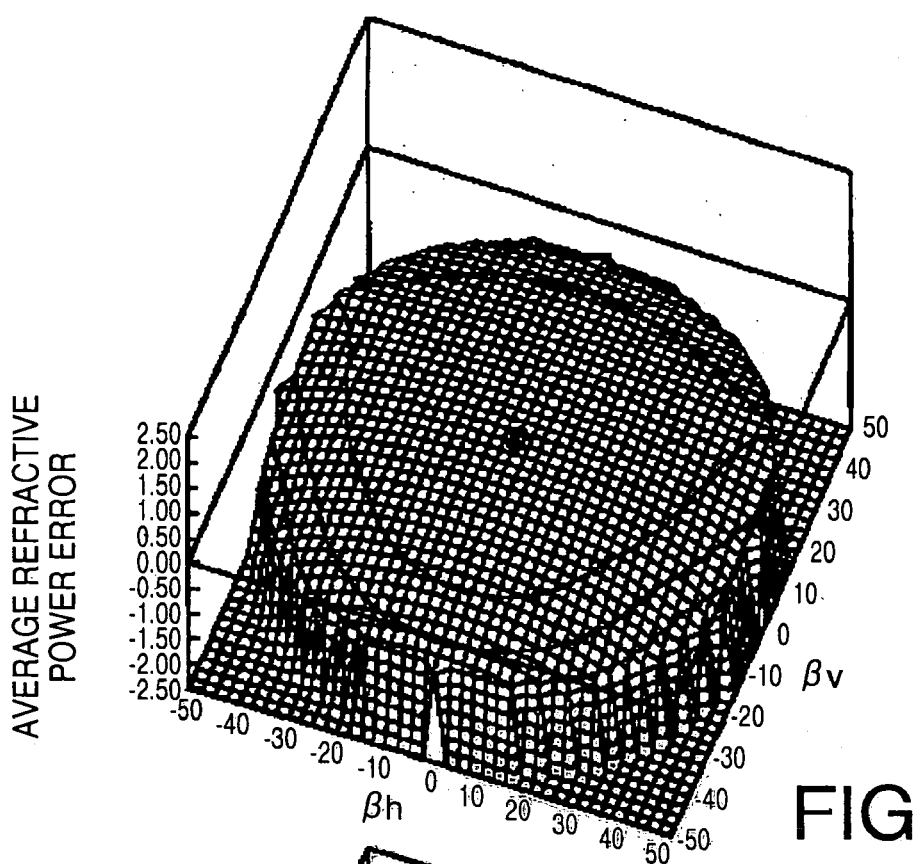
FIG. 88A is a three dimensional graph illustrating an average refractive power error of the spectacle lens of the tenth example.
Figure 88B:
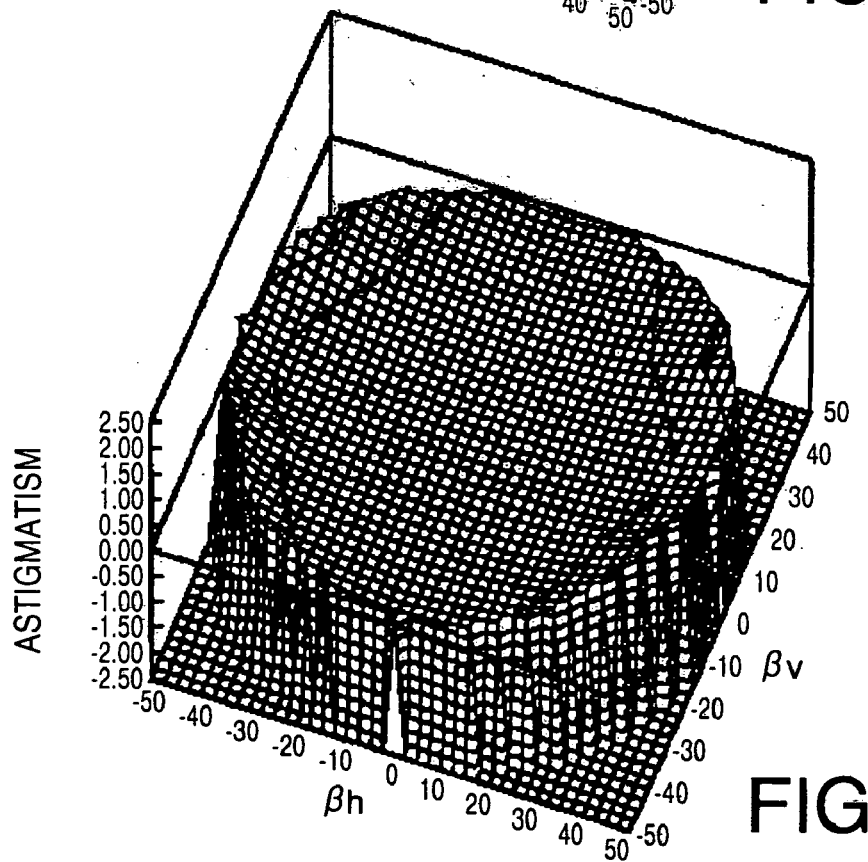
FIG. 88B is a three dimensional graph illustrating astigmatism of the spectacle lens of the tenth example.

FIGS. 88A and 88B represent optical performance of the spectacle lens of the tenth example. FIGS. 88A and 88B are three dimensional graphs of the average refractive power error and the astigmatism, respectively.

FIFTH COMPARATIVE EXAMPLE

A spectacle lens according to a fifth comparative example will be described below using numerical references shown in FIG. 2. Specifications of the spectacle lens of the third comparative example are indicated in Table 15. The spectacle lens of the fifth comparative example has the inner surface 13 whose spherical power is shown in Table 15, and has the outer surface 12 which is a rotationally symmetrical aspherical surface.

TABLE 15

| | |
|---|---|
| SPHERICAL POWER SPH | 4.00[D] |
| CURVATURE OF OUTER SURFACE C1 (ROTATIONALLY-SYMMETRICAL ASPHERICAL SURFACE) | 7.17[D] |
| CURVATURE OF INNER SURFACE C2 (SPHERICAL SURFACE) | 1.26[D] |
| CENTRAL THICKNESS | 4.30[mm] |

FIG. 89A is a list showing a distribution of the curvature $C_1(h,\theta)$ which is obtained on the outer surface 12 at each point having the polar coordinate $(h,\theta)$. FIG. 89B is a list showing a distribution of the curvature $C_2(h,\theta)$ which is obtained on the inner surface 13 at each point having the polar coordinate $(h,\theta)$. Since the inner surface 13 is spherical, the curvatures $C_2(h,\theta)$ at all of the points on the inner surface 13 are the same.

Figure 90A:
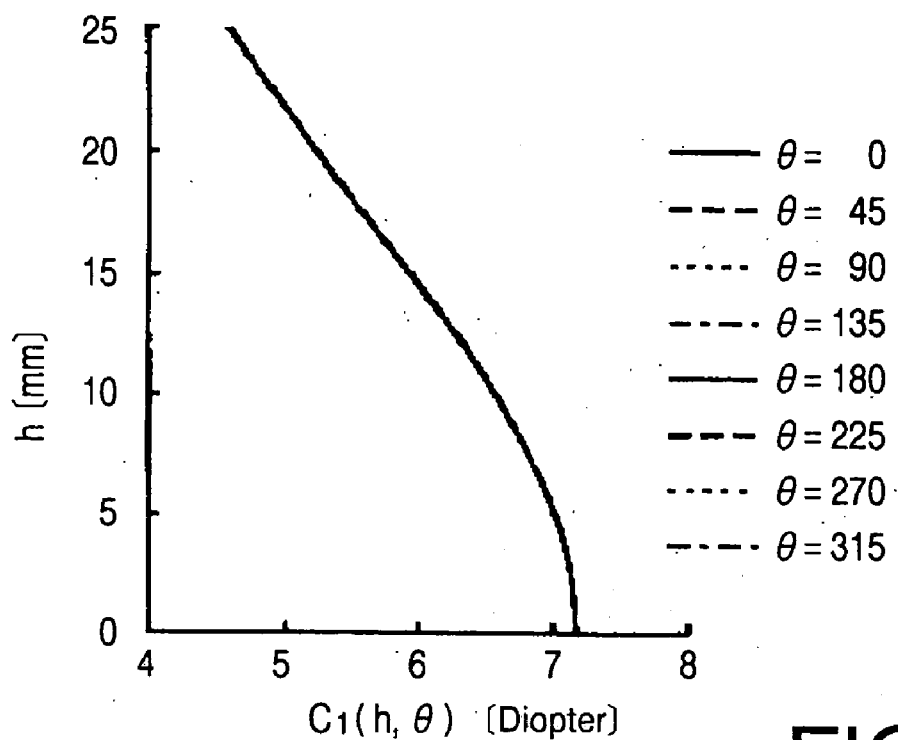
FIG. 90A is a graph illustrating change of the curvature $C_1(h,\theta)$ of the fifth comparative example for each of angles $\theta$ with respect to change of a height h.
Figure 90B:
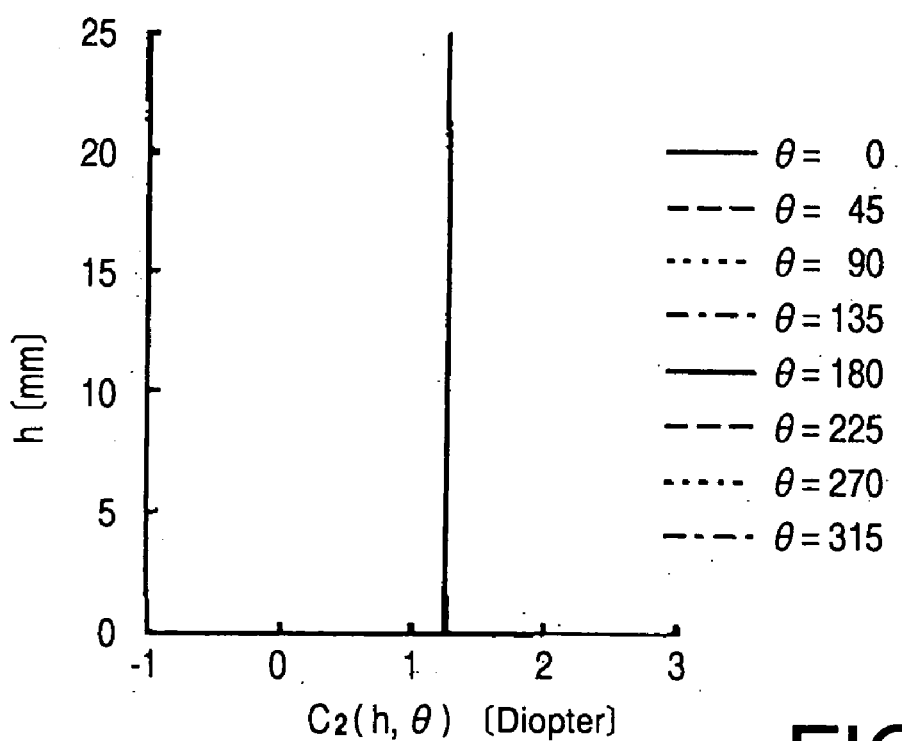
FIG. 90B is a graph illustrating change of the curvature $C_2(h,\theta)$ of the fifth comparative example for each of angles $\theta$ with respect to change of a height h.

FIGS. 90A and 90B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles θ are overlapping one another on the curve shown in FIG. 90A. Since the inner surface 13 is spherical, the change of the curvature $C_2(h,\theta)$ is represented by a linear line on which all of the changes of the curvature $C_2(h,\theta)$ at different angles θ are overlapping one another.

Figure 91A:
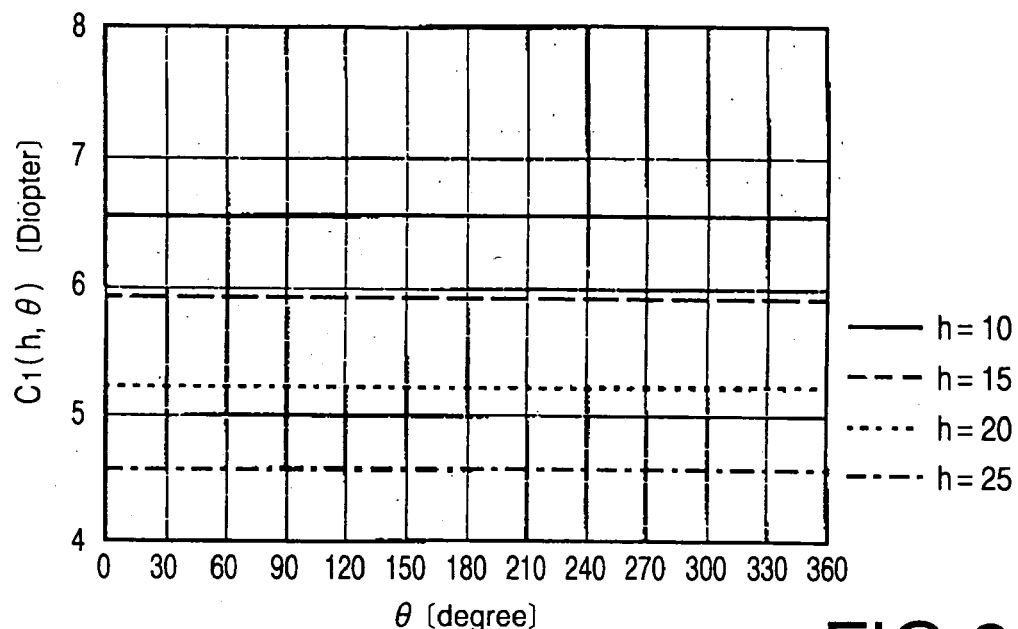
FIG. 91A is a graph illustrating change of the curvature $C_1(h,\theta)$ of the fifth comparative example for each of the heights h with respect to change of the angle $\theta$.
Figure 91B:
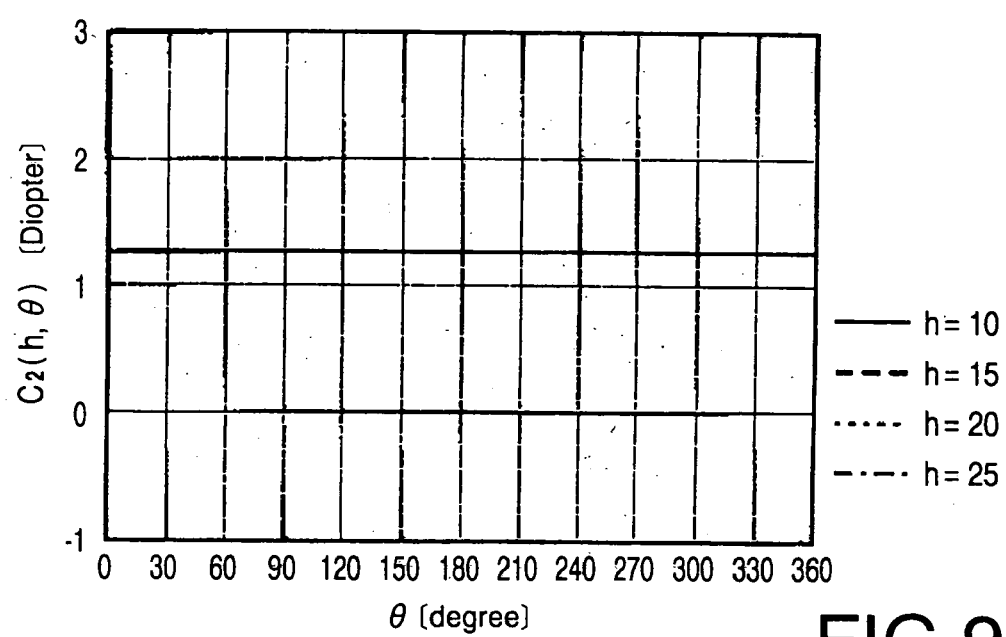
FIG. 91B is a graph illustrating change of the curvature $C_2(h,\theta)$ of the fifth comparative example for each of the heights h with respect to change of the angle $\theta$.

FIGS. 91A and 91B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the curvature $C_1(h,\theta)$ does not change with respect to the change of the angle θ, the curvature $C_1(h,\theta)$ is represented by a linear line for each of the heights of 10 mm, 15 mm, 20 mm and 25 mm in FIG. 91A. Also, the curvature $C_1(h,\theta)$ becomes smaller as the height h increases. Since the inner surface 13 is spherical, the change of the curvature $C_2(h,\theta)$ is represented by a linear line on which all of the changes of the curvature $C_2(h,\theta)$ at different heights h are overlapping one another in FIG. 91B.

Figure 92A:
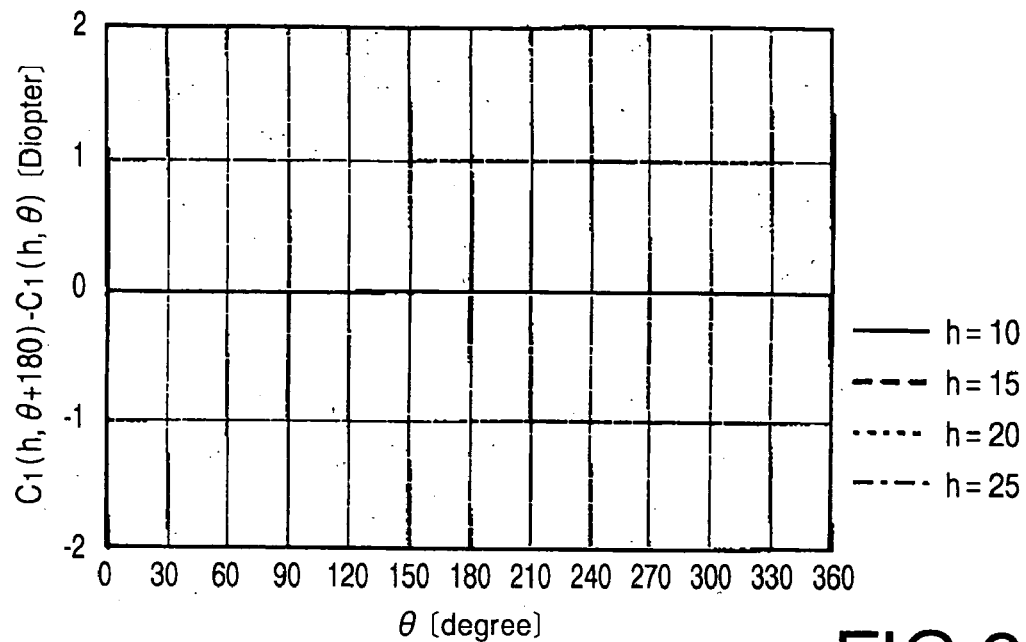
FIG. 92A is a graph illustrating change of a value of $C_1(h,\theta+180)-C_1(h,\theta)$ of the fifth comparative example for each of the heights h with respect to the change of the angle $\theta$.
Figure 92B:
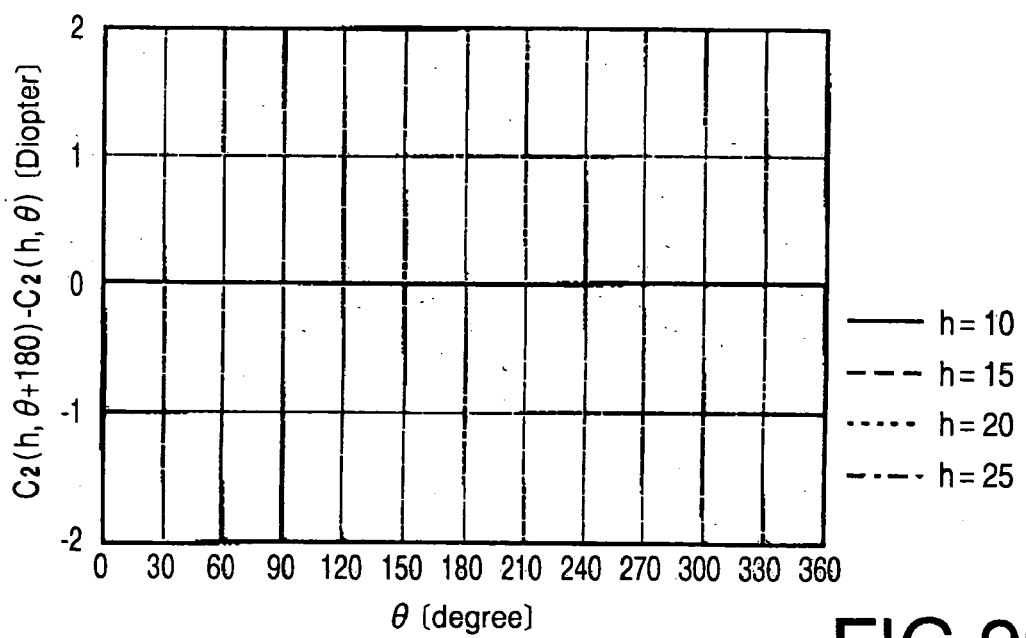
FIG. 92B is a graph illustrating change of a value of $C_2(h,\theta+180)-C_2(h,\theta)$ of the fifth comparative example for each of the heights h with respect to the change of the angle $\theta$.
Figure 93:
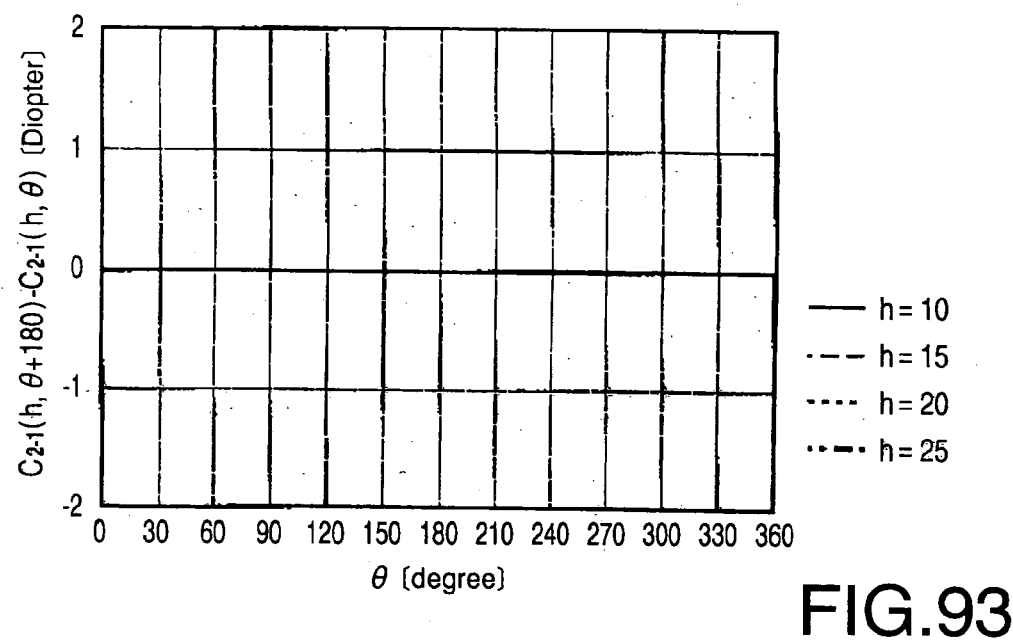
FIG. 93 is a graph illustrating change of a value of $C_{2-1}(h,\theta+180)-C_{2-1}(h,\theta)$ of the fifth comparative example for each of the heights h with respect to the change of the angle $\theta$.

FIGS. 92A and 92B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle θ. FIG. 93 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle θ.

Since both of the outer and inner surfaces are rotationally-symmetrical, the Value of $C_1(h,\theta+180)-C_1(h,\theta)$ of the condition (6), the value of $C_2(h,\theta+180)-C_2(h,\theta)$ the condition (4) and the value of $C_{2-1}(h,\theta+180)-C_{2-1}(h,\theta)$ of the condition (2) take a constant value of zero regardless of the angle θ. Accordingly, the fifth comparative example does not satisfy the conditions (2), (4) and (6).

Figure 94A:
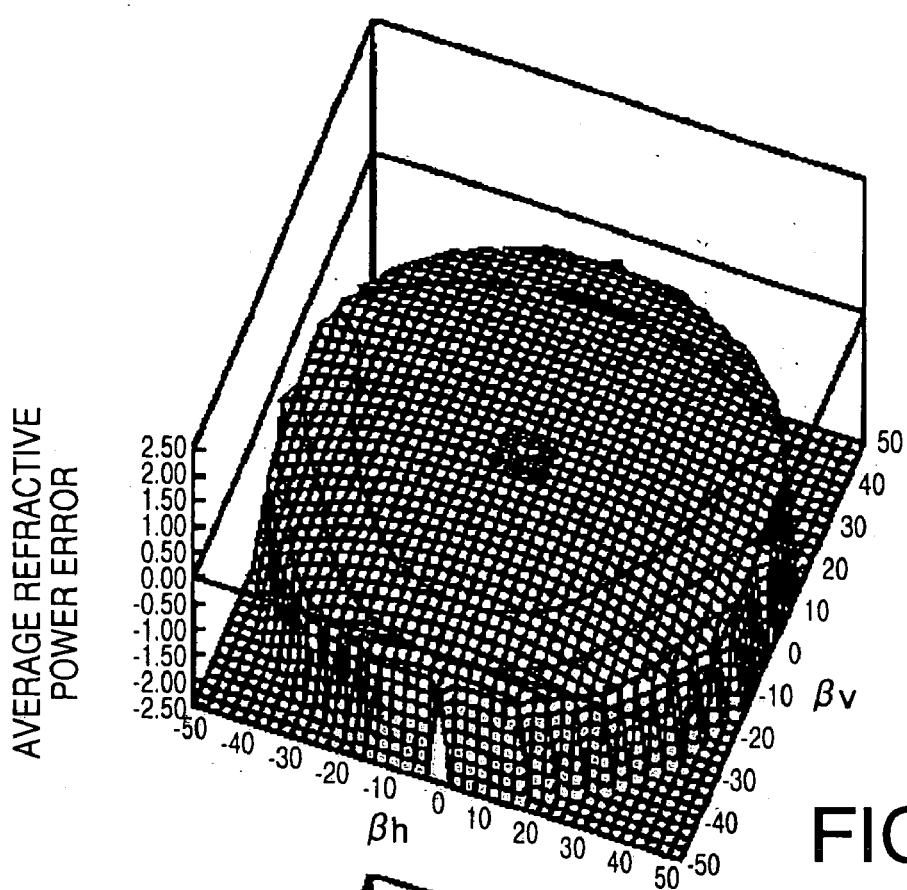
FIG. 94A is a three dimensional graph illustrating an average refractive power error of the spectacle lens of the fifth comparative example.
Figure 94B:
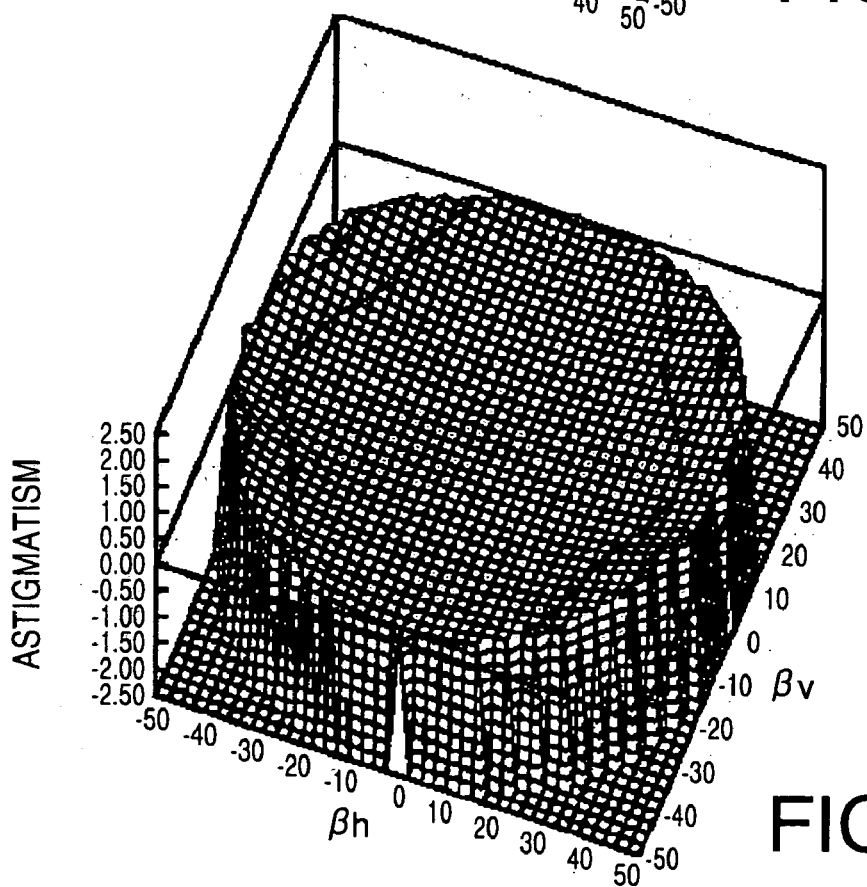
FIG. 94B is a three dimensional graph illustrating astigmatism of the spectacle lens of the fifth comparative example.

FIGS. 94A and 94B represent optical performance of the spectacle lens of the fifth comparative example. FIGS. 94A and 94B are three dimensional graphs of the average refractive power error and the astigmatism, respectively. By comparing FIG. 94A with FIGS. 82A and 88A and comparing FIG. 94B with FIGS. 82B and 88B, it is understood that the aberrations are sufficiently corrected in each of the ninth and the tenth examples.

ELEVENTH EXAMPLE

A spectacle lens according to a eleventh example will be described below using numerical references shown in FIG. 1. The spectacle lens according to the eleventh example is a plus lens that is prescribed cylindrical power. Specifications of the spectacle lens of the eleventh example are indicated in Table 16. As shown in Table 16, the outer surface 2 is a spherical surface having a curvature shown in Table 16, and the inner surface 3 is a rotationally-asymmetrical aspherical surface.

TABLE 16

| | |
|---|---|
| SPHERICAL POWER SPH | 4.00[D] |
| CYLINDRICAL POWER CYL | −4.00[D] |
| ASTIGMATIC AXIS AX | 45[°] |
| CURVATURE OF OUTER SURFACE C1 (SPHERICAL SURFACE) | 6.96[D] |
| CURVATURE OF INNER SURFACE C2 (ROTATIONALLY-ASYMMETRICAL ASPHERICAL SURFACE) | 1.02~7.04[D] |
| CENTRAL THICKNESS | 3.80[mm] |

FIG. 95A is a list showing a distribution of the curvature $C_1(h,\theta)$ which is obtained on the outer surface 2 at each point having the polar coordinate $(h,\theta)$. FIG. 95B is a list showing a distribution of the curvature $C_2(h,\theta)$ which is obtained on the inner surface 3 at each point having the polar coordinate $(h,\theta)$. Since the outer surface 2 is spherical, the curvatures $C_1(h,\theta)$ at all of the points on the outer surface 2 are the same.

Figure 96A:
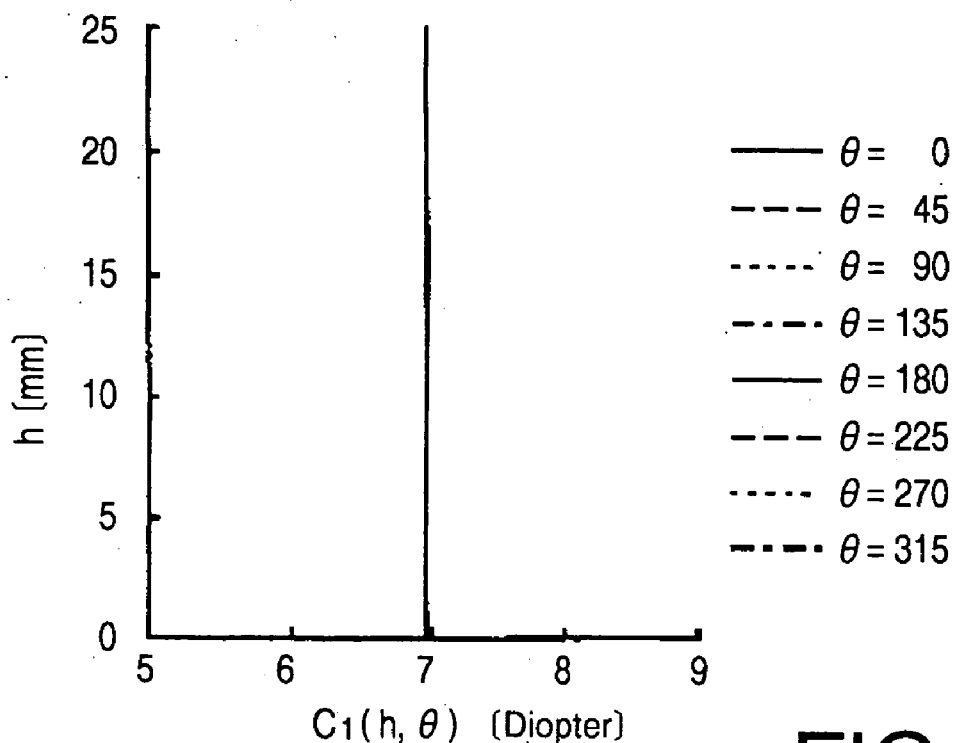
FIG. 96A is a graph illustrating change of the curvature $C_1(h,\theta)$ of the eleventh example for each of angles $\theta$ with respect to change of a height h.
Figure 96B:
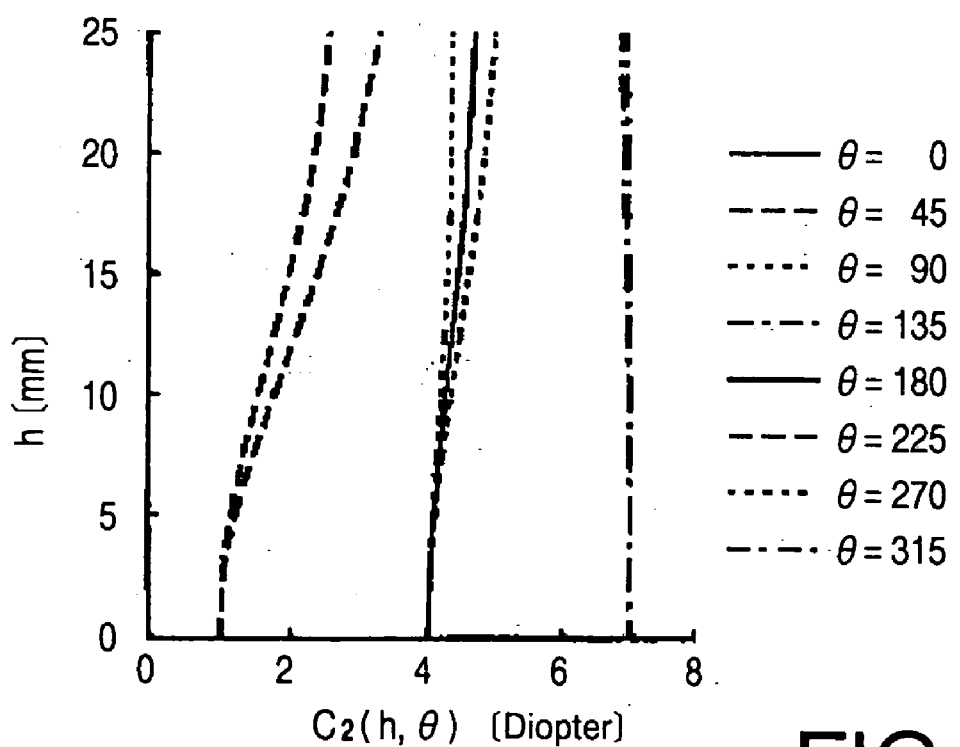
FIG. 96B is a graph illustrating change of the curvature $C_2(h,\theta)$ of the eleventh example for each of angles $\theta$ with respect to change of a height h.

FIGS. 96A and 96B are graphs respectively illustrating the changes of the curvatures $C_1(h,\theta)$ and $C_2(h,\theta)$ for each of the angle θ of 0°, 45°, 90°, 135°, 180°, 225°, 270° and 315° with respect to the change of the height h.

Since the outer surface 2 is spherical, the change of the curvature $C_1(h,\theta)$ is represented by a linear line on which all of the changes of the curvature $C_1(h,\theta)$ at different angles θ are overlapping one another in FIG. 96A.

In FIG. 96B, curves of the angles θ of 0° and 180° are overlapping one another. On the left side of the curve of the angle θ of 0° (180°) on FIG. 96B, a curve of the curvature of the angles θ of 270°, a curve of the curvature of the angles θ of 45° and a curve of the curvature of the angles θ of 225° are indicated in order of the decreasing amount of the curvature.

On the right side of the curve of the angle θ of 0° (180°) on FIG. 96B, a curve of the curvature of the angles θ of 90°, a curve of the curvature of the angles θ of 315° and a curve of the curvature of the angles θ of 135° are indicated in order of the increasing amount of the curvature. Since the inner surface 3 has the cylindrical power, the curves of the curvatures for different angles θ take different values at the height h=0.

Figure 97A:
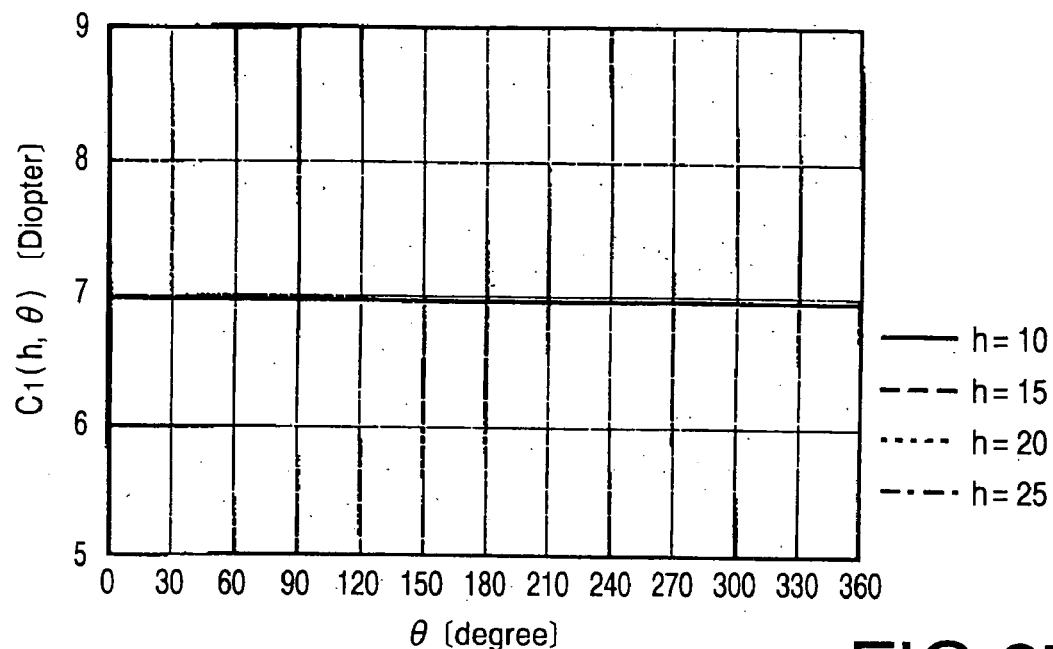
FIG. 97A is a graph illustrating change of the curvature $C_1(h,\theta)$ of the eleventh example for each of the heights h with respect to change of the angle $\theta$.
Figure 97B:
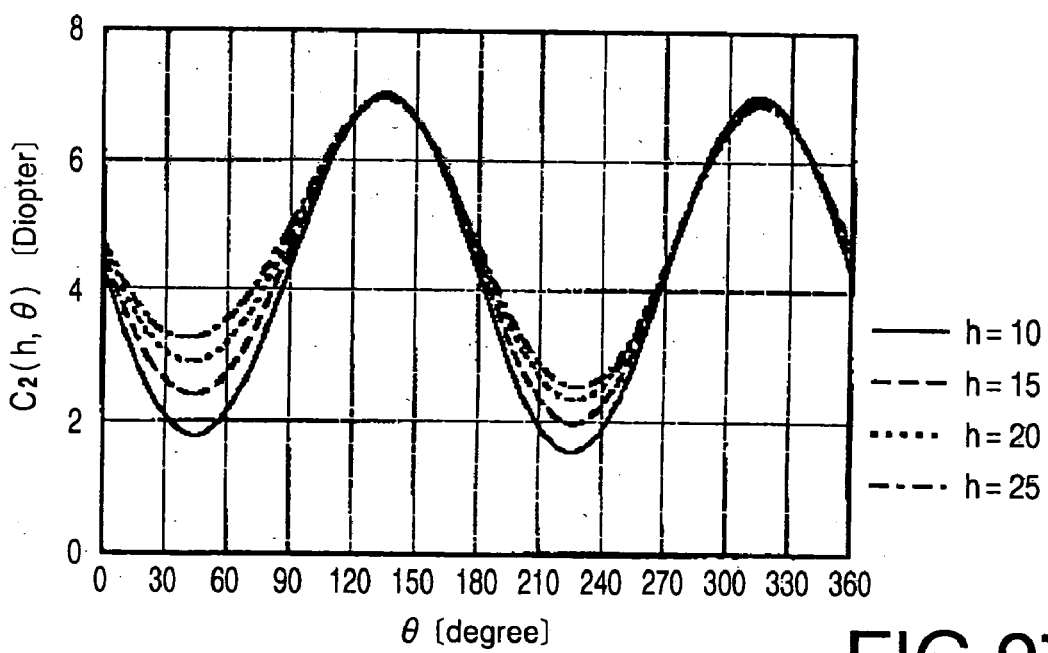
FIG. 97B is a graph illustrating change of the curvature $C_2(h,\theta)$ of the eleventh example for each of the heights h with respect to change of the angle $\theta$.

FIGS. 97A and 97B are graphs respectively illustrating the changes of the curvatures $C_1(h,\theta)$ and $C_2(h,\theta)$ for each of the heights h of 10 mm, 15 mm, 20 mm and 25 mm with respect to the change of the angle θ.

Since the outer surface 2 is spherical, the change of the curvature $C_1(h,\theta)$ is represented by a linear line on which all of the changes of the curvature $C_1(h,\theta)$ at different heights h are overlapping one another on FIG. 97A. As shown in FIG. 97B, for all of curves of the heights of 10 mm, 15 mm, 20 mm and 25 mm, the curvature $C_2(h,\theta)$ takes a local minimal value at the angle $\theta$ of about 45° (i.e., in the upper portion) and takes a local minimal value at the angle $\theta$ of about 225° (i.e., in the upper portion). As shown in FIG. 97B, for all of the image heights, the local minimal value at the angle $\theta$ of about 45° is larger than the local minimal value at the angle $\theta$ of about 225°.

Figure 98A:
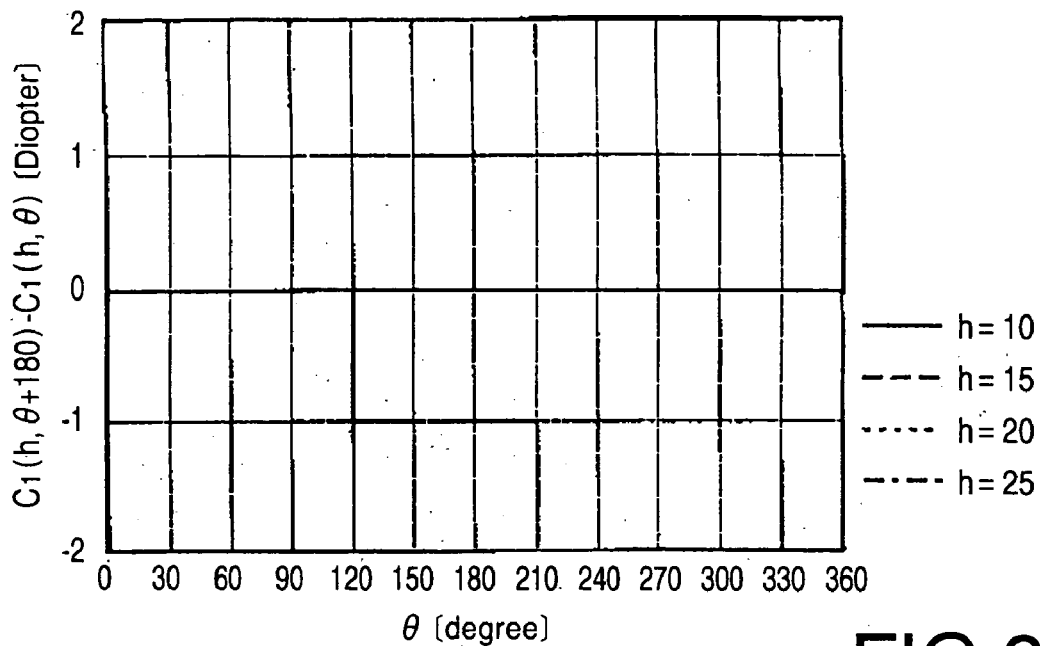
FIG. 98A is a graph illustrating change of a value of $C_1(h,\theta+180)-C_1(h,\theta)$ of the eleventh example for each of the heights h with respect to the change of the angle $\theta$.
Figure 98B:
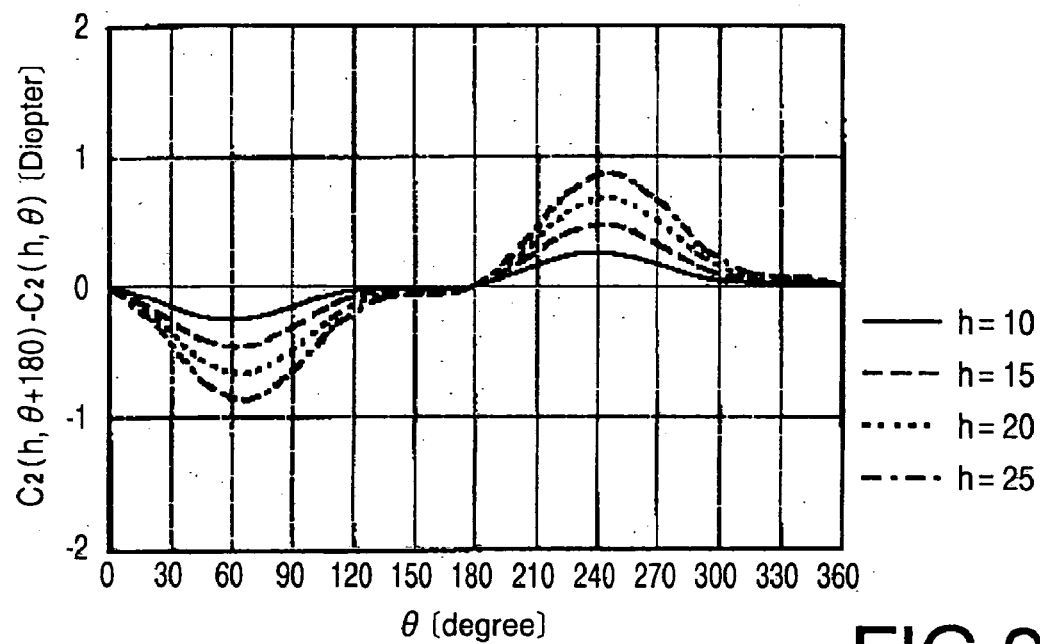
FIG. 98B is a graph illustrating change of a value of $C_2(h,\theta+180)-C_2(h,\theta)$ of the eleventh example for each of the heights h with respect to the change of the angle $\theta$.

FIGS. 98A and 98B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle $\theta$.

Since the outer surface 2 is spherical, the change of the value of $C_1(h,\theta+180)-C_1(h,\theta)$ is represented by a linear line on which all of the changes of the value of $C_1(h,\theta+180)-C_1(h,\theta)$ at different heights h are overlapping one another on FIG. 98A.

As shown in FIG. 98B, for all of curves of the heights h of 10 mm, 15 mm, 20 mm and 25 mm, the value of $C_2(h,\theta+180)-C_2(h,\theta)$ takes the minimum value at the angle $\theta$ of about 65° (i.e., in the upper portion) and takes the maximum value at the angle $\theta$ of about 245° (i.e., in the lower portion). Further, as shown in FIG. 98B, the amplitude of the curve of $C_2(h,\theta+180)-C_2(h,\theta)$ becomes greater as the height h increases. It is obvious from FIG. 98B that $C_2(h,\theta+180)-C_2(h,\theta)$ is negative for each of the heights h of 10 mm, 15 mm, 20 mm and 25 mm within the range of $30 \leq \theta \leq 150$. Accordingly, the spectacle lens according to the eleventh example satisfies the condition (4).

Figure 99:
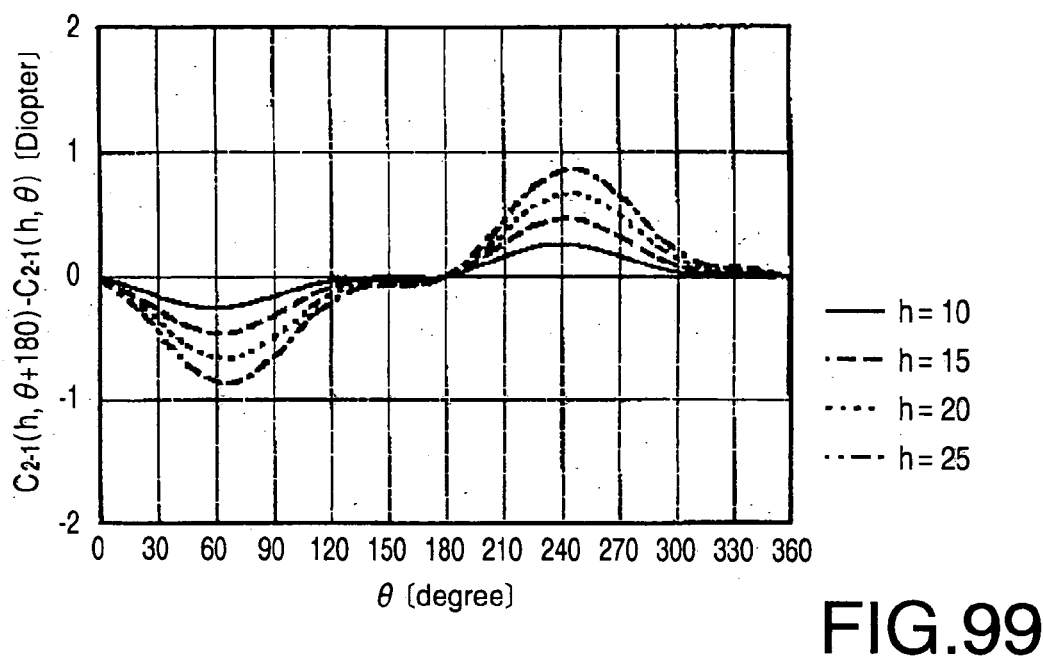
FIG. 99 is a graph illustrating change of a value of $C_{2-1}(h,\theta+180)-C_{2-1}(h,\theta)$ of the eleventh example for each of the heights h with respect to the change of the angle $\theta$.

FIG. 99 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle $\theta$. As shown in FIG. 99, for all of the curves of the heights h of 10 mm, 15 mm, 20 mm and 25 mm, the value of $C_{2-1}(h,\theta+180)-C_{2-1}(h,\theta)$ takes the minimum value at the angle $\theta$ of about 65° (i.e., in the upper portion) and takes the maximum value at the angle $\theta$ of about 245° (i.e., in the lower portion). Further, as shown in FIG. 99, the amplitude of the curve of the value of $C_{2-1}(h,\theta+180)-C_{2-1}(h,\theta)$ becomes greater as the height h increases.

It is obvious from FIG. 99 that $C_{2-1}(h,\theta+180)-C_{2-1}(h,\theta)$ is negative for each of the heights h of 10 m, 15 mm, 20 mm and 25 mm within the range of $30 \leq \theta \leq 150$. Accordingly, the spectacle lens according to the eleventh example satisfies the condition (1).

Figure 100A:
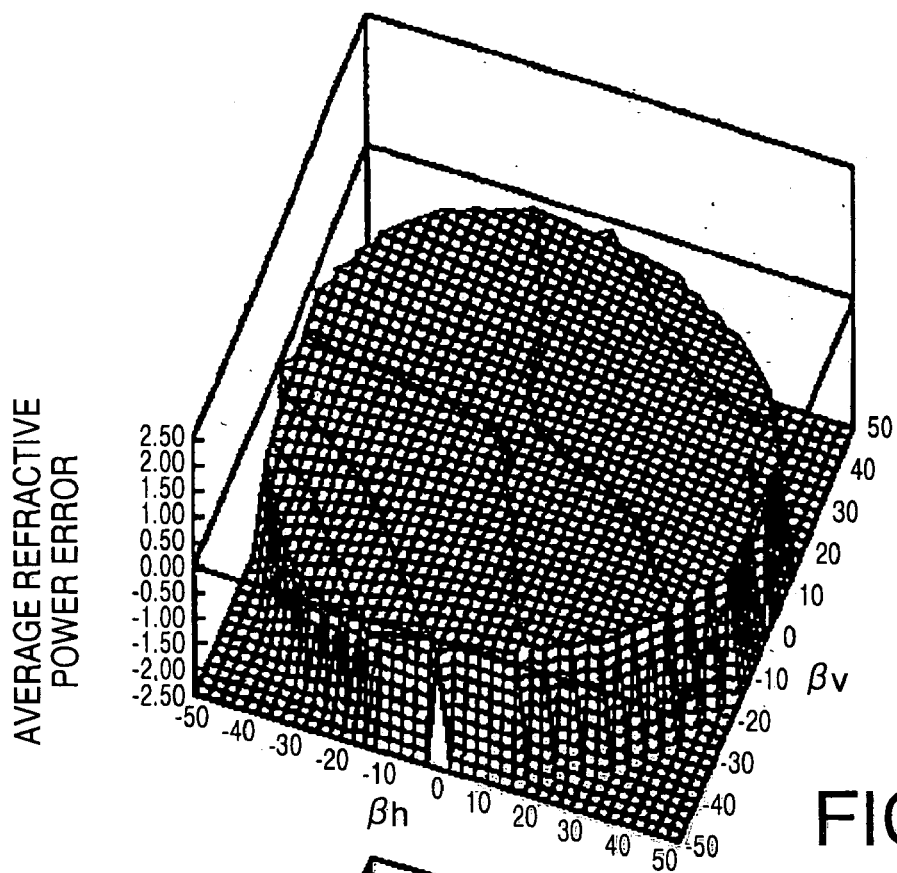
FIG. 100A is a three dimensional graph illustrating an average refractive power error of the spectacle lens of the eleventh example.
Figure 100B:
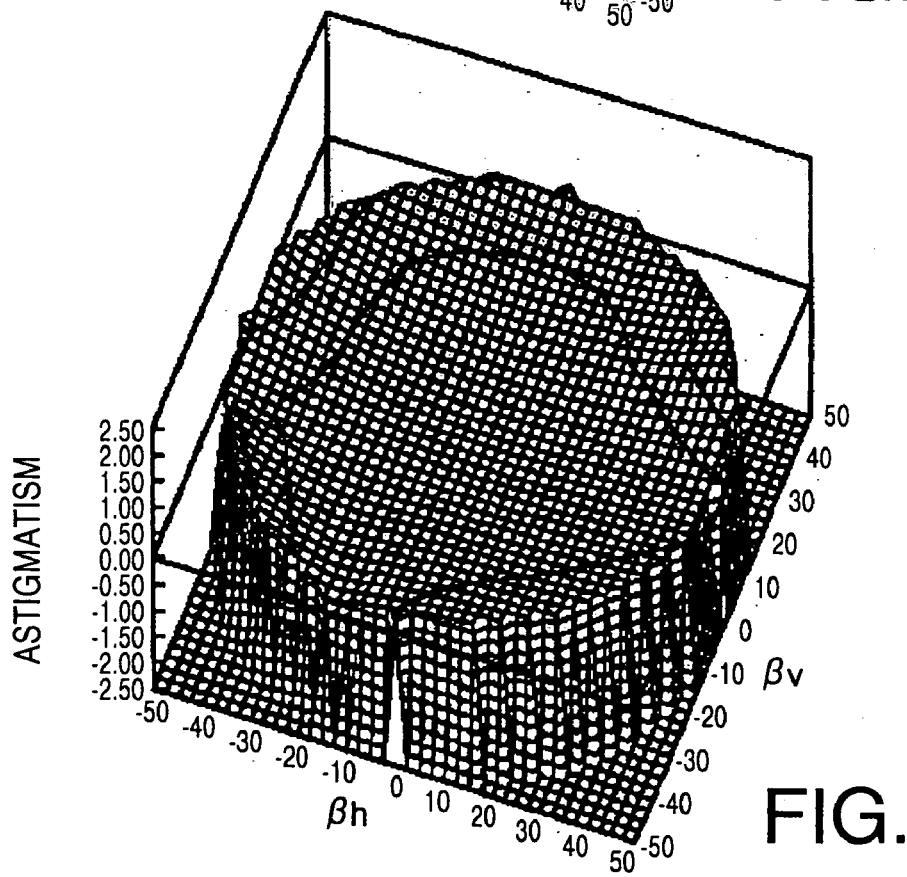
FIG. 100B is a three dimensional graph illustrating astigmatism of the spectacle lens of the eleventh example.

FIGS. 100A and 100B represent optical performance of the spectacle lens of the eleventh example. FIGS. 100A and 100B are three dimensional graphs of the average refractive power error and the astigmatism, respectively.

TWELFTH EXAMPLE

A spectacle lens according to a twelfth example will be described below using numerical references shown in FIG. 1. The spectacle lens according to the twelfth example is a plus lens having the same spherical power and cylindrical power as those of the eleventh example. Specifications of the spectacle lens of the twelfth example are indicated in Table 17. As shown in Table 17, both of the outer surface 2 and the inner surface 3 are rotationally-asymmetrical aspherical surfaces.

TABLE 17

| | |
|---|---|
| SPHERICAL POWER SPH | 4.00[D] |
| CYLINDRICAL POWER CYL | −4.00[D] |

TABLE 17-continued

| | |
|---|---|
| ASTIGMATIC AXIS AX | 45[°] |
| CURVATURE OF OUTER SURFACE C1 (ROTATIONALLY-ASYMMETRICAL ASPHERICAL SURFACE) | 7.18~4.23[D] |
| CURVATURE OF INNER SURFACE C2 (ROTATIONALLY-ASYMMETRICAL ASPHERICAL SURFACE) | 1.26~4.27[D] |
| CENTRAL THICKNESS | 4.30[mm] |

FIG. 101A is a list showing a distribution of the curvature $C_1(h,\theta)$ which is obtained on the outer surface 2 at each point having the polar coordinate $(h,\theta)$. FIG. 101B is a list showing a distribution of the curvature $C_2(h,\theta)$ which is obtained on the inner surface 3 at each point having the polar coordinate $(h,\theta)$.

Figure 102A:
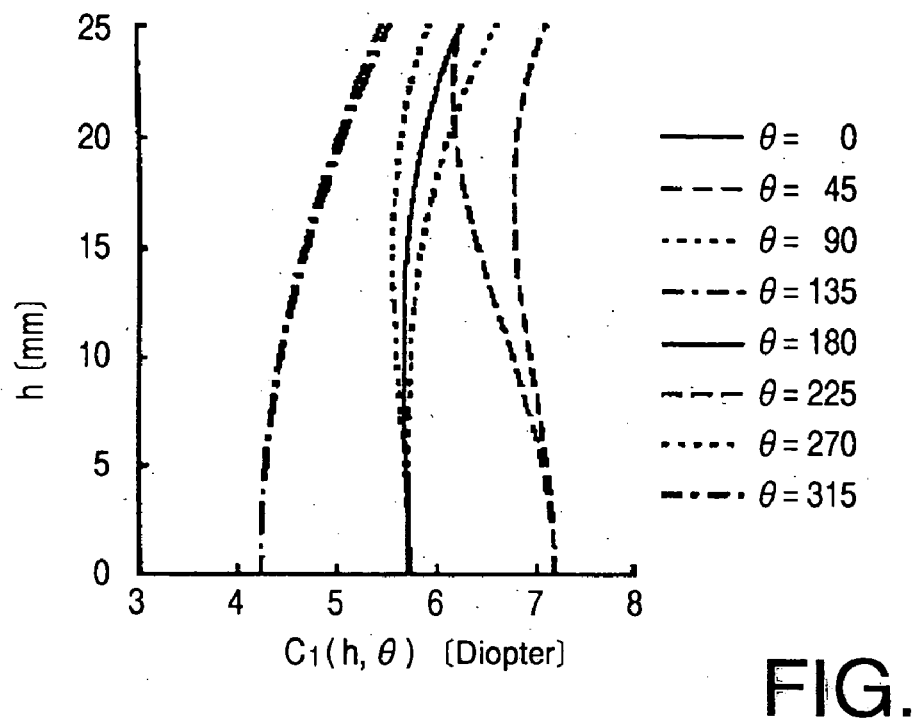
FIG. 102A is a graph illustrating change of the curvature $C_1(h,\theta)$ of the twelfth example for each of angles $\theta$ with respect to change of a height h.
Figure 102B:
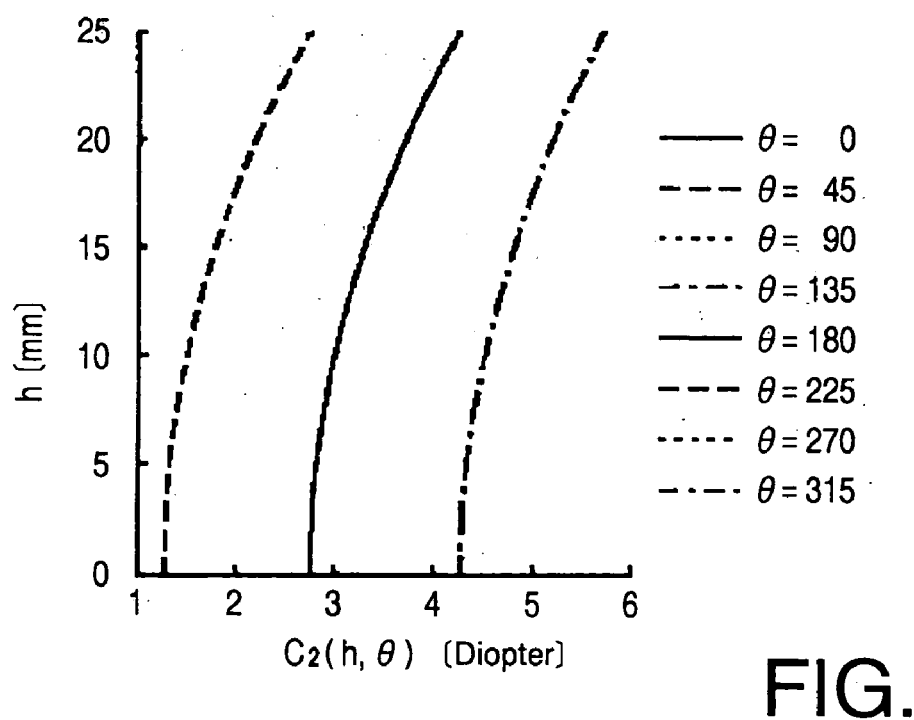
FIG. 102B is a graph illustrating change of the curvature $C_2(h,\theta)$ of the twelfth example for each of angles $\theta$ with respect to change of a height h.

FIGS. 102A and 102B are graphs respectively illustrating the changes of the curvatures $C_1(h,\theta)$ and $C_2(h,\theta)$ for each of the angle $\theta$ of 0°, 45°, 90°, 135°, 180°, 225°, 270° and 315° with respect to the change of the height h.

As shown in FIG. 102A, between two curves that take the curvature of 4.23 at the height h of zero, the curve on the left side is a curve of the angle of 135°, and the curve on the right side is a curve of the angle of 315°. Also, among three curves that take the curvature of 5.71 at the height h of zero, a curve indicated by a solid line is one on which curves of the angles of 0° and 180° are overlapping one another, a curve (indicated by a dashed line) on the left side is a curve of the angle of 90°, and a curve (indicated by a dashed line) on the right side is a curve of the angles of 270°. Further, between two curves that take the curvature of 7.18 at the height h of zero, the curve on the left side is a curve of the angle of 45°, and the curve on the right side is a curve of the angle of 225°.

In FIG. 102A, a curve on which the curves of the angles of 45° and 225° are overlapping, a curve on which the curves of the angles of 0°, 90°, 180° and 270° are overlapping and a curve on which the curves of the angles of 135° and 315° are overlapping are indicated.

Figure 103A:
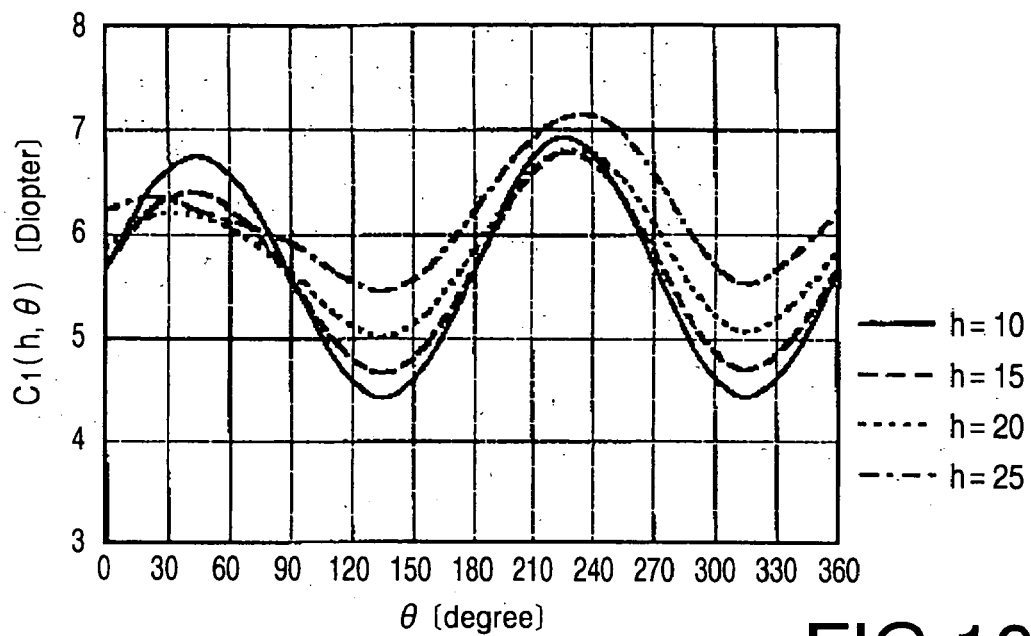
FIG. 103A is a graph illustrating change of the curvature $C_1(h,\theta)$ of the twelfth example for each of the heights h with respect to change of the angle $\theta$.
Figure 103B:
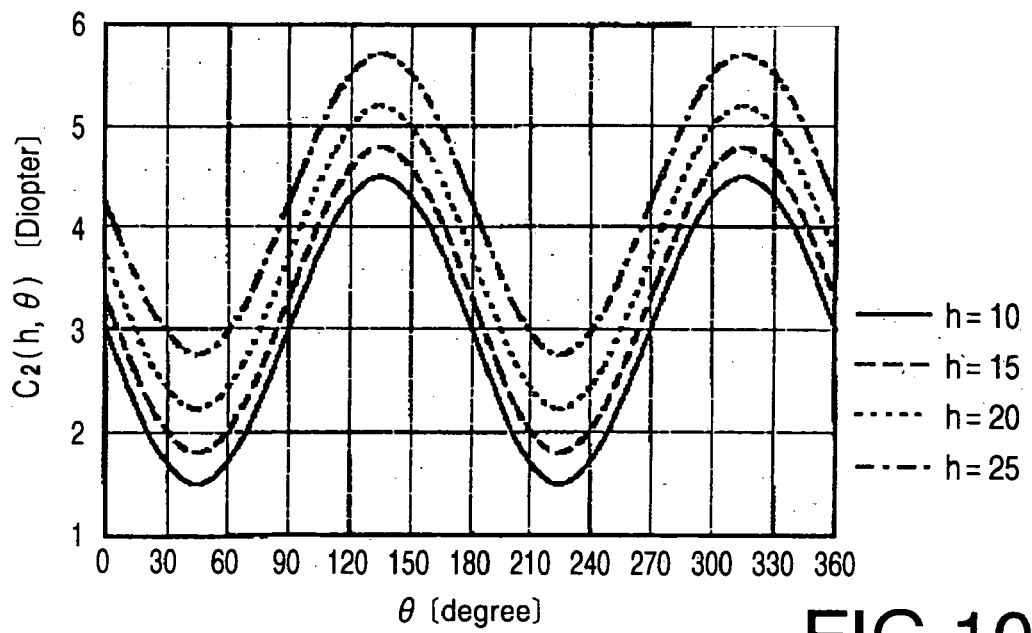
FIG. 103B is a graph illustrating change of the curvature $C_2(h,\theta)$ of the twelfth example for each of the heights h with respect to change of the angle $\theta$.

FIGS. 103A and 103B are graphs respectively illustrating the changes of the curvatures $C_1(h,\theta)$ and $C_2(h,\theta)$ for each of the heights h of 10 mm, 15 mm, 20 mm and 25 mm with respect to the change of the angle $\theta$.

As shown in FIG. 103A, for all of curves of the heights of 10 mm, 15 mm, 20 mm and 25 mm, the curvature $C_1(h,\theta)$ of the outer surface 2 takes local maximum values at the angles $\theta$ of about 45° and 225°. As shown in FIG. 103A, for all of the image heights, the local maximum value at the angle $\theta$ of about 225° is larger than the local maximum value at the angle $\theta$ of about 45°.

As shown in FIG. 103B, for all of curves of the heights of 10 mm, 15 mm, 20 mm and 25 mm, the curve of the curvature $C_2(h,\theta)$ of the inner surface 3 has a form of a sine wave.

Figure 104A:
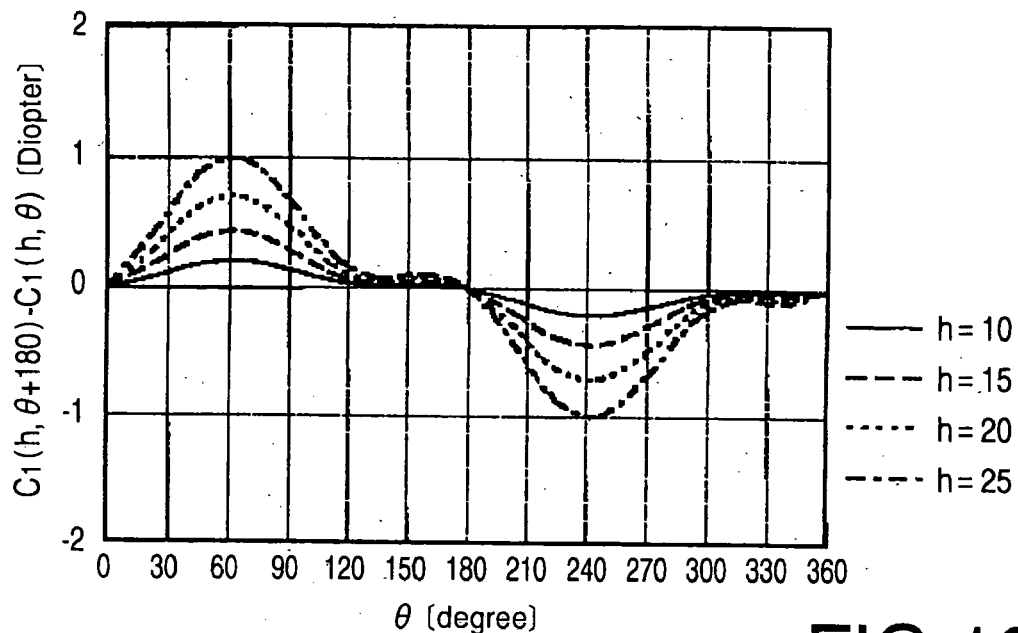
FIG. 104A is a graph illustrating change of a value of $C_1(h,\theta+180)-C_1(h,\theta)$ of the twelfth example for each of the heights h with respect to the change of the angle $\theta$.
Figure 104B:
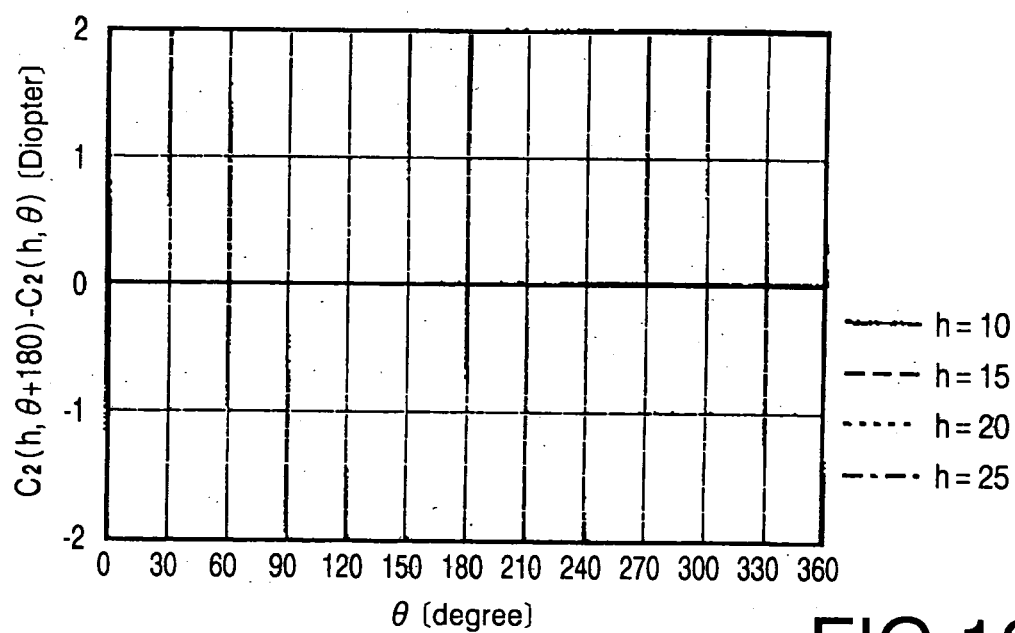
FIG. 104B is a graph illustrating change of a value of $C_2(h,\theta+180)-C_2(h,\theta)$ of the twelfth example for each of the heights h with respect to the change of the angle $\theta$.

FIGS. 104A and 104B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle $\theta$.

As shown in FIG. 104A, for all of curves of the heights h of 10 mm, 15 mm, 20 mm and 25 mm, the value of $C_1(h,\theta+180)-C_1(h,\theta)$ takes the maximum value at the angle $\theta$ of about 60° (i.e., in the upper portion) and takes the minimum value at the angle $\theta$ of about 240° (i.e., in the lower portion). Further, as shown in FIG. 104A, the amplitude of the curve of $C_1(h,\theta+180)-C_1(h,\theta)$ becomes greater as the height h increases.

As shown in FIG. 104B, since the curve the curvature $C_2(h,\theta)$ changes like the sine wave, symmetrical points on the surface has the same curvature. Therefore, the change of the value $C_2(h,\theta+180)-C_2(h,\theta)$ is indicated by a linear line on which all of the curves at different heights h are overlapping one another.

Figure 105:
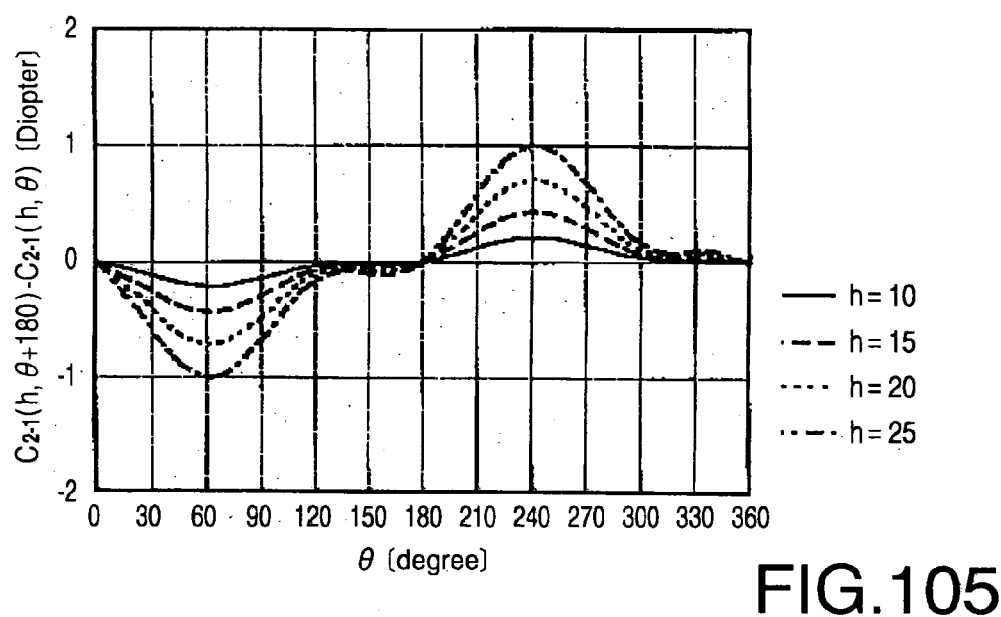
FIG. 105 is a graph illustrating change of a value of $C_{2-1}(h,\theta+180)-C_{2-1}(h,\theta)$ of the twelfth example for each of the heights h with respect to the change of the angle $\theta$.

FIG. 105 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle $\theta$. As shown in FIG. 105, for all of the curves of the heights h of 10 mm, 15 mm, 20 mm and 25 mm, the value of $C_{2-1}(h,\theta+180)-C_{2-1}(h,\theta)$ takes the minimum value at the angle $\theta$ of about 65° (i.e., in the upper portion) and takes the maximum value at the angle $\theta°$ of about 240° (i.e., in the lower portion). Further, as shown in FIG. 105, the amplitude of the curve of the value of $C_{2-1}(h,\theta+180)-C_{2-1}(h,\theta)$ becomes greater as the height h increases.

It is obvious from FIG. 105 that $C_{2-1}(h,\theta+180)-C_{2-1}(h,\theta)$ is negative for each of the heights h of 10 mm, 15 mm, 20 mm and 25 mm within the range of $30 \leq \theta \leq 150$. Accordingly, the spectacle lens according to the eleventh example satisfies the condition (2).

Figure 106A:
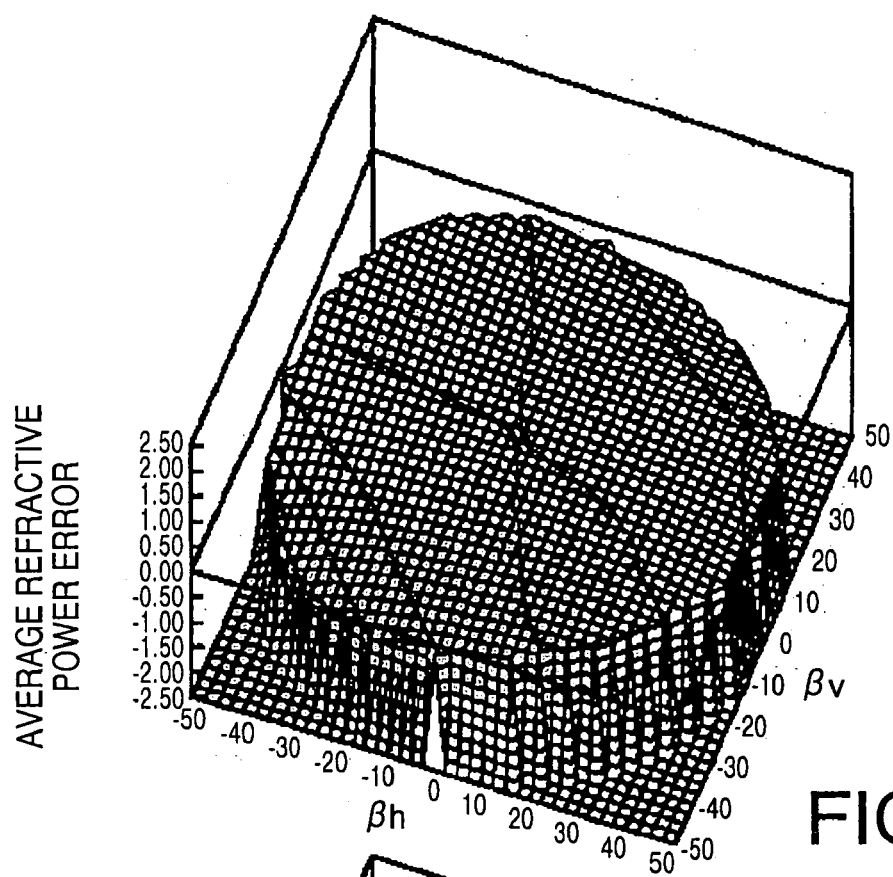
FIG. 106A is a three dimensional graph illustrating an average refractive power error of the spectacle lens of the twelfth example.
Figure 106B:
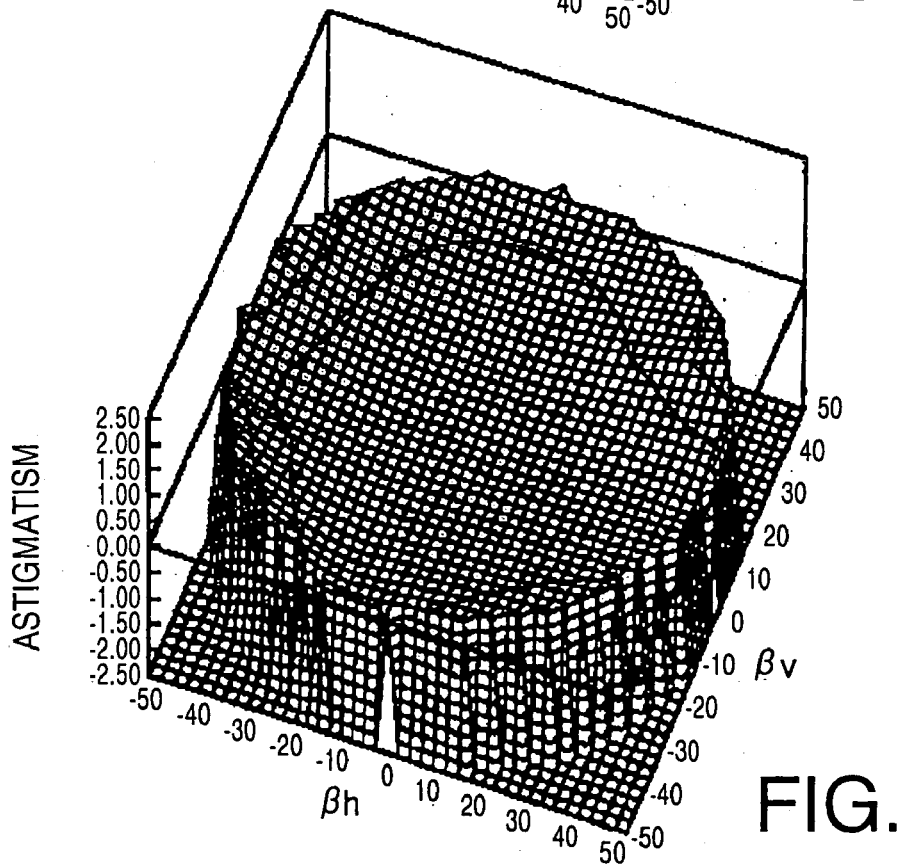
FIG. 106B is a three dimensional graph illustrating astigmatism of the spectacle lens of the twelfth example.

FIGS. 106A and 106B represent optical performance of the spectacle lens of the twelfth example. FIGS. 106A and 106B are three dimensional graphs of the average refractive power error and the astigmatism, respectively.

SIXTH COMPARATIVE EXAMPLE

A spectacle lens according to a sixth comparative example will be described below using numerical references shown in FIG. 2. The spectacle lens of the sixth comparative example has the same spherical power and cylindrical power as those of the eleventh and the twelfth examples. Specifications of the spectacle lens of the sixth comparative example are indicated in Table 18. As shown in Table 18, the inner surface 13 is a toric surface having a curvature shown in Table 18, and the outer surface 12 is a rotationally-symmetrical aspherical surface.

TABLE 18

| | |
|---|---|
| SPHERICAL POWER SPH | 4.00[D] |
| CYLINDRICAL POWER CYL | −4.00[D] |
| ASTIGMATIC AXIS AX | 45[°] |
| CURVATURE OF OUTER SURFACE C1 (ROTATIONALLY-SYMMETRICAL ASPHERICAL SURFACE) | 7.17[D] |
| CURVATURE OF INNER SURFACE C2 (TORIC SURFACE) | 1.26~7.27[D] |
| CENTRAL THICKNESS | 4.30[mm] |

FIG. 107A is a list showing a distribution of the curvature $C_1(h,\theta)$ which is obtained on the outer surface 12 at each point having the polar coordinate $(h,\theta)$. FIG. 107B is a list showing a distribution of the curvature $C_2(h,\theta)$ which is obtained on the inner surface 13 at each point having the polar coordinate $(h,\theta)$.

Figure 108A:
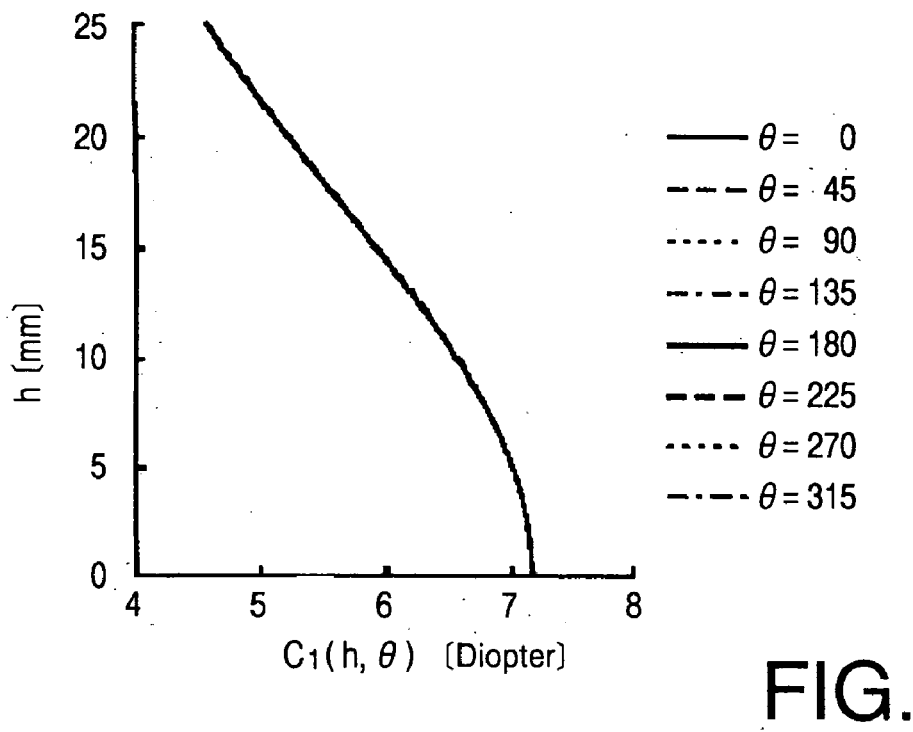
FIG. 108A is a graph illustrating change of the curvature $C_1(h,\theta)$ of the sixth comparative example for each of angles $\theta$ with respect to change of a height h.
Figure 108B:
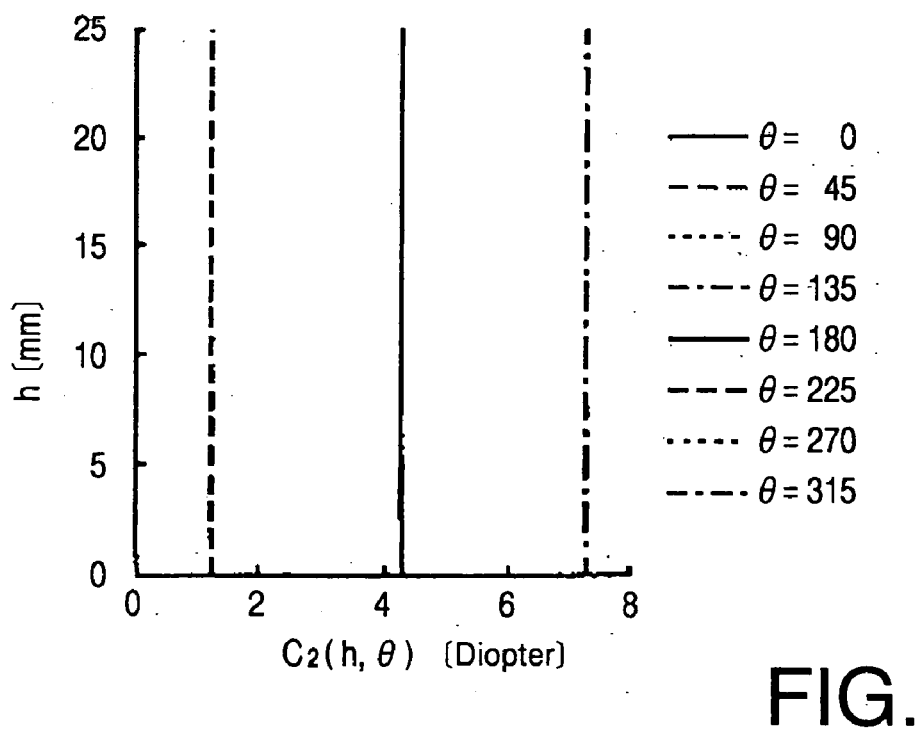
FIG. 108B is a graph illustrating change of the curvature $C_2(h,\theta)$ of the sixth comparative example for each of angles $\theta$ with respect to change of a height h.

FIGS. 108A and 108B are graphs respectively illustrating the changes of the curvatures $C_1(h,\theta)$ and $C_2(h,\theta)$ for each of the angle $\theta$ of 0°, 45°, 90°, 135°, 180°, 225°, 270° and 315° with respect to the change of the height h.

The outer surface 12 is the rotationally-symmetrical aspherical surface. Therefore, even though the change of the curvature $C_1(h,\theta)$ is represented by a curve, all of the changes of the curvature $C_1(h,\theta)$ at different angles $\theta$ are overlapping one another on the curve shown in FIG. 72A.

Since the inner surface 13 is the toric surface, a linear line (a solid line) on which the changes of the curvature $C_2(h,\theta)$ of the angles $\theta$ of 45° and 225° are overlapping, a linear line on which the changes of the curvature $C_2(h,\theta)$ of the angles $\theta$ of 0°, 90°, 180° and 270° are overlapping, and a linear line on which the changes of the curvature $C_2(h,\theta)$ of the angles $\theta$ of 135° and 315° are overlapping are indicated in order of the increasing amount of the curvature.

Figure 109A:
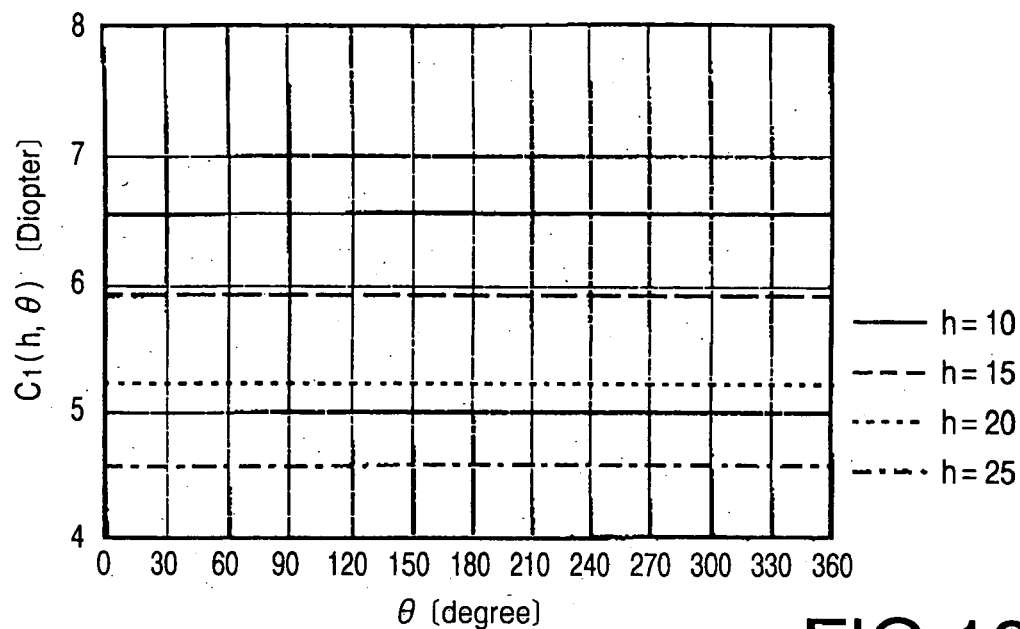
FIG. 109A is a graph illustrating change of the curvature $C_1(h,\theta)$ of the sixth comparative example for each of the heights h with respect to change of the angle $\theta$.
Figure 109B:
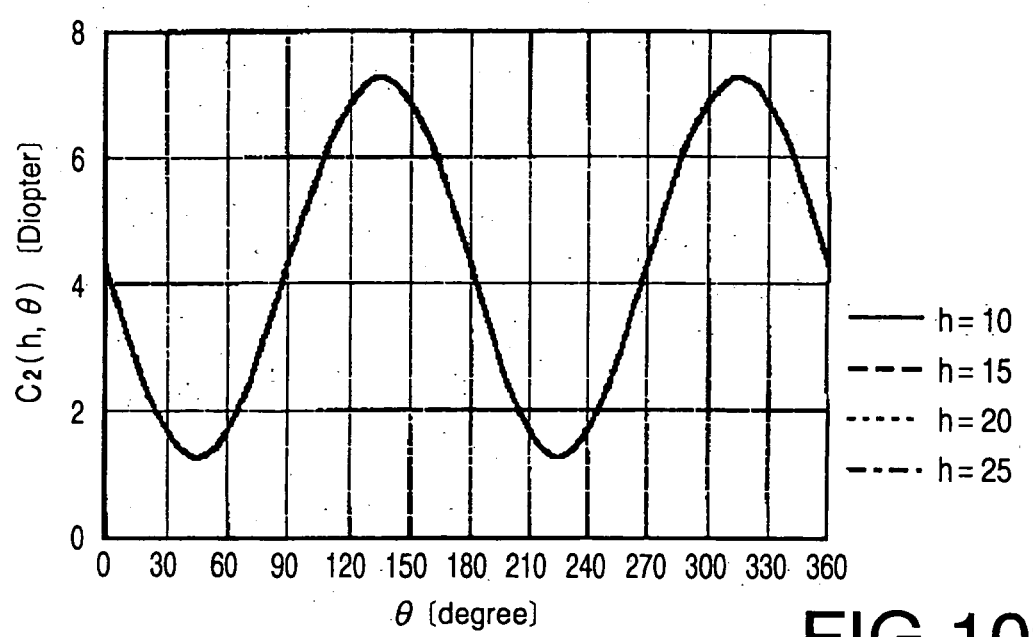
FIG. 109B is a graph illustrating change of the curvature $C_2(h,\theta)$ of the sixth comparative example for each of the heights h with respect to change of the angle $\theta$.

FIGS. 109A and 109B are graphs respectively illustrating the changes of the curvatures $C_1(h,\theta)$ and $C_2(h,\theta)$ for each of the heights h of 10 mm, 15 mm, 20 mm and 25 mm with respect to the change of the angle $\theta$.

Since the curvature $C_1(h,\theta)$ does not change with respect to the change of the angle $\theta$, the curvature $C_1(h,\theta)$ is represented by a linear line for each of the heights of 10 mm, 15 mm, 20 mm and 25 mm in FIG. 109A. Also, the curvature $C_1(h,\theta)$ becomes greater as the height h increases. As shown in FIG. 109B, since the inner surface 13 is the toric surface, the change of the curvature $C_2(h,\theta)$ is represented by a curve like a sine wave on which all of the changes of the curvature $C_2(h,\theta)$ at different heights h are overlapping one another.

Figure 110A:
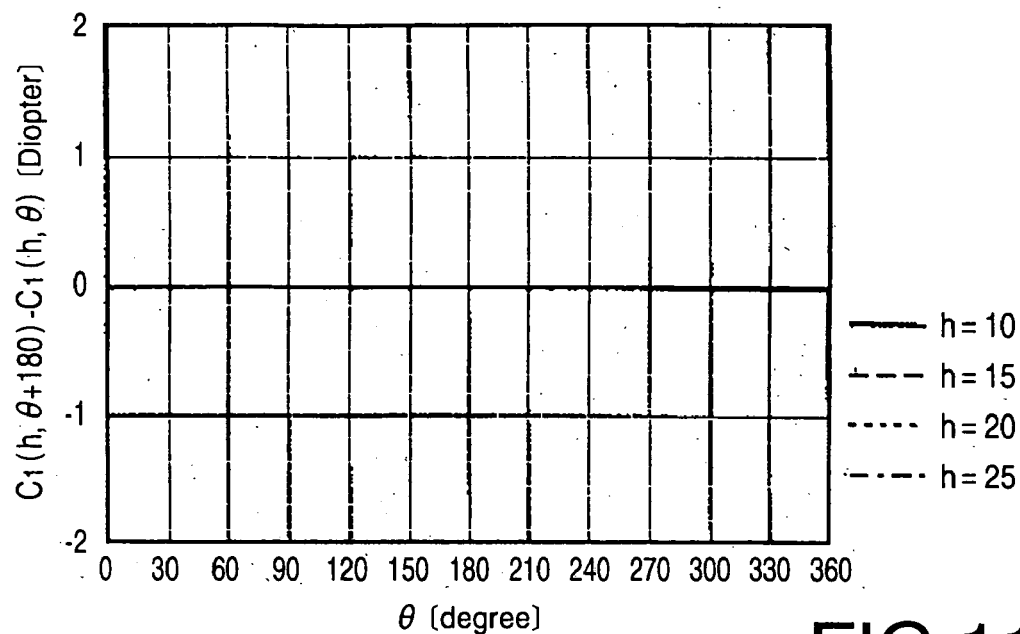
FIG. 110A is a graph illustrating change of a value of $C_1(h,\theta+180)-C_1(h,\theta)$ of the sixth comparative example for each of the heights h with respect to the change of the angle $\theta$.
Figure 110B:
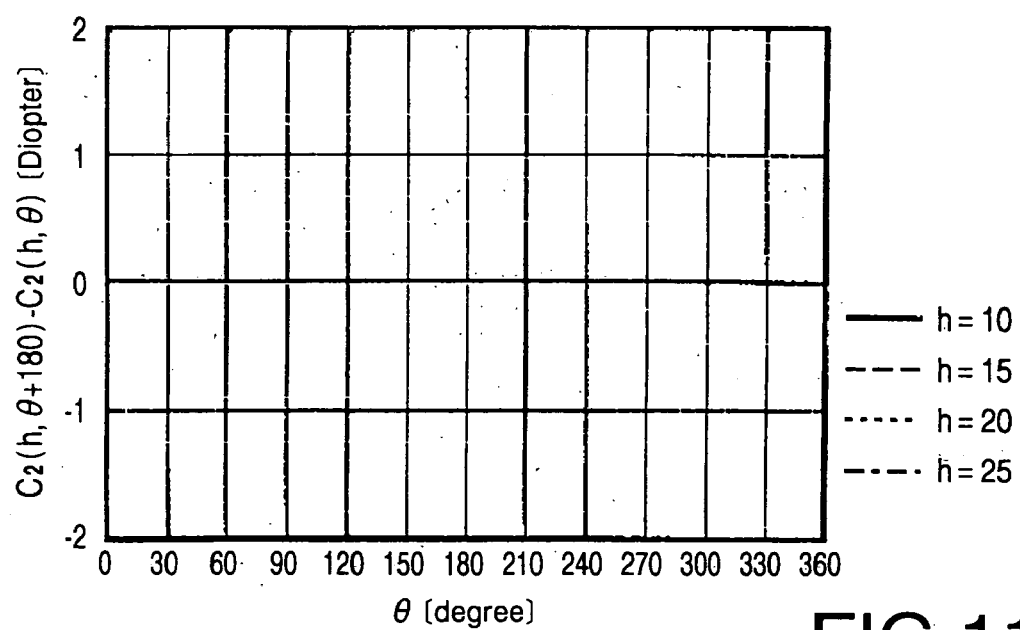
FIG. 110B is a graph illustrating change of a value of $C_2(h,\theta+180)-C_2(h,\theta)$ of the sixth comparative example for each of the heights h with respect to the change of the angle $\theta$.
Figure 111:
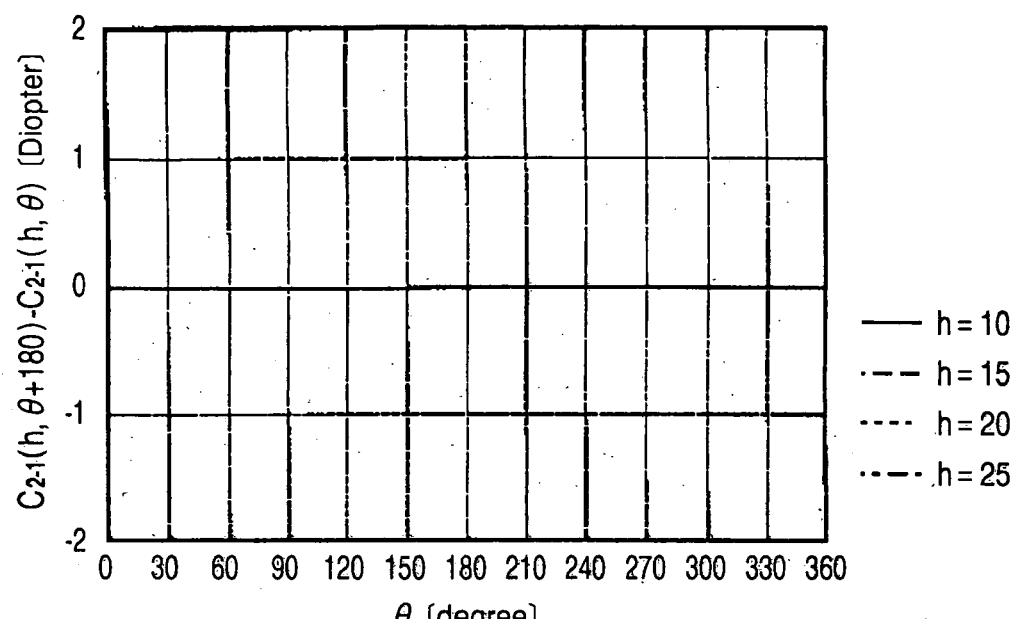
FIG. 111 is a graph illustrating change of a value of $C_{2-1}(h,\theta+180)-C_{2-1}(h,\theta)$ of the sixth comparative example for each of the heights h with respect to the change of the angle $\theta$.

FIGS. 110A and 110B are graphs respectively illustrating the changes of the value of $C_1(h,\theta+180)-C_1(h,\theta)$ of the condition (6) and the value of $C_2(h,\theta+180)-C_2(h,\theta)$ of the condition (4) for each of the heights h of 10 mm, 15 mm, 20 mm and 25 mm with respect to the change of the angle $\theta$. FIG. 111 is a graph illustrating the change of the value of $C_{2-1}(h,\theta+180)-C_{2-1}(h,\theta)$ of the condition (2) for each of the heights h of 10 mm, 15 mm, 20 mm and 25 mm with respect to the change of the angle $\theta$.

Since the outer surface is rotationally symmetrical and the inner surface is the toric surface which is symmetrical with respect to the optical axis thereof, the value of $C_1(h,\theta+180)-C_1(h,\theta)$ of the condition (6), the value of $C_2(h,\theta+180)-C_2(h,\theta)$ the condition (4) and the value of $C_{2-1}(h,\theta+180)-C_{2-1}(h,\theta)$ of the condition (2) take a constant value of zero regardless of the height h and the angle $\theta$. Accordingly, the sixth comparative example does not satisfy the conditions (6), (4) and (2).

Figure 112A:
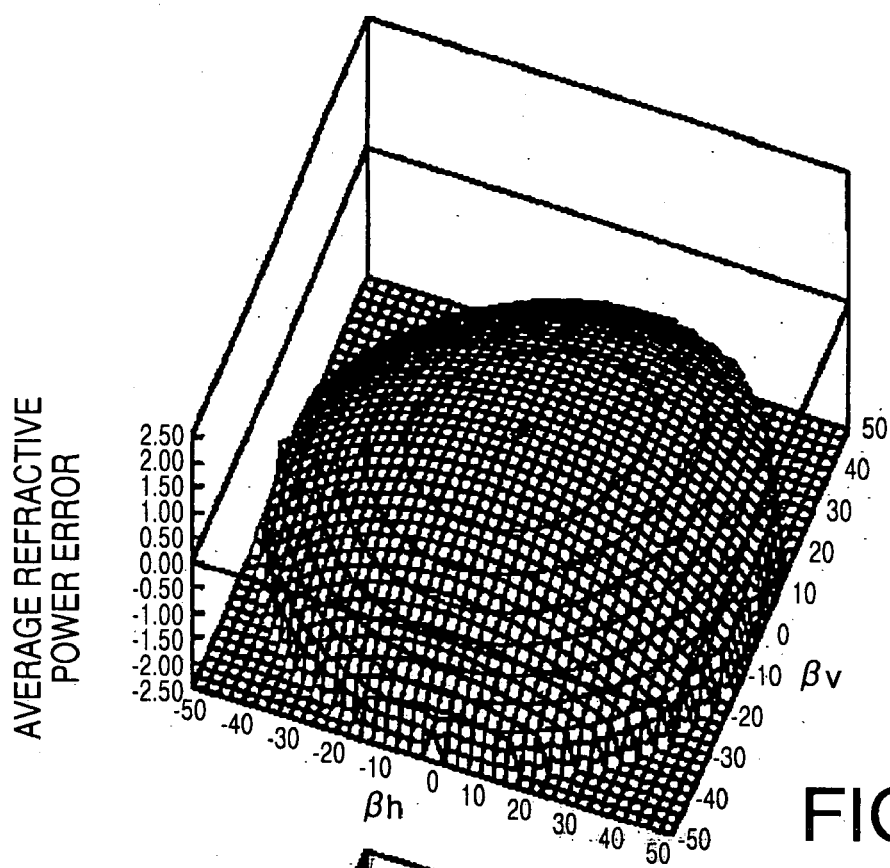
FIG. 112A is a three dimensional graph illustrating an average refractive power error of the spectacle lens of the sixth comparative example.
Figure 112B:
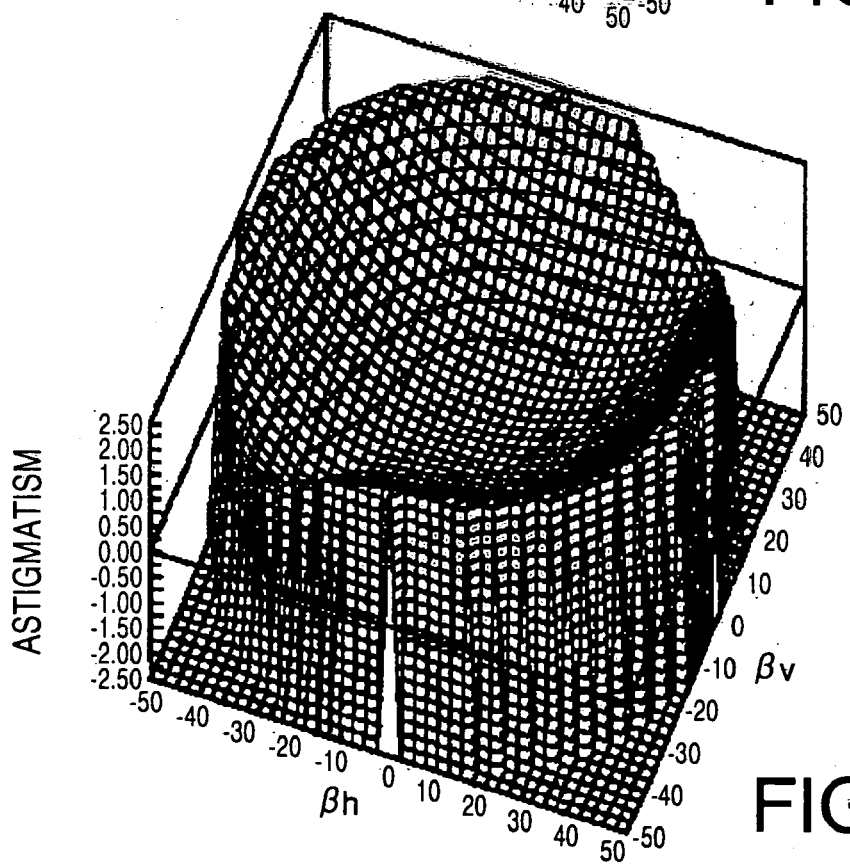
FIG. 112B is a three dimensional graph illustrating astigmatism of the spectacle lens of the sixth comparative example.

FIGS. 112A and 112B represent optical performance of the spectacle lens of the sixth comparative example. FIGS. 112A and 112B are three dimensional graphs of the average refractive power error and the astigmatism, respectively. By comparing FIG. 112A with FIGS. 100A and 106A and comparing FIG. 112B with FIGS. 100B and 106B, it is understood that the aberrations are sufficiently corrected in each of the eleventh and the twelfth examples.

As described above, according to the embodiments of the invention a single-vision spectacle lens configured such that an upper portion of the lens has suitable performance for the distance vision and that a lower portion of the lens has suitable performance for the near vision can be accomplished.

Although the present invention has been described in considerable detail with reference to certain preferred embodiments thereof, other embodiments are possible.

The present disclosure relates to the subject matter contained in Japanese Patent Application No. P2003-055191, filed on Mar. 3, 2003, which is expressly incorporated herein by reference in its entirety.

What is claimed is:

1. A spectacle lens having an outer surface and an inner surface, one of the outer and inner surfaces being configured to be a rotationally-asymmetrical aspherical surface, when a curvature at a coordinate $(h,\theta)$ of the outer surface is represented by $C_1(h,\theta)$, a curvature at a coordinate $(h,\theta)$ of the inner surface is represented by $C_2(h,\theta)$, and a difference between curvatures of the outer surface and the inner surface at the coordinate (h,θ) is represented by $C_{2-1}(h,\theta)=C_2(h,\theta)-C_1(h,\theta)$, if $C_{2-1}(0,\theta)>0$, said spectacle lens satisfying a condition (1):

$$C_{2-1}(h,\theta+180)-C_{2-1}(h,\theta)>0 \qquad (1),$$

and if $C_{2-1}(0,\theta)<0$, said spectacle lens satisfying a condition (2):

$$C_{2-1}(h,\theta+180)-C_{2-1}(h,\theta)<0 \qquad (2)$$

wherein the conditions (1) and (2) hold within ranges of 10 mm≦h≦20 mm and 30°≦θ≦150°, wherein given that a normal line which is normal to the outer surface through a centration point is regarded as a $z_1$-axis, a direction which is perpendicular to the $z_1$-axis and which corresponds to an upward direction in the state of wearing of said spectacle lens is regarded as a $y_1$-axis, and a direction which is perpendicular to the $y_1$-axis and the $z_1$-axis in a left hand coordinate system is regarded as an $x_1$-axis, the coordinate (h,θ) of the outer surface is defined as a point having a height h (unit: mm) from the $z_1$-axis on an intersection line which is formed between the outer surface and a plane including the $z_1$-axis and forming an angle θ (unit: degree) with respect to the $x_1$-axis, wherein given that a normal line which is normal to the inner surface through the centration point is regarded as a $z_2$-axis, a direction which is perpendicular to the $z_2$-axis and which corresponds to the upward direction in the state of wearing of said spectacle lens is regarded as a $y_2$-axis, and a direction which is perpendicular to the $y_2$-axis and the $z_2$-axis in the left hand coordinate system is regarded as an $x_2$-axis, the coordinate (h,θ) of the inner surface is defined as a point having a height h (unit: mm) from the $z_2$-axis on an intersection line which is formed between the inner surface and a plane including the $z_2$-axis and forming an angle θ (unit: degree) with respect to the $x_2$-axis, wherein the centration point being defined as a point which coincides with a pupil position of a wearer when said spectacle lens is viewed from a front side in a state of wearing of said spectacle lens.

2. The spectacle lens according to claim 1, wherein when the inner surface is configured to be the rotationally-asymmetrical aspherical surface, if $C_{2-1}(0,\theta)>0$, said spectacle lens satisfying a condition (3):

$$C_2(h,\theta+180)-C_2(h,\theta)>0 \qquad (3),$$

and if $C_{2-1}(0,\theta)<0$, said spectacle lens satisfying a condition (4):

$$C_2(h,\theta+180)-C_2(h,\theta)<0 \qquad (4)$$

wherein the conditions (3) and (4) hold within the ranges of 10 mm≦h≦20 mm and 30°θ≦150°.

3. The spectacle lens according to claim 1, wherein when the outer surface is configured to be the rotationally-asymmetrical aspherical surface, if $C_{2-1}(0,\theta)>0$, said spectacle lens satisfying a condition (5):

$$C_1(h,\theta+180)-C_1(h,\theta)<0 \qquad (5),$$

and if $C_{2-1}(0,\theta)<0$, said spectacle lens satisfying a condition (6):

$$C_1(h,\theta+180)-C_1(h,\theta)>0 \qquad (6)$$

wherein the conditions (5) and (6) hold within the ranges of 10 mm≦h≦20 mm and 30°≦θ≦150°.

4. The spectacle lens according to claim 1, wherein the outer surface is configured to be a spherical surface, and the inner surface is configured to be the rotationally-asymmetrical aspherical surface.

5. The spectacle lens according to claim 1, wherein the outer surface is configured to be the rotationally-asymmetrical aspherical surface, and the inner surface is configured to be a spherical surface.

6. The spectacle lens according to claim 1, wherein the outer surface is configured to be the rotationally-asymmetrical aspherical surface, and the inner surface is configured to be a toric surface.

7. The spectacle lens according to claim 1, wherein both of the outer and inner surfaces are configured to be aspherical surfaces.

8. The spectacle lens according to claim 1, wherein the outer surface is configured to be a rotationally-symmetrical aspherical surface, and the inner surface is configured to be the rotationally-asymmetrical aspherical surface.

9. The spectacle lens according to claim 1, wherein the outer surface is configured to be the rotationally-asymmetrical aspherical surface, and the inner surface is configured to be a rotationally-symmetrical aspherical surface.

10. The spectacle lens according to claim 1, wherein both of the outer and inner surfaces are configured to be the rotationally-asymmetrical aspherical surfaces.

11. The spectacle lens according to claim 1, wherein one of the outer and inner surfaces has cylindrical refractive power for correction of an astigmatic vision.

* * * * *